(12) United States Patent
Oh et al.

(10) Patent No.: US 11,231,612 B2
(45) Date of Patent: Jan. 25, 2022

(54) BROADBAND ADAPTIVE LENS ASSEMBLY WITH VARIABLE OPTICAL POWER FOR AUGMENTED REALITY DISPLAY

(71) Applicant: Magic Leap, Inc., Plantation, FL (US)

(72) Inventors: Chulwoo Oh, Cedar Park, TX (US); Ravi Kumar Komanduri, Austin, TX (US); Roy Matthew Patterson, Hutto, TX (US); Charles Scott Carden, Austin, TX (US); Michael Nevin Miller, Austin, TX (US); Vikramjit Singh, Pflugerville, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/171,290

(22) Filed: Oct. 25, 2018

(65) Prior Publication Data

US 2019/0227375 A1 Jul. 25, 2019

Related U.S. Application Data

(60) Provisional application No. 62/577,672, filed on Oct. 26, 2017.

(51) Int. Cl.
*G02F 1/1335* (2006.01)
*G09G 5/00* (2006.01)
(Continued)

(52) U.S. Cl.
CPC ......... *G02F 1/133526* (2013.01); *G02B 1/00* (2013.01); *G02B 5/1833* (2013.01);
(Continued)

(58) Field of Classification Search
CPC ............. G09G 5/14; G09G 3/003; G09G 5/00
See application file for complete search history.

(56) References Cited

U.S. PATENT DOCUMENTS 6,850,221 B1 2/2005 Tickle
9,081,426 B2 7/2015 Armstrong
(Continued)

FOREIGN PATENT DOCUMENTS

WO WO 2003/077012 9/2003
WO WO 2019/084334 5/2019

OTHER PUBLICATIONS

Invitation to Pay Additional Fees for PCT Application No. PCT/US 18/57604, dated Jan. 8, 2019.
(Continued)

*Primary Examiner* — Lauren Nguyen
(74) *Attorney, Agent, or Firm* — Knobbe, Martens, Olson & Bear, LLP

(57) ABSTRACT

A display device comprises a waveguide configured to guide light in a lateral direction parallel to an output surface of the waveguide. The waveguide is further configured to outcouple the guided light through the output surface. The display device additionally comprises a broadband adaptive lens assembly configured to incouple and to diffract therethrough the outcoupled light from the waveguide. The broadband adaptive lens assembly comprises a first waveplate lens comprising a liquid crystal (LC) layer arranged such that the waveplate lens has birefringence ($\Delta n$) that varies in a radially outward direction from a central region of the first waveplate lens and configured to diffract the outcoupled light at a diffraction efficiency greater than 90% within a wavelength range including at least 450 nm to 630 nm. The broadband adaptive lens assembly is configured to be selectively switched between a plurality of states having different optical powers.

16 Claims, 56 Drawing Sheets

(51) Int. Cl.

| | | |
|---|---|---|
| *G02B 6/12* | (2006.01) | |
| *G09G 3/00* | (2006.01) | |
| *G09G 5/14* | (2006.01) | |
| *G02B 1/00* | (2006.01) | |
| *G02B 5/30* | (2006.01) | |
| *G02B 5/18* | (2006.01) | |
| *G02B 6/122* | (2006.01) | |
| *G02B 27/01* | (2006.01) | |
| *G02F 1/1337* | (2006.01) | |
| *G06K 9/00* | (2006.01) | |
| *G06T 19/00* | (2011.01) | |

(52) U.S. Cl.
CPC .............. *G02B 5/30* (2013.01); *G02B 6/12* (2013.01); *G02B 6/122* (2013.01); *G02B 27/0172* (2013.01); *G02F 1/1337* (2013.01); *G02F 1/133528* (2013.01); *G06K 9/00671* (2013.01); *G06T 19/006* (2013.01); *G09G 3/002* (2013.01); *G09G 3/003* (2013.01); *G09G 5/00* (2013.01); *G09G 5/14* (2013.01)

(56) References Cited

U.S. PATENT DOCUMENTS

| | | | |
|---|---|---|---|
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 2005/0232530 | A1 | 10/2005 | Kekas |
| 2006/0028436 | A1 | 2/2006 | Armstrong |
| 2006/0077861 | A1* | 4/2006 | Katsuma ............... G11B 7/1374 369/112.16 |
| 2007/0081123 | A1 | 4/2007 | Lewis |
| 2012/0050143 | A1 | 3/2012 | Border et al. |
| 2012/0127062 | A1 | 5/2012 | Bar-Zeev et al. |
| 2012/0162549 | A1 | 6/2012 | Gao et al. |
| 2013/0077040 | A1 | 3/2013 | Escuti et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0335683 | A1* | 12/2013 | Escuti ................. G02F 1/1393 349/96 |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2016/0011419 | A1 | 1/2016 | Gao |
| 2016/0026253 | A1 | 1/2016 | Bradski et al. |
| 2016/0033698 | A1 | 2/2016 | Escuti et al. |
| 2016/0041449 | A1 | 2/2016 | Clark et al. |
| 2016/0047956 | A1 | 2/2016 | Nelson et al. |
| 2016/0116738 | A1 | 4/2016 | Osterhout |
| 2017/0184848 | A1* | 6/2017 | Vallius ............... G02B 27/4205 |
| 2017/0373459 | A1 | 12/2017 | Weng et al. |

OTHER PUBLICATIONS

Crawford, et al.: "Liquid-crystal diffraction gratings using polarization holography alighnment techniques," Journal of Applied Physics 98, 123102, 2005.

Escuti, M. et al., "39.4: Polarization-independent switching with high contrast from a liquid crystal polarization grating", SID Symposium Digest, vol. 37, pp. 1443-1446, Jun. 2006, in 5 pages.

Escuti, M. et al., "Polarization-Independent LC Microdisplays Using Liquid Crystal Polarization Gratings: A Viable Solution", ILCC presentation, Jul. 1, 2008, in 15 pages.

Kim, J. et al., "Wide-angle, nonmechanical beam steering with high throughput utilizing polarization gratings", Applied Optics, vol. 50, No. 17, Jun. 10, 2011, in 4 pages.

Komanduri, R. et al., "18:3: Late-News Paper: Polarization Independent Liquid Crystal Microdisplays", SID Digest, vol. 39, No. 1, pp. 236-239, May 2008, in 4 pages.

Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.

Komanduri, R. et al., "Elastic Continuum Analysis of the Liquid Crystal Polarization Grating", Physical review. E, Statistical, nonlinear, and soft matter physics, May 25, 2007, in 8 pages.

Komanduri, et al., "Multi-twist retarders: broadband retaration control using self-aligning reactive liquid crystal layers," Optical Society of America, Optics Express 404, vol. 21, No. 1, Jan. 14, 2013.

Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.

Komanduri, R. et al., "Polarization-independent modulation for projection displays using small-period LC polarization gratings", Journal of the Society for information display, vol. 15, No. 8, pp. 589-594, Aug. 2007, in 7 pages.

Lee, et al., Negative dispersion of birefringence in two-dimensionally self-organized smectic liquid crystal and monomer thin film, Optics Letters, vol. 39, No. 17, Sep. 1, 2014.

Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.

Nikolova et al., "Diffraction Efficiency and Selectivity of Polarization Holographic Recording", Optica Acta: Int'l J Optics (1984) 31(5):579-588.

Oh, C. et al., 16.2: Polarization-Independent Modulation Using Standard Liquid Crystal Microdisplays and Polymer Polarization Gratings, IDRC, 2008, in 4 pages.

Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.

Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.

Oh, C. et al., "Numerical analysis of polarization gratings using the finite-difference time-domain method", Physical review A, vol. 76, Oct. 12, 2007, in 8 pages.

Oh, C. et al., "Polarization-Independent Modulation using Standard LCDs and Polymer PGs", 2008, in 6 pages.

Yang et al. Negative dispersion of birefringence of smectic liquid crystal-polymer compostie: dependence on the constituent molecules andtemperature, Optical Society of America, Optics Express 2466, vol. 23, No. 3, Feb. 9, 2015.

International Search Report and Written Opinion for PCT Application No. PCT/US 18/57604, dated Mar. 3, 2019.

(56) References Cited

OTHER PUBLICATIONS

International Preliminary Report for Patentability for PCT Application No. PCT/US 18/57604, dated Apr. 28, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpreserice.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye tracking in Advanced Interface Design," Human-Computer interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tabiryan, et al., "Thin wavepiate lenses of switchable focal length—new generation in optics," Optics Express, vol. 23, No. 20, Sep. 22, 2015.
Tabiryan, et al., "Broadband waveplate lenses," Optics Express, vol. 24, No. 7, Mar. 24, 2016.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

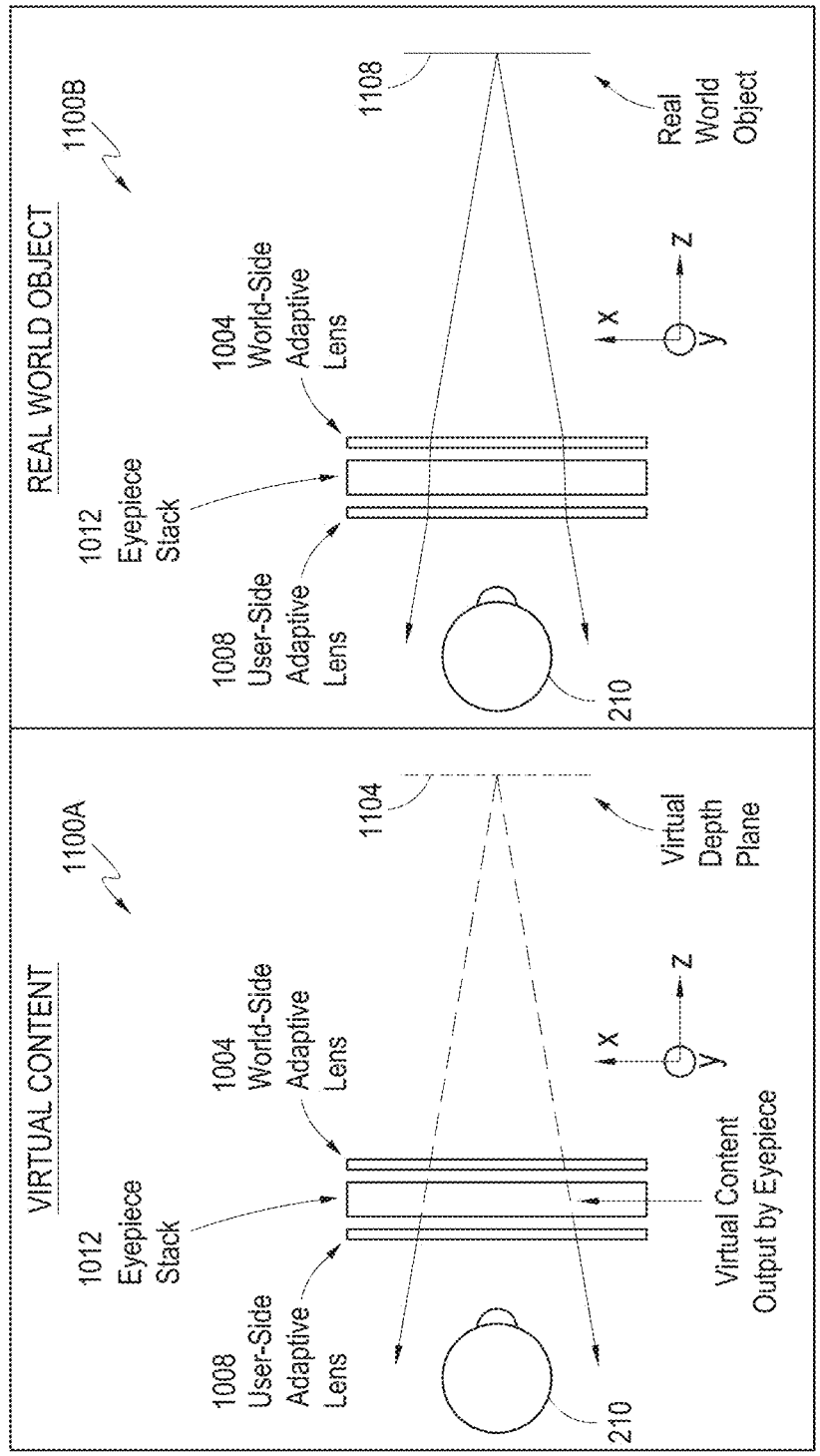

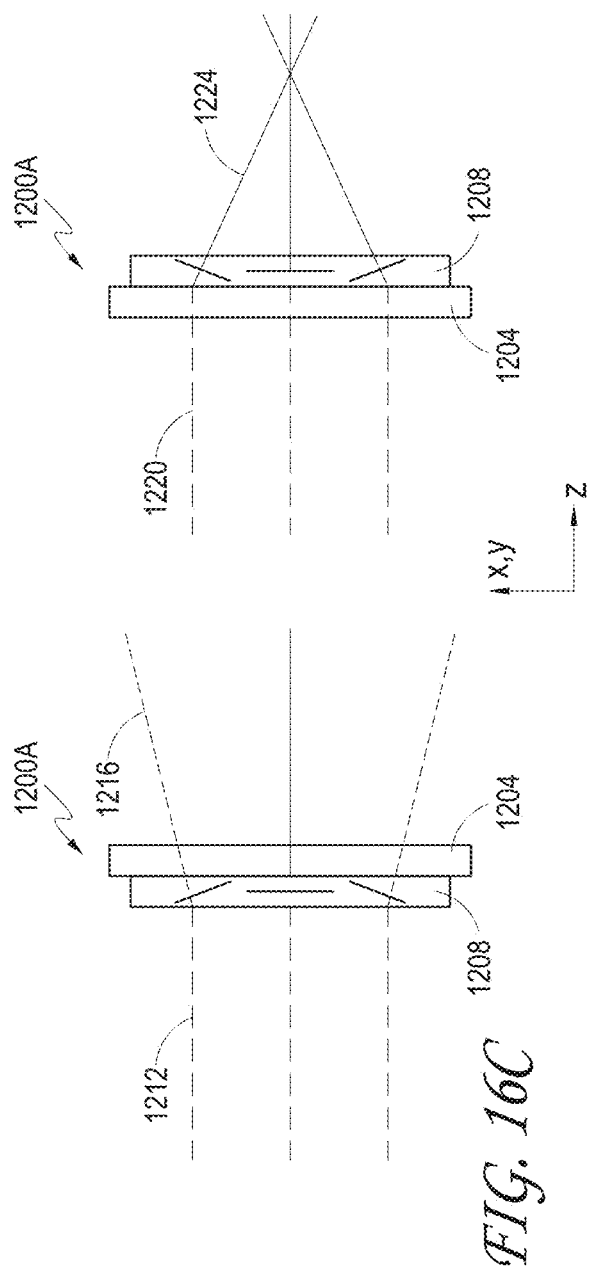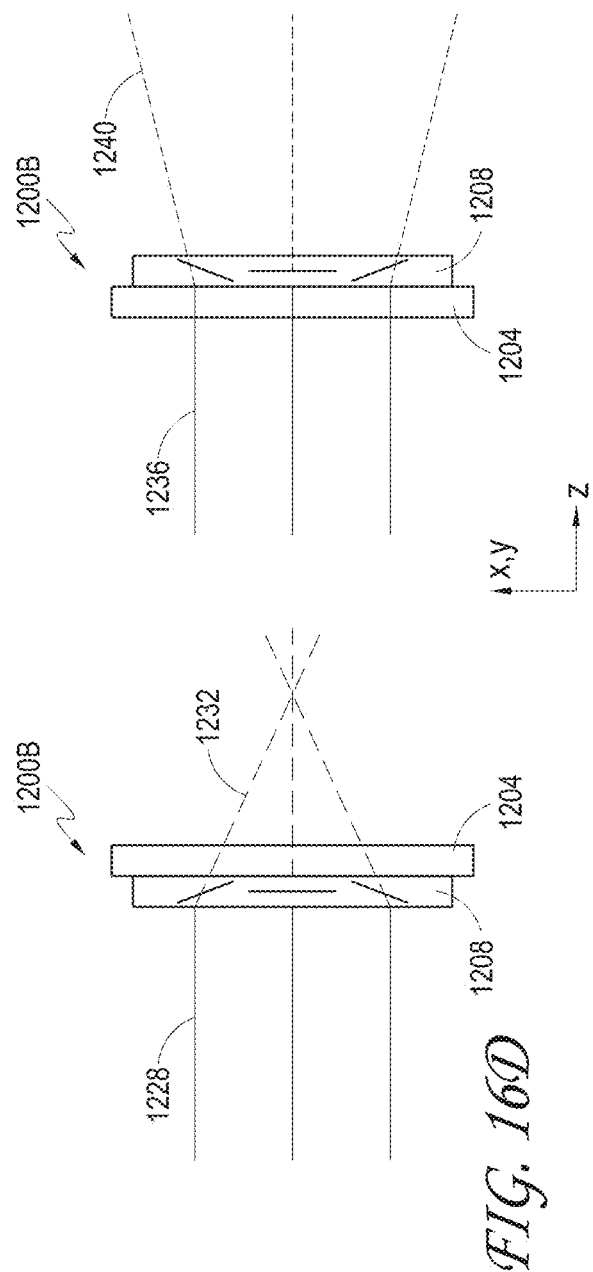
FIG. 16C
FIG. 16D

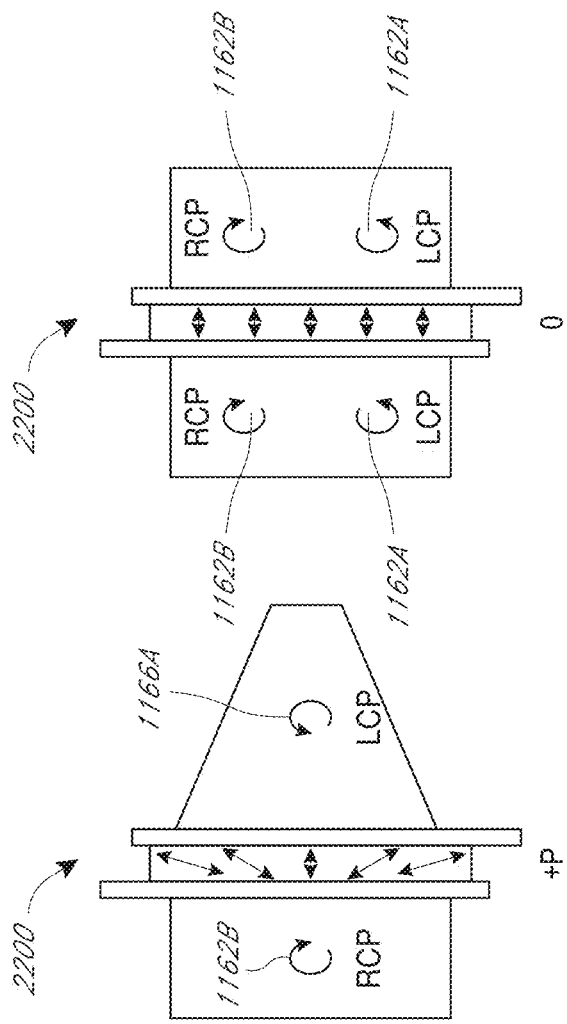
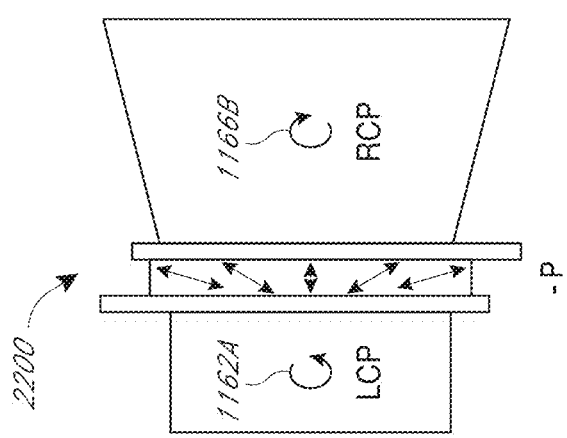
FIG. 22C
FIG. 22B
FIG. 22A

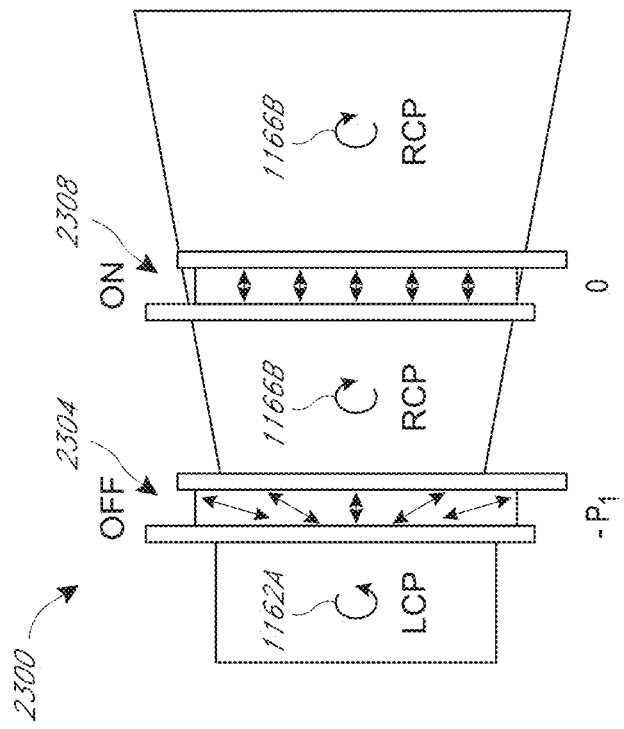
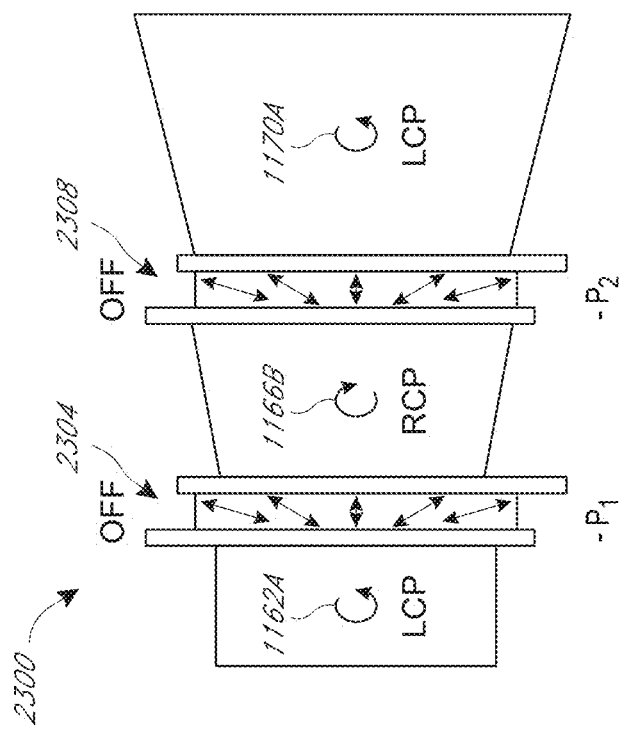

Photo-alignment layer coating

Optical patterning/recording

- Holographic 2-beam exposure
- Optical replication with 1-beam

Liquid crystal polymer coating/UV curing

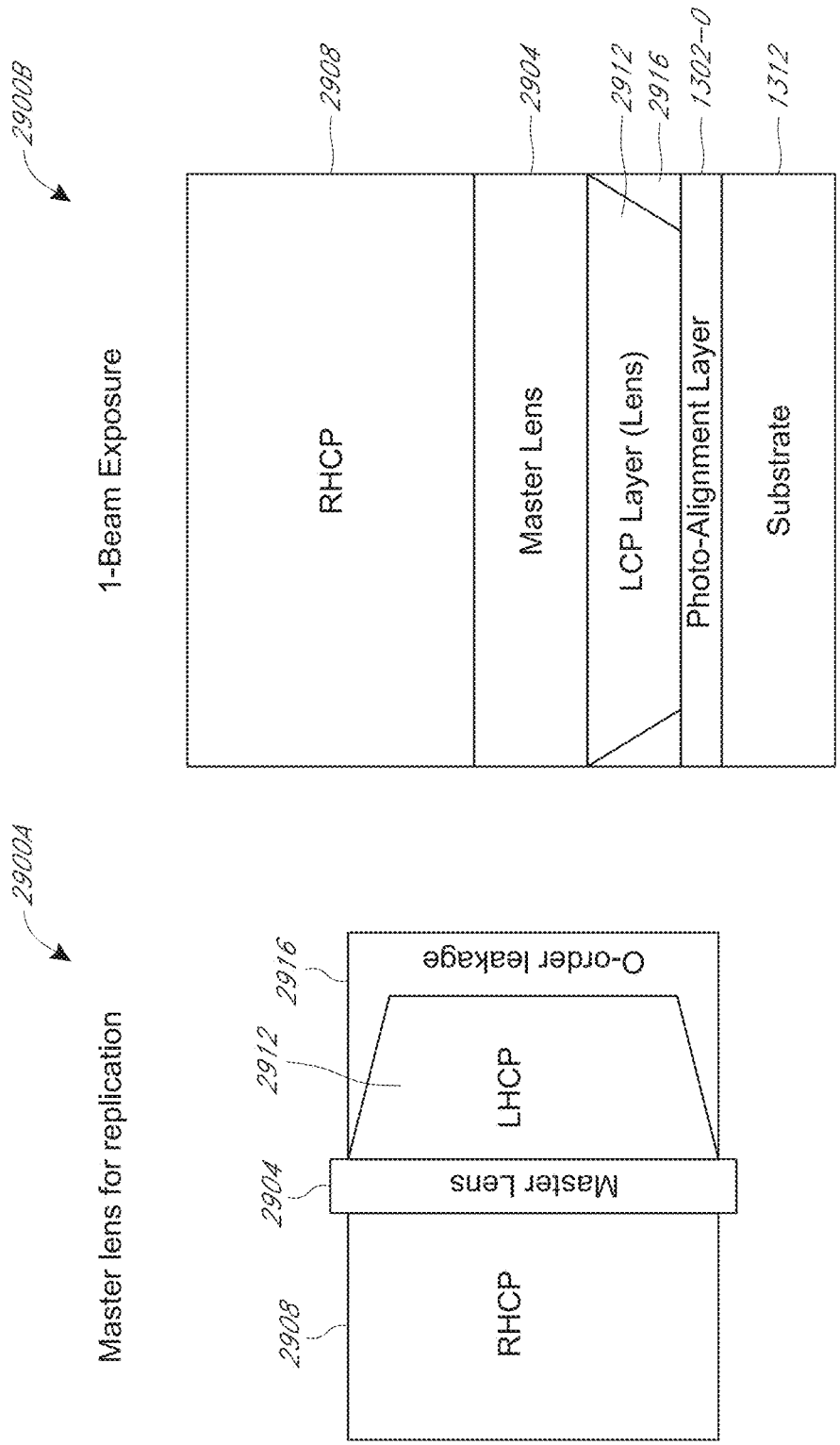

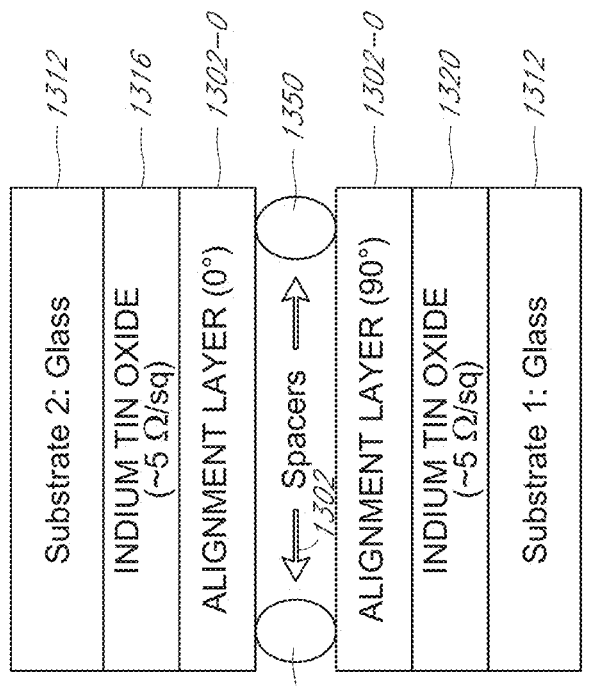
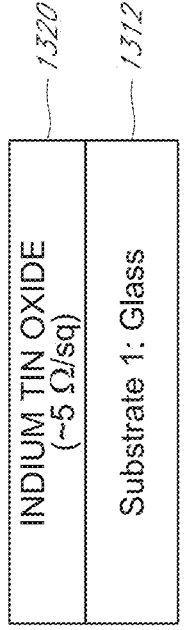
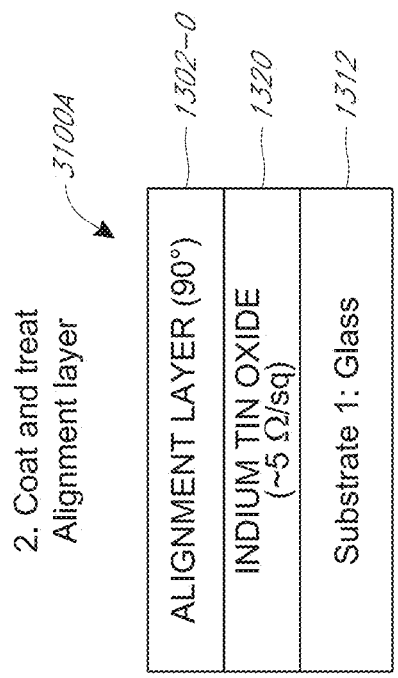

Step 1. Alignment layer coating/patterning

Step 2. Release surface treatment

Step 3. LCP layer coating

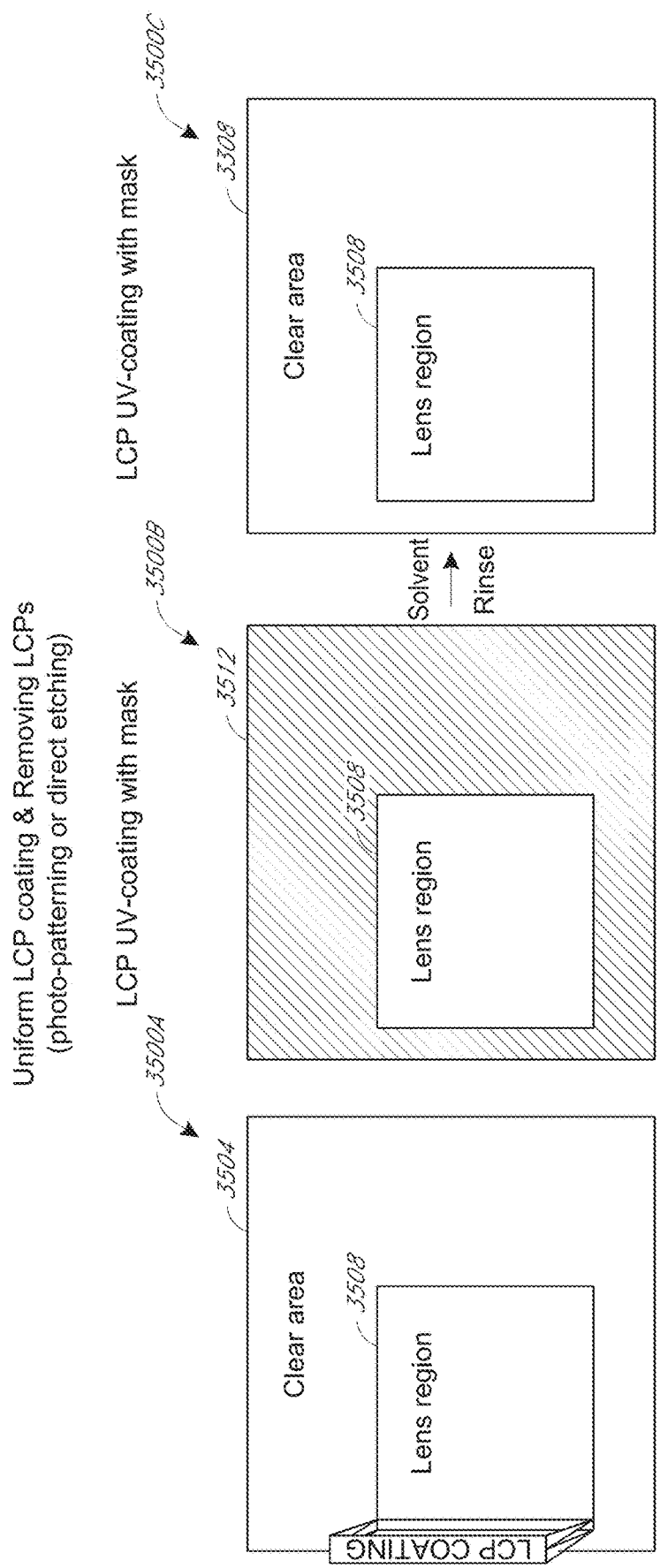

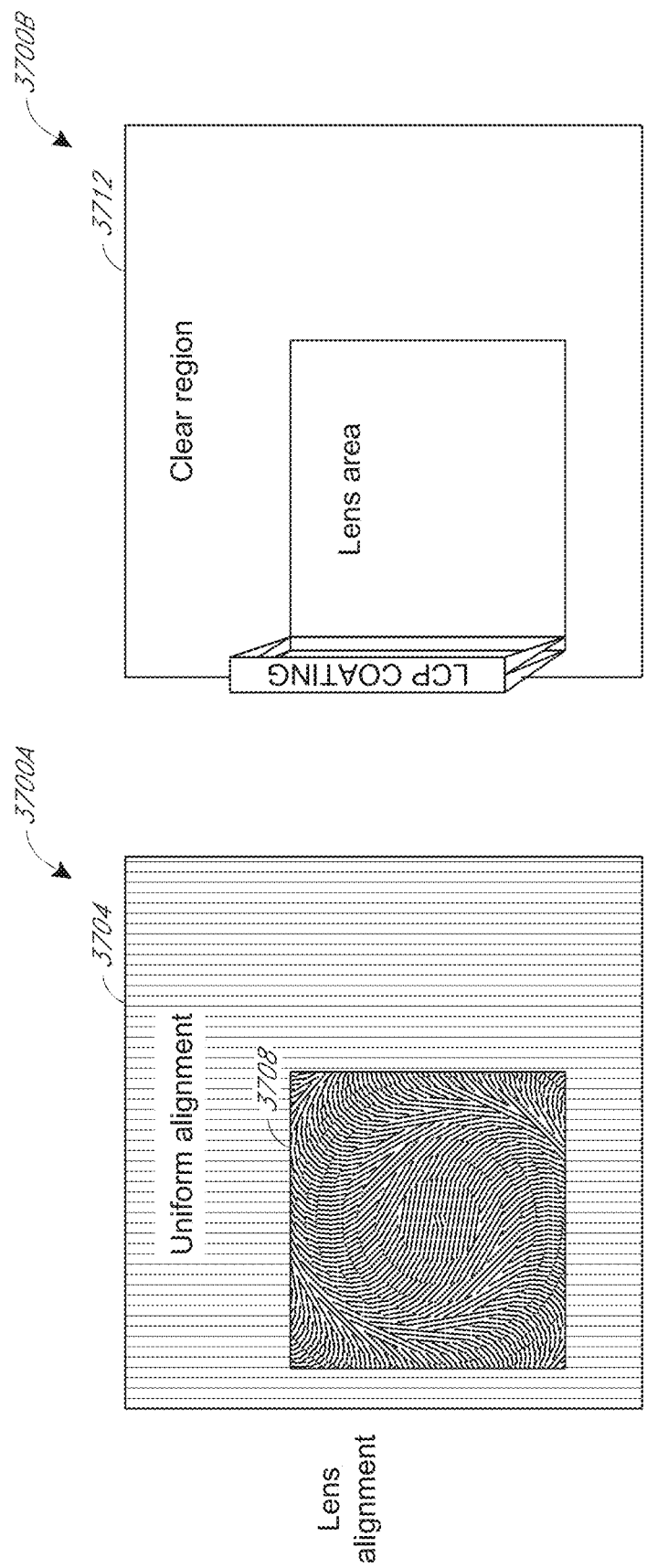

BROADBAND ADAPTIVE LENS ASSEMBLY WITH VARIABLE OPTICAL POWER FOR AUGMENTED REALITY DISPLAY

CROSS-REFERENCE TO RELATED APPLICATIONS

This application claims the benefit of priority to U.S. Provisional Patent Application No. 62/577,672, filed Oct. 26, 2017, entitled "BROADBAND ADAPTIVE LENS ASSEMBLY FOR AUGMENTED REALITY DISPLAY," the content of which is hereby incorporated by reference herein in its entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In an aspect, a display device comprises a waveguide configured to guide light in a lateral direction parallel to an output surface of the waveguide. The waveguide is further configured to outcouple the guided light through the output surface. The display device additionally comprises a broadband adaptive lens assembly configured to incouple and to diffract therethrough the outcoupled light from the waveguide. The broadband adaptive lens assembly comprises a first waveplate lens comprising a liquid crystal (LC) layer arranged such that the waveplate lens has birefringence ($\Delta n$) that varies in a radially outward direction from a central region of the first waveplate lens and configured to diffract the outcoupled light at a diffraction efficiency greater than 90% within a wavelength range including at least 450 nm to 630 nm. The broadband adaptive lens assembly is configured to be selectively switched between a plurality of states having different optical powers.

In another aspect, a broadband adaptive lens assembly for a display device comprises a first waveplate lens comprising a liquid crystal (LC) layer having LC molecules arranged such that the first waveplate lens has birefringence ($\Box n$) that varies in a radially outward direction from a central region of the first waveplate lens and configured to diffract light at a diffraction efficiency greater than 90% within a wavelength in a range spanning at least 450 nm to 630 nm. The broadband adaptive lens assembly additionally comprises a switchable waveplate configured to be electrically activated and deactivated. The broadband adaptive lens assembly is configured to be selectively switched between at least two lens states. The two lens states include a first lens state configured to exert a first lens effect according to a first optical power and to alter a polarization of light passing through the broadband adaptive lens assembly, and a second lens state configured to exert a second lens effect according to a second optical power and to preserve the polarization of the light passing through the broadband adaptive lens assembly.

In another aspect, a broadband adaptive lens assembly for a display device comprises a first waveplate lens comprising a liquid crystal (LC) layer formed on a substrate. The LC layer has LC molecules that are arranged such that the first waveplate lens has birefringence ($\Delta n$) that varies in a radially outward direction from a central region of the LC layer and configured to diffract light at a diffraction efficiency greater than 90% within a wavelength range spanning at least 450 nm to 630 nm. Ones of the LC molecules that are closest to the substrate have generally the same orientation direction at different locations at the same radius from the central region. The broadband adaptive lens assembly is configured to be selectively switched between at least two lens states. A first lens state is configured to exert a first lens effect according to a first optical power and to alter a polarization of light passing through the broadband adaptive lens assembly. A second lens state is configured to exert a second lens effect according to a second optical power and to preserve the polarization of the light passing through the broadband adaptive lens assembly.

In another aspect, an integrated broadband adaptive lens assembly for a display device comprises a first electrode, a second electrode and a liquid crystal (LC) layer stack interposed between the first electrode and the second electrode. The LC layer stack comprises a switchable liquid crystal (LC) layer comprising unpolymerized LC molecules interposed between first and second polymerized LC layers each comprising polymerized LC molecules. LC molecules in the switchable LC layer that are adjacent to LC molecules in the first polymerized LC layer are generally elongated in a first direction. LC molecules in the switchable LC layer that are adjacent to LC molecules in the second polymerized LC layer are generally elongated in a second direction crossing the first direction. The switchable LC layer comprises LC molecules configured such that under a first voltage condition across the first and second electrodes, a polarization of incident light passing therethrough is preserved, while under a second voltage condition across the first and second electrodes, the polarization of the incident light passing therethrough is altered.

In another aspect, a display device comprises a pair of adaptive lens assemblies in an optical path. Each of the adaptive lens assemblies comprises a corresponding switchable waveplate configured to diffract light at a diffraction efficiency greater than 90% within a wavelength range including at least 450 nm to 630 nm and to switch between first and second states to selectively alter a polarization state of light passing therethrough. The adaptive lens assemblies have optical powers with opposite signs.

In another aspect, an adaptive lens assembly comprises one or more waveplate lenses and one or more switchable waveplates aligned in an optical path. Each of the one or more waveplate lenses is configured to diffract outcoupled light at a diffraction efficiency greater than 90% within a wavelength range including at least 450 nm to 630 nm, to alter a polarization state of light passing therethrough, to provide a first optical power for light having a first polarization, and to provide a second optical power for light having a second polarization. Each of the one or more switchable waveplates is configured to diffract the outcoupled light at a diffraction efficiency greater than 90% within a wavelength range including at least 450 nm to 630 nm and is selectively switchable between a first state configured to pass the light therethrough without altering a polarization state of the light, and a second state configured to alter the polarization state of the light passing therethrough.

In another aspect, a wearable augmented reality head-mountable display system comprises a light modulating system configured to output light to form an image, a head mountable frame, one or more waveguides attached to the frame and configured to receive the light from the light modulating system and a pair of adaptive lens assemblies, wherein the one or more waveguides are disposed between the adaptive lens assemblies. Each of the adaptive lens assemblies comprises one or more waveplate lenses configured to diffract outcoupled light at a diffraction efficiency greater than 90% within a wavelength range including at least 450 nm to 630 nm and to provide a first optical power for light having a first polarization, and to provide a second optical power for light having a second polarization. The each of the adaptive lens assemblies additionally comprises one or more switchable waveplates in an optical path, wherein each of the one or more switchable waveplates is configured to diffract the outcoupled light at a diffraction efficiency greater than 90% within a wavelength range including at least 450 nm to 630 nm and to selectively alter a polarization state of light passing therethrough. The adaptive lens assemblies are configured to provide a respective optical power that is adjustable upon application of a respective electrical signal.

In another aspect, a method of integrating a broadband adaptive lens assembly comprises forming a lower stack and an upper stack. The lower stack comprises a first electrode layer formed on a first substrate, a first alignment layer formed on the first electrode layer, and a first polymerized LC layer on the first alignment layer. The upper stack comprises a second electrode layer formed on a second substrate, a second alignment layer formed on the second electrode, and a second polymerized LC layer on the second alignment layer. The method additionally includes, after forming the lower and upper stacks, stacking the upper stack and the lower stack such that the first and second polymerized LC layers face each other, wherein stacking comprises forming spacers to create a gap between the upper and lower stacks. The method additionally comprises filling the gap with unpolymerized LC molecules to form a switchable liquid crystal (LC) layer. Forming the switchable LC layer comprises self-aligning LC molecules in the switchable LC layer that are adjacent to LC molecules in the first polymerized LC layer to be generally elongated in a first direction, and self-aligning LC molecules in the switchable LC layer that are adjacent to LC molecules in the second polymerized LC layer to be generally elongated in a second direction crossing the first direction.

In another aspect, a method of fabricating a broadband waveplate lens assembly comprises providing a transparent substrate and forming an alignment layer on the transparent substrate. The alignment layer is configured to cause liquid crystal (LC) molecules formed thereon to align according to a waveplate lens pattern. The method additionally includes forming a LC layer on the alignment layer. LC molecules of the LC layer that are immediately adjacent to the alignment layer align according to the waveplate lens pattern in which the LC molecules of the LC layer at a given radius from a central region of the waveplate lens pattern have elongation directions that are generally aligned in the same direction. The LC layer is configured to diffract light at a diffraction efficiency greater than 90% within a wavelength range including at least 450 nm to 630 nm. The broadband adaptive lens assembly is configured to be selectively switched between a plurality of states having different optical powers.

In another aspect, a head mounted display system is configured to project light to an eye of a user to display augmented reality image content in a vision field of the user. The head-mounted display system comprises a frame configured to be supported on a head of the user. The display system additionally comprises an eyepiece disposed on the frame. At least a portion of the eyepiece is transparent and disposed at a location in front of the user's eye when the user wears the head-mounted display such that the transparent portion transmits light from the environment in front of the user to the user's eye to provide a view of the environment in front of the user. The eyepiece is configured to emit light into the user's eye to display augmented reality image content to the user's vision field. At least one switchable lens assembly comprises a diffractive liquid crystal lens assembly comprising a twisted nematic switcheable lens. The twisted nematic switchable lens comprises an active layer of twisted nematic liquid crystal, a first layer of polymerized liquid crystal adjacent to the active layer of twisted nematic liquid crystal, a second layer of polymerized liquid crystal adjacent to the active layer of twisted nematic liquid crystal. The active layer of twisted nematic liquid crystal disposed between the first and second layers of polymerized liquid crystal. The nematic switchable lens further comprises first and second electrodes disposed to applying an electric field to the active layer of twisted nematic liquid crystal. The first and second electrodes are on opposite sides of the active layer and the first and second layers of polymerized liquid crystal such that the active layer and the first and second layers of polymerized liquid crystal are disposed between the first and second electrodes. The head mounted display additionally comprises electronics configured to vary the optical power of the switchable lens by applying an electrical signal to the electrodes. The at least one switchable lens assembly is configured to transmit light from the environment in front of the user to the user's eye.

In another aspect, a head mounted display system is configured to project light to an eye of a user to display augmented reality image content in a vision field of the user. The head-mounted display system comprises a frame configured to be supported on a head of the user. The system additionally comprises an eyepiece disposed on the frame. At least a portion of the eyepiece is transparent and disposed at a location in front of the user's eye when the user wears the head-mounted display such that the transparent portion transmits light from the environment in front of the user to the user's eye to provide a view of the environment in front of the user. The eyepiece is configured to emit light into the user's eye to display augmented reality image content to the user's vision field. The system additionally comprises at least one switchable lenses assembly comprising a diffractive liquid crystal lens assembly. The diffractive liquid crystal lens assembly comprises an active layer comprising a twisted nematic liquid crystal diffractive lens, a first and second retarders comprising polymerized liquid crystal on opposite sides of the active layer, and first and second electrodes disposed to applying an electric field to the active layer of twisted nematic liquid crystal, the first and second electrodes on opposite sides of the active layer. The system further comprises electronics configured to vary the optical power of the switchable lens by applying an electrical signal to the electrodes, wherein the at least one switchable lenses is configured to transmit light from the environment in front of the user to the user's eye.

In another aspect, a head mounted display system is configured to project light to an eye of a user to display augmented reality image content in a vision field of the user. The head-mounted display system comprises a frame configured to be supported on a head of the user. The system additionally comprises an eyepiece disposed on the frame. At least a portion of the eyepiece is transparent and disposed at a location in front of the user's eye when the user wears the head-mounted display such that the transparent portion transmits light from the environment in front of the user to the user's eye to provide a view of the environment in front of the user. The eyepiece is configured to emit light into the user's eye to display augmented reality image content to the user's vision field. The system additionally includes at least one switchable lens assembly comprising a plurality of switchable lenses. Each of the switchable lenses has at least two states. The switchable lens assembly has different optical power for different states of the plurality of lenses. The switchable lens assembly has different optical power for different wavelengths when the plurality of lenses are set to a particular state. The system further comprises electronics in communication with the switchable lenses to alter the state of the plurality of lenses. The electronics are configured to cause different lenses in the plurality of switchable lenses to be in different states for different wavelengths.

In another aspect, a method of fabricating an eyepiece for augmented reality eyewear configured to direct light into a wearer's eye so as to present images to the wearer comprises providing a substrate. The method additionally comprises forming a first lens region on the substrate, where the first lens region comprises a transparent liquid crystal lens having optical power. The method further comprises providing a second region on the substrate that is transparent that does not have optical power.

In another aspect, a head mounted display system is configured to project light to an eye of a user to display augmented reality image content in a vision field of said user. The head-mounted display system comprises a frame configured to be supported on a head of the user. The display system additionally comprises an eyepiece disposed on the frame. At least a portion of said eyepiece is transparent and disposed at a location in front of the user's eye when the user wears said head-mounted display such that said transparent portion transmits light from the environment in front of the user to the user's eye to provide a view of the environment in front of the user. Said eyepiece is configured to emit light into said user's eye to display augmented reality image content to the user's vision field. The display system additionally comprises at least one switchable lens assembly comprising a plurality of switchable lenses, where each of said switchable lenses has at least two states. Variation in the states of said switchable lenses changes the state of the at least one switchable assembly. Said switchable lens assembly has different optical power for different states of said plurality of lenses. Said switchable lens assembly has different optical power for different wavelengths when the plurality of lenses are set to a particular state. The display system further comprises electronics in communication with said switchable lenses to alter the state of said plurality of lenses. Said display device is configured to emit a first color light into said user's eye at a first time and a second color light into said user's eye at a second time to display augmented reality image content to the user's vision field. Said electronics are configured to cause a least one of said lenses to be in different states at first and second times to provide images in said first and second colors.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

FIG. 11A illustrates an example of the display system of FIG. 10 displaying virtual content to a user at a virtual depth plane.

FIG. 11B illustrates an example of the display system of FIG. 10 providing a view of real world content to a user.

FIG. 16C illustrates an example of a waveplate lens that provides different optical power to diverge or converge light passing therethrough depending on the polarization of light and the side on which the light is incident.

FIG. 16D illustrates an example of a waveplate lens that provides different optical power to diverge or converge light passing therethrough depending on the polarization of light and the side on which the light is incident.

FIG. 22A illustrates a cross-sectional view of an example of a deactivated switchable broadband waveplate lens diverging and flipping the polarization of light having a first circular polarization.

FIG. 22B illustrates a cross-sectional view of an example of a deactivated switchable broadband waveplate lens converging and flipping the polarization of light having a second circular polarization.

FIG. 22C illustrates a cross-sectional view of an example of an activated switchable broadband waveplate lens passing circularly polarized light without substantially converging or diverging while preserving the polarization thereof.

FIG. 23A illustrates an example of a broadband adaptive waveplate lens assembly comprising a pair of broadband switchable waveplate lenses, in operation in which both switchable waveplate lenses are deactivated.

FIG. 23B illustrates the broadband adaptive waveplate lens assembly of FIG. 23A, in operation with one of the switchable waveplate lenses activated.

FIGS. 29A-29B illustrate an example method of configuring an alignment layer for aligning liquid crystal molecules in broadband waveplates or broadband waveplate lenses using a master lens.

FIGS. 31A-31C illustrate an example method of fabricating a switchable broadband waveplate comprising liquid crystals or a switchable broadband waveplate lens comprising liquid crystals using a gap fill process.

FIGS. 35A-35C illustrate an example method of forming a switchable broadband waveplate comprising liquid crystals or a switchable broadband waveplate lens comprising liquid crystals on a portion of a substrate by blanket coating a layer of liquid crystals and subtractively removing.

FIGS. 37A-37B illustrate an example method of forming a switchable broadband waveplate comprising liquid crystals or a switchable broadband waveplate lens comprising liquid crystals on a portion of a substrate by using selective nanoimprinting an alignment layer.

Figure 1:
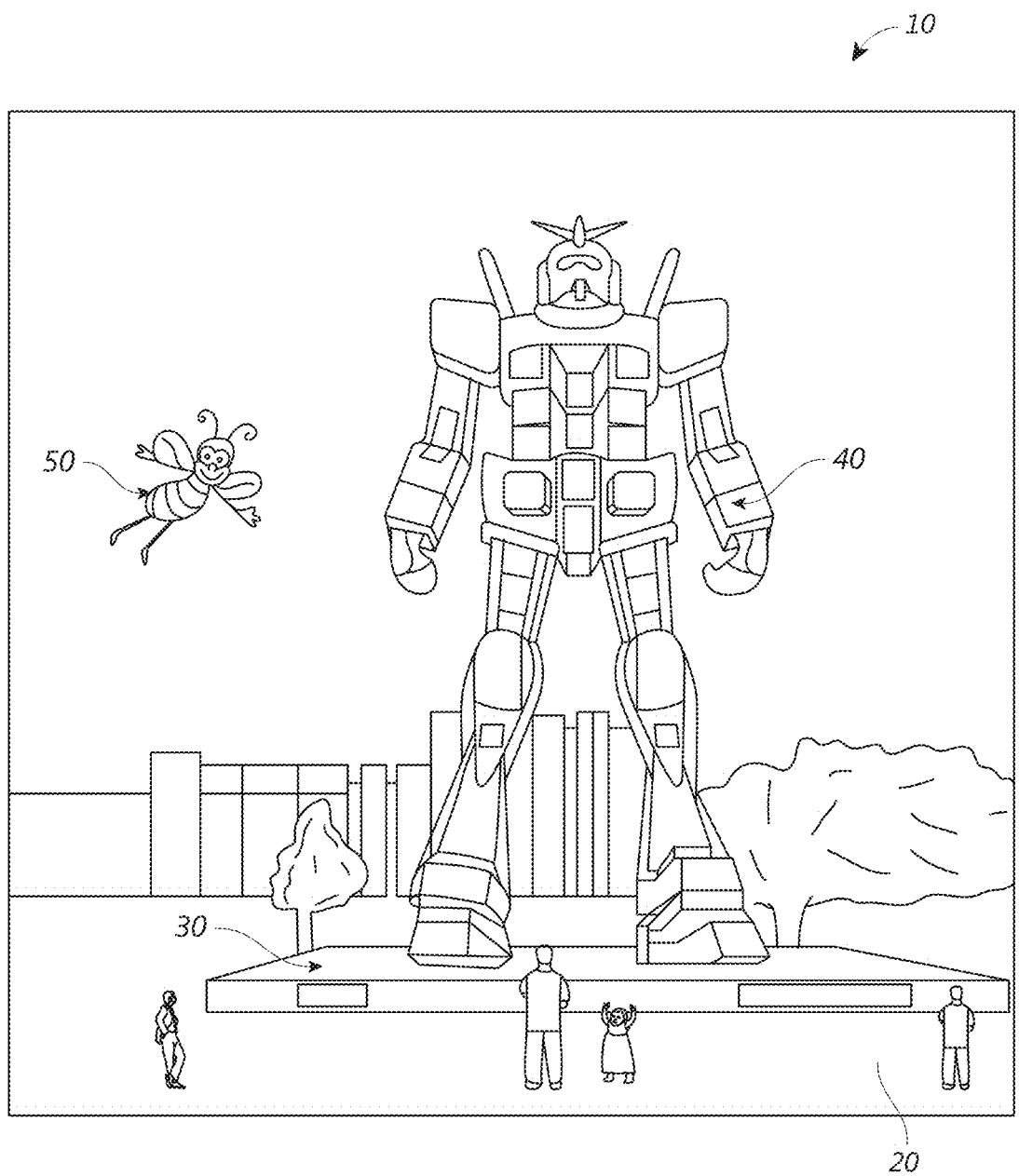
FIG. 1 illustrates a user's view of augmented reality (AR) through an AR device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, a plurality of waveguides may be configured to form virtual images at a plurality of virtual depth planes (also referred to simply a "depth planes" herein). Different waveguides of the plurality of waveguides may have different optical powers and may be formed at different distances from the user's eye. The display systems may also include a plurality lenses that provide or additionally provide optical powers. The optical powers of the waveguides and/or the lenses may provide images at different virtual depth planes. Undesirably, each of the waveguides and lenses may increase the overall thickness, weight and cost of the display.

Advantageously, in various embodiments described herein, an adaptive lens assembly may be utilized to provide variable optical power to, e.g., modify the wavefront divergence of light propagating through the lens assembly to provide virtual depth planes at different perceived distances from a user. The adaptive lens assembly may include a pair of waveplate lenses having a switchable waveplate disposed between them. Each of the first and second waveplate lenses may be configured to alter a polarization state of the light passing therethrough, and the switchable waveplate may be switchable between a plurality of states, e.g., a first state that allows light to pass without changing a polarization of the light and a second state that alters the polarization of the light (e.g., by changing the handedness of the polarization). In some embodiments, one or both of the waveplate lenses may be switchable between these first and second states and the intervening switchable waveplate noted above may be omitted.

It will be appreciated that the adaptive lens assembly may comprise a stack of a plurality of waveplate lenses and a plurality of switchable waveplates. For example, the adaptive lens assembly may comprise multiple subassemblies comprising a pair of waveplate lenses with an intervening switchable waveplate. In some embodiments, the adaptive lens assembly may include alternating waveplate lenses and switchable waveplates. Advantageously, such alternating arrangement allows a reduction in thickness and weight by having neighboring switchable waveplates share a common waveplate lens. In some embodiments, by switching the states of the various combinations of the switchable plates in the stack, more than two discrete levels of optical power may be provided.

In some embodiments, the adaptive lens assembly forms a display device with a waveguide assembly to form images at different virtual depth planes. In various embodiments, the display device comprises a pair of adaptive lens assemblies interposed by a waveguide assembly. The waveguide assembly includes a waveguide configured to propagate light (e.g., visible light) therein (e.g., via total internal reflection) and to outcouple the light. For example, the light may be outcoupled along an optical axis direction normal to a major surface of the waveguide. One of the pair of adaptive lens assemblies may be formed on a first side of the waveguide assembly and may be configured to provide variable optical power to modify the wavefront of light passing through the adaptive lens assembly to form images at each of a plurality of virtual depth planes. For example, the adaptive lens assemblies may converge or diverge outcoupled light received from the waveguide assembly. To compensate for modifications of real world views due to the convergence or divergence of ambient light propagating through the adaptive lens assembly and/or the waveguide assembly, the other of the pair of adaptive lens assemblies is additionally provided on a second side of the waveguide assembly opposite the first side. When the switchable waveplates of each adaptive lens assembly assume a corresponding state, the adaptive lens assemblies may have optical powers with opposite signs, such that the other of the adaptive lens assemblies correct for distortions caused by the adaptive lens assembly on the first side of the waveguide assembly.

Advantageously, relative to a continuously variable adaptive lens having continuously variable optical elements, utilizing a switchable waveplate that is switchable between two states simplifies the driving of the adaptive lens assembly and reduces the computational power needed to determine how to appropriately activate the adaptive lens assembly for a desired optical power. In addition, by allowing the adaptive lens assembly to modify the wavefront divergence of light outputted by a waveguide, the number waveguides needed to provide a plurality of depth planes is reduced relative to an arrangement in which each waveguide provides a particular amount of wavefront divergence.

Reference will now be made to the drawings, in which like reference numerals refer to like parts throughout. Unless indicated otherwise, the drawings are schematic not necessarily drawn to scale.

Example Display Systems

Figure 2:
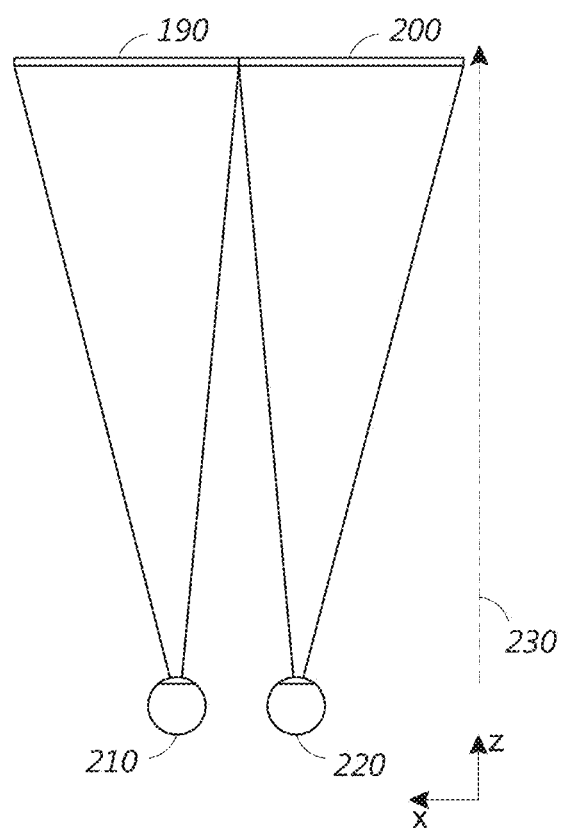
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
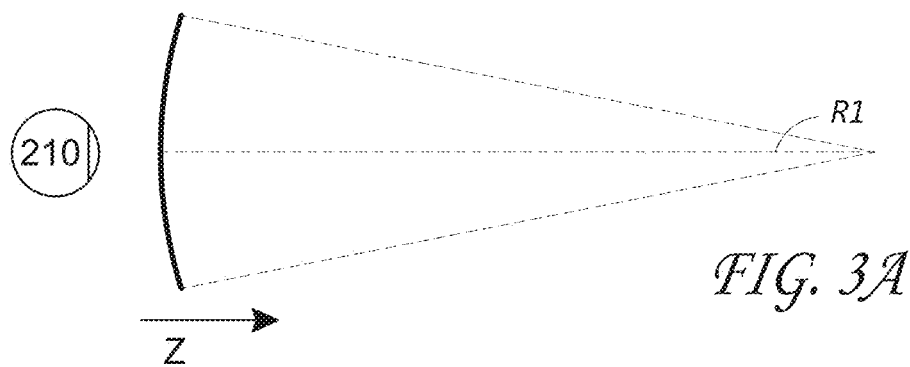
FIGS. 3A-3C illustrate relationships between radius of curvature and focal radius.
Figure 3B:
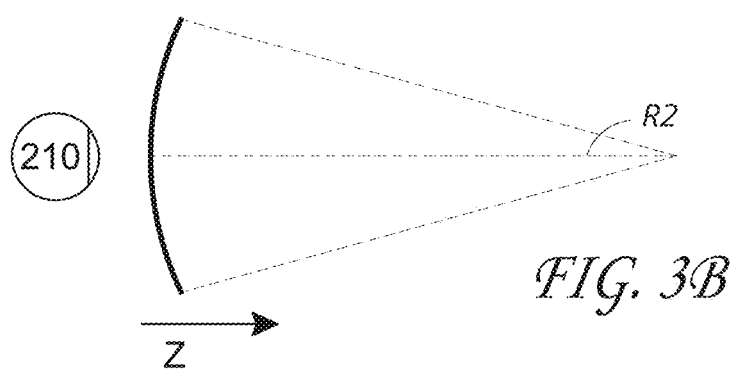
Figure 3C:
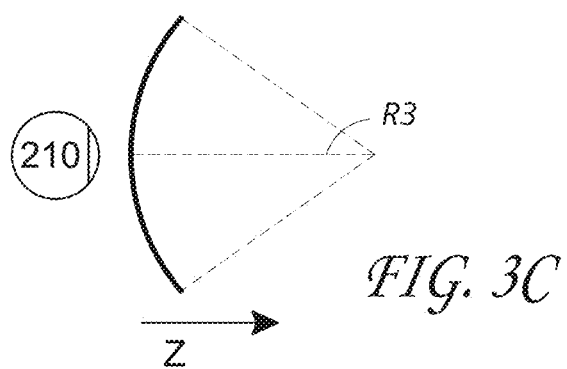

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
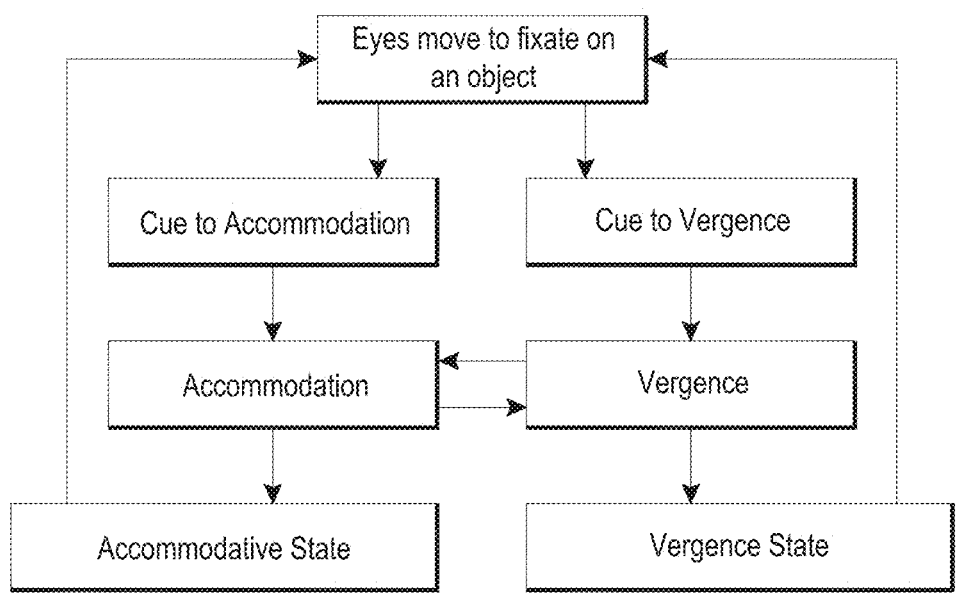
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
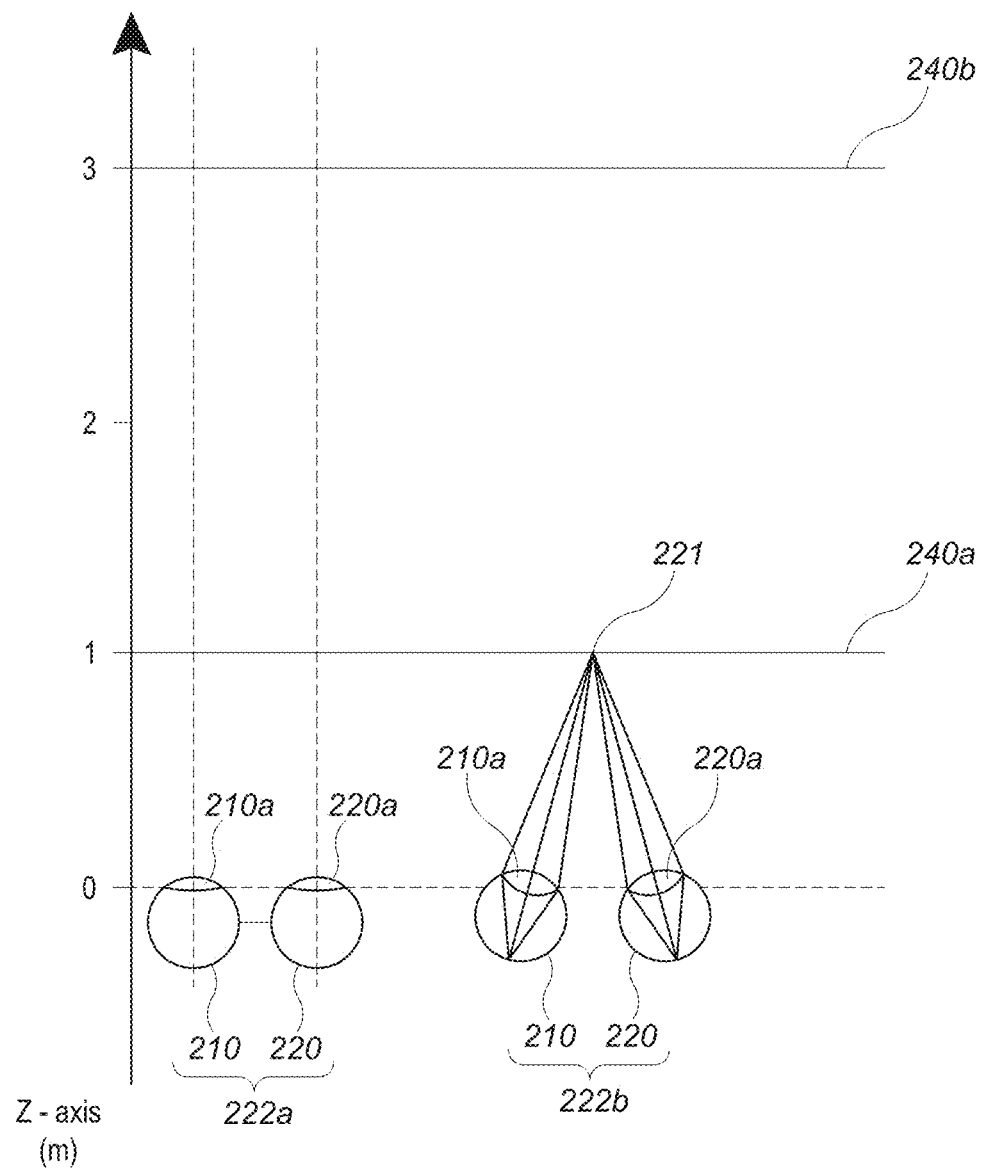
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
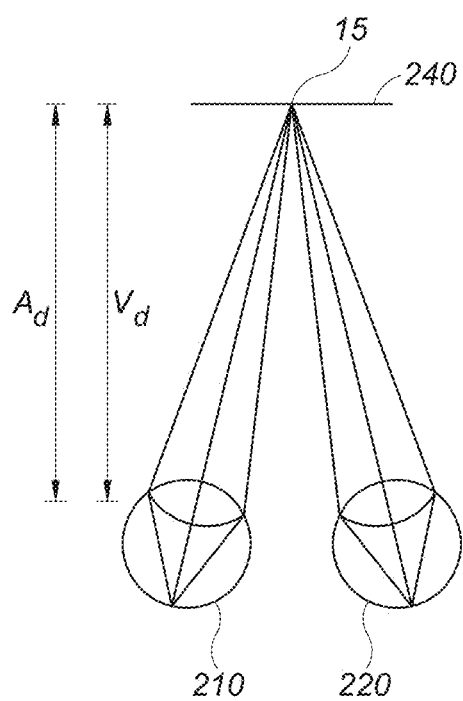
FIG. 4C illustrates an example of a representation of a top-down view of a user viewing content via a display system.
Figure 4D:
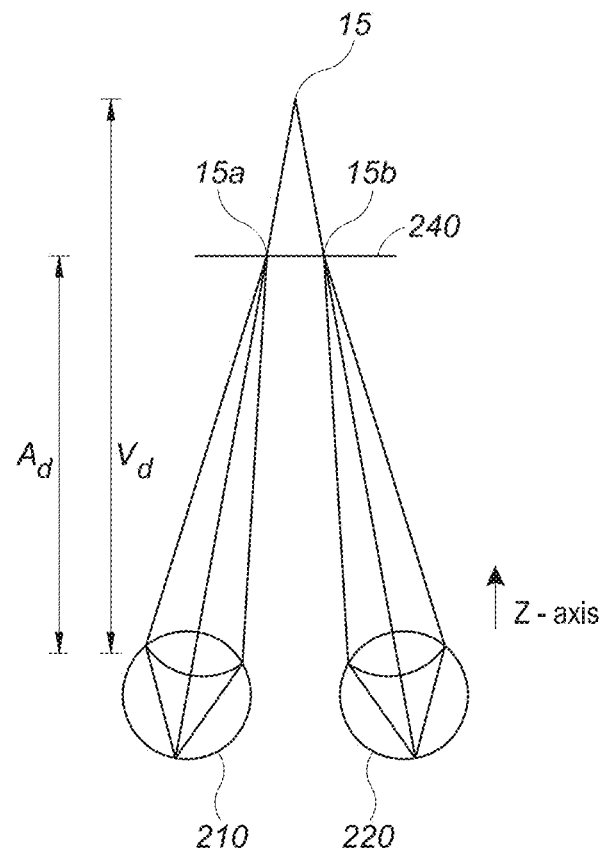
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d-A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
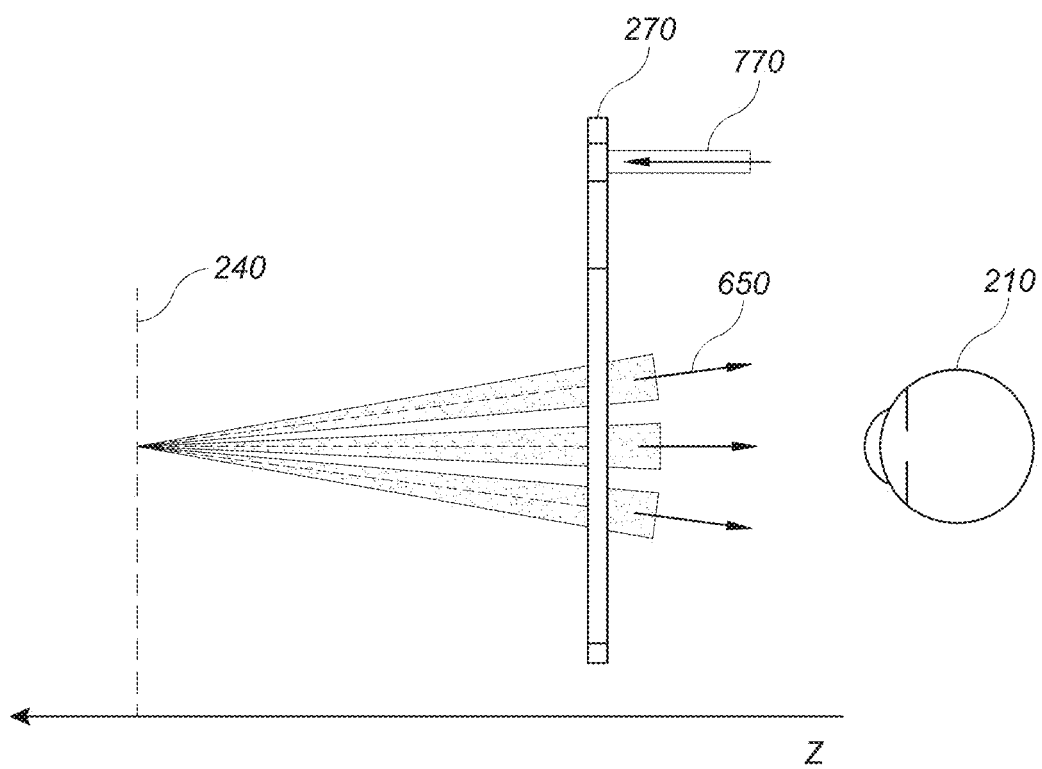
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
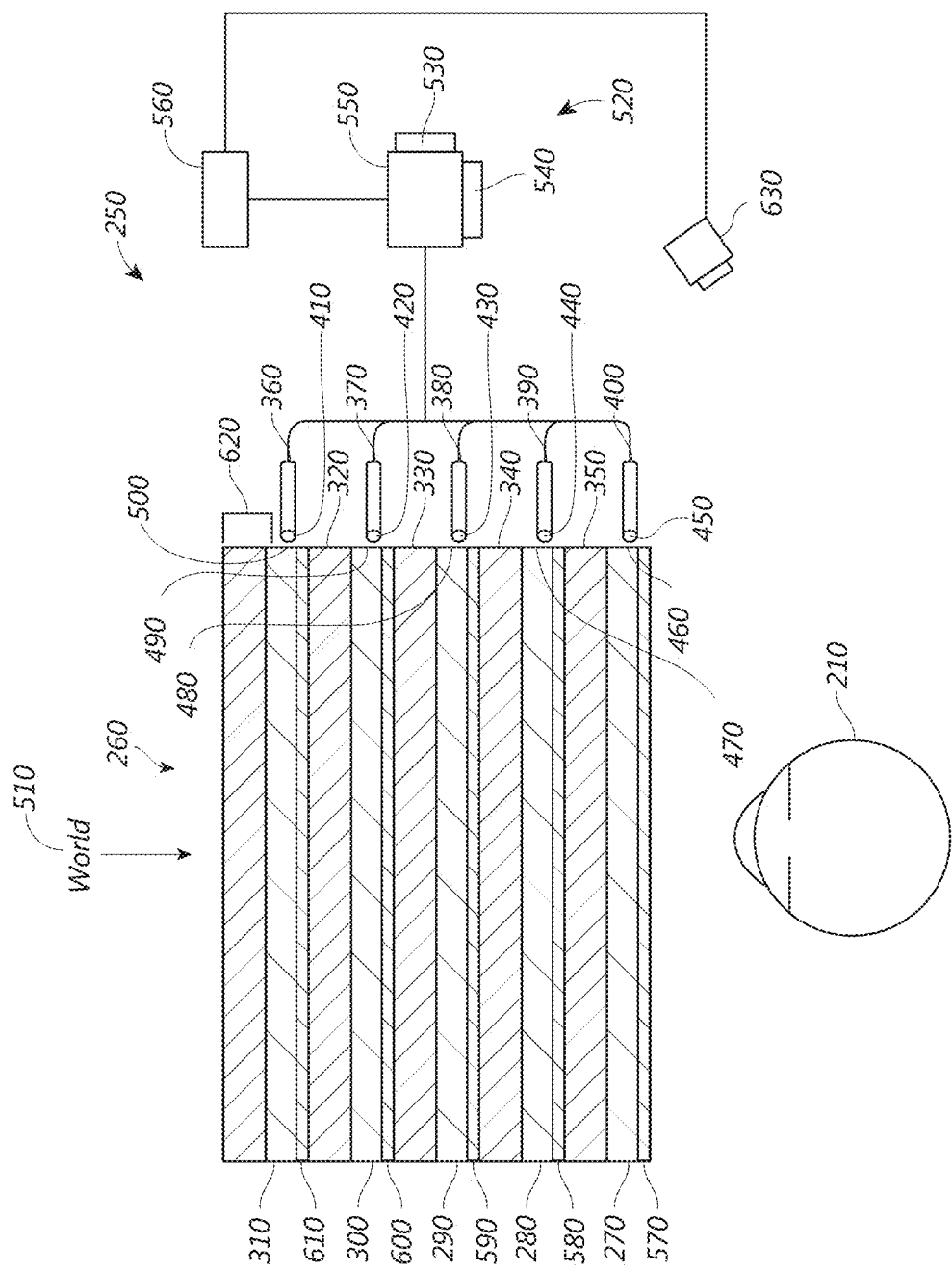
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
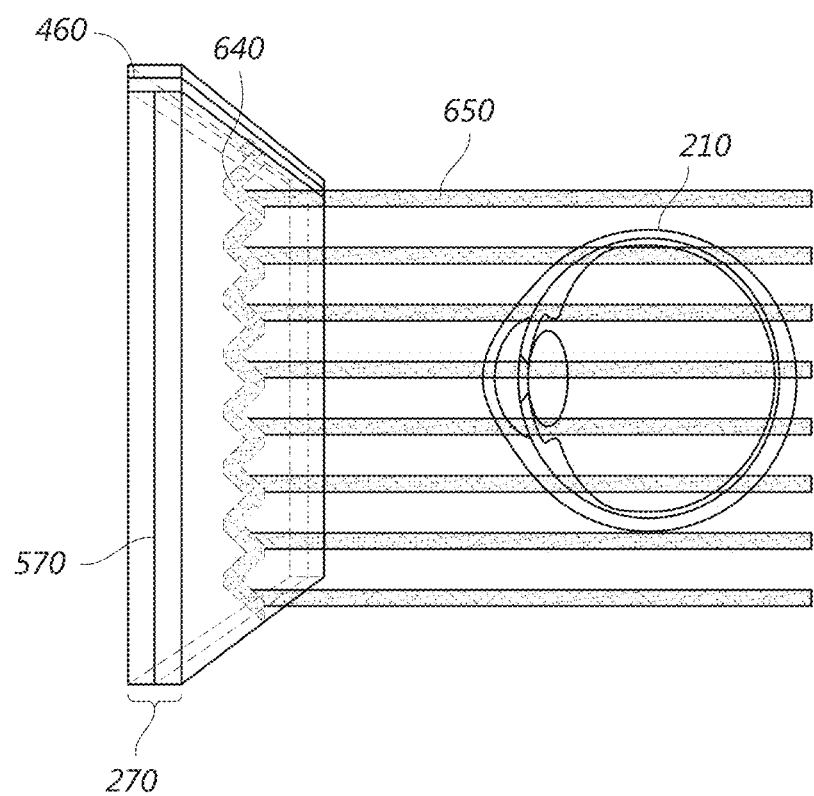
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
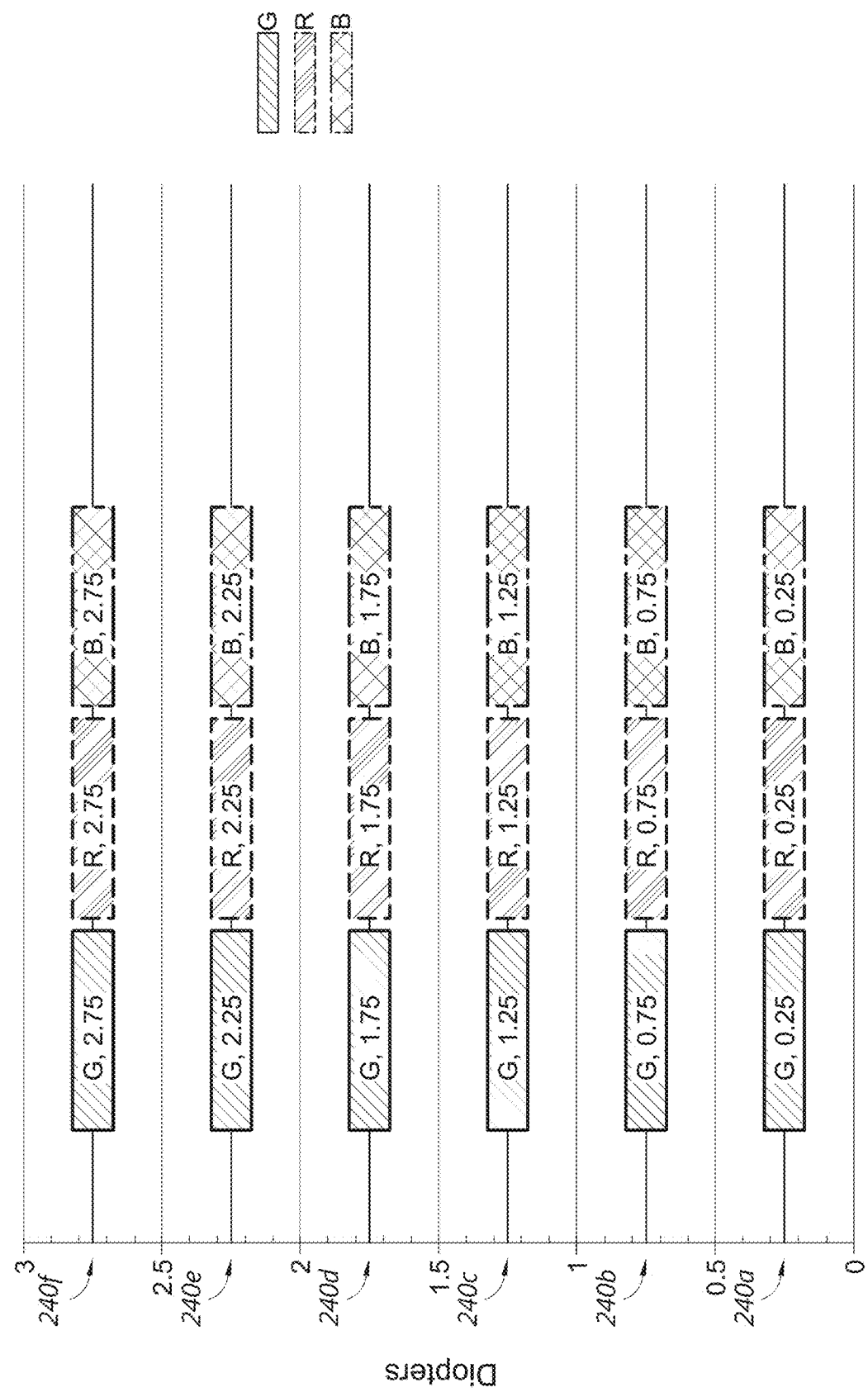
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
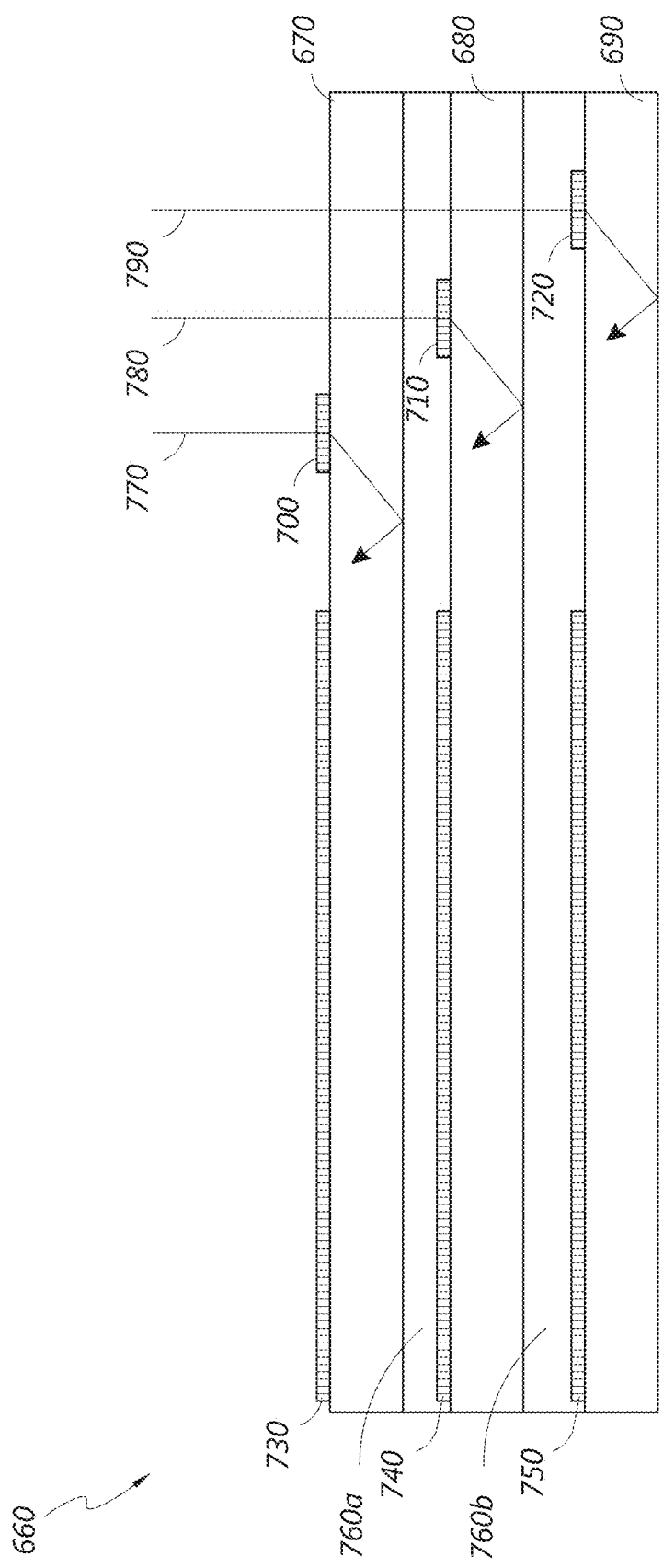
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
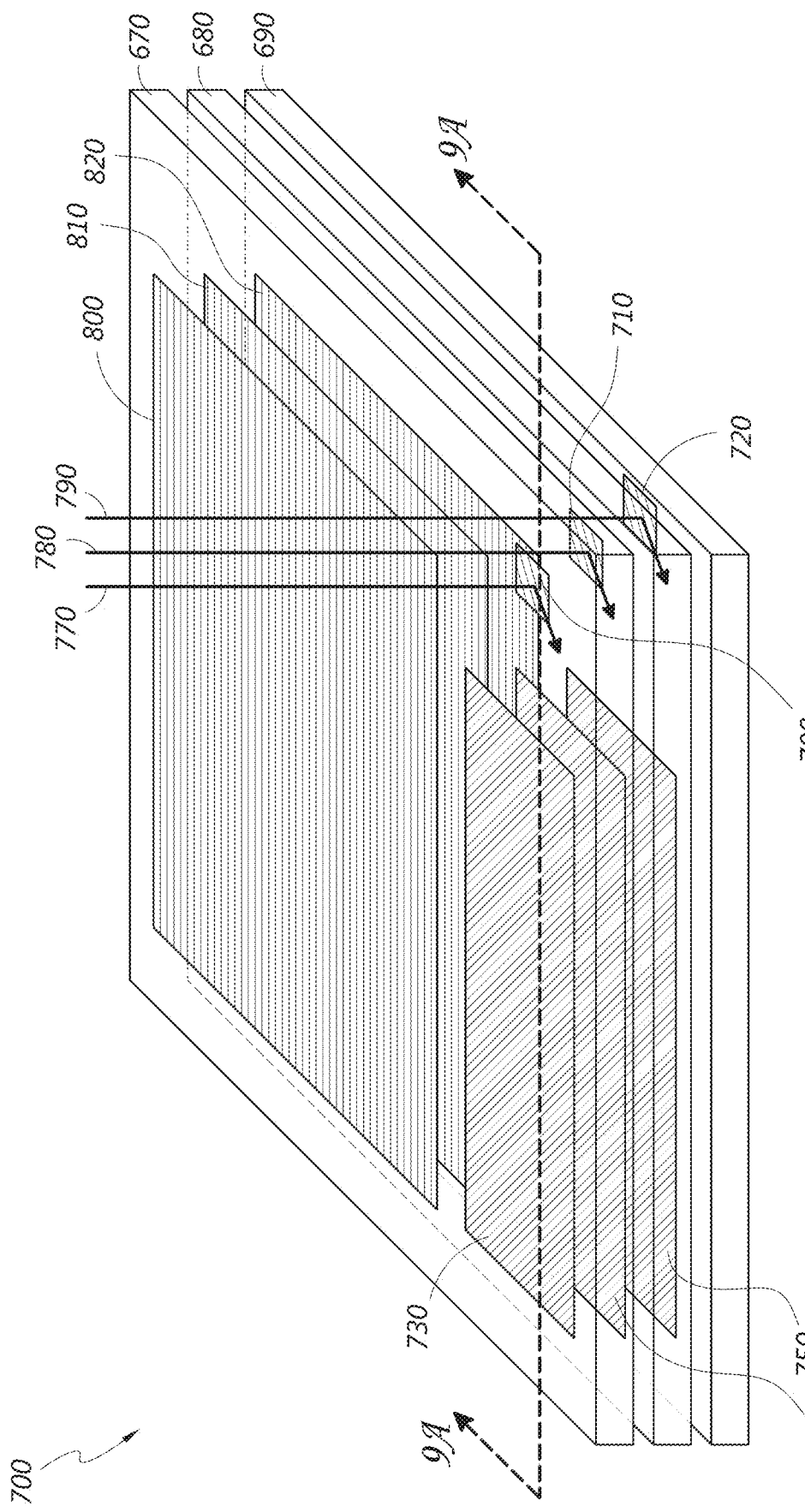
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
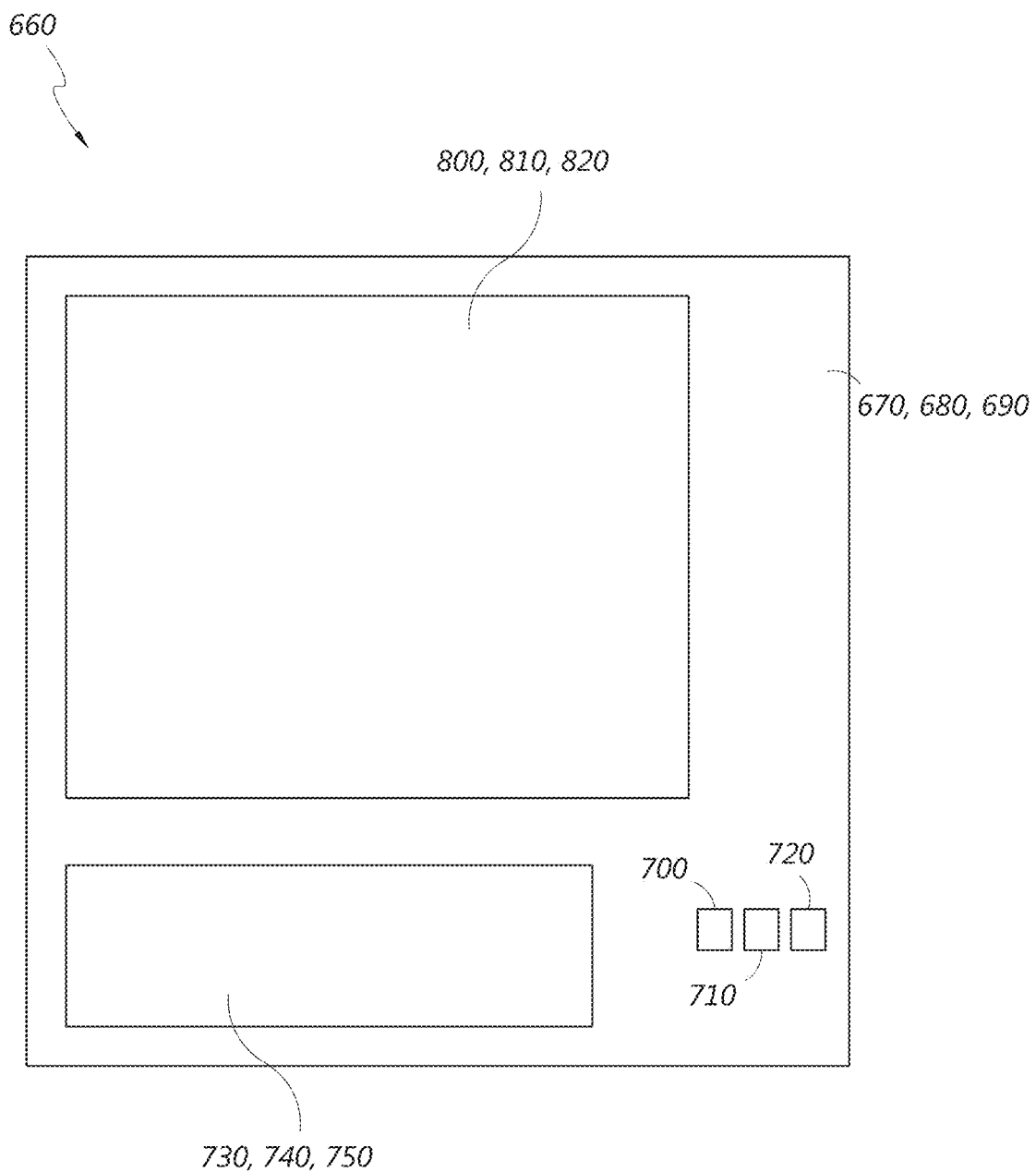
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
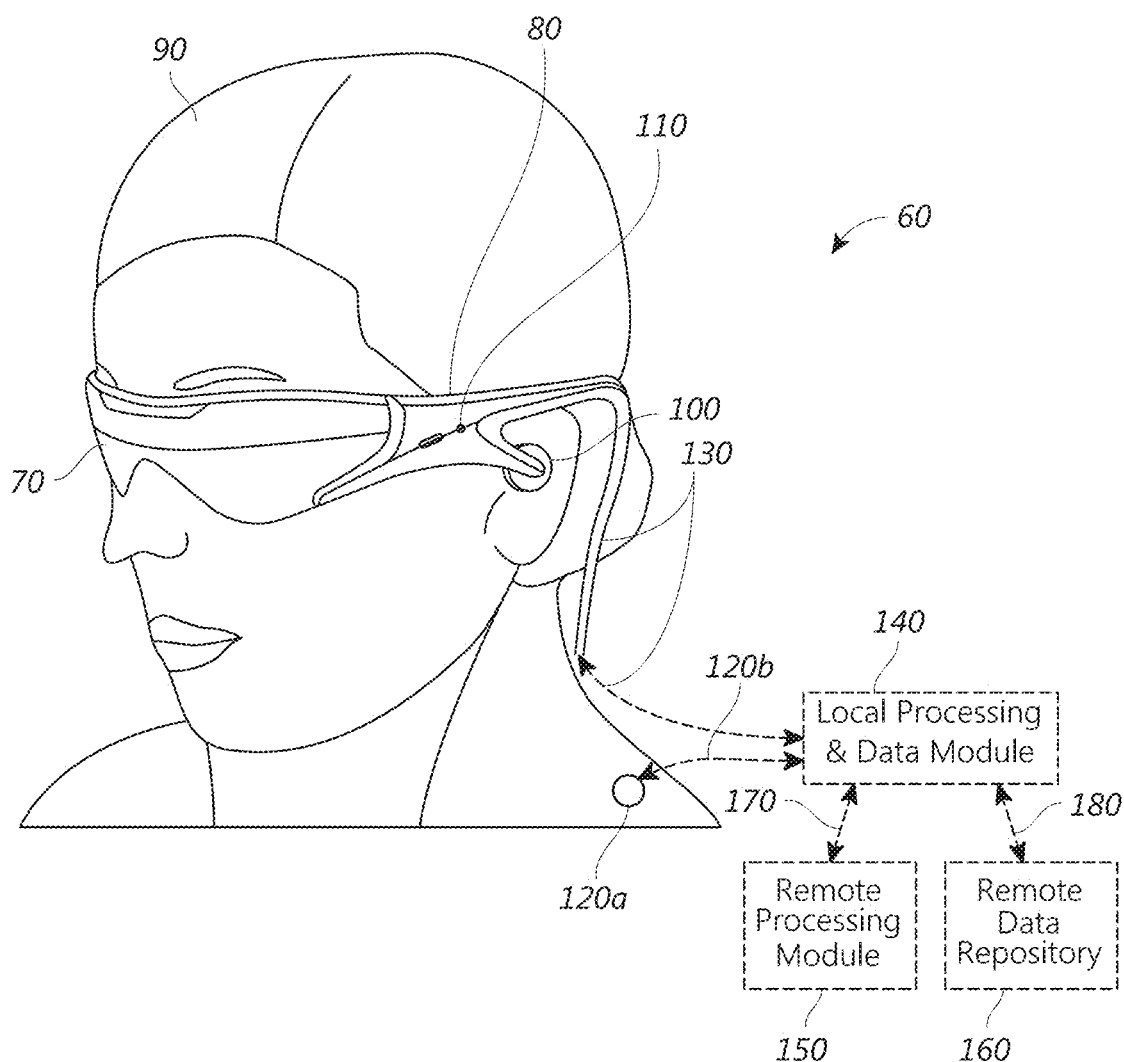
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Liquid Crystal Materials for Broadband Adaptive Waveplate Lens Assemblies

Generally, liquid crystals possess physical properties that may be intermediate between conventional fluids and solids. While liquid crystals are fluid-like in some aspects, unlike most fluids, the arrangement of molecules within liquid crystals exhibits some structural order. Different types of liquid crystals include thermotropic, lyotropic, and polymeric liquid crystals. Thermotropic liquid crystals disclosed herein can be implemented in various physical states, e.g., phases, including a nematic state/phase, a smectic state/phase, a chiral nematic state/phase or a chiral smectic state/phase.

As described herein, liquid crystals in a nematic state or phase can have calamitic (rod-shaped) or discotic (disc-shaped) organic molecules that have relatively little positional order, while having a long-range directional order with their long axes being roughly parallel. Thus, the organic molecules may be free to flow with their center of mass positions being randomly distributed as in a liquid, while still maintaining their long-range directional order. In some implementations, liquid crystals in a nematic phase can be uniaxial; i.e., the liquid crystals have one axis that is longer and preferred, with the other two being roughly equivalent. In some implementations, the liquid crystal molecules orient their long axis. In other implementations, liquid crystals can be biaxial; i.e., in addition to orienting their long axis, the liquid crystals may also orient along a secondary axis.

As described herein, liquid crystals in a smectic state or phase can have the organic molecules that form relatively well-defined layers that can slide over one another. In some implementations, liquid crystals in a smectic phase can be positionally ordered along one direction. In some implementations, the long axes of the molecules can be oriented along a direction substantially normal to the plane of the liquid crystal layer, while in other implementations, the long axes of the molecules may be tilted with respect to the direction normal to the plane of the layer.

Herein and throughout the disclosure, nematic liquid crystals can be composed of rod-like molecules with the long axes of neighboring molecules approximately aligned to one another. To describe this anisotropic structure, a dimensionless unit vector n, called the director, may be used to describe the direction of preferred orientation of the liquid crystal molecules.

Herein and throughout the disclosure, an azimuthal angle or a rotation angle $\varphi$ is used to describe an angle of rotation of a liquid crystal molecule about a layer normal direction, or an axis normal to a major surface of a liquid crystal layer, which is measured in a plane parallel to a major surface of the liquid crystal layers or of the substrate, e.g., the x-y plane, and measured between an alignment direction, e.g., an elongation direction or the direction of the director, and a direction parallel to the major surface, e.g., the y-direction.

Herein and throughout the disclosure, when an angle such as the rotation angle $\varphi$ is referred to as being substantially the same or different between different regions, it will be understood that an average of the angles can, for example, be within about 1%, about 5% or about 10% of each other although the average angles can be larger in some cases.

As describe herein, some liquid crystals in a nematic state or a smectic state can also exhibit a twist in a layer normal direction. Such liquid crystals are referred to as being twisted nematic (TN) liquid crystals or twisted smectic (SN) liquid crystals. TN or SN liquid crystals can exhibit a twisting of the molecules about an axis perpendicular to the director, with the molecular axis being parallel to the director. When the degree of twist is relatively large, twisted liquid crystals may be referred to as being in a chiral phase or a cholesteric phase.

As described herein, TN or SN liquid crystals can be described as having a twist angle or a net twist angle ($\phi$), which can refer to, for example, the relative azimuthal angular rotation between an uppermost liquid crystal molecule and a lowermost liquid crystal molecule across a specified length, e.g., the thickness of the liquid crystal layer.

As described herein, "polymerizable liquid crystals" may refer to liquid crystal materials that can be polymerized, e.g., in-situ photopolymerized, and may also be described herein as reactive mesogens (RM).

The liquid crystal molecules may be polymerizable in some embodiments and, once polymerized, may form a large network with other liquid crystal molecules. For example, the liquid crystal molecules may be linked by chemical bonds or linking chemical species to other liquid crystal molecules. Once joined together, the liquid crystal molecules may form liquid crystal domains having substantially the same orientations and locations as before being linked together. The term "liquid crystal molecule" may refer either or both to the liquid crystal molecules before polymerization or/and to the liquid crystal domains formed by these molecules after polymerization. Once polymerized, the polymerized network may be referred to as liquid crystal polymer (LCP).

In some embodiments, unpolymerized liquid crystal molecules or polymerizable liquid crystal molecules prior to being polymerized may have at least limited rotational degree of freedom. These unpolymerized liquid crystal molecules can rotate or tilt, e.g., under an electrical stimulus, which results in alteration of the optical properties. For example, by applying an electric field, some liquid crystal layers including unpolymerized liquid crystal molecules may be switched between one or more states having different diffractive or polarization altering properties.

The inventors have recognized that the above-described properties of liquid crystals or reactive mesogens (RMs) can be advantageously applied to various components of broadband switchable waveplates and waveplate lenses disclosed herein. For example, in some unpolymerized RMs, the orientations of LC molecules can be altered after deposition, e.g., by application of an external stimulus, e.g., electric field. Based on this recognition, the inventors disclose herein waveplates and waveplate lenses that can be switched between a plurality of states by application of an external stimulus.

In addition, the inventors have recognized that, when unpolymerized, the orientations of LC molecules at surfaces or interfaces of some LCs or RMs can be aligned by controlling the surface or interface on which the LC molecules are formed. For example, a stack of multiple LC layers can be formed where, by controlling orientations of LC molecules closest to the surface of an LC layer, orientations of immediately adjacent LC molecules in the next LC layer can be controlled, e.g., to have the same orientation as the LC molecules closest to the surface in the previous LC layer or the same orientation as elongated microstructures in adjacent layers. In addition, LC molecules between the LC molecules at surfaces or interfaces can be controlled to have a predetermined amount of twist. Based on recognition of these and other attributes including birefringence, chirality, and ease for multiple-coating, the inventors disclose herein waveplates and waveplate lenses that have useful properties such as broadband capability with tailored optical properties, e.g., diffraction efficiency, optical power and polarizability, to name a few.

Display Devices Having Switchable Broadband Adaptive Waveplate Lens Assemblies

As described supra in reference to FIG. 6, some display systems according to embodiments include a waveguide assembly 260 configured to form images at a plurality of virtual depth planes. The waveguide assembly 260 includes waveguides 270, 280, 290, 300, 310 each configured to propagate light by total internal reflection (TIR), and includes out-coupling optical elements 570, 580, 590, 600, 610 each configured to extract light out of a respective one of the waveguides 270, 280, 290, 300, 310 by redirecting the light. Each of the waveguide 270, 280, 290, 300, 310 is configured to output light to form an image corresponding to a particular depth plane. The waveguide assembly 260 may also optionally include a plurality of lenses 320, 330, 340, 350 between the waveguides for providing different optical powers for forming the images at different virtual depth planes.

In the illustrated embodiment of the waveguide assembly 260 in FIG. 6, the number of depth planes may be directly proportional to the number of waveguides and lenses. However, the inventors have recognized various challenges associated with implementing a waveguide assembly configured for displaying images at a plurality of depth planes by having a proportional number of waveguides and lenses. For example, a high number of waveguides 270, 280, 290, 300, 310 and a high number of corresponding lenses 320, 330, 340, 350 can undesirably increase the overall thickness, weight, cost, and manufacturing challenges to the waveguide assembly 260. For example, when formed of a conventional lens material, e.g., glass, each of the lenses 320, 330, 340, 350 may add millimeters or tens of millimeters in thickness and corresponding weight to the displays. In addition, a high number of waveguides and lenses can produce undesirable optical effects to the user, e.g., relatively high absorption loss. Thus, in one aspect, the inventors have recognized a potential benefit in some cases for display systems that can generate images at a plurality of depth planes with fewer numbers of waveguides, fewer number of lenses, thinner and lighter waveguides and lenses and/or fewer numbers of lenses per waveguide.

Still referring to FIG. 6, it will be appreciated that the lenses 320, 330, 340, 350 may be configured to form images at different depth planes by exerting respective optical powers to light from the waveguides 310, 300, 290 and 280. In various embodiments, the light outcoupled from the waveguides may have a polarization, e.g., a circular polarization. However, when polarized light outcoupled from a waveguide passes through a waveplate lens or a waveplate formed of liquid crystals, less than 100% of the outcoupled light transmitted therethrough may be optically affected, e.g., diffractively diverged, converged or altered in polarization, resulting in a portion of the outcoupled light passing through without being optically affected. The light passing through the lens without being optically affected in this manner is sometimes referred to as leakage light. The leakage light may be undesirably focused, defocused or altered in polarization in the downstream optical path, or not be affected at all. When a significant portion of the light passing through a waveplate or waveplate lens constitutes leakage light, a user may experience undesirable effects, such as, "ghost" images, which are unintended images or images that become visible to the user at unintended depth planes. The inventors have recognized that such leakage light may result from, among other causes, the waveplate lenses or waveplates formed of liquid crystals being configured to have a relatively high diffraction efficiency within a relatively narrow range of wavelengths in the visible spectrum. Thus, in another aspect, the inventors have recognized a need for a broadband adaptive waveplate lens assembly that can generate images at a plurality of depth planes with less undesirable effects arising from leakage light over a relatively wide range of wavelengths in the visible spectrum. To address these and other needs, various embodiments include broadband adaptive waveplate lens assemblies comprising switchable waveplate lenses or switchable waveplates based on liquid crystals, which are configured to provide variable optical power. The waveplate lenses and waveplates formed of liquid crystals can provide various advantages towards achieving these objectives, including small thickness, light weight and high degree of configurability at the molecular level. In various embodiments described herein, display devices are configured to form images at different virtual depth planes using a waveguide assembly configured to guide light in a lateral direction parallel to an output surface of a waveguide and to outcouple the guided light through the output surface to one or more broadband adaptive waveplate lens assemblies. In various embodiments, a broadband adaptive waveplate lens assembly is configured to incouple and to diffract therethrough the outcoupled light from the waveguide. The broadband adaptive lens assembly includes a first waveplate lens comprising a liquid crystal (LC) layer arranged such that the waveplate lens has birefringence ($\Delta n$) that varies in a radially outward direction from a central region of the first waveplate lens. The resulting waveplate lens can be configured to diffract the outcoupled light at a diffraction efficiency greater than 90%, greater than 95% or even greater than 99% within a broadband wavelength range including at least 450 nm to 630 nm. In some embodiments, the broadband adaptive waveplate lens assemblies according to embodiments are significantly lighter and thinner (microns) compared to conventional lenses, and can advantageously provide variable optical power over a broadband wavelength range. Advantageously, such broadband adaptive lens assemblies may reduce the number, thickness and weight of a waveguide assembly such as the waveguide assembly 260 (FIG. 6), as well as reducing or eliminating undesirable effects arising from leakage light.

As used herein, optical power (P, also referred to as refractive power, focusing power, or convergence power)

refers to the degree to which a lens, mirror, or other optical system converges or diverges light. It is equal to the reciprocal of the focal length of the device: P=1/f. That is, high optical power corresponds to short focal length. The SI unit for optical power is the inverse meter ($m^{-1}$), which is commonly called the diopter (D).

As described herein, converging lenses that focus light passing therethrough are described as having a positive optical power, while diverging lenses that defocus light passing therethrough are described as having a negative power. Without being bound by theory, when light passes through two or more thin lenses that are relatively close to each other, the optical power of the combined lenses may be approximated as a sum of the optical powers of the individual lenses. Thus, when light passes through a first lens having a first optical power P1 and further passes through a second lens having a second optical power P2, the light may be understood to converge or diverge according to a sum of optical powers Pnet=P1+P2.

A medium having a refractive index that depends on the polarization and propagation direction of light is referred to be birefringent (or birefractive). As described throughout the specification and understood in the relevant industry, when light has a polarization that is perpendicular to the optic axis of a birefringent medium, the birefringent medium is described as having an ordinary refractive index ($n_o$), when light has a polarization that is parallel to the optic axis of the birefringent medium, the birefringent medium is described as having an extraordinary refractive index ($n_e$), and a difference of the refractive indices $n_e-n_o$ of the birefringent medium material is referred to as a birefringence $\Delta n$. The phase retardation of light in a material medium having birefringence $\Delta n$ can be expressed as $\Gamma=2\pi\Delta nd/\lambda$ where $\lambda$ is the wavelength of light and d is the thickness of the medium.

Generally, optically anisotropic materials, e.g., liquid crystals, display a positive dispersion of birefringence ($\Delta n$) where the $\Delta n$ decreases with increasing wavelength of light $\lambda$. The positive dispersion of $\Delta n$ results in different phase retardation $\Gamma=2\pi\Delta nd/\lambda$, at different $\lambda$. As disclosed herein, an anisotropic material displaying a negative dispersion of birefringence ($\Delta n$) refers to a material in which the birefringence increases with increasing wavelength of light $\lambda$.

As described above, the wavelength dependence of diffraction efficiency of a waveplate lens or a waveplate can be an important consideration in reducing or minimizing various undesirable optical effects. As described herein, diffraction efficiency ($\eta$) of a birefringent medium such as a layer of liquid crystals can be expressed as $\eta=\sin^2(\pi\Delta nd/\lambda)$, where $\Delta n$ is birefringence, $\lambda$ is wavelength and d is the thickness. Because phase retardation that light propagating through the diffractive components varies with the wavelength for conventional birefringent media, some diffractive components including waveplate lenses and waveplates display a relatively narrow range of wavelengths, or bandwidth, within the visible spectrum in which diffraction efficiency is sufficiently high. In contrast, waveplate lenses and waveplates according to embodiments display a relatively wide range of wavelengths, or bandwidth, within the visible spectrum in which diffraction efficiency is sufficiently high for various applications described herein.

According to various embodiments, a broadband waveplate lens or a waveplate may be described as having a normalized bandwidth ($\Delta\lambda/\lambda_0$), where $\lambda_0$ is a center wavelength within the visible spectrum spanning a wavelength range of about 400-800 nm, including one or more of a red spectrum having a wavelength range of about 620-780 nm, a green spectrum having a wavelength range of about 492-577 nm and a blue spectrum having a wavelength range of about 435-493 nm, and $\Delta\lambda$ is a range of wavelengths centered about the $\lambda_0$ within which a diffraction efficiency exceeds 70%, 80%, 90%, 95%, 99% or by any value within a range defined by these values.

According to various embodiments, when a waveplate lens or a waveplate is described as being a broadband waveplate lens or a broadband waveplate, it will be understood as having an average, an instantaneous, a mean, a median or a minimum value of diffraction efficiency which exceeds 70%, 80%, 90%, 95%, 99% or a percentage within any of these values, within at least a portion of a visible spectrum spanning a wavelength range of about 400-800 nm, including one or more of a red spectrum which includes wavelengths in the range of about 620-780 nm, a green spectrum which includes wavelengths in the range of about 492-577 nm, and a blue spectrum in the range of about 435-493 nm, or within a range of wavelengths defined by any wavelength within the visible spectrum within about 400-800 nm, e.g., 400-700 nm, 430-650 nm or 450-630 nm.

Based on the relationship $\eta=\sin^2(\pi\Delta nd/\lambda)$ described above for diffraction efficiency, a broadband waveplate lens or a waveplate can have an efficiency for a fixed d when the ratio of $\Delta n/\lambda$ has a positive and relatively constant value. As described herein, a medium having a positive ratio value of $\Delta n/\lambda$ is referred to as a having a negative dispersion. According to embodiments, broadband waveplate lenses or broadband waveplates described herein have negative dispersion, or a birefringence ($\Delta n$) that increases with increasing wavelength ($\lambda$) within wavelength ranges described above.

According to various embodiments, a broadband waveplate lens or a waveplate may be described as having an instantaneous, a mean, a median, a minimum or a maximum value of the ratio $\Delta n/\lambda$ that is a positive value within any range of the visible spectrum described above. In addition, a broadband waveplate lens or the waveplate has a relatively high ratio of $\Delta\lambda/\lambda_0$, where $\Delta\lambda$ is a wavelength range within any range of the visible spectrum described above and $\lambda_0$ is a centroid wavelength within the $\Delta\lambda$. According to various embodiments, a high normalized bandwidth $\Delta\lambda/\lambda_0$ can have a value of about 0.3-0.7, 0.4-0.7, 0.5-0.7, 0.6-0.7 or a value within any range defined by these values. In addition, the broadband waveplate lens or the waveplate has a ratio $\Delta n/\lambda$ that is relatively constant within various wavelength ranges within the visible spectrum described above. For example, the ratio $\Delta n/\lambda$ can have a deviation, e.g., a standard deviation, from a mean, a median, a minimum or a maximum value of the ratio $\Delta n/\lambda$ that does not exceed more than 30%, 20%, 10%, 5%, 1% or a percentage within any of these values.

As described herein, a "transmissive" or "transparent" structure, e.g., a transparent substrate, may allow at least some, e.g., at least 20, 30, 50, 70 or 90%, of an incident light, to pass therethrough. Accordingly, a transparent substrate may be a glass, sapphire or a polymeric substrate in some embodiments. In contrast, a "reflective" structure, e.g., a reflective substrate, may reflect at least some, e.g., at least 20, 30, 50, 70, 90% or more of the incident light therefrom.

Figure 10:
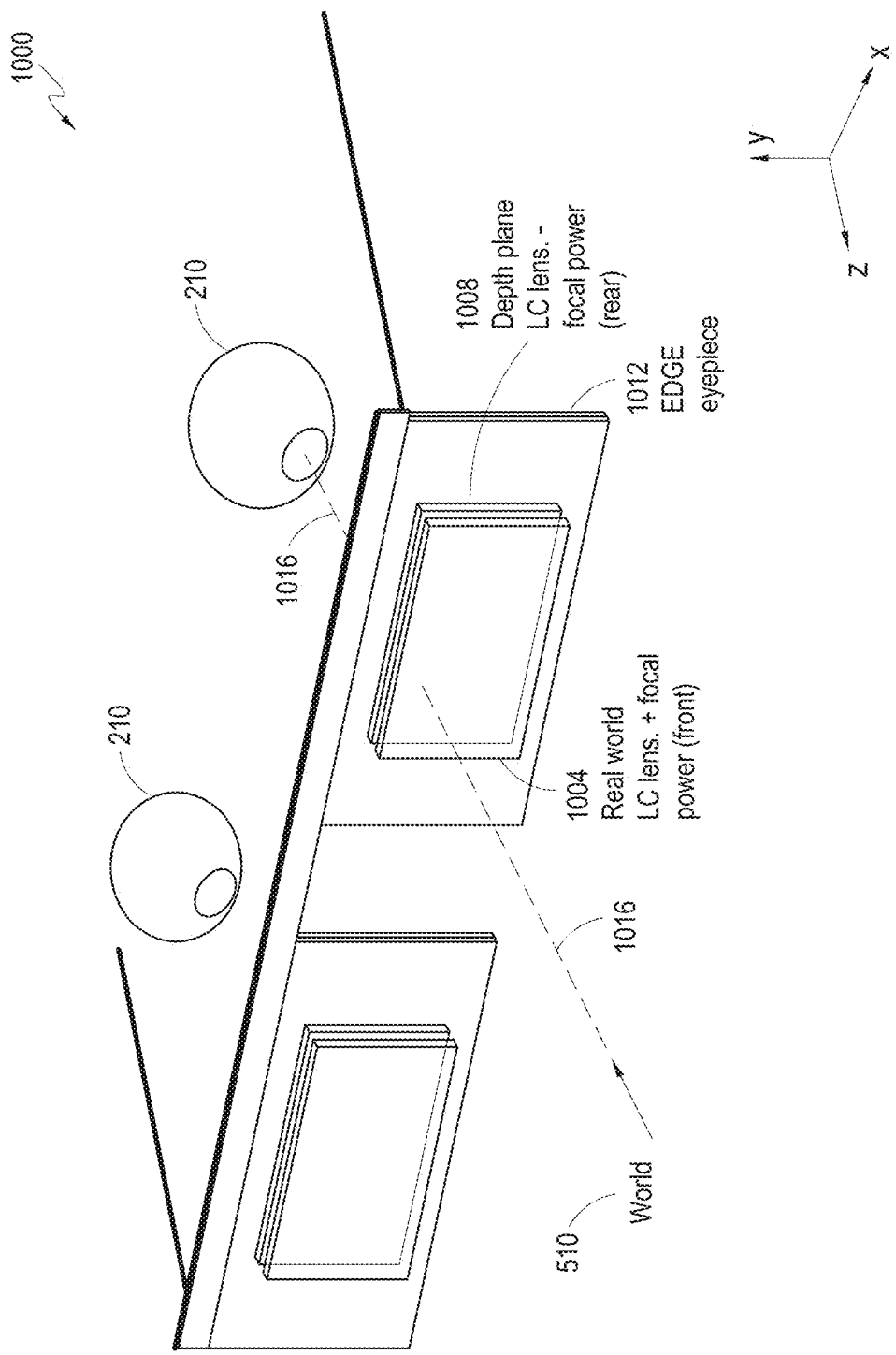
FIG. 10 illustrates an example of a display system comprising a pair of adaptive lens assemblies.

FIG. 10 illustrates an example of a display device 1000, e.g., a wearable display device, comprising one or more broadband adaptive lens assemblies, e.g., a pair of broadband adaptive lens assemblies 1004, 1008 in an optical path 1016 that are interposed by a waveguide assembly 1012. As described supra, the waveguide assembly includes a waveguide configured to propagate light (e.g., visible light), e.g., under total internal reflection, and to outcouple the light in an optical axis extending from (e.g., in a direction normal to) a light output surface of the waveguide (e.g., a major surface of the waveguide). The light may be outcoupled by a diffraction grating in some embodiments. Each of the broadband adaptive lens assemblies 1004, 1008 may be configured to at least partially transmit outcoupled light therethrough. In the illustrated embodiments, each of the adaptive lens assemblies may be configured to receive outcoupled light from the waveguide assembly 1012 and to converge or diverge the outcoupled light in the optical axis direction. Each of the broadband adaptive lens assemblies 1004, 1008 comprises a waveplate lens comprising liquid crystals arranged such that the waveplate lens has birefringence (Δn) that varies in a radial direction from a central region of the waveplate lens and that increases or decreases with increasing wavelength (λ) within a range of the visible spectrum. The broadband adaptive lens assembly is configured to be selectively switched between a plurality of states having different optical powers. The broadband adaptive lens assembly is configured to alter a polarization state of the outcoupled light passing therethrough when activated (e.g., electrically activated).

As described herein, an adaptive lens assembly refers to a lens assembly having at least one optical property that may be adjusted, e.g., reversibly activated and deactivated, using an external stimulus. Example optical properties that may be reversibly activated and deactivated include, among other properties, optical power (focal length), phase, polarization, polarization-selectivity, transmissivity, reflectivity, birefringence and diffraction properties, among other properties. In various embodiments, adaptive lens assemblies are capable of electrically varying the optical power and the polarization state of light passing therethrough.

In the illustrated embodiment, each of the pair of broadband adaptive lens assemblies 1004, 1008 is configured to be selectively switched between at least two states. In a first state, each is configured to pass the outcoupled light therethrough without altering a polarization state thereof, while in a second state, each is configured to alter the polarization state of the outcoupled light passing therethrough. For example, in the second state, each of the broadband adaptive lens assemblies 1004, 1008 reverses the handedness of circularly polarized light, while in the first state, each of the broadband adaptive lens assemblies 1004, 1008 preserves the handedness of circularly polarized light.

Still referring to FIG. 10, the display device 1000 further comprises a waveguide assembly 1012 interposed between the pair of adaptive lens assemblies 1004, 1008. The waveguide assembly 1012 may be similar to the waveguide assembly 260 described above with respect to FIG. 6, which comprises one or more waveguides, similar to one or more waveguides 270, 280, 290, 300, 310 in FIG. 6. As described supra, e.g., with respect to FIGS. 6 and 7, the waveguide may be configured to propagate light under total internal reflection in a lateral direction parallel to a major surface of the waveguide. The waveguide may further be configured to outcouple the light, e.g., in a direction normal to the major surface of the waveguide.

Still referring to FIG. 10, a first adaptive lens assembly 1004 of the pair of adaptive lens assemblies is disposed on a first side of the waveguide assembly 1012, e.g., the side of the world 510 observed by a user, and a second adaptive lens assembly 1008 of the pair of lens assemblies is disposed on a second side of the waveguide assembly 1012, e.g., the side of the eye 210 of the user. As described infra, the pair of adaptive lens assemblies as configured provides to a user virtual content from the waveguide assembly 1012 at a plurality of virtual depth planes, as well the view of the real world. In some embodiments, there is little or no distortion due to the presence of the adaptive lens assemblies. The virtual content and the view of the real world are provided to the user upon activation of the first and second adaptive lens assemblies 1004, 1008, as described infra with respect to FIGS. 11A and 11B.

FIGS. 11A and 11B illustrate examples of display devices 1100A/1100B, each comprising adaptive lens assemblies in operation to output image information to a user. The display devices 1100A and 1100B in an unpowered state are structurally identical. The display device 1100A is used herein to describe outputting virtual image to the user, while the display device 1100B is used herein to describe transmitting a real world image through the display device 1100B to the user. The display device 1100A/1100B includes a pair of the switchable lenses assemblies 1004, 1008 that are configured to be electrically activated by, e.g., application of a voltage or a current. In some embodiments, in a deactivated state, e.g., when no voltage or current is applied, each of the first and second switchable lenses assemblies 1004, 1008 has a low, e.g., about zero, optical power. In some embodiments, in an activated state, e.g., when a voltage or a current is applied, the first adaptive lens assembly 1004 on the side of the world may provide a first net optical power (Pnet1) having a first sign, e.g., a positive optical power. When in an activated state, the second adaptive lens assembly 1008 on the side of the user may provide a second net optical power (Pnet2) having a second sign, e.g., a negative optical power.

FIG. 11A illustrates an example of the display system of FIG. 10 displaying virtual content to a user at a virtual depth plane, according to some embodiments. As described supra, the waveguide assembly 1012 interposed between the pair of the adaptive lens assemblies 1004, 1008 comprises a waveguide configured to receive light containing virtual image information and to propagate the light under total internal reflection. The waveguide assembly 1012 is further configured to outcouple the light through, e.g., a diffraction grating, towards the eye 210. The outcoupled light passes through the second adaptive lens assembly 1008 prior to entering the eye 210. When activated, the second adaptive lens assembly 1008 has a second net optical power, Pnet2, which may have a negative value, such that the user sees the virtual image at a virtual depth plane 1104.

In some embodiments, the second adaptive lens assembly 1008 may be adjusted electrically to adjust the second net optical power (Pnet2) of the second adaptive lens assembly 1008, thereby adjusting the distance to the virtual depth plane 1104. For example, as a virtual object "moves" closer and further relative to the eye 210 within a virtual three dimensional space, the second net optical power Pnet2 of the second adaptive lens assembly 1008 may be correspondingly adjusted, such that the virtual depth plane one 1104 adjusts to track the virtual object. Thus, the user may experience relatively little or no accommodation/vergence mismatch beyond an acceptable threshold. In some embodiments, the magnitude of the distance to the virtual depth plane 1104 may be adjusted in discrete steps, while in some other embodiments, the magnitude of the distance to the virtual depth plane 1104 may be adjusted continuously.

FIG. 11B illustrates an example of the display system of FIG. 10 providing a view of real world content to a user, according to some embodiments. When the second adaptive lens assembly 1008 is activated to have the second net optical power (Pnet2) to display the virtual content at the virtual depth plane 1104, light from the real world passing through the second adaptive lens assembly 1008 may also be converged or diverged according to Pnet2 of the activated second adaptive lens assembly 1008. Thus, objects in the real world may appear out of focus. To mitigate such distortion, according to embodiments, when activated, the first and second adaptive lens assemblies 1004, 1008 may be configured to have optical powers having opposite signs. In some embodiments, light passing through the first and second adaptive lens assemblies 1004, 1008 converges or diverges according to a combined optical power having a magnitude that is about a difference between magnitudes of first and second net optical powers Pnet1, Pnet2, of the first and second adaptive lens assemblies 1004, 1008, respectively. In some embodiments, the waveguide assembly 1012 may also have optical power and the adaptive lens assembly 1008 may be configured to account for the distortions caused by both the lens assembly 1004 and the waveguide assembly 1012. For example, the optical power of the adaptive lens assembly 1008 may be opposite in sign to the sum of the optical powers of the lens assembly 1004 and the waveguide assembly 1012.

In some embodiments, the first adaptive lens assembly 1004 is configured to have the first net optical power Pnet1 that has a magnitude that is close to or the same as the magnitude of the second net optical power Pnet2 of the second adaptive lens assembly 1008, while having a sign that is opposite of Pnet2. As a result, when both the first and second adaptive lens assemblies 1004, 1008 are activated simultaneously, objects in the real world appear relatively unaffected by the optical power of the second adaptive lens assembly 1008 provided for displaying the virtual content.

In some embodiments, first adaptive lens assembly 1004 may be configured such that when activated, the first net optical power Pnet1 dynamically matches the second net optical power Pnet2 of the second adaptive lens assembly 1008. For example, as the second net optical power Pnet1 of the second switchable assembly 1008 is adjusted to track moving virtual objects within the virtual three dimensional space, the first net optical power Pnet1 of the first adaptive lens assembly 1004 may be dynamically adjusted, such that the magnitude of the combined optical power P=Pnet1+Pnet2 may be kept less than a predetermined value. Thus, according to embodiments, the objects in the real world may be prevented from being unacceptably out of focus by compensating the second net optical power (Pnet2) of the second adaptive lens assembly 1008, which may have a negative value, with the first net optical power (Pnet1) of the first adaptive lens assembly 1004, such that the combined optical power P=Pnet1+Pnet2 remains small, e.g., near about 0 m$^{-1}$.

Switchable Waveplate and Switchable Waveplate Lenses for Broadband Adaptive Waveplate Lens Assemblies As discussed above, the advantages of forming images at a plurality of depth planes with fewer waveguides includes the overall reduction in thickness and weight of the display device (e.g., display device 1000 in FIG. 10). Thus, various embodiments described herein provide adaptive waveplate lens assemblies that are compact, lightweight and provide various optical functionalities, e.g., high bandwidth capability and variable optical power. In addition, various embodiments described herein provide adaptive lens assemblies with relatively low amount of leakage light.

To provide images at a plurality of depth planes with high efficiency over a wide range of the visible spectrum, the broadband adaptive lens assembly according to various embodiments include a waveplate lens (1154A, 1154B in FIGS. 12A, 12B, respectively) comprising liquid crystals arranged such that the waveplate lens has birefringence (Δn) that varies in a radial direction from a central region of the first waveplate lens and that increases or decreases with increasing wavelength (λ) within a range of the visible spectrum. As described above, according to various embodiments, the broadband adaptive waveplate lens assembly can generate images at multiple depth planes by being configured to be selectively switched between a plurality of states with different optical powers. The selective switching of the broadband lens assembly can in turn be performed by switching a waveplate lens or a waveplate included in the broadband adaptive waveplate lens assembly according to embodiments, as discussed herein.

Figure 12B:
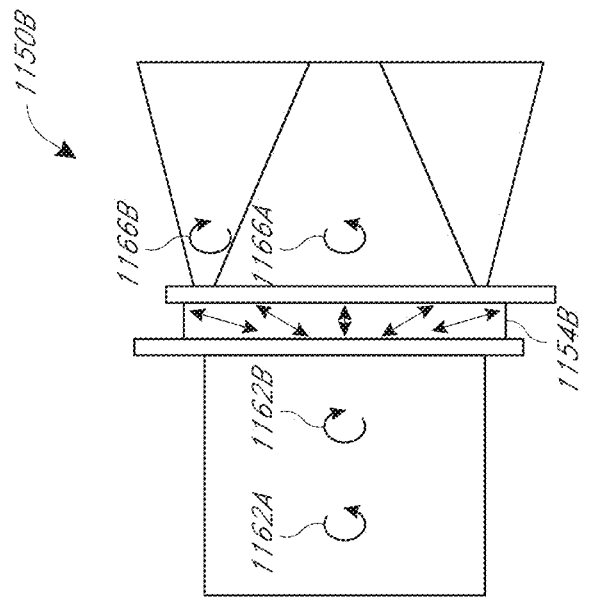
FIG. 12B illustrates an example of a switchable waveplate lens comprising liquid crystals.
Figure 12A:
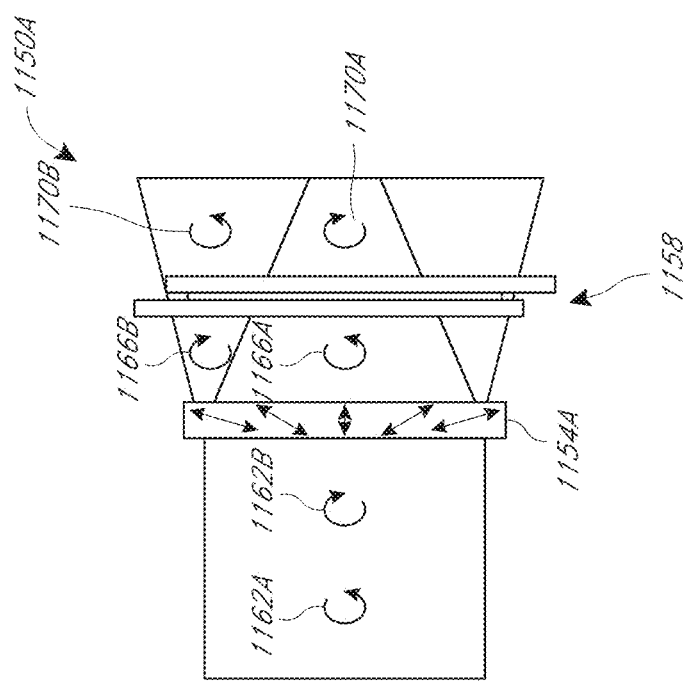
FIG. 12A illustrates an example of a waveplate lens assembly comprising liquid crystals.

Referring to FIG. 12A, in some embodiments, the broadband adaptive lens assembly 1150A is configured to be switched between different optical power states by employing a switchable waveplate 1158 comprising liquid crystals in the same optical path as the waveplate lens 1154A. The waveplate lens 1154A may be a passive lens and the broadband adaptive lens assembly 1150A may be selectively switched between different states by electrically activating and deactivating the switchable waveplate 1158.

Still referring to FIG. 12A, in operation, the waveplate lens 1154A is configured such that it diverges or converges incident light 1162A, 1162B passing therethrough depending on the polarization of the light, e.g., circular polarization, according to various embodiments. When configured as a half-waveplate (HWP) lens, the illustrated waveplate lens 1154A, which may be a passive waveplate lens, is configured to converge a right-hand circular polarized (RHCP) light beam 1162B incident on the waveplate lens 1154A into a left-hand circular polarized (LHCP) light beam 1166A. On the other hand, the waveplate lens 1154A is configured to diverge a LHCP light beam 1162A incident on the waveplate lens 1154A into a right-hand circular polarized (RHCP) light beam 1166B.

Still referring to FIG. 12A, after being focused or defocused by the waveplate lens 1154A depending on the circular polarization of the light incident thereon, the LHCP light beam 1166A or the RHCP light beam 1166B is incident on a switchable waveplate 1158. The liquid crystals of the switchable waveplate 1158 are configured such that, when activated, e.g., electrically activated, the polarization of a circularly polarized light passing therethrough is preserved (not illustrated). That is, the LHCP light beam 1166A and the RHCP light beam 1166B passes through the switchable waveplate 1158 unaffected. On the other hand, when deactivated, e.g., electrically activated, the polarization of the circularly polarized light passing therethrough is altered or flipped (illustrated). That is, the LHCP light beam 1166A is converted to a RHCP light beam 1170A and the RHCP light beam 1166B is converted to a LHCP light beam 1170B.

Referring to FIG. 12B, in some other embodiments, the broadband adaptive lens assembly 1150B is configured to be switched between different optical power states by employing a switchable waveplate lens 1154B comprising liquid crystals. The adaptive lens assembly 1150B may be selectively switched between different states by electrically activating and deactivating the switchable waveplate lens 1154B.

In operation, the liquid crystals of the waveplate lens 1154B are configured such that the waveplate lens 1154B diverges or converges the incident light 1162A, 1162B passing therethrough depending on its polarization, e.g., circular polarization, according to various embodiments. When configured as a half-waveplate lens, when deactivated, e.g., electrically deactivated, the illustrated waveplate lens 1154B is configured to converge a RHCP light beam 1162B incident on the waveplate lens 1160B into a LHCP light beam 1166A. Conversely, when deactivated, the waveplate lens 1154B is configured to diverge a left-hand polarized (LHCP) light beam 1162A incident on the waveplate lens 1154B into a RHCP beam 1166B. On the other hand, when activated, e.g., electrically deactivated, the polarization of the circularly polarized light passing therethrough is preserved or unaffected (not illustrated), and the LHCP light beam 1162A and the RHCP light beam 1162B incident thereon pass through the waveplate lens 1154B without substantially being converged or diverged and without having their polarization state affected. In various embodiments, by configuring the liquid crystals to be rearranged in response to a switching signal, e.g., electric field, the waveplate lens assemblies 1150A, 1150B may be activated or deactivated to converge or diverge and to flip or conserve the polarization of circularly polarized light depending on its polarization.

Broadband Switchable Waveplates

As described above, according to various embodiments, the broadband adaptive waveplate lens assembly can be used to generate images at multiple depth planes by selectively switching the broadband waveplate lens assembly between a plurality of lens states having different optical powers. As described above, in some embodiments, the broadband adaptive waveplate lens assembly may be configured to be selectively switched between a plurality of lens states by electrically activating a broadband switchable waveplate included in the broadband adaptive waveplate lens assembly. In the following, embodiments of such broadband switchable waveplates are disclosed.

In some embodiments, a broadband switchable waveplate comprises a layer of unpolymerized twisted nematic (TN) liquid crystals (LCs) and is configured to be switched upon application of an electric field across a thickness of the layer of TN LCs. Without being bound to any theory, the switching may be achieved upon altering orientations of the unpolymerized LC molecules across the thickness of the layer of TN LCs.

Figure 13A:
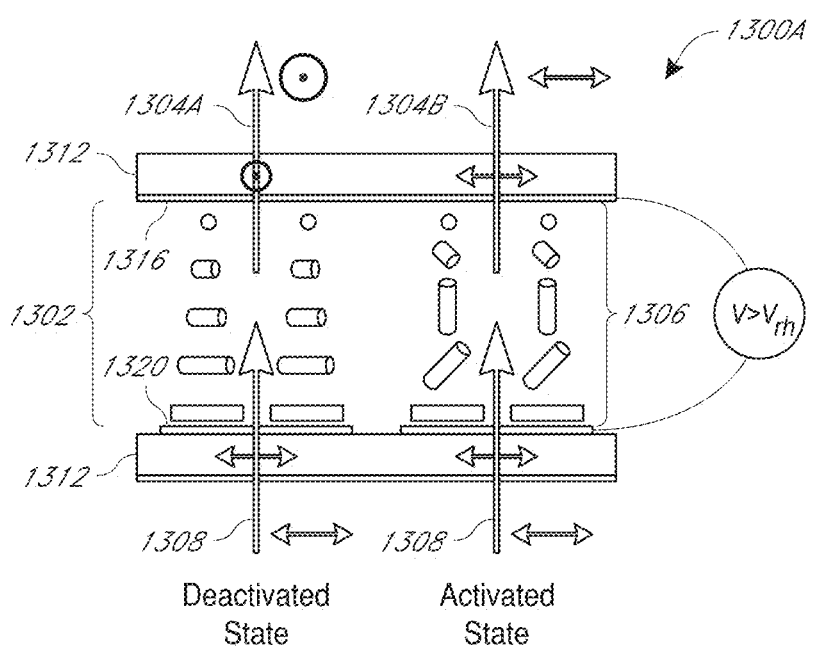
FIG. 13A illustrates a cross-sectional view of an example of a switchable waveplate comprising a layer of twisted nematic liquid crystals.

Referring to FIGS. 13A-13F, according to various embodiments, broadband switchable waveplates comprise a layer of twisted nematic (TN) liquid crystals (LCs). FIG. 13A illustrates a cross-sectional view of an example of a switchable waveplate comprising a layer of TN LCs. A TN LC switchable waveplate 1300A comprises a layer 1302 of TN LCs disposed between a pair of transparent substrates 1312. Each of the transparent substrates 1312 has formed on the inner surface a conducting transparent electrode 1316, 1320.

The surfaces of the transparent electrodes 1316, 1320 and/or the substrates 1312 may be configured such that the TN LC molecules in contact with or immediately adjacent to the upper electrode 1316 tend to orient with their long axes extending in a first lateral direction, while the TN LC molecules in contact with or immediately adjacent to the lower electrode 1320 tend to orient with their long axes extending in a second lateral direction, which may cross, e.g., to form an angle of about 90 degrees relative to, the first lateral direction. The TN LC molecules between the TN LC molecules immediately adjacent to the lower electrode 1320 and the TN LC molecules immediately adjacent to the upper electrode 1316 undergo a twist. The illustrated TN LC switchable waveplate 1300A is configured as a broadband waveplate.

Still referring to FIG. 13A, in operation, in the absence of an electric field (deactivated state) across the TN LC layer 1302, the nematic director of the TN LC molecules undergoes a smooth 90 degree twist across the thickness of the TN LC layer 1302. In this state, the incident light 1308 polarized in a first direction (same direction as the LC molecules closest to the lower electrodes 1312, indicated by double-headed arrows) is incident on the TN LC layer 1302. The twisted arrangement of the TN LC molecules within the TN LC layer 1302 serves as an optical wave guide and rotates the plane of polarization by a quarter turn (90 degrees) prior to reaching the upper electrodes 1316. In this state, the TN LC layer 1302 serves to shift the polarization direction of linearly polarized light passing therethrough from one linear polarization direction to another. Thus, the transmitted light 1304A is polarized in a second direction (same direction as the LC molecules closes to the upper electrodes 1316) opposite the first direction.

On the other hand, when a voltage exceeding a threshold voltage (V>Vth) of the TN LC switchable waveplate 1300A is applied to across the electrodes 1316, 1320 (activated state), the TN LC molecules within the TN LC layer 1306 tend to align with the resulting electric field and the optical wave guiding property of the TN LC layer 1304 described above with respect to the deactivated state is lost. In this state, the TN LC layer 1306 serves to preserve the polarization direction of light passing therethrough. Thus, the incident light 1308 and the transmitted light 1304B are polarized in the same first direction (same direction as the LC molecules closest to the lower electrodes 1312).

Still referring to the activated state, when the voltage or the electric field is turned off, the TN LC molecules relax back to their twisted state and the TN LC molecules of the TN LC layer 1306 in the activated state returns to the configuration of TN LC molecules of the TN LC layer 1302 in the deactivated state.

As described above, the TN LC switchable waveplate 1300A described above with respect to FIG. 13A serves to shift the polarization direction of linearly polarized light. However, various broadband waveplate lens assemblies described herein includes a switchable waveplate configured as a switchable half waveplate for reversing handedness of circular polarized light. Thus, in the following with respect to FIGS. 13B-13D, switchable waveplates configured as switchable half waveplates are described, according to embodiments.

Figure 13B:
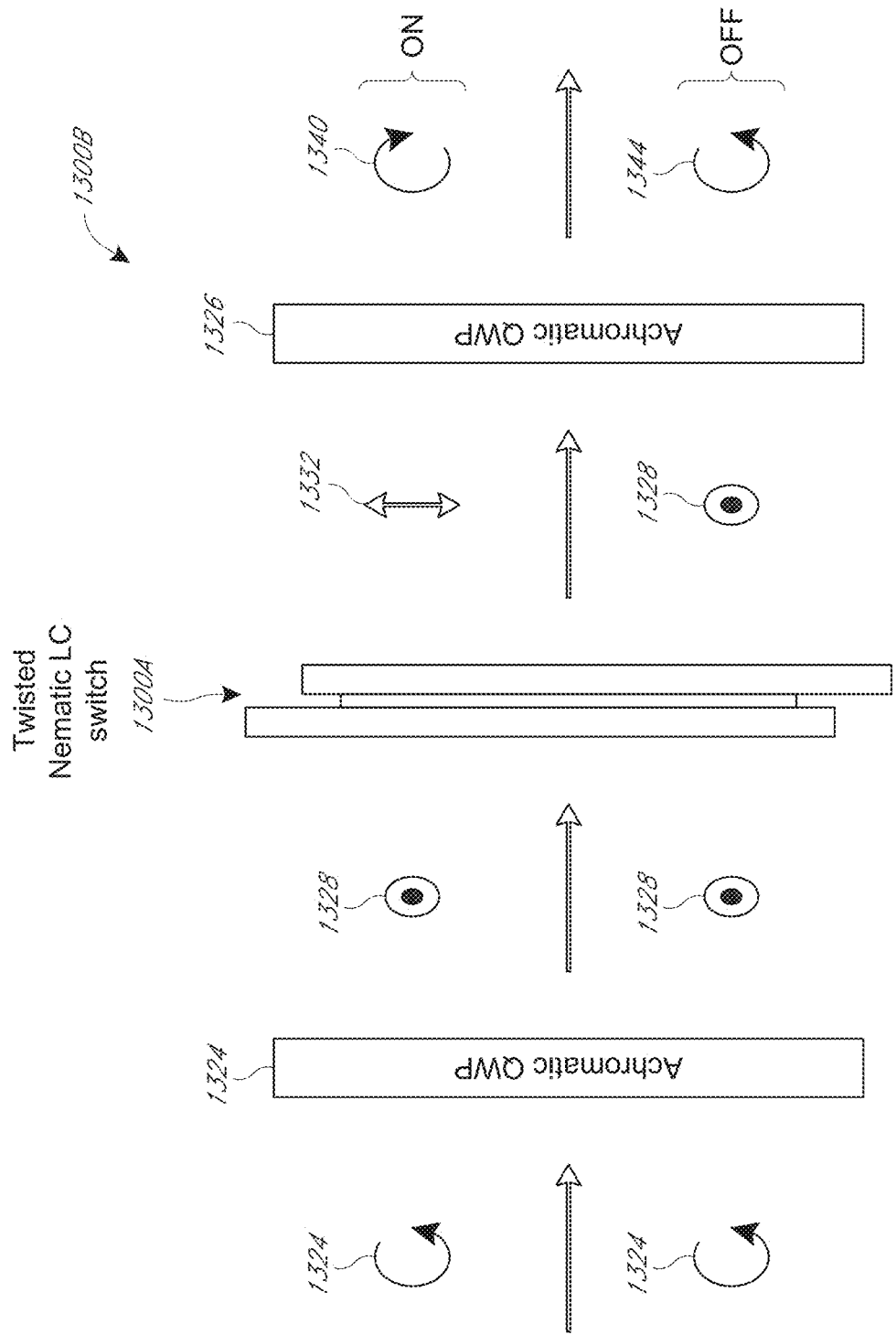
FIG. 13B illustrates an example of a switchable waveplate assembly comprising the switchable waveplate of FIG. 13A interposed between a pair of quarter waveplates in operation with the switchable waveplate activated or deactivated.

FIG. 13B illustrates a cross-sectional view of a switchable broadband waveplate 1300B configured as a half wave plate, according to embodiments. The switchable broadband waveplate 1300B includes the TN LC switchable waveplate 1300A illustrated with respect to FIG. 13A. In addition, in order to serve as a broadband half waveplate for circular polarized light, the switchable broadband waveplate 1300B additionally includes a pair of achromatic quarter waveplates (QWP) 1324, 1326.

In operation, in an activated state (upper portion of FIG. 13B) of the switchable broadband waveplate 1300B, when an incident circularly polarized light beam 1324 having a first handedness, e.g., a left-hand circular polarized (LHCP) light beam, passes through the first QWP 1324, the first QWP 1324 converts the circularly polarized light beam 1324 into a first linearly polarized light beam 1328 having a first linear polarization. Subsequently, upon passing through an activated TN LC switchable waveplate 1300A, the first linearly polarized light beam 1328 is converted into a second linearly polarized light beam 1332 having a second linear polarization. Subsequently, upon passing through the second QWP 1326, the second linearly polarized light beam 1332 is transformed into an exiting circularly polarized light beam 1340 having a second handedness opposite the first handedness, e.g., into a RHCP light beam. Thus, when activated, the switchable broadband waveplate 1300B serves as a half waveplate that reverses the polarization of a circular polarized light beam.

On the other hand, when the switchable broadband waveplate 1300B is deactivated (lower portion of FIG. 13B), after the incident circularly polarized light beam 1324 passes through the first QWP 1324 as described above and subsequently passes through a deactivated TN LC switchable waveplate 1300A, the polarization of the first linearly polarized light beam 1328 is preserved. Thereafter, upon passing through the second QWP 1326, first linearly polarized light beam 1328 is transformed into an exiting circularly polarized light beam 1340 having the first handedness, e.g., into a LHCP light beam. Thus, when deactivated, the broadband waveplate 1300B serves as transparent medium which preserves the polarization of a circular polarized light beam.

In various embodiments described herein, the first and/or second QWP 1324, 1326 are broadband quarter waveplates having similar bandwidths compared to the TN LC switchable waveplate 1300A. According to embodiments, quarter waveplates 1324, 1326 can be formed using a polymerized TN LC layer. To provide broadband capability, QWPs according to various embodiments include a plurality of TN LC layers. When each of the TN LC layers are formed on its own substrate, the resulting broadband quarter waveplate and/or the optical absorption of the resulting stack may become unacceptably thick. Thus, in the following, embodiments of QWPs comprising a plurality of TN LC layers formed on a single substrate are described, for efficient integration with the TN LC switchable waveplate 1300A.

Figure 13C:
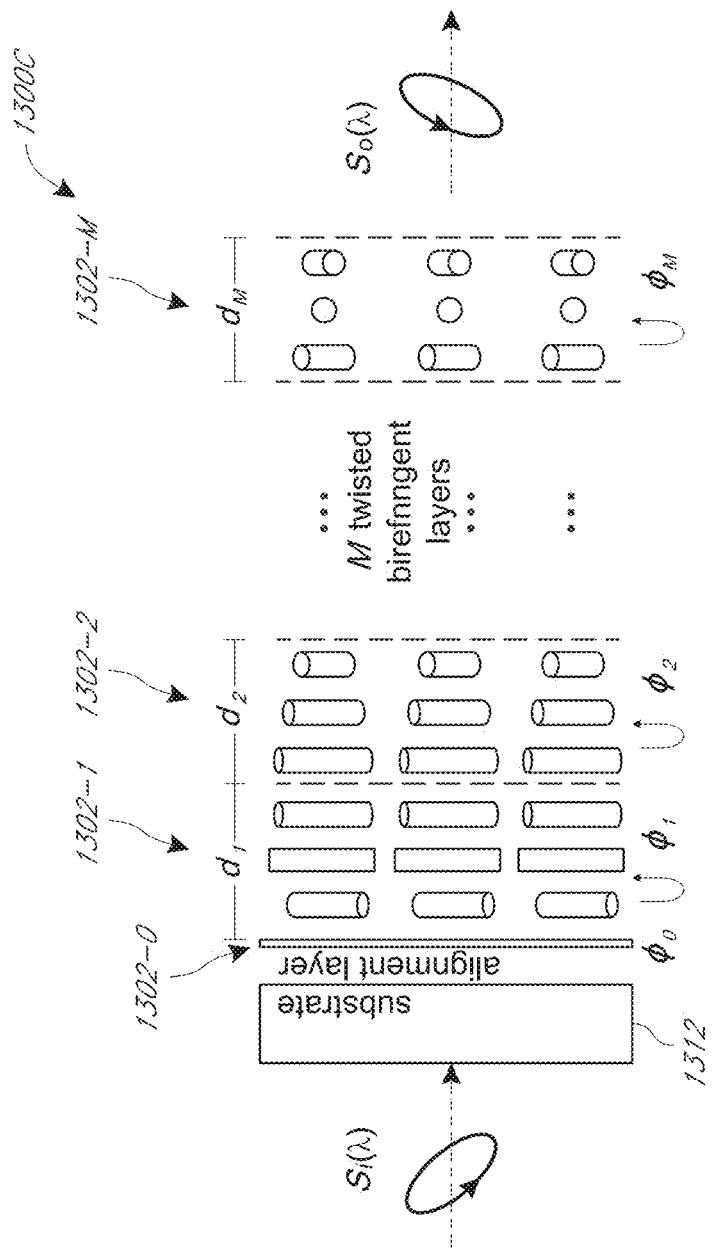
FIG. 13C illustrates an example of the quarter waveplate comprising a plurality of layers of twisted nematic liquid crystal layers.

FIG. 13C illustrates a cross-sectional view of a broadband QWP 1300C, which can be the first and/or second QWP 1324, 1326 illustrated above with respect to FIG. 13B, comprising a plurality (M number) of TN LC layers 1302-1, 1302-2, ... 1302-M, stacked on an alignment layer 1302-0 formed on a substrate 1312. The alignment layer 1302-0, which is further described elsewhere in the specification, is configured to induce the elongation direction of the LC molecules in the first TN LC layer 1302-1 that are immediately adjacent to the alignment layer 1302-0 to be aligned in a first direction. The LC molecules above the LC molecules aligned by the alignment layer 1302-0 successively undergo a first twist, such that the LC molecules in the first TN LC layer 1302-1 that are farthest from the alignment layer 1302-0, which are directly adjacent to the second TN LC layer 1302-2, are elongated in a second direction. The alignment of LC molecules in each of the subsequent TN LC layers 1302-2 to 1302-M are aligned in a similar manner as the first TN LC layer 1302-1 except, the LC molecules closest to the previous layer is aligned in the same direction as the topmost LC molecules of the previous layer. For example, the topmost LC molecules in the first TN LC layer 1302-1 and the bottommost LC molecules in the second TN LC layer 1302-2 are aligned in the same second direction. The LC molecules in the second TN LC layer 1302-2 undergo a second twist, such that the topmost LC molecules in the second TN LC layer 1302-2 are elongated in a third direction. Such alignment of LC molecules in a given TN LC layer as a result of the alignment of LC molecules in an adjacent layer in contact therewith is sometimes referred to as self-alignment, because no intervening alignment layer is interposed therebetween. Thus, in some embodiments, broadband QWPs comprise a plurality of TN LC layers having two or more self-aligned TN LC layers each having a non-zero twist.

In embodiments, the TN LC layers comprise polymerized LC molecules (LCPs), formed using, e.g., reactive mesogens. As described above, reactive mesogens are initially low molecular weight LCs which may be aligned by surfaces and a twist to have complex profiles, as with conventional LCs, but which may then be cured into a solid polymer film by, e.g., photo-polymerization.

Figure 13E:
FIG. 13E illustrates an example of a switchable waveplate assembly comprising a layer of twisted nematic liquid crystals interposed between a pair of quarter waveplates integrated as a single stack.
Figure 13D:
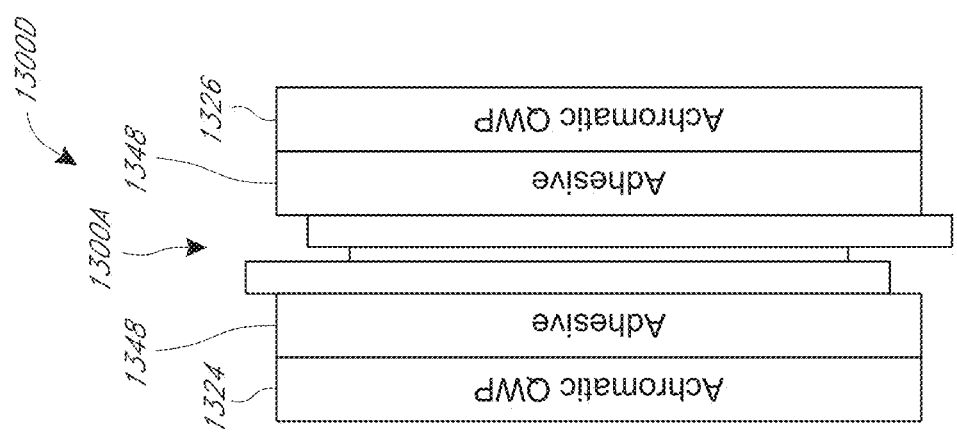
FIG. 13D illustrates an example of a switchable waveplate assembly comprising the switchable waveplate of FIG. 13A interposed between a pair of quarter waveplates integrated as a single stack using adhesive layers.

FIG. 13D illustrates a cross-sectional view of an integrated switchable broadband waveplate 1300D in which a TN LC switchable waveplate 1300A similar to that described above with respect to FIG. 13A is integrated into a single stack with a pair of broadband QWP 1324, 1326 similar to that described above with respect to FIG. 13C. In the illustrated embodiment, the TN LC switchable waveplate 1300A is integrated into a single stack by having attached on opposing sides thereof the pair of broadband quarter waveplates 1324, 1326 using adhesive layers 1348.

FIG. 13E illustrates a cross-sectional view of an integrated switchable broadband waveplate 1300E in which a TN LC switchable waveplate 1300A similar to that described above with respect to FIG. 13A is integrated into a single stack with a pair of broadband quarter waveplates 1324, 1326 in a similar manner as described above with respect to FIG. 13D, except, instead of using adhesive to form an integrated stack, one of the pair of broadband quarter waveplates 1324, 1326 serves as a substrate on which a TN LC switchable waveplate 1300A (FIG. 13A) may be directly formed. For example, on a surface of one or both of the QWP 1324, 1326, different layers of the TN LC switchable waveplate 1300A may be directly formed. Advantageously, one or both of the substrates 1312 of the TN LC switchable waveplate 1300A may be omitted. Thus, the TN LC switchable waveplate 1300A is integrated into a compact single stack by being directly formed on one of the pair of broadband QWP 1324, 1326, and forming thereon the other one of the pair of broadband QWP 1324, 1326.

In each of the embodiments illustrated above with respect to FIGS. 13D and 13E, the broadband QWP can be formed of liquid crystal-based materials or other non-liquid crystal-based materials such as, e.g., quartz and $MgF_2$. In the following, with respect to FIG. 13F, an embodiment in which broadband QWP comprising liquid crystals is particularly advantageously integrated with a TN LC switchable waveplate into a single stack to serve not only as QWP but also as alignment layers for the TN LC switchable waveplate.

Figure 13F:
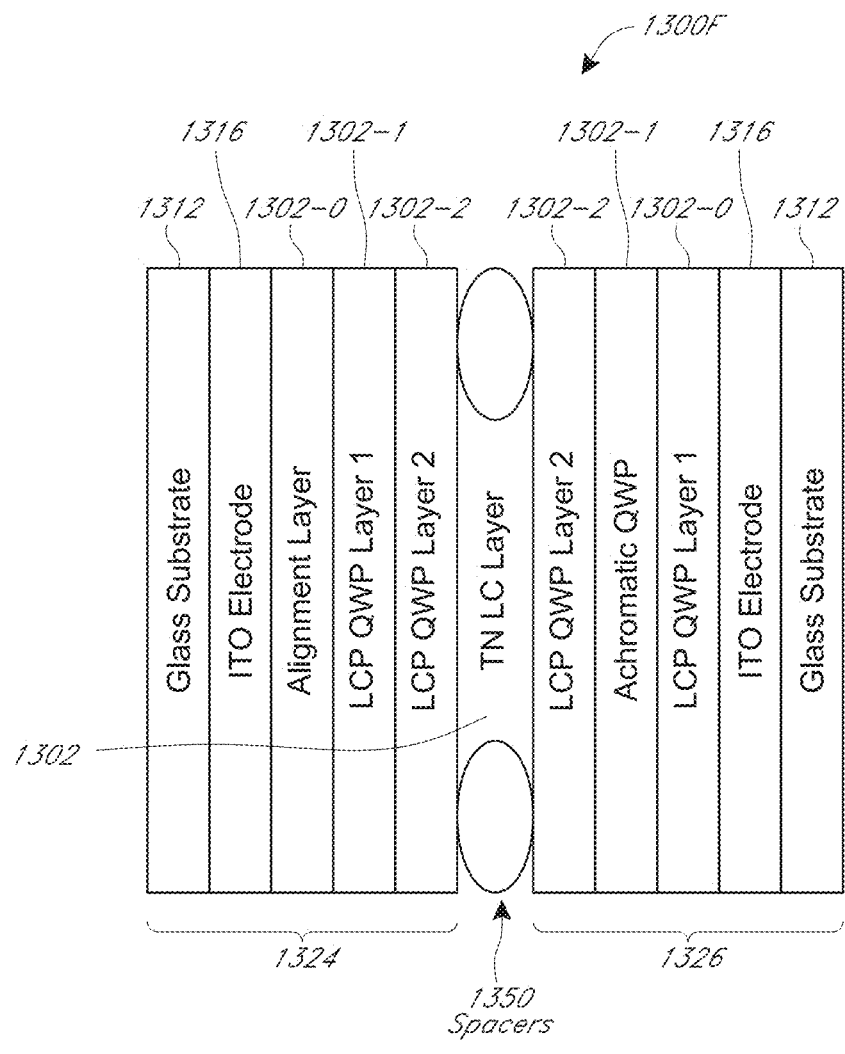
FIG. 13F illustrates an example of a switchable waveplate assembly comprising a layer of twisted nematic liquid crystals interposed between a pair of quarter waveplates of FIG. 13C integrated as a single stack.

FIG. 13F illustrates a cross-sectional view of an integrated switchable broadband waveplate 1300F integrating a TN LC switchable waveplate similar to that described above with respect to FIG. 13A. The switchable broadband waveplate 1300F includes a pair of broadband QWP 1324, 1326 arranged in a similar manner as described above with respect to FIG. 13E, except, instead of the broadband QWP 1324, 1326 as substrates for the TN LC layer 1302, broadband QWP 1324, 1326 comprises thin polymerized LC layers formed on respective surfaces of substrates 1312. The LC molecules of the TN LC layer 1302 are inserted into a gap formed between opposing surfaces of broadband QWP 1324, 1326 by spacers 1350, which defines the thickness of the TN LC layer 1302. The method of inserting the LC molecules is further described elsewhere in the specification. In addition, different layers of the TN LC switchable waveplate 1300A and different layers of the broadband QWP 1324, 1326 are integrally formed into a single stack. For example, the first broadband QWP 1324 includes a substrate 1312 on which a lower transparent electrode 1316 is formed, followed by an alignment layer 1302-0 and a plurality of TN LC layers 1302-1, 1302-2. Similarly, the second broadband QWP 1326 includes a substrate 1312, on which an upper transparent electrode 1320 is formed, followed by an alignment layer 1302-0 and a plurality of TN LC layers 1302-1, 1302-2.

Still referring to FIG. 13F, advantageously, the outermost LC molecules of the TN LC layer 1302-2 of the first broadband QWP 1324 facing the gap and the outermost LC molecules of the TN LC layer 1302-2 of the second broadband QWP 1326 facing the gap are arranged to serve as alignment layers for the switchable TN LC layer 1302, such that the outermost LC molecules of the TN LC layer 1302 are self-aligned, in a similar manner as described above with respect to FIG. 13C. In addition, by integrally stacking different layers the TN LC switchable waveplate 1300A with different layers of the broadband QWP 1324, 1326, the total thickness of the entire stack can be substantially reduced. For instance, while mechanically bonding TN LC switchable waveplate 1300A as illustrated in FIG. 13A with the broadband quarter waveplates 1324, 1326 as illustrated in FIG. 13C would have resulted in as many as four substrates, the entire stack of the switchable broadband waveplate 1300F has only two substrates.

In references to FIG. 13F and various embodiments throughout the specification, a switchable LC layer, e.g., the TN LC layer 1302 inserted into the gap has a thickness of about 1 µm-50 µm, 1-10 µm, 10-20 µm, 20-30 µm, 30-40 µm, 40-50 µm or a value within any range defined by these values. In addition, passive LC layers, e.g., the TN LC layers 1302-1, 1302-2, can have a thickness of about 0.1 µm-50 µm, 0.1-1 µm, 1-10 µm, 10-20 µm, 20-30 µm, 30-40 µm, 40-50 µm or a value within any range defined by these values.

In various embodiments described herein, an alignment layer (e.g., 1302-0 in FIGS. 13C, 13F) is used to align LC molecules, e.g., align the elongation direction of LC molecules, along a particular direction. For example, as described above with respect to FIGS. 13A-13F, an alignment layer can be used to define a director (n), or a local average elongation direction of elongated LC molecules, in a predetermined direction. In some other embodiments, an alignment layer may be formed of organic polymers such as polyimides and polyamides that are mechanically rubbed, obliquely deposited inorganic oxides such as $SiO_2$, or long chain aliphatic siloxanes. In some embodiments, a noncontact alignment layer may be formed of organic polymers using plane-polarized light to generate a surface anisotropy, which in turn defines the director. For example, use of cis-trans photoisomerization of azo dye, which may be deposited directly or dissolved into a standard orientation layer (e.g., polyimide) or the LC mixture, can produce an orientation effect in the alignment layer without rubbing. Noncontact alignment layers that use azo chromophores sometimes employ an intense laser light to induce the isomerization of the dye molecules.

Figure 14A:
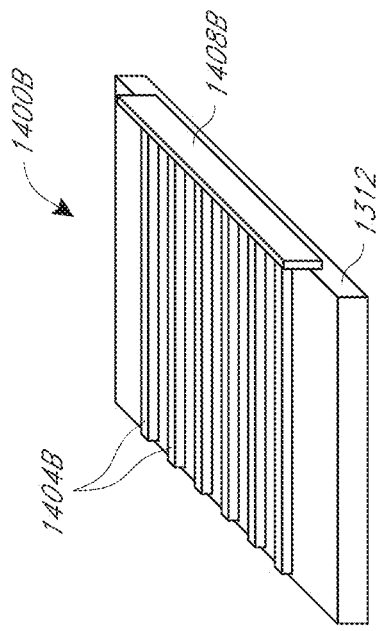
FIG. 14A illustrates a perspective view of an example of one of a pair of transparent electrodes for switching a layer of liquid crystals.

In some other embodiments, a pattern of nanostructures can serve as an alignment layer for aligning the LC molecules. Advantageously, in some embodiments, the pattern of nanostructures can be formed as part of an electrode layer to improve optical transmittance, to reduce process steps, and/or to further reduce the overall thickness of the broadband waveplates described above, e.g., with respect to FIGS. 13A-13F. To achieve this end, FIG. 14A illustrates a perspective view of a pattern of nanostructures 1400A, e.g., nanowires formed on a transparent substrate 1312, that serve a dual function of an alignment layer as well as an electrode layer, according to embodiments. The pattern of nanostructures 1400A can be patterned on the substrate 1312 using, e.g., a lithographic or a nanoimprinting technique, described in detail elsewhere in the specification. The nanostructures can be formed of a sufficiently thin conducting material that is patterned as elongated metal wires. For example, the conducting material can be gold, silver, copper, aluminum or ITO or any suitable conducting material having a thickness and electrical resistivity such that the resulting pattern of nanostructures can serve simultaneously as an alignment layer and as an electrode layer. In the illustrated embodiment, the pattern of nanostructures 1400A comprises periodic conducting lines 1404A extending in a first direction, e.g., x-direction, that are connected to a rail 1408A for supplying current or voltage to the periodic conducting lines 1404A. In various embodiments, the periodic conducting lines 1404A can have a pitch of 1 µm to 1000 µm, 5 µm to 500 µm, 10 µm to 100 µm, or any value within a range defined by these values. The conducting lines 1404 can have a width of 10 nm to 1 µm, 100 nm to 1000 nm, 100 nm to 500 nm, 200 nm to 300 nm, or any value within a range defined by these values. The periodic conducting lines 1404 can have a thickness of 10 nm to 1 µm, 100 nm to 1000 nm, 100 nm to 500 nm, 400 nm to 500 nm, or any value within a range defined by these values. A combination of the material, the thickness and the width of the periodic conducting lines 1404A can be selected such that a resulting sheet resistance of the periodic conducting lines 1404A is about 1 Ohms/square to 100 Ohms/square, 2 Ohms/square to 50 Ohms/square, 5 Ohms/square to 20 Ohms/square, or any value within a range defined by these values, for instance about 10 Ohms/square. In addition, a combination of the material and thickness of the conducting lines 1404A can be selected such that the resulting transmittance in the visible spectrum is 80% to 99%, 90% to 99%, 95% to 99%, 97% to 99%, or any value within a range defined by these values, for instance about 98%. Other dimensions, configurations and values are possible.

Figure 14B:
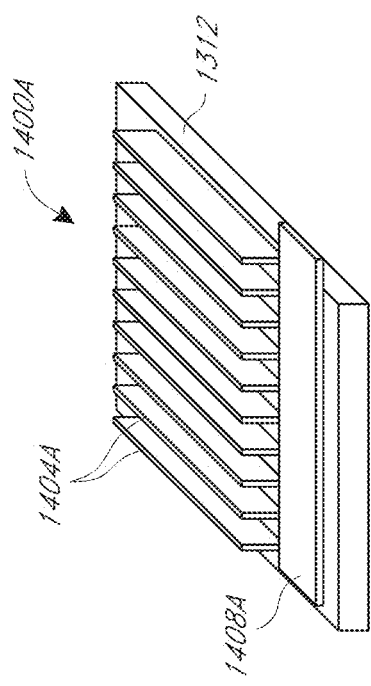
FIG. 14B illustrates a perspective view of an example of the other of a pair of transparent electrodes for switching a layer of liquid crystals.

FIG. 14B illustrates a perspective view of a pattern of nanostructures 1400B that is similar to the pattern of nanostructures 1400A described above with respect to FIG. 14A, except, the pattern of nanostructures 1400B comprises periodic conducting lines 1404B extending in a second direction, e.g., the x-direction, that are connected to a rail 1408B for supplying current to the periodic conducting lines 1404B.

Figure 14C:
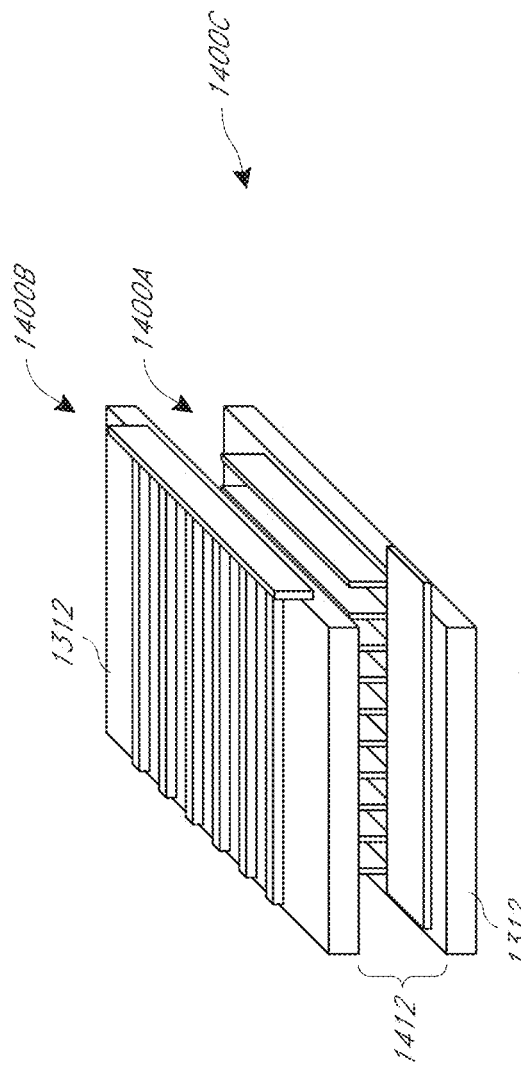
FIG. 14C illustrates a perspective view of an example of a pair of vertically separated transparent electrodes for switching a layer of liquid crystals.

FIG. 14C illustrates a perspective view of a pair of electrodes 1400C, according to embodiments. The pair of electrodes 1400C includes the pattern of nanostructures 1400A (FIG. 14A) and the pattern of nanostructures 1400B (FIG. 14B) that are arranged such that the periodic conducting lines 1404A and the periodic conducting lines 1404B face and cross each other, and are separated by a gap 1412 configured to dispose one or more LC layers, e.g., TN LC layers, therein. Advantageously, it has been found that each of the patterns of nanostructures 1400A and 1400B can serve as an alignment layer similar to the alignment layer 1302-0 described above with respect to FIGS. 13C, 13F such that when nematic LC molecules, e.g., reactive mesogens, are formed thereon, the LC molecules that are immediately adjacent to each of the patterns of nanostructures 1400A and 1400B may become aligned, e.g., with the director of the nematic LC molecules generally being aligned in the same direction as the elongation direction of the periodic conducting lines 1404A, 1404B. In addition, the LC molecules between the LC molecules immediately adjacent to the periodic conducting lines 1404A, 1404B can be configured to undergo a twist using a twisting agent such that an unpolymerized TN LC layers similar to the TN LC layer 1302 described above with respect to FIG. 13A and polymerized TN LC layer(s) similar to the TN LC layers 1302-1, 1302-2, . . . 1302-M described above with respect to FIG. 13C may be formed.

Referring back to FIG. 13F, it will be appreciated that, in some embodiments, by combining the functionality of an electrode and an alignment layer, the pattern of nanostructures 1400A can replace the combination of the transparent electrode 1316 and the alignment layer 1302-0 of the broadband QWP 1324, and the pattern of nanostructures 1400B can replace the combination of the transparent electrode 1320 and the alignment layer 1302-0 of the broadband QWP 1326, thereby allowing a more compact overall stack.

Still referring to FIG. 14C, in operation, the arrangement of LC molecules with and without an electric field and the corresponding effect on the polarization of light is similar to that described above with respect to FIG. 13A.

Figures 15A, 15B:
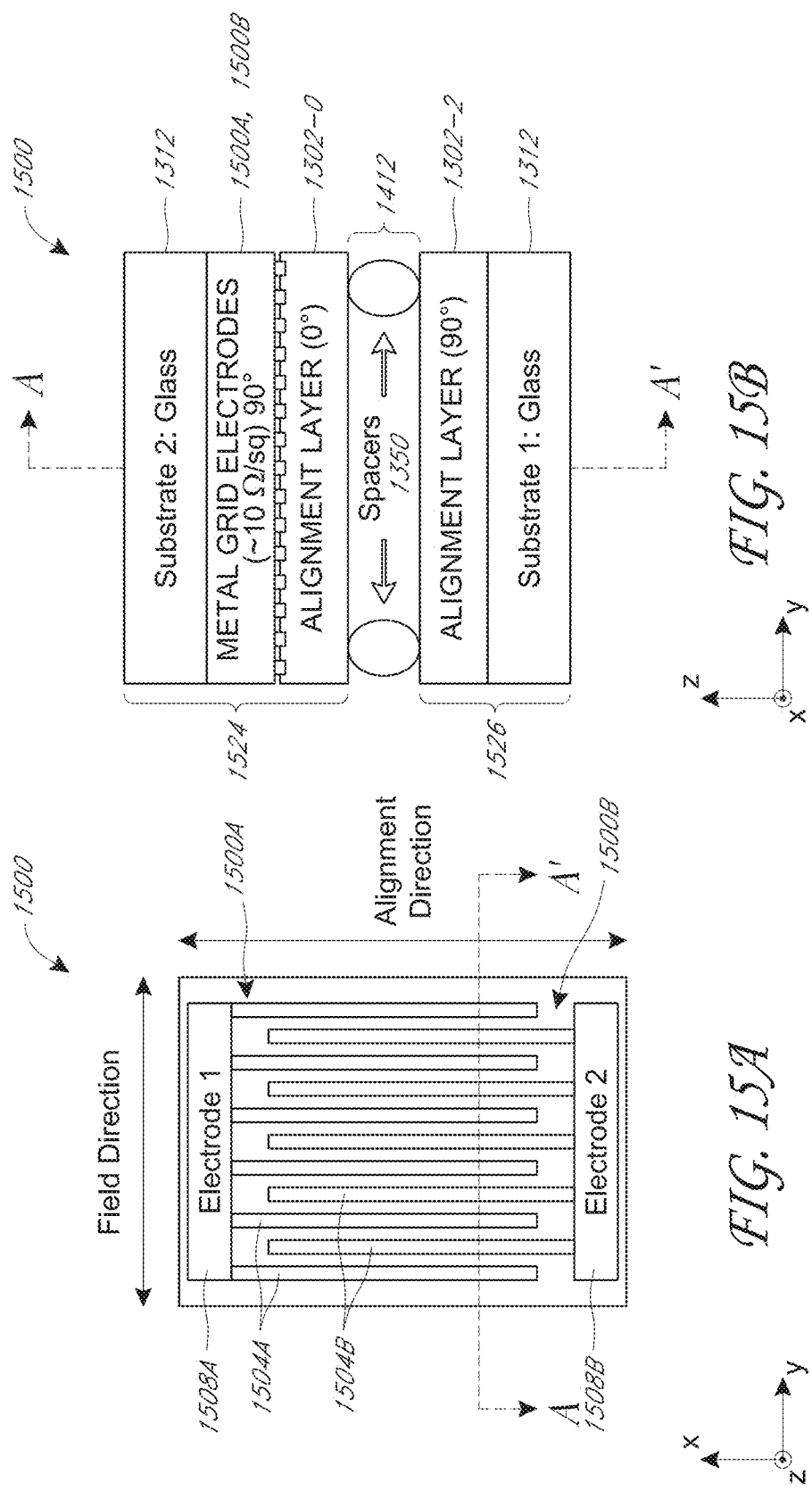
FIG. 15A illustrates a plan view of an example of a pair of horizontally interlaced transparent electrodes for switching a layer of liquid crystals.
FIG. 15B illustrates a cross-sectional view of an example of a switchable waveplate assembly including the pair of horizontally interlaced transparent electrodes of FIG. 15A.

FIGS. 15A and 15B illustrate a plan view and a cross-sectional view, respectively, of a TN LC switchable broadband waveplate 1500, according to embodiments. Unlike the broadband waveplates illustrated above with respect to FIGS. 13A and 13F having vertically separated electrodes for switching, the TN LC switchable broadband waveplate includes an in-plane laterally separated electrodes for switching. The TN LC switchable broadband waveplate 1500 includes an alignment electrode stack 1524 and an alignment layer stack 1526. In a similar manner as described above with respect to FIG. 13F, LC molecules are inserted into a gap formed by spacers 1350 between opposing surfaces of the alignment electrode stack 1524 and the alignment layer stack 1526. The method of inserting the LC molecules is described elsewhere in the specification. The alignment electrode stack 1524 includes first and second electrodes 1500A, 1500B formed on an upper transparent substrate 1312, and further includes an optional upper alignment layer 1302-0. The alignment layer stack 1526 includes a lower alignment layer 1302-0 formed on a lower transparent substrate 1312.

Referring to FIG. 15A, the alignment electrode stack 1524 includes the first and second electrodes 1500A, 1500B each including a respective one of first and second periodic conducting lines 1504A, 1504B. The periodic conducting lines 1504A are interdigitated or interlaced and alternating with the periodic conducting lines 1504B. Each of the first and second periodic conducting lines 1504A, 1504B are strapped to rails 1508A, 1508B, respectively, in a similar manner as described above with respect to the patterned nanostructures 1400A (FIG. 14A), 1400B (FIG. 14B). The material, thicknesses, widths and the pitch of the alternating periodic conducting lines 1504A, 1504B can be similar to those described above with respect to the patterned nanostructures 1400A (FIG. 14A), 1400B (FIG. 14B). However, unlike the pair of electrodes 1400C described above with respect to FIG. 14C that are vertically separated, the periodic conducting lines 1504A are alternating with the periodic conducting lines 1504B in a lateral direction, e.g., y-direction, such that the electric field between the periodic conducting lines 1504A and the periodic conducting lines 1504B is directed in the lateral direction.

Referring to the cross-sectional view of the TN LC switchable cell 1500 in FIG. 15B, in a similar manner as described above with respect to FIG. 13F, LC molecules are inserted into the gap formed between opposing surfaces of the alignment electrode stack 1524 and the alignment layer stack 1526, such that a TN LC layer (not shown) similar to the TN LC layer 1302 (FIG. 13A) can be formed. The method of inserting the LC molecules is described elsewhere in the specification.

In some embodiments, in a similar manner as described above with respect to FIG. 14C, the alternating periodic conducting lines 1504A, 1504B and/or the upper alignment layer 1302-0 in the alignment electrode stack 1524 can serve as alignment layers for outermost LC molecules of a TN LC layer 1302 formed in the gap 1412, in a similar manner as the alignment layer 1316 described above with respect FIG. 13A and to the conducting lines 1404B described above with respect FIG. 14C. When the alternating periodic conducting lines 1504A, 1504B serve as an alignment layer, in some embodiments, the upper alignment layer 1302-0 may be omitted. In a similar manner to the alignment layer 1320 described above with respect FIG. 13A and to the conducting lines 1404A described above with respect FIG. 14C, the lower alignment layer 1302-0 may serve to align LC molecules in the gap 1412 that are immediately adjacent thereto.

While not illustrated, in some embodiments, the illustrated TN LC switchable broadband waveplate 1500 can integrate, in a similar manner as described above with respect to FIG. 1300F, a plurality of TN LC layers similar to the TN LC layers 1302-1, 1302-2, . . . 1302-M (FIG. 13F, not shown) between the alternating periodic conducting lines 1504A, 1504B and the LC molecules in the gap 1412, and/or between the lower alignment layer 1302-0 and the LC molecules in the gap 1412, thereby providing an integrated QWP functionality in a similar manner as described above with respect to FIG. 13F.

Still referring to FIGS. 15A, 15B, in operation, in the absence of an electric field, the alternating periodic conducting lines 1504A, 1504B serve as an alignment layer for the LC molecules immediately adjacent to the periodic conducting lines 1504A, 1504B, such that the LC molecules have a director generally extending parallel to the periodic conducting lines 1504A, 1504B. In the deactivated state, in a similar manner as described above with respect to FIG. 13A, the switchable broadband waveplate 1500 is configured to flip the polarization of linearly polarized light. On the other hand, when an electric field is applied in a lateral direction, e.g., y-direction, between the periodic conducting lines 1504A and the periodic conducting lines 1504B, the LC molecules between immediately adjacent periodic conducting lines 1504A, 1504B align with their elongation direction in a direction away from parallel, e.g., between parallel and perpendicular or perpendicular, to the periodic conducting lines 1504A, 1504B. In the activated state, in a similar manner as described above with respect to FIG. 13A, the switchable broadband waveplate 1500 is configured to preserve the polarization of linearly polarized light.

In some embodiments, in addition to combining the functionality of electrodes and an alignment layer, the first and second electrodes 1500A, 1500B can, e.g., replace the combination of the transparent electrodes 1316, 1320 and the upper and lower alignment layers 1302-0 of the broadband waveplate 1300F (FIG. 13F), thereby allowing a further more compact overall stack, and even more improved transmittance due to halving of electrode layers.

Liquid Crystal-Based Waveplate Lenses

As described above with respect to FIG. 12A, to provide images at a plurality of depth planes with high efficiency over a wide range of the visible spectrum, some broadband adaptive waveplate lens assemblies according to embodiments include a switchable waveplate and one or more waveplate lenses, which may be passive or switchable, that are formed of a thin film of birefringent liquid crystals. In the following, example waveplate lenses comprising liquid crystals whose orientations in the plane of the waveplate are adapted for focusing and/or altering the polarization state of light transmitted therethrough are disclosed. In the following, various embodiments of lenses and waveplates formed of liquid crystals.

Figure 16A:
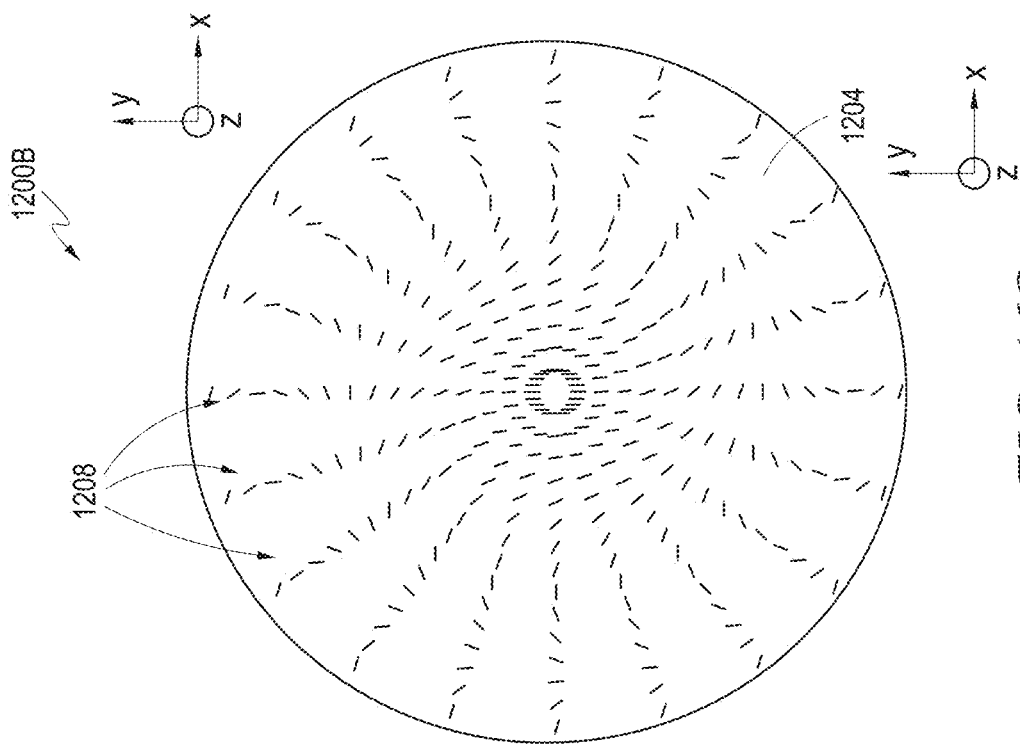
FIG. 16A illustrates a plan view of an example of a waveplate lens comprising liquid crystals.
Figure 16B:
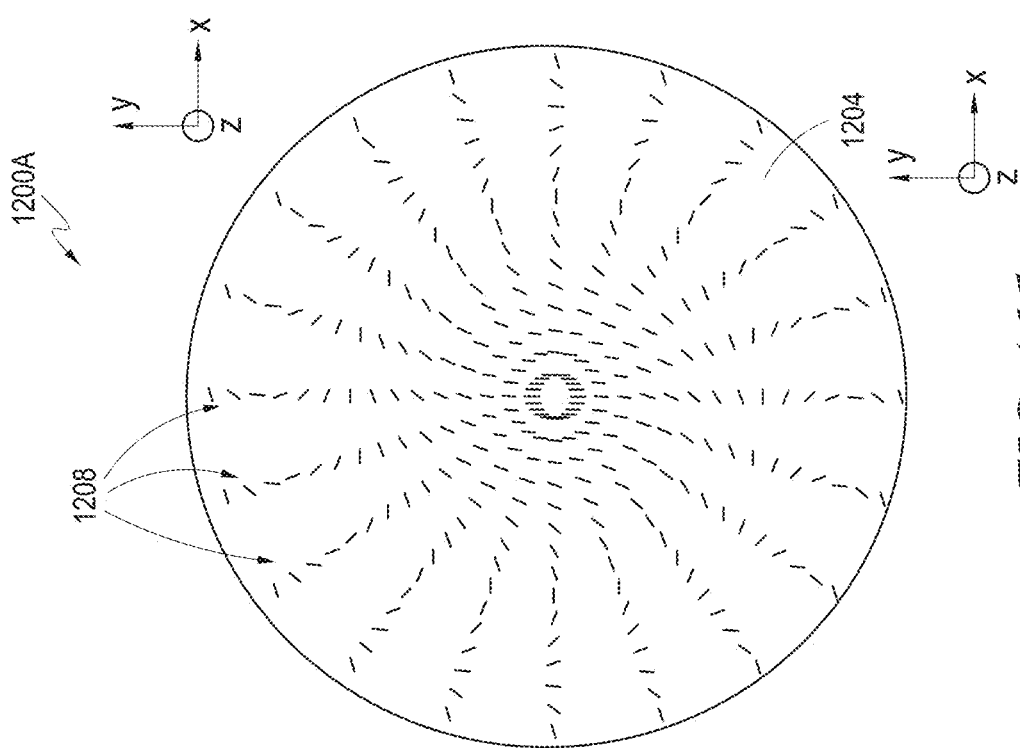
FIG. 16B illustrates a plan view of an example of a waveplate lens comprising liquid crystals.

One example of liquid crystal-based waveplate lenses is illustrated with respect to FIGS. 16A and 16B.

FIGS. 16A and 16B illustrate examples of waveplate lenses 1200A and 1200B, respectively, each comprising a transparent substrate 1204, e.g., a glass substrate, having formed thereon liquid crystal molecules 1208 elongated along different elongation directions relative to a direction parallel to an axial direction (e.g., x-direction or y-direction) along a major surface of the substrate 1204. That is, the liquid crystal molecules 1208 are rotated about a direction (e.g., z-direction) normal to a major surface of the substrate 1204 by different angles ($\phi$) of rotation, where $\phi$ is described as the angle between the direction of elongation of the liquid crystal molecules relative to a direction parallel to the layer normal (e.g., x-direction or y-direction).

In the illustrated implementations, the liquid crystal molecules 1208 at a given radius from a central axis C or the center of the lens have substantially the same angle ($\phi$) of rotation. As arranged, the liquid crystal molecules 1208 are configured to focus a collimated beam of light to a point at a focal length. Without being bound to any theory, the angle ($\phi$) of rotation of liquid crystal molecules 1208 may be proportional to a power of r, where r is the radial distance from C and has a value between about 1 and 3, e.g., 2. In one implementation, the angle ($\phi$) may be proportional to $+/-k_0 r^2/f$, where r is the radial distance from C and $k_0 = 2\pi/\lambda$ is the wavenumber of the light that is to be focused by the diffractive waveplate lens, $\lambda$ is the wavelength of the light, f is the focal length of the waveplate lenses 1200A, 1200B. The + and − sign can correspond to the direction of rotation of the liquid crystal molecules 1208 relative to the liquid crystal molecules 1208 nearest to the center C of the waveplate lenses 1200A, 1200B.

It will be appreciated that the patterns of liquid crystal molecules 1208 of waveplate lenses 1200A and 1200B represent flipped images of each other. That is, one of the waveplate lenses 1200A and 1200B may be obtained by rotating the other of the waveplate lenses 1200B and 1200B around an axial direction (e.g., x-direction or y-direction) by 180 degrees. As configured, focal lengths and optical powers of the waveplate lenses 1200A and 1200B are the same in magnitude but opposite in sign.

In some implementations, each of waveplate lenses 1200A and 1200B may serve as half waveplate lenses. When configured as a half-waveplate lens, each of the waveplate lenses 1200A and 1200B rotates the plane of a linearly polarized light by an angle $2\alpha$ with respect to the polarization of an input beam, where $\alpha$ is the angle between the input polarization direction and the waveplate axis. For a circular polarized beam, this change in angle translates into a phase shift and reversal of the polarization handedness. Thus, a $\pm 2\alpha$ phase shift may be generated in a circularly polarized beam with the sign of the phase shift depending on the polarization handedness.

FIG. 16C illustrates examples of a waveplate lens that diverges or converges light passing therethrough depending on the polarization of light and the side on which the light is incident, according to some embodiments. When configured as a half-waveplate lens, the illustrated waveplate lens 1200A may be configured to diverge a right-hand circular polarized (RHCP) light beam 1212 incident on a first side into a left-hand circular polarized (LHCP) beam 1216. On the other hand, the waveplate lens 1200A may be configured to converge a RHCP light beam 1220 incident on a second side opposite to the first side into a left-hand circular polarized (LHCP) beam 1224.

For the waveplate lens 1200B, the situation is reversed. As illustrated in FIG. 16D, when configured as a half-waveplate, the waveplate lens 1200B may be configured to converge a LHCP light beam 1228 incident on a first side into a RHCP beam 1232. On the other hand, the waveplate lens 1200B may be configured to diverge a LHCP light beam 1236 incident on a second side opposite the first side into a RHCP beam 1240.

Thus, by controlling the direction of angle of rotation and the radial distribution of the liquid crystals 1208, the waveplate lens may be configured to converge or diverge circularly polarized light having either handedness. It will be appreciated that, based on the relationship between the angles of rotation of the liquid crystals, the optical power may be increased or decreased. In addition, in some embodiments, the liquid crystals may be aligned and unaligned by applying an electric field. Thus, it will be appreciated that in the limit where the optical power is near zero, the waveplate lenses may be used as waveplates, e.g., switchable waveplates.

Broadband Adaptive Waveplate Lens Assemblies Including a Switchable Waveplate

As described above with respect to FIG. 12A, to provide images at a plurality of depth planes with high efficiency over a wide range of the visible spectrum, some broadband adaptive waveplate lens assemblies according to embodiments include a switchable waveplate and one or more waveplate lenses, which may be passive or switchable, that are formed of a thin film of birefringent material, e.g., liquid crystals. In the following, embodiments of broadband adaptive waveplate lens assemblies comprising a switchable broadband waveplate are disclosed. For example, the switchable broadband waveplate may be one of broadband switchable waveplates described above with respect to FIGS. 13A-13F, FIGS. 14A-14C and FIGS. 15A-15B.

Figure 17A:
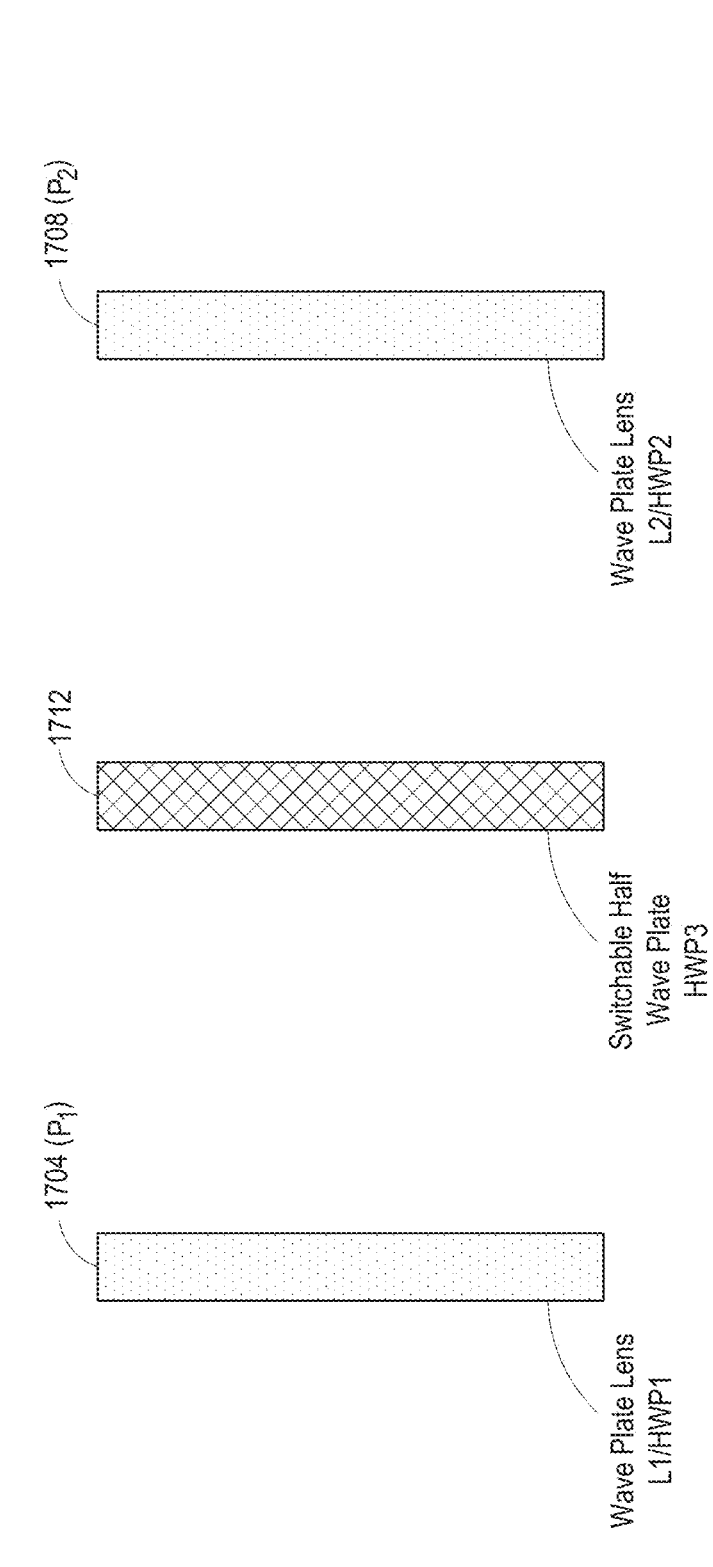
FIG. 17A illustrates an example of an adaptive lens assembly comprising waveplate lenses and a switchable waveplate.
Figure 17B:
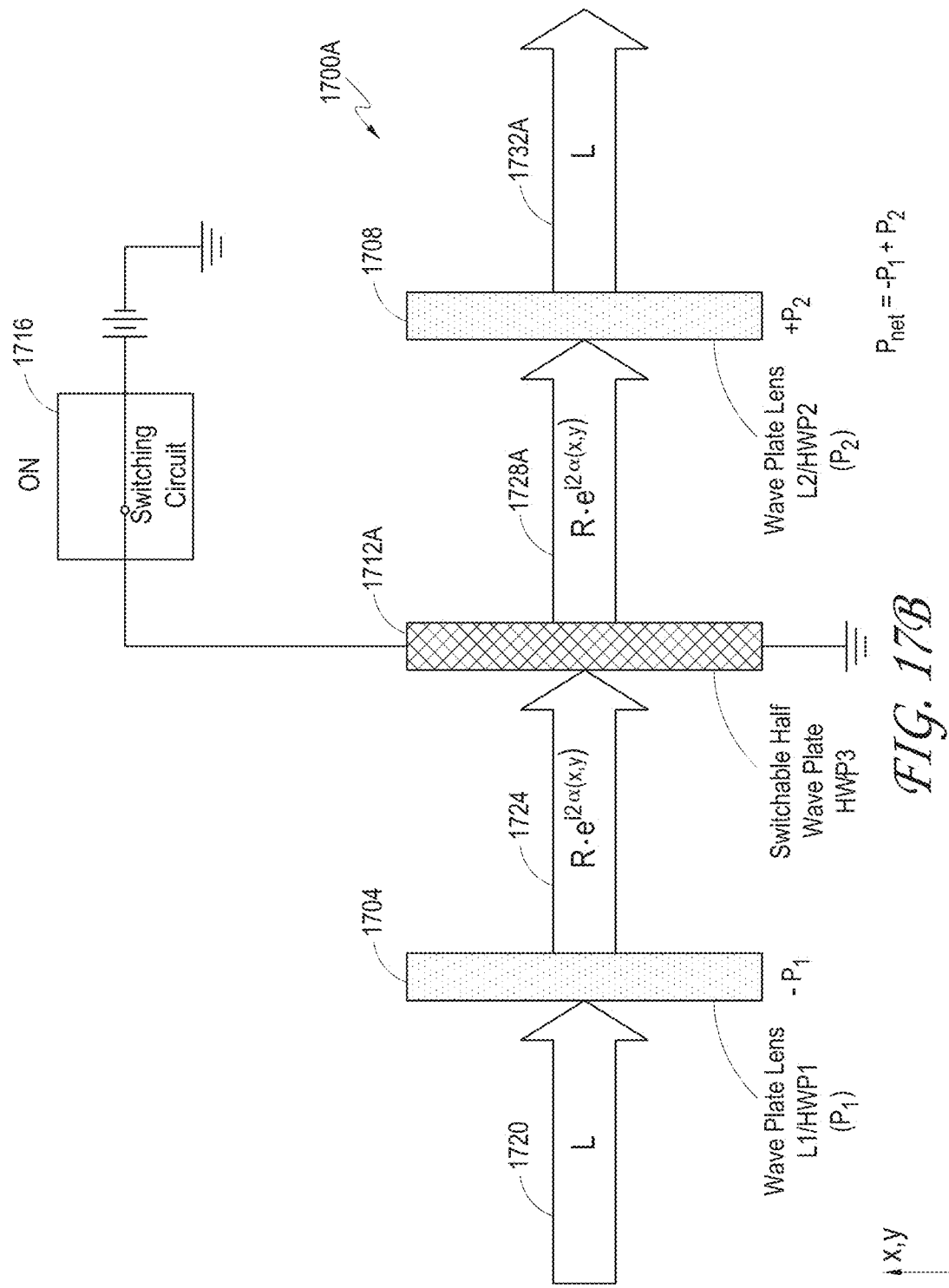
FIG. 17B illustrates an example of the adaptive lens assembly of FIG. 17A in operation with the switchable waveplate activated.
Figure 17C:
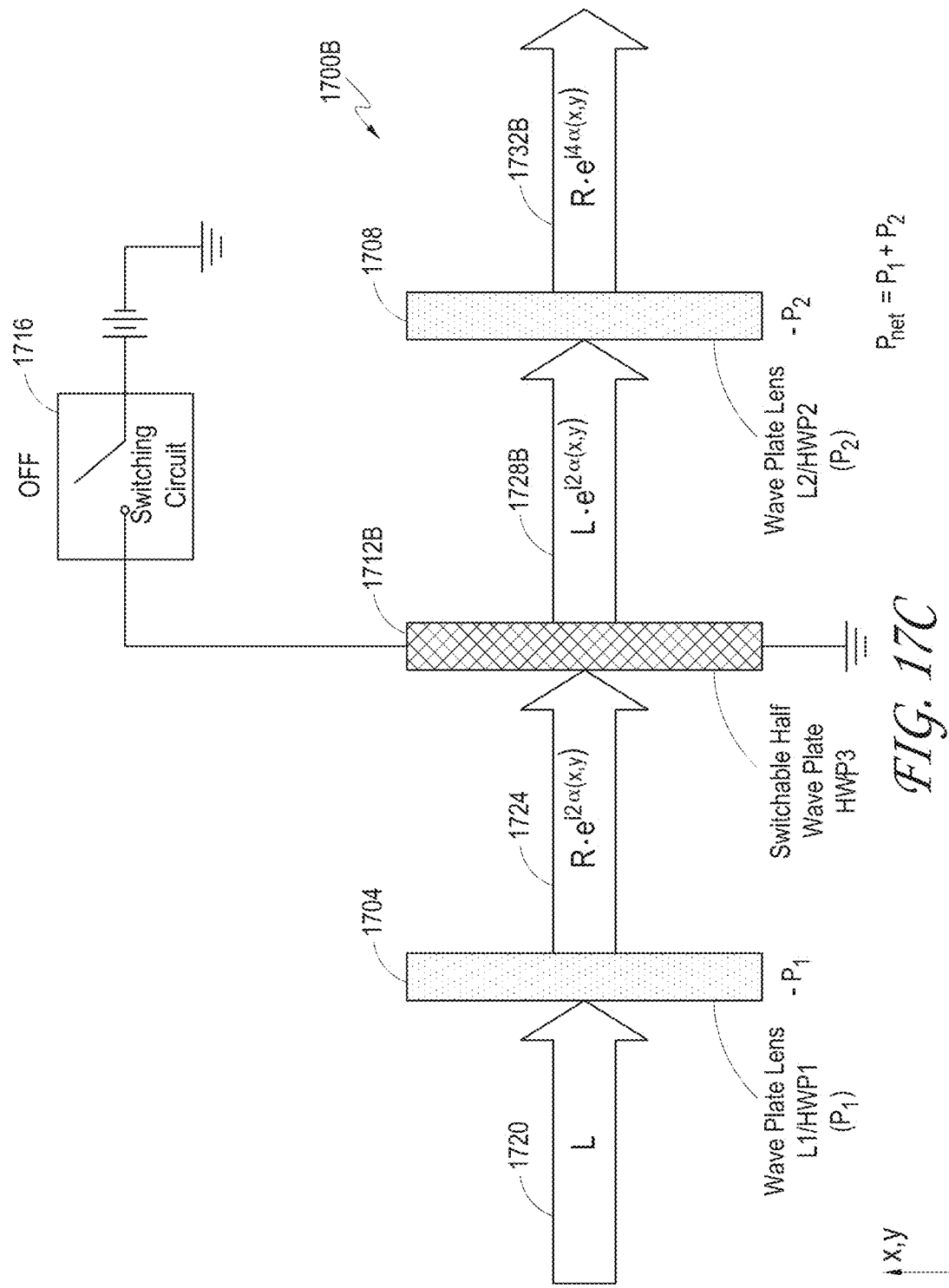
FIG. 17C illustrates an example of the adaptive lens assembly of FIG. 13A in operation with the switchable waveplate deactivated.

FIG. 17A illustrates an example of a broadband adaptive waveplate lens assembly 1700 comprising waveplate lenses, e.g., passive waveplate lenses, and a switchable waveplate, according to some embodiments. The broadband adaptive waveplate lens assembly 1700 may be configured, e.g., as either one of the pair of switchable waveplate assemblies 1004, 1008 described supra with respect to FIGS. 10, 11A and 11B. FIG. 17B illustrates the broadband adaptive waveplate lens assembly 1700A in operation when the switchable waveplate of the adaptive lens assembly 1700 illustrated in FIG. 17A is activated, whereas FIG. 17C illustrates the broadband adaptive waveplate lens assembly 1700B in operation when the switchable waveplate of the adaptive lens assembly 1700 illustrated in FIG. 17A is deactivated. The adaptive lens assembly 1700 is configured to couple and to transmit therethrough the light outcoupled from the waveguide assembly 1012 (FIGS. 10, 11A, 11B). The adaptive lens assembly 1700 comprises a first waveplate lens (L1/HWP1) 1704, e.g., a first half-waveplate lens, a second waveplate lens (L2/HWP2) 1708, e.g., a second half-waveplate lens, and a switchable waveplate (HWP3) 1712, e.g., a switchable half waveplate.

In various embodiments, each of the L1/HWP1 1704 and L2/HWP2 1708 is configured to serve as a lens and a half waveplate. As described above with respect to FIGS. 12A and 12B, when configured as a half-waveplate, each of the L1/HWP1 1704 and L2/HWP2 1708 is configured to convert light having a circular polarization of first handedness (first HCP) to light having a circular polarization of second handedness (second HCP). That is, each of the L1/HWP1 1704 and L2/HWP2 1708 is configured to convert light passing therethrough from light having LHCP or RHCP, and to convert light having RHCP or LHCP, respectively.

In various embodiments, each of the L1/HWP1 1704 and L2/HWP2 1708 is configured to serve as a lens, for a given polarization, having a first lensing effect or a second lensing effect opposite the second lensing effect. That is, each of the L1/HWP1 1704 and L2/HWP2 1708 is configured to either converge or diverge light passing through. In various embodiments, each of the L1/HWP1 1704 and L2/HWP2 1708 may be configured to have opposite lensing effects depending on the polarization state of the incident light. For example, each of the L1/HWP1 1704 and L2/HWP2 1708 may be configured to focus light incident thereon having a first HCP while being configured to defocus light incident thereon having a second HCP.

In some embodiments, the L1/HWP1 1704 and L2/HWP2 1708 are configured to have the same lensing effect for light having a given HCP. That is, both of the L1/HWP1 1704 and L2/HWP2 1708 may be configured to focus light having LHCP, focus light having RHCP, defocus light having LHCP or defocus light having RHCP.

In some embodiments, each of the L1/HWP1 1704 and L2/HWP2 1708 may comprise liquid crystal molecules that are elongated and rotated such that liquid crystals at a given radius from a central axis of the respective waveplate lenses 1704, 1708 have the same angle ($\phi$) of rotation, as described above with respect to FIGS. 12A and 12B. Each of the first and second waveplate lenses 1704, 1708 is configured to alter a polarization state, e.g., invert a polarization state, of light passing therethrough. The switchable waveplate 1712 is configured to alter a polarization state, e.g., invert a polarization state, of light passing therethrough when electrically deactivated, while being configured to substantially pass light without altering the polarization state of light passing therethrough when activated. The electrical signal, e.g., a current signal or a voltage signal, for switching the switchable waveplate 1712 may be provided by a switching circuit 1716 electrically connected thereto.

In various embodiments, when deactivated, e.g., electrically deactivated using a voltage or a current signal provided by the switching circuit 1716, the HWP3 1712B (FIG. 17C) serves as a half waveplate. That is, when deactivated, the HWP3 1712B (FIG. 17C) serves as a half waveplate configured to convert light passing therethrough from light having LHCP or RHCP to light having RHCP or LHCP, respectively. Thus, each of the L1/HWP1 1704, the L2/HWP2 1708, and the HWP3 1712B when deactivated (FIG. 17C) is configured to convert light having a circular polarization of first handedness (first HCP) to light having a circular polarization of second handedness (second HCP).

In various embodiments, when activated, e.g., electrically activated using a voltage or a current signal provided by the switching circuit 1716, e.g., by removing the voltage or the current signal, the HWP3 1712A (FIG. 17B) serves as transmitting medium for light without affecting the polarization or providing any lensing effect.

In some embodiments, a single waveplate lens 1704 and/or 1708 may function both as a waveplate lens and as a switchable half waveplate. In such embodiments, the dedicated switchable half waveplate 1712 may be omitted.

FIG. 17B illustrates an example of the adaptive lens assembly of FIG. 17A in operation with the switchable waveplate activated, according to some embodiments. The adaptive lens assembly 1700A may be activated when the switchable waveplate 1712 is activated, e.g., when no current or voltage is applied to the switchable waveplate 1712 by the switching circuit 1716. The adaptive lens assembly 1700A may correspond to the first adaptive lens assembly 1004 (on the world side) or the second adaptive lens assembly 1008 (on the user side). By way of example only, the adaptive lens assembly 1700A will be described as corresponding to the first adaptive lens assembly 1004 or the second adaptive lens assembly 1008, as part of the display device 1000 (FIG. 10) that is displaying the view of the real world to the user without displaying a virtual image. For example, the display device 1000 (FIG. 10) may be used as an ordinary eyeglass or an ordinary goggle. Each of the L1/HWP1 1704 and L2/HWP2 1708 may be configured to have a first lensing effect, e.g., diverging effect, on light having a first HCP, e.g., LHCP, passing therethrough. Each of the L1/HWP1 1704 and L2/HWP2 1708 may also be configured to have a second lensing effect opposite the first lensing effect, e.g., converging effect, on light having the opposite HCP, e.g., RHCP, passing therethrough.

In the illustrated embodiment, the light beam 1720 may represent a light beam from the world that is incident on either the first adaptive lens assembly 1004 (FIGS. 11A/B, on the world side) or the second adaptive lens assembly 1008 (FIGS. 11A/B, on the user side) while the display device 1700A is being used as ordinary eyeglasses or a goggle, without displaying virtual content. By way of example only, the light beam 1720 having a first HCP, e.g., LHCP, travels, e.g., in a positive z-direction, until the beam 1720 impinges on the L1/HWP 1704, to be transmitted therethrough. The L1/HWP1 1704 converts the light beam 1720 having LHCP into a light beam 1724 having RHCP. Because the L1/HWP1 1704 is also configured as a lens, the L1/HWP1 1704 also diverges the light beam 1720 according to a first optical power P1 of the L1/HWP1 1704.

The light beam 1724 having RHCP is subsequently incident on the HWP3 1712A in the activated state. Because the HWP3 1712A is activated, the light beam 1724 having RHCP transmits through the HWP3 1712A without being substantially affected in terms of polarization or lensing effect, to be incident on the L2/HWP2 1708, as light beam 1728A having RHCP. As described above, when configured as an adaptive lens assembly on the user side (e.g., second adaptive lens assembly 1004 in FIG. 10), the L2/HWP2 1708 is configured similarly to L1/HWP1 1704 in the illustrated embodiment, i.e., to convert the polarization and to diverge light having LHCP while converging light having RHCP. Thus, the light beam 1728A having RHCP is converted back to light beam 1732 having LHCP. Thus, when HWP3 1712A is activated, the L1/HWP1 1704 and the L2/HWP2 1704 transmit light beams having opposite polarizations, such that the L1/HWP1 1704 and the L2/HWP2 1708 have opposite lensing effect on light passing therethrough. That is, because the light beam 1728A incident on the L2/HWP2 1704 has RHCP, the light beam 1732A exiting the L2/HWP2 1708 is converged according to a second optical power P2, unlike the light beam 1724 exiting the L1/HWP1 1704 that is diverged according to a first optical power P1. Thereafter, upon exiting the adaptive lens assembly 1700A in the activated state, the light beam 1732A may be viewed by the eye.

In some embodiments, when the HWP3 1712A is activated, the first optical power P1 of L1/HWP1 1704, which may be negative (i.e., diverging), and the second optical power P2 of L2/HWP2 1708, which may be positive (i.e., converging), may have substantially the same or matched magnitudes. In these embodiments, the net optical power Pnet of the adaptive lens assembly 1700A, which may be approximately −P1+P2, may be substantially zero because of the compensation of the lensing effects of the L1/HWP1 1704 and the L2/HWP2 1708. However, embodiments are not so limited, and the first and second optical powers P1, P2 may have different magnitudes, such that the net optical power Pnet may have a nonzero value. For example, in some embodiments, the nonzero Pnet may be equal to an eyeglass prescription of the user, thereby allowing for corrections to focusing errors (e.g., refractive focusing errors) of the eyes of the user.

It will be appreciated that, while in the illustrated embodiment, the incident light beam 1720 has LHCP, a similar outcome would result when the incident light beam 1720 has RHCP. That is, when the light beam 1720 has RHCP, the light beams 1724 and 1728A have LHCP, and unlike the illustrated embodiment, the light beams 1724 and 1728A are converged relative to the light beam 1720. Likewise, the L2/HWP2 1708 diverges the light beam 1728A converged by the L1/HWP1 1704, such that the net optical power Pnet may be substantially zero.

It will be appreciated that the lensing effects of the L1/HWP1 1704 and L2/HWP2 1708 and the selectivity of the lensing effects to the polarization state of incident light beams described above with respect to FIG. 17B serves as but one example, and other configurations are possible. For example, while in FIG. 17B, the L1/HWP1 1704 and L2/HWP2 1708 is configured to diverge light having LHCP while converging light having RHCP, in other embodiments, the L1/HWP1 1704 and L2/HWP2 1708 may be configured to converge light having LHCP while diverging light having RHCP.

In summary, in some embodiments, when the HWP3 1712A of the adaptive lens assembly 1700A is in a activated state, the exiting light beam 1732A has the same HCP as the incident light beam 1720, and may be substantially matched to the incident light beam 1720 in terms of the lens effect because of the compensation of the lens effects between P1 of L1/HWP1 1704 and P2 of L2/HWP2 1708. As a result, when the user is not viewing virtual content, the view of the world is relatively unaffected by the presence of the adaptive lens assemblies (1004, 1008 in FIGS. 10, 11A, 11B).

FIG. 17C illustrates an example of the adaptive lens assembly of FIG. 17A in operation with the switchable waveplate deactivated, according to some embodiments. The adaptive lens assembly 1700B may be deactivated when the switchable waveplate 1712B is deactivated, e.g., when a current or a voltage is applied to the switchable waveplate 1712B by the switching circuit 1716. The adaptive lens assembly 1700B may, e.g., correspond to the first adaptive lens assembly 1004 (on the world side) or the second adaptive lens assembly 1008 (on the user side). In the following, by way of example, the adaptive lens assembly 1700B will be first described as being configured as the second adaptive lens assembly 1008 on the user side, as part of the display device (e.g., display device 1100A in FIG. 11A) that is outputting virtual image to the user. Subsequently, the adaptive lens assembly 1700B will be described as being configured as the first adaptive lens assembly 1004 on the world side, as part of the display device 1100B (FIG. 11B) that is simultaneously transmitting the view of the real world while outputting the virtual image to the user, to reduce or essentially eliminate distortion of the view of the real world resulting from the lens effects of the second adaptive lens assembly 1008.

When configured as the second adaptive lens assembly 1008 on the user side (FIG. 11A), each of the L1/HWP1 1704 and L2/HWP2 1708 may be configured to diverge light having one of HCP, e.g., LHCP, passing therethrough. Each of the L1/HWP1 1704 and L2/HWP2 1708 may also be configured to converge light having the other HCP, e.g., RHCP, passing therethrough.

As described above with respect to FIG. 11A, some of the light propagating in the x-direction, e.g., by total internal reflection, within the waveguide assembly 1012 may be redirected, or out-coupled, in the z-direction. The light out-coupled from the waveguide assembly 1012 (FIG. 11A) may be incident on the switchable lens assembly 1700B as a circularly polarized light beam 1720 having LHCP. The light beam 1720 travels, e.g., in a positive z-direction, until the light beam 1720 impinges on the L1/HWP 1704, to be transmitted therethrough. The L1/HWP1 1704 converts the light beam 1720 having LHCP into a light beam 1724 having RHCP. Because the L1/HWP1 1704 is configured to diverge light having LHCP, the light beam 1724 is also diverged according to the first optical power P1 of the L1/HWP1 1704.

The light beam 1724 having RHCP is subsequently incident on the HWP3 1712B in the deactivated state. Unlike the activated HWP 1712A illustrated above with respect to FIG. 17B, because the HWP3 1712B is deactivated, the light beam 1724 having RHCP transmitting through the HWP3 1712B is converted to light beam 1728B having LCHP. Subsequently, the light beam 1728B having LHCP is incident on the L2/HWP2 1708. Because, unlike the light beam 1728A illustrated above with respect to FIG. 17B, the light beam 1728B incident on the L2/HWP2 1708 has LHCP, the L2/HWP2 1708 further diverges the light beam 1728B according to a second optical power P2 into light beam 1732B having RHCP. That is, unlike the activated state of HWP 1712A illustrated with respect to FIG. 17B, because the HWP 1712B is deactivated, L1/HWP1 1704 and the L2/HWP1 1704 are configured to transmit light beams having the same polarization, LHCP. Thus, unlike the L1/HWP1 1704 and the L2/HWP2 1708 having the compensating effect illustrated with respect to FIG. 17B, the L1/HWP1 1704 and the L2/HWP2 1708 in FIG. 17C have additive lensing effect on the light passing therethrough. That is, because the light beam 1720 incident on L1/HWP1 1704 and the light beam 1728B incident on L2/HWP2 1704 both have LHCP, light beam 1732B exiting the L2/HWP2 1708 will be further diverged, in addition to being diverged by the L1/HWP1 1704. Thereafter, upon exiting the adaptive lens assembly 1700B in the deactivated state, the light beam 1732A may be viewed by the eye.

In some embodiments, the first optical power P1 of L1/HWP1 1704 and the second optical power P2 of L2/HWP2 1708 may both be negative (i.e., diverging) and may have substantially the same or matched magnitudes. In these embodiments, the net optical power Pnet of the adaptive lens assembly 1700B, which may be approximately P1+P2, may be substantially double that of P1 or P2 because of the additive lens effect of the combination of L1/HWP1 1704 and L2/HWP2 1708. However, embodiments are not so limited, and the first and second optical powers P1, P2 may have different magnitudes.

It will be appreciated that, while in the illustrated embodiment, the incident light beam 1720 has LHCP, parallel outcome will result when the incident light beam 1720 has RHCP. That is, when the light beam 1720 has RHCP, unlike the illustrated embodiment, the resulting light beam 1732B has LHCP and is converged by L1/HWP1 1704 and L2/HWP2 1708 according to a net optical power Pnet, which has a magnitude that is approximately a sum of the magnitudes of the first and second optical powers P1 and P2.

It will be appreciated that the lensing effects of the L1/HWP1 1704 and L2/HWP2 1708 and the dependence of the lensing effects on the polarization state of incident light beams described above with respect to FIG. 17C serves as but one example, and other configurations are possible. For example, while in FIG. 17B, the L1/HWP1 1704 and L2/HWP2 1708 are configured to diverge light having LHCP while converging light having RHCP, in other embodiments, the L1/HWP1 1704 and L2/HWP2 1708 may be oppositely configured to diverge light having LHCP while converging light having RHCP.

Consequently, in some embodiments, when the switchable half waveplate 1712B of the adaptive lens assembly 1700B is in an deactivated state, the exiting light beam 1732B has the opposite HCP relative to the incident light beam 1720, and may be diverged according to additive optical powers P1 of L1/HWP1 1704 and P2 of L2/HWP2 1708. As a result, when the user is viewing a virtual content, the virtual content is focused into the eye 210 according to a net optical power whose value is approximately Pnet=P1+P2.

In the above, the adaptive lens assembly 1700B in the deactivated state has been described when configured as the second adaptive lens assembly 1008 on the user side in the display device 1100A described supra with respect to FIG. 11A. As described supra with respect to FIG. 11B, however, activating the second adaptive lens assembly 1008 to display virtual content to the user's eye 210, without any compensating effect, may result in a defocusing or distortion of the view of the real world, which may be undesirable. Thus, it may be desirable to configure the first adaptive lens assembly 1004 on the world side to at least partially compensate or negate the lens effect of the second adaptive lens assembly 1008 when deactivated to display the virtual content.

Referring back to FIG. 17C, when configured as the first adaptive lens assembly 1004 (FIG. 11B) on the world side to negate the lens effect of the second adaptive lens assembly 1008 (FIG. 11B) on the user side, components of the adaptive lens assembly 1700B may be configured similarly as described supra with respect to FIG. 11B. That is, as light transmitted from the world 510 to the eye 210 traverses the first and second adaptive lens assemblies 1004, 1008, each may be configured as described above with respect to the adaptive lens assembly 1700B described with respect to FIG. 17C. In operation, as described above, the polarization of the light transmitted from the world through the first adaptive lens assembly 1004 is converted from a first polarization state to a second polarization state, e.g., from RHCP to LHCP. Subsequently, the polarization of the light transmitted through the second adaptive lens assembly 1008 is converted back from the second polarization state to the first polarization state, e.g., from LHCP to RHCP. Furthermore, as described above with respect to FIG. 11B, the light transmitted from the world through the first adaptive lens assembly 1004 undergoes a first lens effect, e.g., converging effect, according to a first net optical power Pnet1=P1+P2 having a first sign, e.g., positive sign. Subsequently, the light transmitted through the second adaptive lens assembly 1008 undergoes a second lens effect opposite to the first lens effect, e.g., diverging effect, according to a second net optical power Pnet2=P1'+P2' having a second sign, e.g., negative sign, because the light incident on the second adaptive lens assembly 1008 has an opposite polarization as the light incident on the first adaptive lens assembly 1004. When Pnet1 and Pnet2 have substantially similar magnitudes, the overall lens effect, approximated by P=Pnet1+Pnet2 may be substantially zero. As a result, when the user is viewing virtual content by activating the second lens assembly 1008, as well as viewing real objects in the surrounding world, the view of the world is relatively unaffected by the compensating effect of the first lens assembly 1004.

In various embodiments, when deactivated, each of the first and second adaptive lens assemblies 1004, 1008 may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters.

Display Devices Including Adaptive Lens Assemblies Having a Switchable Half Waveplate and Waveplate Lenses In the following, an example of a display device described supra with respect to FIGS. 10, 11A and 11B. in which an adaptive lens assembly comprising waveplate lenses and a switchable waveplate, e.g., the adaptive lens assembly 1300 described above with respect to FIGS. 17A-17C, has been integrated, according to some embodiments. The switchable waveplate may be, e.g., one of broadband switchable waveplates described above with respect to FIGS. 13A-13F, FIGS. 14A-14C and FIGS. 15A-15B.

Figure 18A:
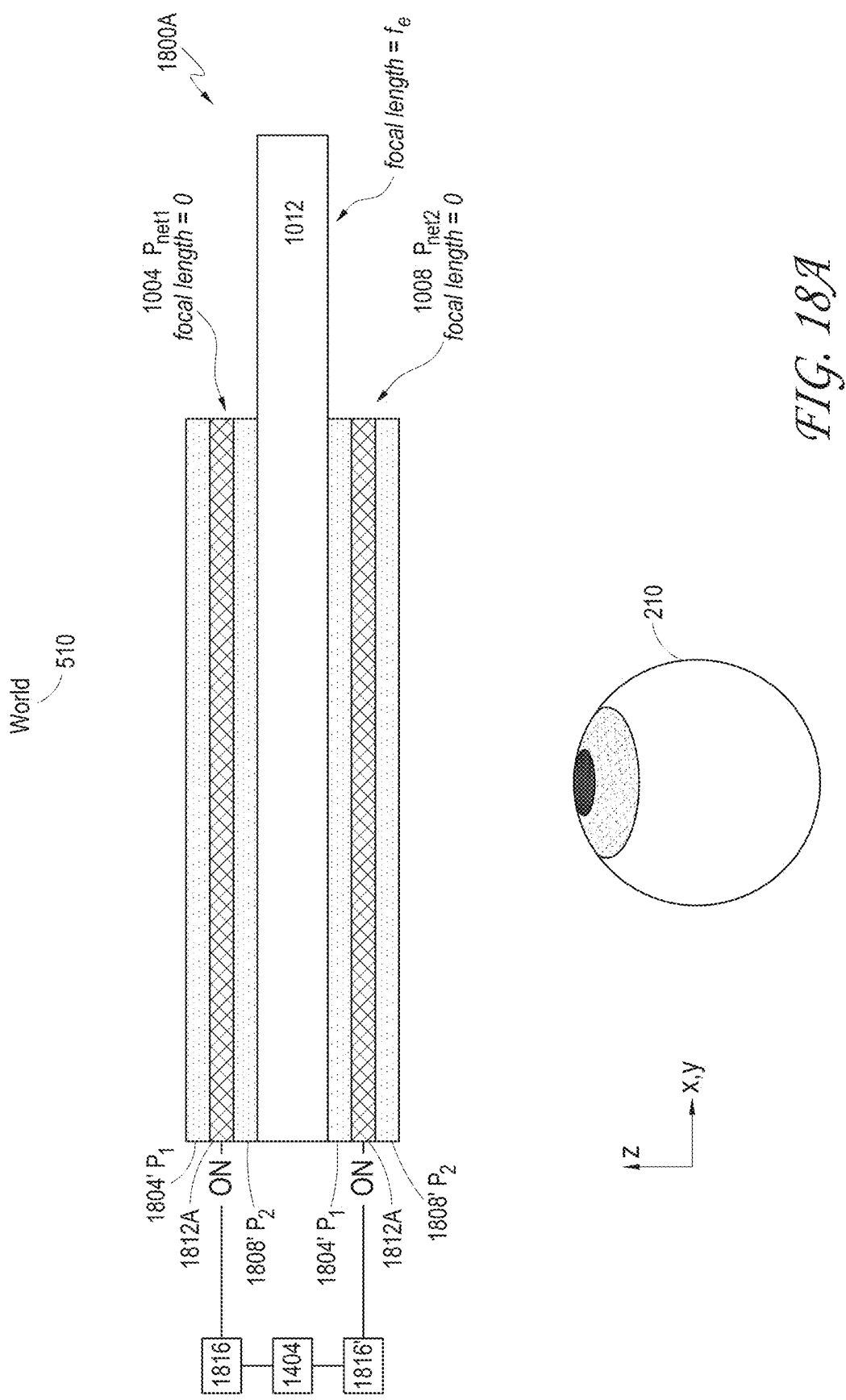
FIG. 18A illustrates an example of a display device comprising a waveguide between pair of adaptive lens assemblies each comprising waveplate lenses and a switchable waveplate, in operation with the switchable waveplate activated.
Figure 18B:
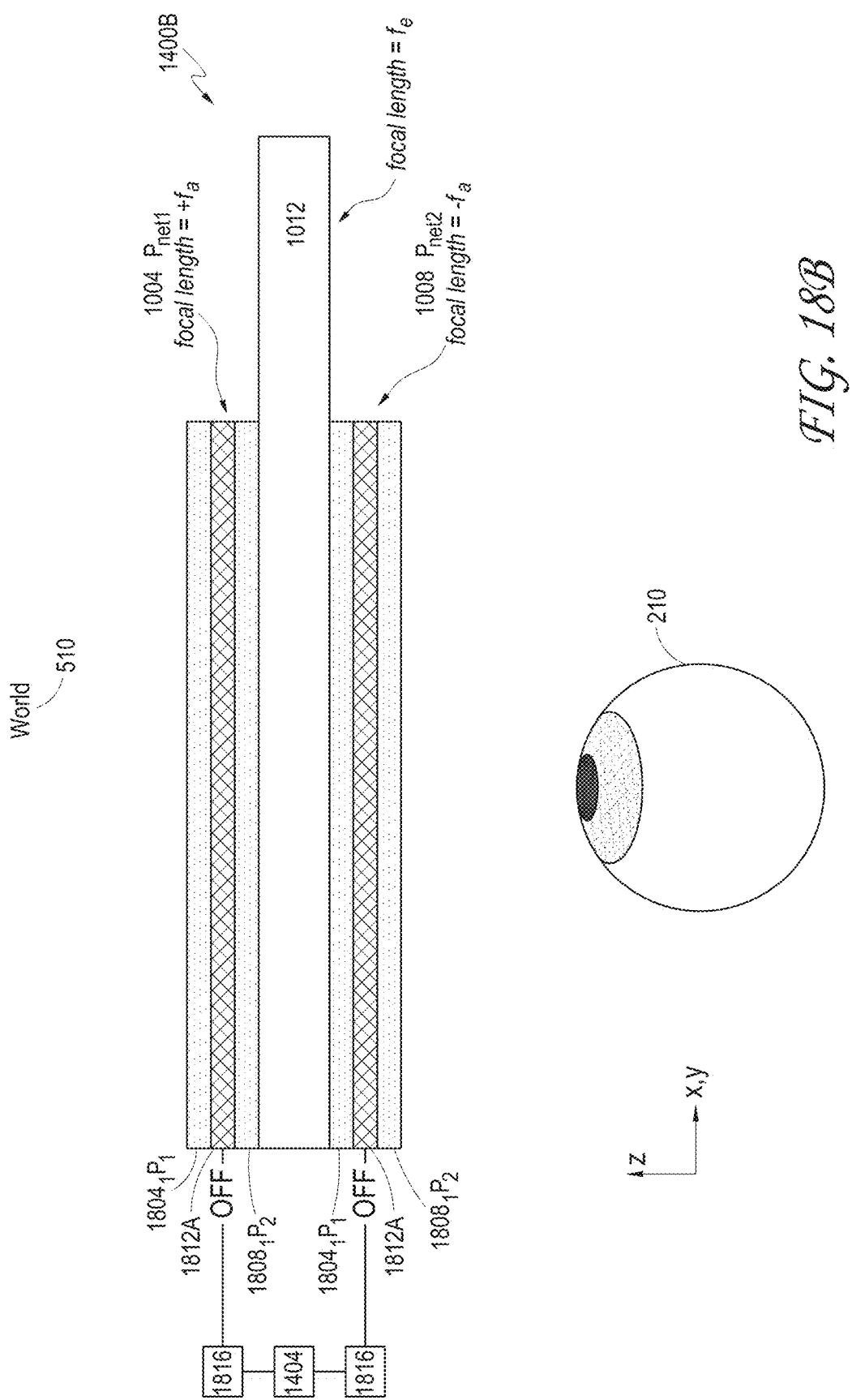
FIG. 18B illustrates an example of the display device of FIG. 18A, in operation with the switchable waveplate deactivated.

FIGS. 18A and 18B illustrate example display devices 1800A/1800B, each including a waveguide assembly 1012 interposed between a first broadband adaptive waveplate lens assembly 1004 and a second broadband adaptive waveplate lens assembly 1008. The display device 1800A is similar to the display device 1100A/1100B described above with respect to FIGS. 11A/11B, where each of the first and second adaptive lens assemblies 1004, 1008 comprises a first waveplate lens (L1/HWP1) 1704, e.g., a first half-waveplate lens, a second waveplate lens (L2/HWP2) 1708, e.g., a second half-waveplate lens, and a switchable waveplate (HWP3) 1712, e.g., a switchable half waveplate.

Referring to FIG. 18A, the display device 1800A in operation is described, when the first and second adaptive lens assemblies 1004, 1008 described above with respect to FIG. 17A are both activated. The first and second adaptive lens assemblies 1004, 1008 may be activated when the switchable waveplate 1712 (FIG. 17A) is activated, e.g., when no current or voltage is applied to the switchable waveplate 1712 by the switching circuits 1816, 1816'. As configured, the display device 1800A may be configured for, e.g., displaying the real world view to the user, without displaying a virtual image. For example, the display device 1800A may be configured to be used as an ordinary eyeglass or an ordinary goggle, as described in detail with respect to FIG. 17B. Similar to FIG. 17A, each of first and second adaptive lens assemblies 1004, 1008 include a first waveplate lens (L1/HWP1) 1804, e.g., a first half-waveplate lens, a second waveplate lens (L2/HWP2) 1808, e.g., a second half-waveplate lens, and a switchable waveplate (HWP3) 1812, e.g., a switchable half waveplate. As described with respect to FIG. 17A, each of L1/HWP1 1804 and L2/HWP2 1808 may be configured to have a first lensing effect, e.g., diverging effect, on light having a first HCP, e.g., LHCP, passing therethrough. In addition, each of the L1/HWP1 1804 and L2/HWP2 1808 may also be configured to have a second lensing effect opposite the first lensing effect, e.g., converging effect, on light having the opposite HCP, e.g., RHCP, passing therethrough. When deactivated, e.g., electrically deactivated using a voltage or a current signal provided by the switching circuit 1816, 1816', the HWP3 1712B (FIG. 17C) serves as a waveplate, e.g., a half waveplate. As described above with respect FIG. 17C, when deactivated, the HWP3 1712B (FIG. 17C) serves as a half waveplate configured to convert light passing therethrough from light having LHCP or RHCP to light having RHCP or LHCP, respectively. On the other hand, when activated, e.g., electrically activated using a voltage or a current signal provided by the switching circuit 1816, 1816', e.g., by removing the voltage or the current signal, the HWP3 1712A (FIG. 17B) serves as transmitting medium for light without affecting the polarization. The detailed operational principles of the first and second adaptive lens assemblies 1004, 1008 that include the L1/HWP1 1804, L2/HWP2 1808 and HWP3, 1812A have been provided above with respect to FIGS. 17A and 17B, and are omitted herein.

Based on the operational principles described in detail with respect to FIGS. 17B and 17C, when the first and second adaptive lens assemblies 1004, 1008 are in an activated state, the light beam (e.g., 1732A in FIG. 17B) exiting from each of the first and second adaptive lens assemblies 1004, 1008, has the same HCP as the light beam incident thereon (e.g., 1720 in FIG. 17B). In addition, the incident light beam 1720 and the exiting light beam 1732A may be substantially matched in terms of the magnitudes of the lens power because of the compensation of the net optical powers of the first and second lens assemblies 1004, 1008, as described above with respect to FIG. 13B.

FIG. 18B illustrates an example of the display device of FIG. 18A, in operation with the switchable waveplate deactivated, according to some embodiments. The first and second adaptive lens assemblies 1004, 1008 by activating the respective switchable waveplates 1712 (FIG. 17A), e.g., by applying current or voltage to the switchable waveplate 1712 using the switching circuit 1816, 1816'. In the following, the operation of the display device 1800B that is outputting a virtual image to the user, while also transmitting light from an object in the real world with reduced or essentially eliminated distortion resulting from the lens effects of the adaptive lens assemblies 1004, 1008, is described.

When displaying a virtual image, as described above with respect to FIGS. 11A and 17C, some of the light propagating in the x-direction within the waveguide within the waveguide assembly 1012 may be redirected, or outcoupled, in the z-direction. The light beam 1720 travels, e.g., in a positive z-direction, until the light beam 1720 impinges on the L1/HWP 1804 of the second adaptive lens assembly 1008. Based on the operational principles of the second adaptive lens assembly 1008 described above with respect to FIG. 17C, when the second adaptive lens assembly 1008 is in a deactivated state, the exiting light beam (e.g., 1732B in FIG. 17C) has the opposite HCP as the incident light beam (e.g., 1720 in FIG. 17C), and is diverged according to the second net optical power Pnet2, for displaying the virtual content at a corresponding virtual depth plane.

In various embodiments, when deactivated, each of the first and second adaptive lens assemblies 1004, 1008 may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters. In some embodiments, the first adaptive lens assembly 1004 between the waveguide assembly 1012 and the world may have a positive optical power, whereas the second adaptive lens assembly 1008 between the waveguide assembly 1012 and the user may have a negative optical power, such that the optical powers of the first and second switchable assemblies 1004, 1008 compensate each other in viewing the world.

Consequently, still referring to FIGS. 18A and 18B, the display device 1800A/1800B comprise a pair of adaptive lens assemblies 1004, 1008 in the optical path between the world 510 and the eye 210, where each of the pair of adaptive lens assemblies 1004, 1008 comprises a switchable waveplate (e.g., 1712A/1712B in FIGS. 17A/17B) configured to alter a polarization state of light passing therethrough when electrically deactivated. When electrically deactivated, the pair of adaptive lens assemblies have net optical powers (Pnet1, Pnet2) having opposite signs such that light passing through the pair of adaptive lens assemblies converges or diverges according to a combined optical power having a magnitude that is about a difference between magnitudes of optical powers the pair of adaptive lens assemblies. The virtual content may be observed by the user at a depth plane according to Pnet2, which may be negative, while the view of the world is relatively unaffected by Pnet2 that is at least partially compensated by Pnet1, which may be positive.

In some embodiments, each of the pair of adaptive lens assemblies has a respective net optical power (Pnet1, Pnet2) that is electrically adjustable or tunable to one of a plurality of values using the switching circuit 1816, 1816'. As described supra, as the images of virtual objects produced by light outcoupled by the waveguide assembly 1012 move in 3D, the second net optical power (Pnet2) of the second adaptive lens assembly 1008 on the user side is adjusted to adapt to the changing depth of the virtual depth plane. Simultaneously, according to embodiments, the first net optical power (Pnet1) of the first adaptive lens assembly 1004 is correspondingly adjusted using the switching circuit 1816, 1816', such that the view of the real world does not undesirably become defocused or distorted. To address this and other needs, in some embodiments, the display device 1800A/1800B comprises a controller 1804 configured such that, when the first net optical power (Pnet1) of a first one of the pair of adaptive lens assemblies 1004, 1008 is electrically adjusted, a second optical power (Pnet2) of a second one of the pair of adaptive lens assemblies is correspondingly adjusted, such that the combined optical power (Pnet1+Pnet2) remains about constant, e.g., about zero. The controller circuitry and the switchable waveplate 1812 are configured such that the time to switch the first and second net optical powers Pnet, Pnet2, to adjust the virtual depth planes using the second adaptive lens assembly 1008 and to compensate the real world view using the first adaptive lens assembly 1004 as described herein, is less than about 100 milliseconds, less than about 50 milliseconds, less than about less than about 10 milliseconds, less than about 5 milliseconds, less than about 1 millisecond, or a value within a range defined by any of these values.

Broadband Switchable Waveplate Lenses

As described above, according to various embodiments, broadband adaptive waveplate lens assemblies can generate images at multiple depth planes by being selectively switched between a plurality of states having different optical powers. In some embodiments described above, the broadband capability of the broadband adaptive waveplate lens assembly can be enabled by one or more broadband passive waveplate lenses (e.g., 1154A in FIG. 12A) coupled with a broadband switchable waveplate (e.g., 1158 in FIG. 12A). In some other embodiments, the broadband capability of the broadband adaptive waveplate lens assembly can be enabled by broadband switchable waveplate lenses without broadband switchable waveplates (e.g., 1154B in FIG. 12B). In the following, structures and configurations of liquid crystal layers of broadband switchable waveplate lenses and broadband adaptive lens assemblies having the same are described, according to embodiments.

Figure 19A:
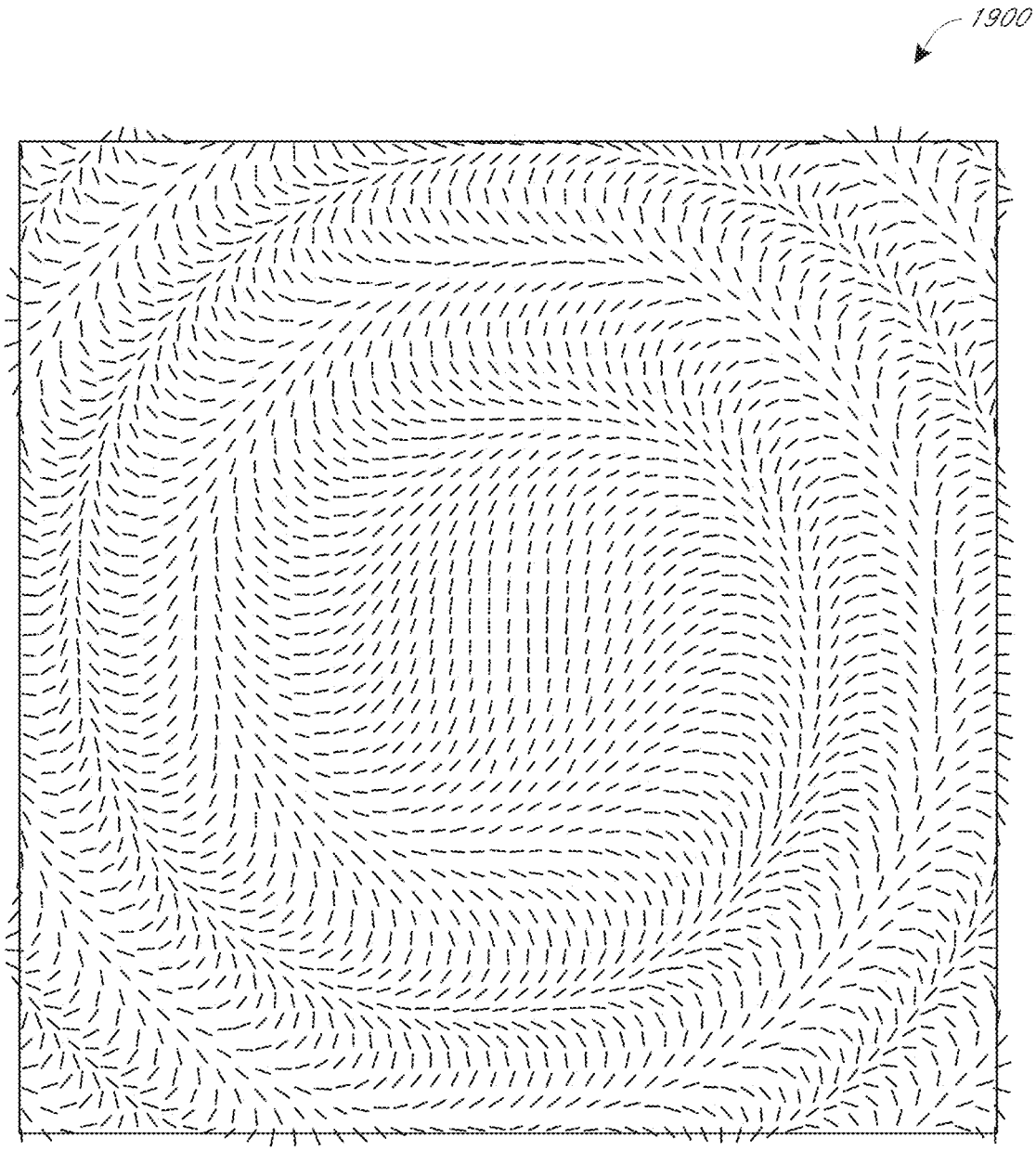
FIG. 19A illustrates a plan view of an example arrangement of liquid crystal molecules closest to the substrate of a broadband waveplate lens comprising liquid crystals.

FIG. 19A illustrates a plan view of a broadband waveplate lens 1900 comprising a layer of LC molecules formed on a transparent substrate, according to various embodiments. The spatial distribution of the elongation direction of lowermost LC molecules or the LC molecules closest to the substrate, and/or the local director of LC molecules resulting therefrom, can be distributed according to the pattern of arrows depicted in FIG. 19A. In the illustrated embodiment, the LC molecules closest to the substrate at a given radius from a central region have generally the same elongation direction.

In the some embodiments, the waveplate lens 1900 is a polarization-type Fresnel zone plate (FZP) lens having a birefringence profile that is radially symmetric and radially modulated. In some embodiments, the orientation of the elongation direction of LC molecules or the local director can vary as a function of radius according to a mathematical function. In the illustrated embodiment, the azimuthal angle $\phi$ of the local director of LC molecules can have discrete values in different zones disposed at different radii from the center of the waveplate lens 1900. For example, $\phi$ in the m-th zone can be expressed as $$\phi = \frac{\pi}{\lambda}(f - \sqrt{f^2 - r^2}) + \left(m + \frac{1}{2}\right)\pi,$$

where f is the focal length and r is the distance from the center of the waveplate lens 1900.

In some other embodiments, the spatial distribution of the elongation direction or the local directors of the LC molecules, or the local birefringence resulting therefrom can be similar to that described above with respect to FIGS. 16A and 16B.

In some embodiments, local orientation directions of LC molecules, e.g., elongation directions, above the lowermost LC molecules can be generally the same as those of the lowermost LC molecules closest to the substrate. In some other embodiments, local orientation directions of LC molecules above the lowermost LC molecules can be generally different from those of the lowermost LC molecules closest to the substrate. For example, local orientation directions of LC molecules above the lowermost LC molecules can be successively twisted, as described infra (e.g., FIGS. 20A, 20B).

Figure 19C:
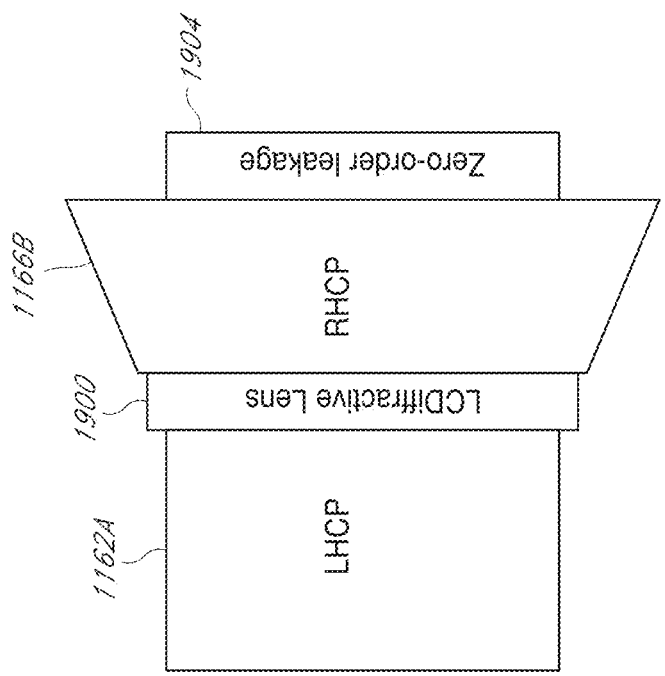
FIG. 19C illustrates the broadband waveplate lens comprising liquid crystals arranged as illustrated in FIG. 19A diverging light having a second circular polarization.
Figure 19B:
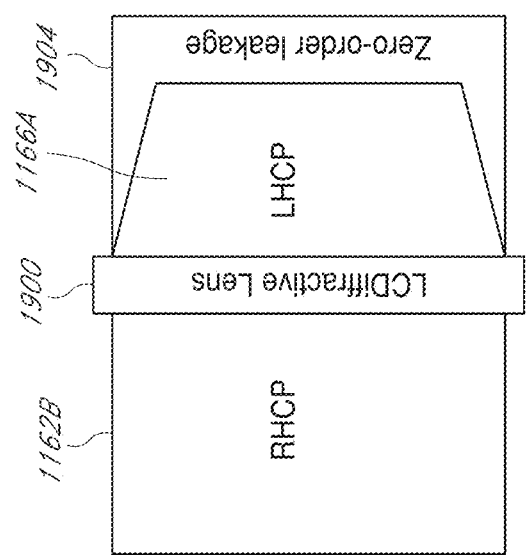
FIG. 19B illustrates the broadband waveplate lens comprising liquid crystals arranged as illustrated in FIG. 19A converging light having a first circular polarization.

In operation, in a similar manner as the waveplate lenses described above with respect to FIGS. 16A and 16B, the broadband waveplate lens 1900 has polarization-selective lens effect of functioning as a convex (or positive) lens (FIG. 19B) for incident light 1162B having a first polarization, e.g., right-handed circular polarization (RHCP), while functioning as a concave (or negative) lens (FIG. 19C) for incident light 1162A having a second polarization, e.g., left-handed circular polarization (LHCP). In addition, the broadband waveplate lens 1900 flips the polarization of the diffracted light. That is, the incident light 1162B having RHCP is converted by the broadband waveplate lens 1900 to light 1166A having LHCP as illustrated in FIG. 19B, while the incident light 1162A having LCHP is converted by the waveplate lens 1900 to light 1166B having RHCP as illustrated in FIG. 19C. The relative proportion of undiffracted leakage light 1904 determines the diffraction efficiency, as described above.

The inventors have found that further improvements in high bandwidth capability of the waveplate lenses can be achieved by particularly configuring the twist arrangement of LC molecules vertically within one or more LC layers (e.g., FIGS. 20A, 20B), or by employing a negative dispersion LC material (FIG. 21), to further reduce the undiffracted leakage light 1904 and to increase the diffraction efficiency, which in turn further reduces undesirable visual effects such as ghost images, as described below.

Figure 20A:
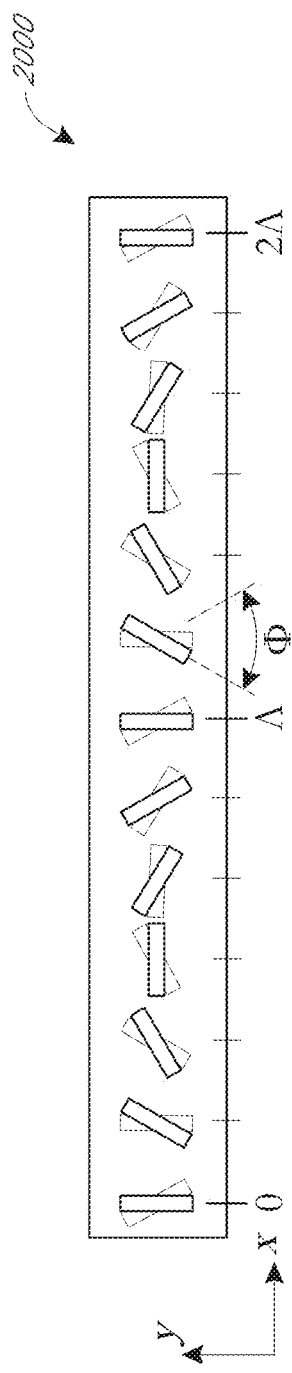
FIG. 20A illustrates a plan view of example arrangement of liquid crystal molecules a broadband waveplate lens comprising a plurality of layers of twisted nematic liquid crystals.
Figure 20B:
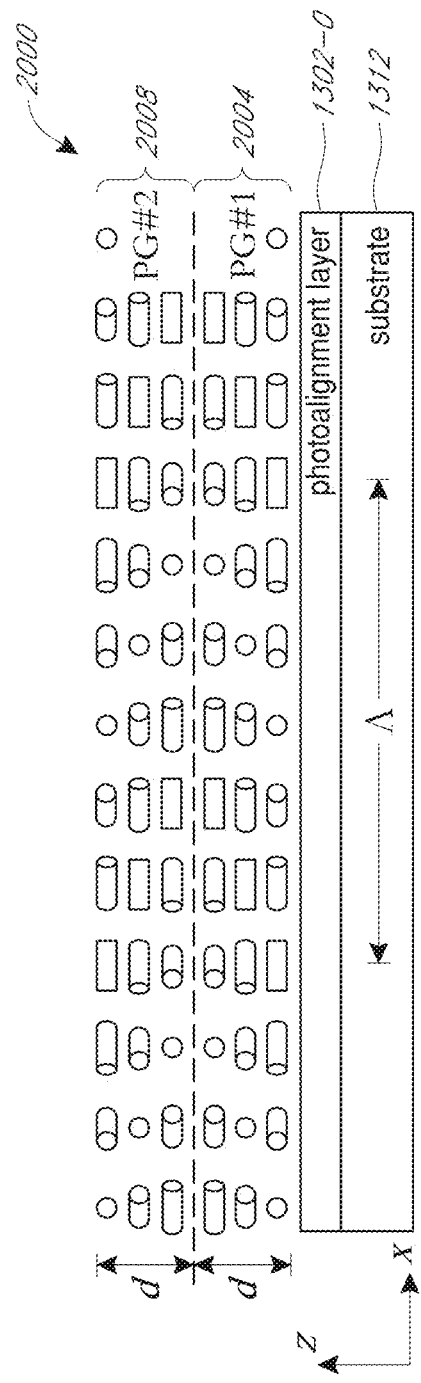
FIG. 20B illustrates a cross-sectional view of an example of a broadband waveplate lens comprising a plurality of layers of twisted nematic liquid crystals.

FIGS. 20A and 20B schematically illustrate a plan view and a cross-sectional view, respectively, of a broadband waveplate lens 2000 comprising crystal plurality of LC layers, according to embodiments. The illustrated broadband waveplate lens 2000 comprises a stack of two LC layers 2004, 2008 having LC molecules that have opposite twist sense, such that retardation of light by one of the LC layers 2004, 2008 is compensated by the other one of the LC layers 2004, 2008. For illustrative purposes only, FIGS. 20A and 20B depict the relative orientations of LC molecules that laterally vary schematically in a particular fashion. However, it will be understood that the lateral arrangement of the LC molecules across the x-y plane at a given depth in the z direction can have any of the various arrangements described above, including those illustrated above with respect to FIGS. 16A and 16B and with respect to FIG. 19A. For example, in some embodiments, the LC molecules closest to the substrate have generally the same local orientation direction, e.g., local elongation direction or local director, at a given radius from the central region and/or have orientation directions that vary as a function of radius, in a similar manner as described above with respect to FIG. 19A. In addition, the arrangement of LC molecules in a given columnar region in the two LC layers 2004, 2008 can be expressed as having the nematic director n which varies as a function of vertical location within the LC layer according to $$n(x,z) = [\cos \phi(x,z), \sin \phi(x,z), 0],$$

where $\phi$ is the azimuth angle of the director n in the x-z plane. That is, for a given column of LC molecules having a first sense of twist in one of the LC layers 2004, 2008, a corresponding column of LC molecules in the other one of the LC layers 2004, 2008 has an opposite sense of twist. In other words, LC molecules in the two LC layers 2004, 2008 have mirror images of each of other about an interface between the two LC layers 2004, 2008.

According to embodiments, reactive mesogens can be employed to create the arrangement of LC molecules in the two LC layers 2004, 2008. For example, by suitably configuring an alignment layer 1302-0, on a substrate 1312, the bottommost LC molecules in the first LC layer 2004 closest to the alignment layer 1302-0 can be arranged to have a first azimuth angle.

The first azimuth angle can be defined, for example, according to the arrangement of elongation direction of the LC molecules as described above with respect to any of FIGS. 16A, 16B and 19A. In addition, the LC molecules above the bottommost LC molecules in the first LC layer 2004 can be configured to have a first twist by adding chiral agents to the first LC layer 2004, such that the uppermost LC molecules closest to a surface of the first LC layer 2004 has a second azimuth angle. Thereafter, by suitably configuring the surface region of the first LC layer 2004, bottommost LC molecules in the second LC layer 2008 closest to the first LC layer 2004 can be arranged to have the second azimuth angle. In addition, the LC molecules above the bottommost LC molecules in the second LC layer 2008 can be configured to have a second chiral twist by adding chiral agents to the second LC layer 2008, such that uppermost LC molecules closest to the surface of the second LC layer 2008 have a third azimuth angle. In some embodiments, the first and second chiral twist is about the same, such that the bottommost LC molecules of the first LC layer 2004 and the uppermost LC molecules of the second LC layer 2008 have the same first azimuth angle.

In one example configuration, by configuring the LC layers 2004, 2008 to have suitable thickness, e.g., between about 1 µm and 2 µm or between about 1.5 µm and 2 µm, for instance about 1.7 µm, and a suitable chiral twist between about 50 degrees and 90 degrees or between about 60 degrees and 80 degrees, for instance about 70 degrees, relative bandwidth $\Delta\lambda/\lambda_o$ greater than 40%, 50% or 60%, for instance about 56% can be achieved, within which wavelength range the diffraction efficiency is greater than 99%, according to embodiments.

As described above, diffraction efficiency (η) can be expressed as $\eta=\sin^2(\pi\Delta nd/\lambda)$, where Δn is birefringence, λ is wavelength and d is thickness. Generally, optically anisotropic materials display Δn which decreases with increasing λ (referred to herein as a positive dispersion of Δn). However, a positive dispersion of Δn results in different phase retardation $\Gamma=2\pi\Delta nd/\lambda$, at different λ. The inventors have recognized that, by employing an optically anisotropic material that displays Δn which increases with increasing λ (referred to herein as having a negative dispersion of Δn), the phase retardation Γ can be kept relatively constant at different λ and the diffraction efficiency η can be kept relatively high and constant over a relatively wide wavelength range, according to embodiments.

Figure 21:
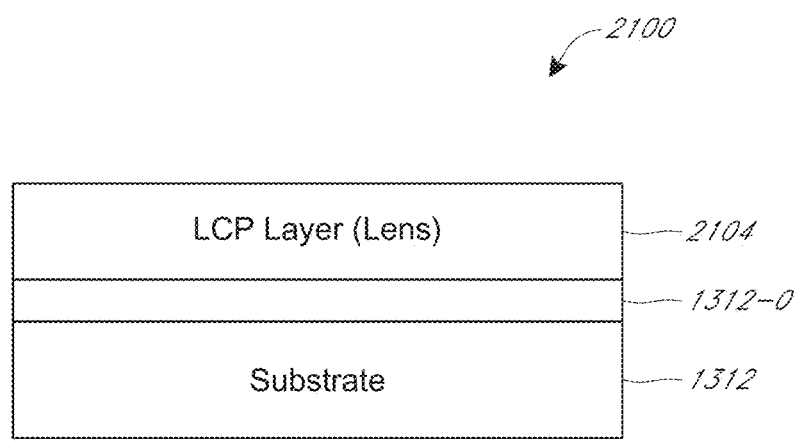
FIG. 21 illustrates a cross-sectional view of an example of a broadband waveplate lens comprising a layer of liquid crystals having increasing birefringence with increasing wavelength.

FIG. 21 illustrates a cross-sectional view of a broadband waveplate lens 2100 comprising a negative dispersion (ND) liquid crystal (LC) layer 2104 formed on a substrate 1312 and an alignment layer 1312-0, according to embodiments. Similar to the broadband waveplate lenses described above with respect to FIG. 19A and FIGS. 20A/20B, to provide the lens effect, the ND LC layer 2104 can be arranged, e.g., by suitably arranging the alignment layer 1312-0, such that the waveplate lens 2100 has a birefringence (Δn) that varies in a radial direction from a central region. In addition, in some embodiments, the bottommost LC molecules closest to the substrate 1312 can be arranged to generally have the same orientation direction at a given radius from the central region and to generally have orientation directions that vary as a function of radius, in a similar manner as described above with respect to FIGS. 16A, 16B and 19A using, e.g., an alignment layer 1312-0 that is suitably configured as discussed elsewhere in the specification.

In various embodiments, the negative dispersion (ND) liquid crystal (LC) layer 2104 can have an average, a local, a mean, a median, a maximum or a minimum birefringence (Δn) of 0.05-0.10, 0.15-0.20, 0.20-0.25, 0.25-0.30, 0.30-0.35, 0.35-0.40, 0.40-0.45, 0.45-0.50, 0.50-0.55, 0.55-0.60, 0.60-0.65, 0.65-0.70, or a value within a range defined by any of these values. In addition, the negative dispersion (ND) liquid crystal (LC) layer 2104 can a have a within-layer birefringence (Δn) range of 0.01-0.05, 0.05-0.10, 0.15-0.20, 0.20-0.25, 0.25-0.30, 0.30-0.35, 0.35-0.40, or a value within a range defined by any of these values.

Still referring to FIG. 21, unlike the LC molecules described above with respect to FIGS. 20A and 20B, the ND LC layer 2104 may be vertically homogenous. For example, in the ND LC layer 2104, LC crystals formed above the bottommost LC molecules may not be twisted. Instead, in some embodiments, within a given columnar region, the local director n may be substantially constant across the thickness of the ND LC layer 2104. In some other embodiments, within a given columnar region, the local director n may be substantially random across the thickness of the LC layer 2104.

According to various embodiments, the ND LC layer 2104 may be formed of a material, e.g., reactive mesogens, having a material property such that Δn increases with increasing wavelength (λ) within at least a portion of the visible spectrum within 400-800 nm, including one or more of a red spectrum which includes wavelengths in the range of about 620-780 nm, a green spectrum which includes wavelengths in the range of about 492-577 nm, and a blue spectrum in the range of about 435-493 nm, or within a range of wavelengths defined by any wavelength within the visible spectrum within about 400 nm to 800 nm, e.g., 400-700 nm, 430-650 nm or 450-630 nm. In some embodiments, within any of these ranges of wavelength, the NC LC layer 2104 has a dispersion of the extraordinary refractive index $n_e$ that is smaller than that of the ordinary refractive index $n_o$.

In some embodiments, the ND LC layer 2104 comprises smectic liquid crystals (LC), e.g., a smectic LC-polymer composite material.

Advantageously, in some embodiments, the broadband waveplate lens 2100 has a single ND LC layer 2104 having birefringence, unlike, e.g., the broadband waveplate lens 2000 described above with respect to FIGS. 20A and 20B having multiple layers.

In various embodiments of broadband waveplate lenses described above with respect to any one of FIGS. 16A, 16B, 19A, 20A/20B and 21, the LC layers can be configured to be passive or switchable, according to embodiments. When configured as a passive lens, the layer of LC molecules can be formed of polymerized LC (LCP), while when configured as a switchable lens, the layer of LC molecules can be formed of unpolymerized LC molecules or reactive mesogens. When configured as a switchable lens, the waveplate lenses described above with respect to FIGS. 16A, 16B, 19A, 20A/20B and 21 further comprises transparent electrodes on both sides (e.g., FIG. 14C) or on the same side (e.g., FIGS. 15A/15B) of the layer of LC molecules, in a similar manner as described above with respect to various embodiments describe above.

FIGS. 22A-22C illustrate a switchable broadband waveplate lens 2200, which may be similar to any of the broadband waveplate lenses that described above with respect to any one of FIGS. 16A, 16B, 19A, 20A/20B and 21, in operation. FIGS. 22A, 22B and 22C illustrate, respectively, a deactivated switchable broadband waveplate lens 2200 having a LHCP light beam incident thereon, a deactivated switchable broadband waveplate lens 2200 having a RHCP light beam incident thereon and an activated switchable broadband waveplate lens 2200 having a LHCP light beam 1162A or RHCP light beam 1162B incident thereon.

Referring to FIG. 22A, the switchable broadband waveplate lens 2200 comprises liquid crystals arranged as described above with respect to any one of FIGS. 16A, 16B, 19A, 20A/20B and 21 and is configured to be selectively switched between different lens states by electrically activating and deactivating. In operation, the switchable broadband waveplate lens 2200 is configured to diverge light according to optical power −P and to converge light according to optical power P depending on the polarization, e.g., circular polarization, of the incident light 1162A, 1162B, according to various embodiments.

Referring to FIG. 22A, when deactivated, the switchable broadband waveplate lens 2200 is configured to diverge a LHCP light beam 1162A incident thereon into a RHCP light beam 1166B according to optical power −P. Conversely, referring to FIG. 22B, when deactivated, e.g., electrically deactivated, the switchable broadband waveplate lens 2200 is configured to converge a RHCP light beam 1162B incident thereon into a LHCP light beam 1166A according to optical power P. On the other hand, referring to FIG. 22C, when activated, e.g., electrically activated, the polarization of the circularly polarized light passing therethrough is preserved (not illustrated), and the RHCP light beam 1162B and the LHCP light beam 1162A incident thereon pass through the switchable broadband waveplate lens 2200 without substantially being converged or diverged (i.e., optical power P~0).

Broadband Adaptive Waveplate Lens Assemblies Having Switchable Waveplate Lenses

As described above with respect to FIG. 22A-22C, a switchable broadband waveplate lens according to embodiments can be configured such that when deactivated, it can exert optical powers P or −P, depending on the polarization of the incident light, while when activated, it can exert substantially no optical power. The inventors have recognized that, by combining two or more switchable broadband waveplate lenses, many more lens states can be obtained for displaying virtual images at many different depths of focus. In the following, broadband adaptive lens assemblies comprising a plurality of switchable broadband waveplate lenses are described where, by configuring the broadband waveplate lenses to have different optical powers, $2^n$ different optical power states can be obtained for an incident light having a given polarization.

FIGS. 23A-23D illustrate a broadband adaptive lens assembly 2300 comprising a first switchable broadband waveplate lens 2204 and a second switchable broadband waveplate lens 2208, each of which may operate in a manner similar to the switchable waveplate lens described above with respect to FIGS. 22A-22C. Each of the switchable broadband waveplate lenses 2204, 2208 may be arranged in a similar manner as any of the broadband waveplate lenses that described above with respect to any one of FIGS. 16A, 16B, 19A, 20A/20B and 21. FIGS. 23A, 23B, 23C and 23D illustrate combinations of states in which the first switchable broadband waveplate lens 2304/second switchable broadband waveplate lens 2308 are deactivated/deactivated, deactivated/activated, activated/deactivated, and activated/activated, respectively.

In the illustrated embodiment, the first switchable broadband waveplate lens 2304 is configured in a similar manner compared to the broadband waveplate lens 2200 described above with respect to FIGS. 22A-22C. That is, when deactivated, the first switchable broadband waveplate lens 2304 is configured to diverge a LHCP light beam 1162A incident thereon into a RHCP beam 1166B according to an optical power −P1. In addition, while not illustrated, when deactivated, the first switchable broadband waveplate lens 2304 is configured to converge a RHCP light beam incident thereon into a LHCP beam according to an optical power +P1. On the other hand, when activated, the first switchable broadband waveplate lens 2304 is configured to substantially preserve the polarization of without substantially converging or diverging the circularly polarized light passing therethrough (i.e., optical power P1~0).

On the other hand, the second switchable broadband waveplate lens 2308 is configured to operate in an opposite manner compared to the broadband waveplate lens 2200 described above with respect to FIGS. 22A-22C, with respect to the sign of the optical power exerted when deactivated. That is, when deactivated, the second switchable broadband waveplate lens 2308 is configured to converge a LHCP light beam 1162A incident thereon into a RHCP beam 1166B according to an optical power +P2. In addition, while not illustrated, when deactivated, the second switchable broadband waveplate lens 2308 is configured to diverge a RHCP light beam incident thereon into a LHCP beam according to an optical power −P2. On the other hand, when activated, the second switchable broadband waveplate lens 2308 is configured to substantially preserve the polarization of without substantially converging or diverging the circularly polarized light passing therethrough (i.e., optical power P2~0).

Referring to FIG. 23A, the first switchable broadband waveplate lens 2304 is deactivated and diverges the LHCP light beam 1162A incident thereon into a RHCP light beam 1166B according to an optical power −P1. Thereafter, the second switchable broadband waveplate lens 2208 is deactivated and diverges the RHCP light beam 1166B incident thereon into a LHCP light beam 1170A according to an optical power −P2. In sum, the LHCP light beam 1162A incident on the broadband adaptive lens assembly 2300 is diverged into the LHCP light beam 1170A according to a net optical power of −(P1+P2).

Referring to FIG. 23B, the first switchable broadband waveplate lens 2304 is deactivated and diverges the LHCP light beam 1162A incident thereon into a RHCP light beam 1166B according to optical power −P1. Thereafter, the second switchable broadband waveplate lens 2208 is activated and preserves the polarization of the RHCP light beam 1166B passing therethrough without substantially converging or further diverging. In sum, the LHCP light beam 1162A incident on the broadband adaptive lens assembly 2300 is diverged into the RHCP light beam 1166BA according to a net optical power of −P1.

Figure 23D:
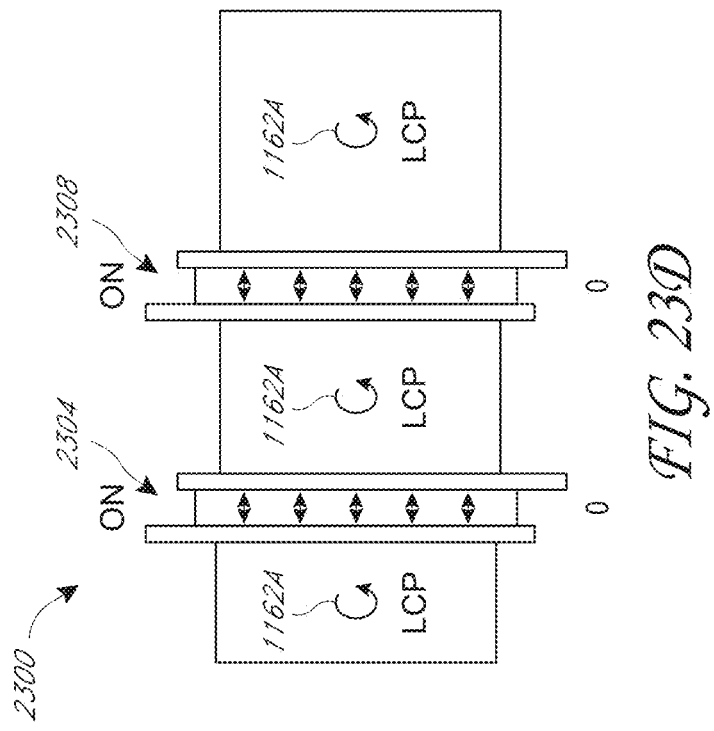
FIG. 23D illustrates an example of a broadband adaptive waveplate lens assembly comprising a pair of broadband switchable waveplate lenses, in operation in which both switchable waveplate lenses are activated.
Figure 23C:
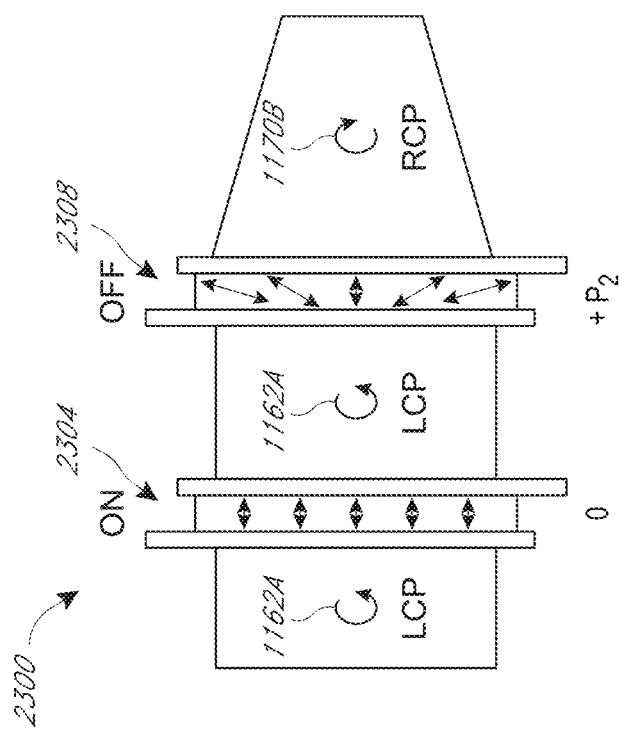
FIG. 23C illustrates the broadband adaptive waveplate lens assembly of FIG. 23A, in operation with one of the switchable waveplate lenses activated.

Referring to FIG. 23C, the first switchable broadband waveplate lens 2304 is activated and preserves the polarization of the LHCP light beam 1162A passing therethrough without substantially converging or diverging. Thereafter, the second switchable broadband waveplate lens 2308 is deactivated and converges the LHCP light beam 1162A incident thereon into a RHCP light beam 1170B according to optical power +P2. In sum, the LHCP light beam 1162B incident on the broadband adaptive lens assembly 2300 is converged into the RHCP light beam 1170B according to a net optical power of +P2.

Referring to FIG. 23D, the first and second switchable broadband waveplate lenses 2304, 2308 are both activated and preserve the polarization of the LHCP light beam 1162A passing therethrough without substantially converging or diverging. Thus, the LHCP light beam 1162B incident on the broadband adaptive lens assembly 2300 emerges substantially unaffected as the LHCP light beam 1162B.

In summary, as illustrated in FIGS. 23A-23D, by selectively switching the first and second switchable broadband waveplate lenses 2304, 2308, a broadband adaptive lens assembly 2300 can have four different optical power states of 0, −P1, +P2, and −(P1+P2), according to embodiments.

In addition, while not illustrated, in an analogous manner, when the incident light is a RHCP light beam, by selectively switching the first and second switchable broadband waveplate lenses 2304, 2308, the broadband adaptive lens assembly 2300 can have four different optical power states would be 0, +P1, −P2, and +(P1+P2).

In addition, while not illustrated, in some embodiments, the second switchable broadband waveplate lens 2308 can be configured to operate in the same manner as the first switchable broadband waveplate lens 2304 in terms of the dependence of the sign of optical power on the polarization of the incident light. In these embodiments, e.g., when the incident light is a LHCP light beam, the resulting four different optical power states would be 0, −P1, −P2, and −(P1−P2).

In addition, if the second switchable broadband waveplate lens 2308 is configured to operate in the same manner compared to the first broadband waveplate lens 2304 in terms of the dependence of the sign of optical power on the polarization of the incident light, when the incident light is a RHCP light beam, the resulting four different optical power states would be 0, P1, P2, and (P1−P2).

In FIGS. 23A-23D, the illustrated broadband adaptive lens assembly 2300 is configured to achieve variable optical powers by independently switching lenses themselves (e.g., first and second switchable broadband waveplate lenses 2304, 2308). However, other embodiments are possible in which one or both of first and second switchable broadband waveplate lenses 2204, 2208 are replaced by a combination of a passive waveplate lens and a switchable waveplate, similar to the combination of the passive waveplate lens 1154A and switchable waveplate 1158, as described above with respect to FIG. 12a.

Figure 24A:
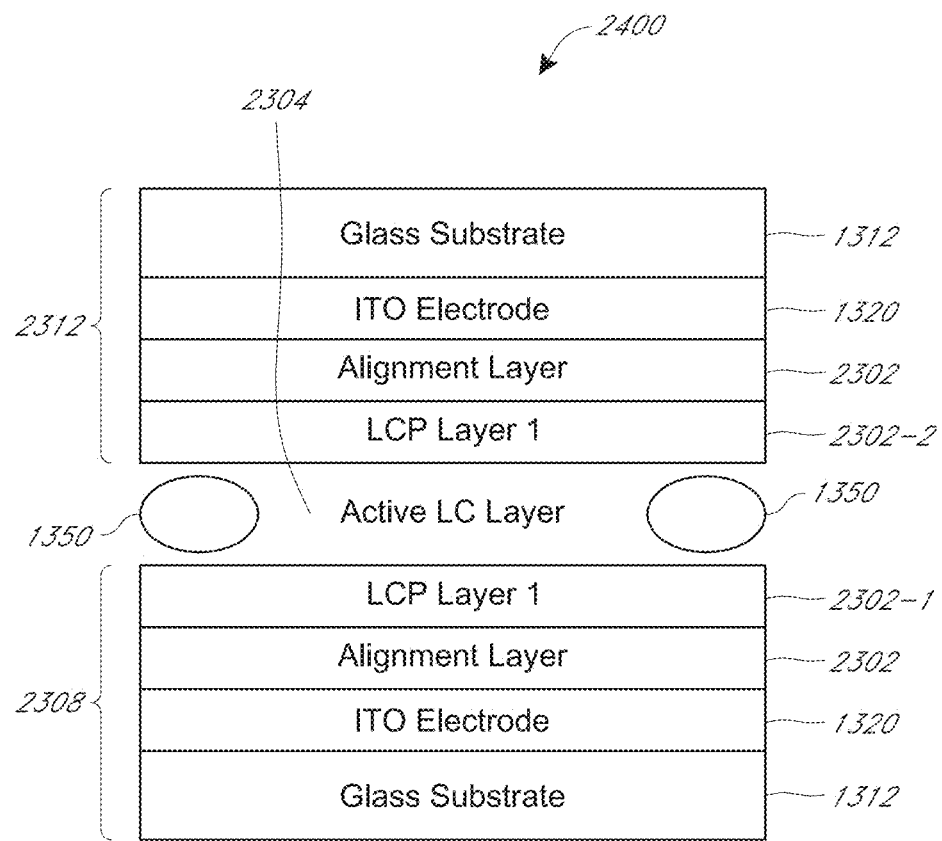
FIG. 24A illustrates an example of an integrated broadband adaptive waveplate lens assembly comprising a switchable broadband waveplate lens interposed between a pair of active broadband switchable waveplate lenses.

FIG. 24A illustrates of an integrated broadband adaptive lens assembly 2400 comprising a switchable layer of LC molecules similar to those described above with respect to any one of FIGS. 19A, 20A/20B and 21, according to embodiments. The integrated broadband adaptive lens assembly 2400 includes a switchable LC layer 2304, which can be similar to those described above with respect to any one of FIGS. 19A, 20A/20B and 21, except, the switchable LC layer 2304 is interposed between a pair of passive waveplate lens stacks 2308, 2312. In a similar manner as described above with respect to FIG. 13F, LC molecules are inserted into a gap formed between surfaces of the passive waveplate lens stacks 2308, 2312 that face each other by spacers 1350, which method of inserting is described elsewhere in the specification. The first passive waveplate lens stack 2308 includes a substrate 1312 on which a lower transparent electrode 1316 is formed, followed by an alignment layer 2302 and a lower polymerized LC (LCP) layer 2302-1. Similarly, the second passive waveplate lens stack 2312 includes a substrate 1312 on which an upper transparent electrode 1320 is formed, followed by an alignment layer 2302 and an upper polymerized LC (LCP) layer 2302-2.

Each of the first and second passive waveplate lens stacks 2308, 2312 serves as waveplate lenses as well as alignment layers for aligning LC molecules in the switchable LC layer 2304. In a similar manner as described above with respect to FIGS. 13C, 13F, the LC molecules of the lower LCP layer 2302-1 closest to the gap and the LC molecules of the upper LCP layer 2302-2 closest to the gap are arranged such that the outermost LC molecules of the switchable LC layer 2304 are self-aligned. However, embodiments are not so limited and in some other embodiments, the outermost LC molecules of the switchable LC layer 2204 may be sufficiently aligned by the upper and/or lower alignment layers 2302 such that one of both of the first and second LCP layers 2302-1, 2302-2 are omitted.

In references to FIG. 24A and various embodiments throughout the specification, a switchable LC layer, e.g., the switchable LC layer 2304 inserted into the gap has a thickness of about 1 μm-50 μm, 1-10 μm, 10-20 μm, 20-30 μm, 30-40 μm, 40-50 μm or a value within any range defined by these values. In addition, passive LC layers, e.g., the LCP layers 2302-1, 2302-2, can have a thickness of about 0.1 μm-50 μm, 0.1-1 μm, 1-10 μm, 10-20 μm, 20-30 μm, 30-40 μm, 40-50 μm or a value within any range defined by these values.

In the illustrated embodiment, each of the LCP layers 2302-1, 2302-2 can have LC molecules having a net twist angle of 30-90 degrees, 40-80 degrees, 50-70 degrees, or any angle within a range defined by any of these values, for instance about 60 degrees.

In some embodiments, the switchable LC layer 2304 can be a single layer, similar to the LC layer described above with respect to FIG. 21. However, embodiments are not so limited. For example, the switchable LC layer 2204 can include a plurality of LC layers, in a similar manner as described above with respect to FIGS. 20A/20B.

In operation, the integrated broadband adaptive lens assembly 2400 described herein with respect to FIG. 24A share some characteristics that may be similar to the switchable waveplate 1300F described above with respect to FIG. 13F. For example, in both embodiments, a switchable waveplate element (the switchable TN LC layer 1302 in FIG. 13F and the switchable LC layer 2304 in FIG. 24A) is interposed between a pair of passive waveplate elements (the plurality of TN LC layers 1302-1, 1302-2 in FIG. 13F, the polymerized LC (LCP) layers 2302-1, 2302-2). In both embodiments, the switchable waveplate element is configured to change the polarization of light passing therethrough into an orthogonally polarized light. Similarly, in both embodiments, the passive waveplate elements are similarly aligned by respective alignment layers such that when the switchable waveplate element is electrically activated to pass light therethrough without diffracting, the passive waveplate elements have cancelling effects on each other. On the other hand, when the switchable waveplate element is electrically deactivated to diffract light passing therethrough, the passive waveplate elements have complementary effects. In particular embodiments, when the passive waveplate elements have the same optical power, and when the switchable waveplate element is activated, the net optical power of the assembly is about zero and the polarization of light is unaltered. On the other hand, when the switchable waveplate element is deactivated, the net optical power of the assembly is a net sum of the powers of the switchable and passive waveplate elements having different signs. In the following, with respect to FIGS. 24B-24D, one particular embodiment is described in which the passive waveplate elements are half waveplate lenses and the switchable waveplate element is also a half waveplate.

Figure 24B:
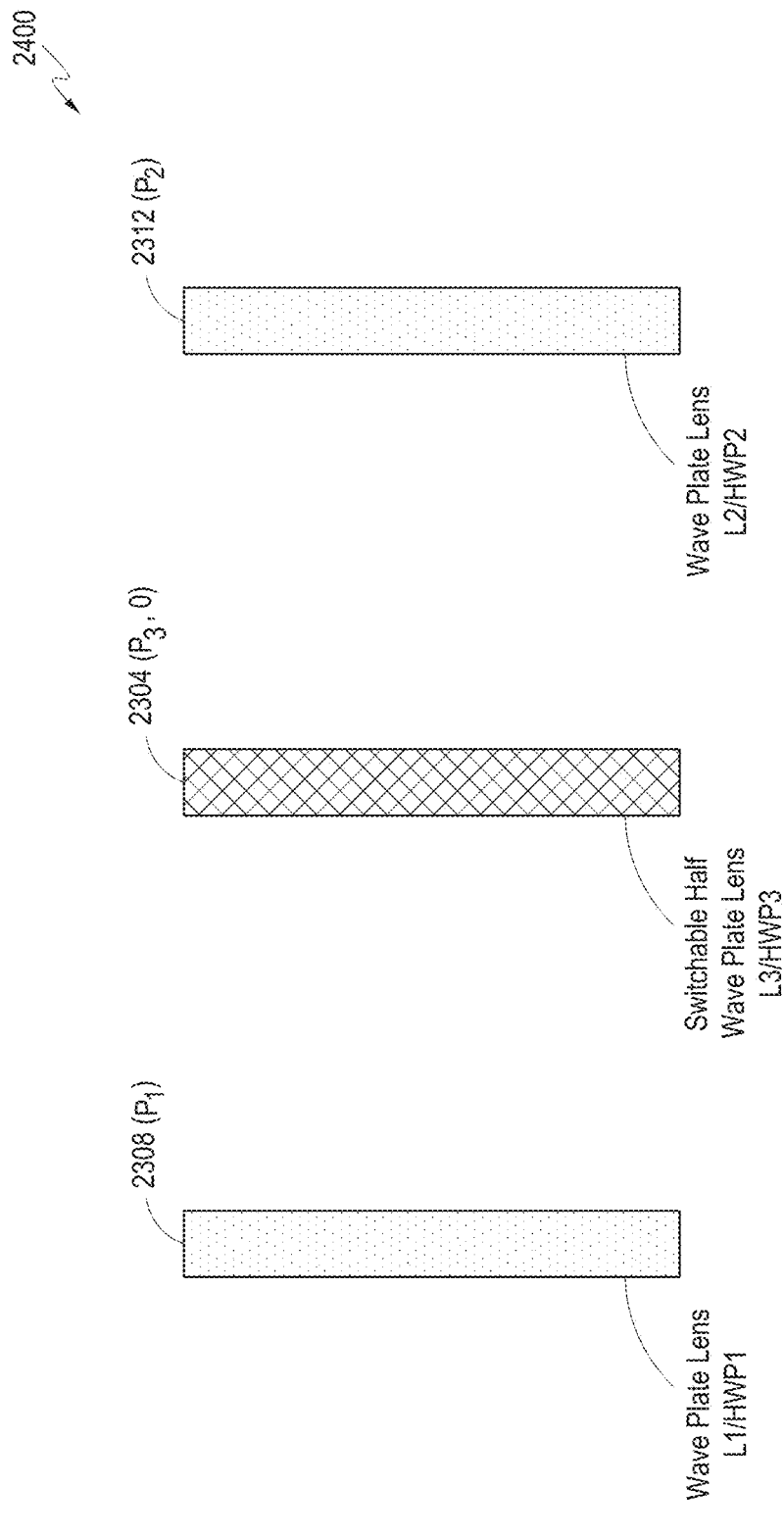
FIG. 24B illustrates the broadband adaptive waveplate lens assembly of FIG. 24A in operation as combination of broadband half waveplate lenses.
Figure 24C:
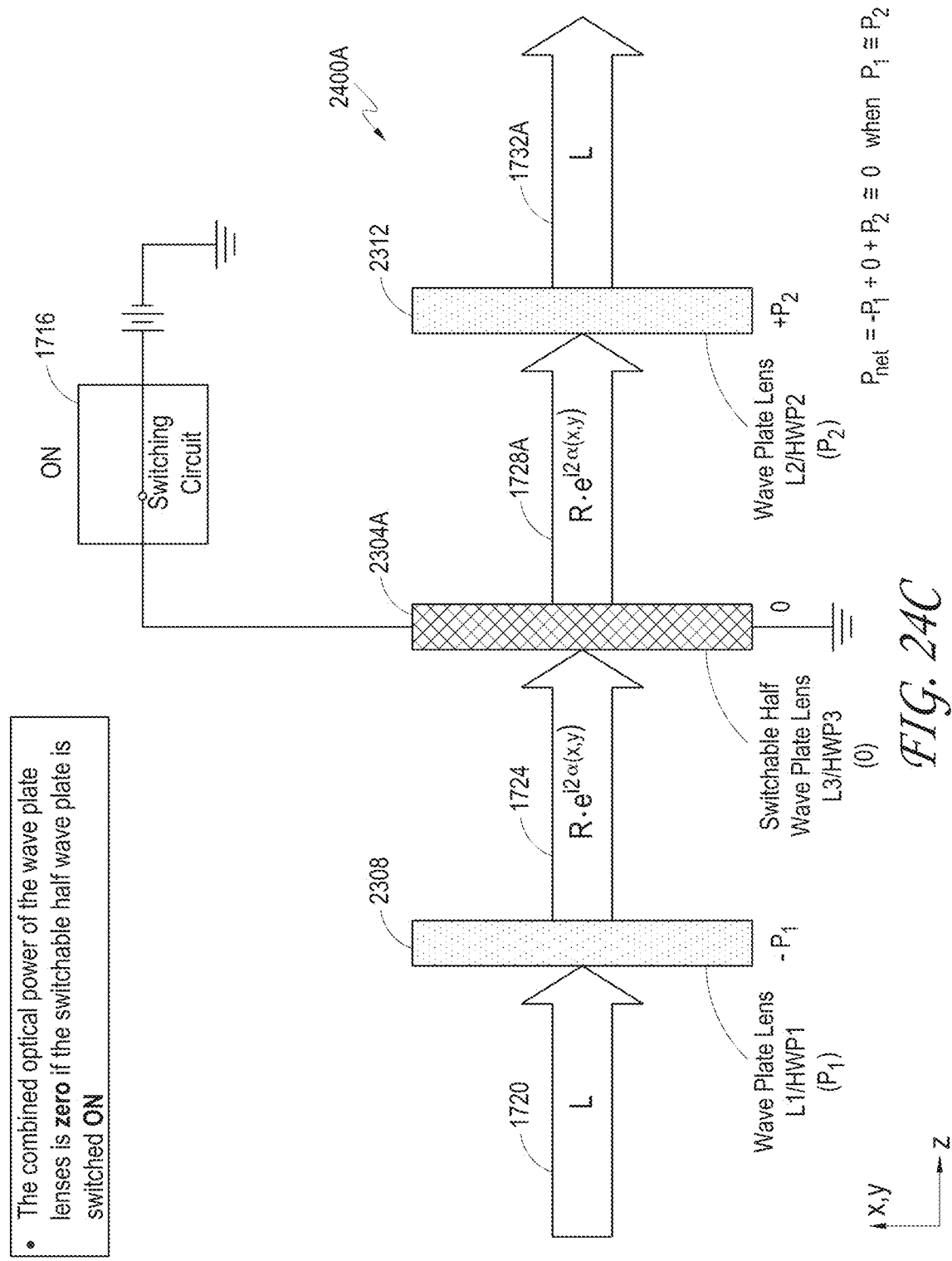
FIG. 24C illustrates the broadband adaptive waveplate lens assembly of FIG. 24B in operation with the switchable broadband waveplate activated.
Figure 24D:
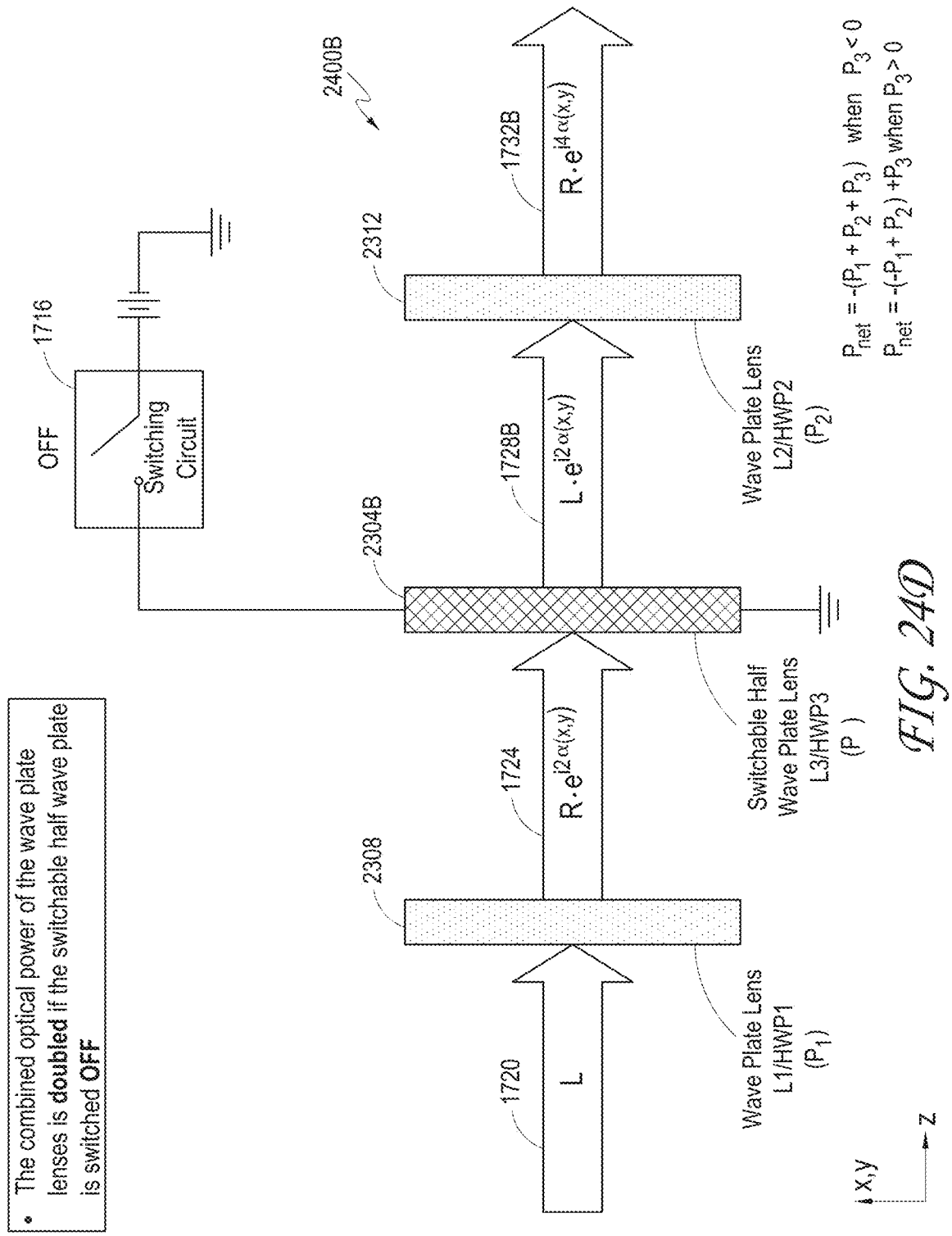
FIG. 24D illustrates the broadband adaptive waveplate lens assembly of FIG. 24B in operation with the switchable broadband waveplate deactivated.

FIGS. 24B-24D illustrate the integrated broadband adaptive lens assembly 2400 in operation, which may be analogous to the adaptive lens assembly described above with respect to FIGS. 17A-17C except, the switchable half waveplate in the middle is configured as a lens exerting an optical power.

FIG. 24B illustrates the integrated broadband adaptive lens assembly 2400 described above with respect to FIG. 24A in terms of optical functionality. FIG. 24C illustrates the integrated broadband adaptive lens assembly 2400A (FIG. 24A) in operation when the switchable waveplate lens 2304 of the adaptive lens assembly 2400 illustrated in FIG. 24B is activated, whereas FIG. 24D illustrates the switchable assembly 2400B in operation when the switchable waveplate lens 2304 of the integrated broadband adaptive lens assembly 2400 illustrated in FIG. 24B is deactivated. The integrated broadband adaptive lens assembly 2400 is configured to couple and to transmit therethrough the light outcoupled from the waveguide assembly 1012 (FIGS. 10, 11A, 11B). The integrated broadband adaptive lens assembly 2400 comprises a first waveplate lens (L1/HWP1) 2308 corresponding to the passive waveplate lens stack 2308 (FIG. 24A), e.g., a first half-waveplate lens, a second waveplate lens (L2/HWP2) 2312 corresponding to the passive waveplate lens stack 2312 (FIG. 24A), e.g., a second half-waveplate lens, and a switchable half waveplate (L3/HWP3) 2304 corresponding to the switchable LC layer 2304 (FIG. 24A).

In FIGS. 24B-24D, the L3/HWP 2304B in a deactivated state (FIG. 24D), the L1/HWP1 2308 and the L2/HWP2 2312 serve as passive half waveplate lenses configured to exert optical powers P3, P1 and P2, respectively, and to flip the handedness of a circular polarized light passing therethrough from a first handedness (first HCP) to a second handedness (second HCP). On the other hand, the L3/HWP 2304A in an activated state (FIG. 24C) is configured to preserve the handedness of the circular polarized light passing therethrough.

In addition, when deactivated, e.g., electrically deactivated using a voltage or a current signal provided by the switching circuit 1716, the L3/HWP3 2304B (FIG. 24D) serves as a half waveplate lens having an optical power P3. On the other hand, when activated using the switching circuit 1716, e.g., by removing the voltage or the current signal, the L3/HWP3 2304A (FIG. 24C) serves as transmitting medium for light without affecting the polarization or providing any substantial lensing effect.

FIG. 24C illustrates the integrated broadband adaptive lens assembly 2400B in operation when the L3/HWP 2304A is activated. The integrated broadband adaptive lens assembly 2400B may correspond to the first adaptive lens assembly 1004 (FIG. 10, on the world side) or the second adaptive lens assembly 1008 (FIG. 10, on the user side). By way of example only, integrated broadband adaptive lens assembly 2400A will be described as corresponding to the first adaptive lens assembly 1004 or the second adaptive lens assembly 1008, as part of the display device 1000 (FIG. 10) that is displaying the view of the real world to the user without displaying a virtual image. For example, the display device 1000 (FIG. 10) may be used as ordinary eyeglasses or ordinary goggles. Each of the L1/HWP1 2308 and L2/HWP2 2312 may be configured to have a first lensing effect, e.g., diverging effect, on light having a first HCP, e.g., LHCP, passing therethrough. While not shown, each of the L1/HWP1 2308 and L2/HWP2 2312 may also be configured to have a second lensing effect opposite the first lensing effect, e.g., converging effect, on light having the opposite HCP, e.g., RHCP, passing therethrough.

In the illustrated embodiment, the light beam 1720 may represent light beam from the world that is incident on either the first adaptive lens assembly 1004 (on the world side) or the second adaptive lens assembly 1008 (on the user side) while the display device 1000 (FIG. 10) is being used as ordinary eyeglasses or goggles, without displaying virtual content. By way of example only, the light beam 1720 having a first HCP, e.g., LHCP, travels, e.g., in a positive z-direction, until the beam 1720 passes through the L1/HWP 2308, to be transmitted therethrough and converted to a light beam 1724 having RHCP while diverging the light beam 1720 according to a first optical power −P1.

Still referring to FIG. 24C, subsequently, because the L3/HWP3 2304A is activated, the light beam 1724 having RHCP transmits through the L3/HWP3 2304A without being substantially affected in terms of polarization or lensing effect, to be incident on the L2/HWP2 2312, as light beam 1728A having RHCP. As described above, when configured as an adaptive lens assembly on the user side (e.g., second adaptive lens assembly 1004 in FIG. 10), the L2/HWP2 2312 is configured similarly as the L1/HWP1 1704 (FIG. 17B), i.e., to convert the polarization and to diverge light having LHCP while converging light having RHCP. Thus, the light beam 1728A having RHCP is converted back to light beam 1732A having LHCP. Thus, when L3/HWP3 2304A is activated, the L1/HWP1 2308 and the L2/HWP2 2312 transmit light beams having opposite polarizations, such that the L1/HWP1 2308 and the L2/HWP2 2312 have opposite lensing effects on the light passing therethrough. That is, because the light beam 1728A incident on the L2/HWP2 2312 has RHCP, the light beam 1732A exiting the L2/HWP2 2312 is converged according to a second optical power +P2, unlike the light beam 1724 exiting the L1/HWP1 1704 that is diverged according to a first optical power −P1. Thereafter, upon exiting the adaptive lens assembly 1700A in the activated state, the light beam 1732A may be viewed by the eye.

In some embodiments, when the L3/HWP3 2304A is activated, the first optical power −P1 of L1/HWP1 2308 and the second optical power +P2 of L2/HWP2 2312 may have substantially the same or matched magnitudes while having opposite signs. In these embodiments, the net optical power Pnet of the integrated broadband adaptive lens assembly 2400, which may be approximately −P1+P2, may be substantially zero, such that the view of the world is substantially unaffected to the viewer. However, embodiments are not so limited, and the first and second optical powers −P1, +P2 may have different magnitudes, such that the net optical power Pnet may have a nonzero value. For example, in some embodiments, the nonzero Pnet may be equal to an eyeglass prescription of the user, thereby allowing for corrections to focusing errors (e.g., refractive focusing errors) of the eyes of the user.

While in the illustrated embodiment, the incident light beam 1720 has LHCP, a similar outcome would result when the incident light beam 1720 has RHCP. That is, when the incident light beam 1720 has RHCP, the light beams 1724 and 1728A have LHCP, and unlike the illustrated embodiment, the light beams 1724 and 1728A are converged according to an optical power +P1. Likewise, the light beam 1728A is diverged according to an optical power −P2, such that the net optical power Pnet may be +P1−P2, which may be substantially zero.

It will be appreciated that the lensing effects of the L1/HWP1 2308 and L2/HWP2 2312 and the selectivity of the lensing effects to the polarization state of incident light beams described above with respect to FIG. 24C serves as but one example, and other configurations are possible. For example, while in FIG. 24C, the L1/HWP1 2408 and L2/HWP2 2312 is configured to diverge light having LHCP while converging light having RHCP, in other embodiments, the L1/HWP1 2308 and L2/HWP2 2312 may be configured to converge light having LHCP while diverging light having RHCP.

In summary, in some embodiments, when the L3/HWP3 2304A is in an activated state, the exiting light beam 1732A has the same HCP as the incident light beam 1720, and may be substantially matched to the incident light beam 1720 in terms of the lens effect because of the compensation of the lens effects between P1 of L1/HWP1 2308 and P2 of L2/HWP2 2312. As a result, when the user is not viewing virtual content, the view of the world is relatively unaffected by the presence of the adaptive lens assemblies (1004, 1008 in FIGS. 10, 11A, 11B).

FIG. 24D illustrates an example of the adaptive lens assembly of FIG. 24B in operation when the L3/HWP3 2304B is deactivated. The integrated broadband adaptive lens assembly 2400B may, e.g., correspond to the first adaptive lens assembly 1004 (on the world side) or the second adaptive lens assembly 1008 (on the user side). In the following, by way of example, integrated broadband adaptive lens assembly 2400B will be first described as being configured as the second adaptive lens assembly 1008 on the user side, as part of the display device (e.g., display device 1100A in FIG. 11A) that is outputting a virtual image to the user. Subsequently, integrated broadband adaptive lens assembly 2400B will be described as being configured as the first adaptive lens assembly 1004 on the world side, as part of the display device 1100B (FIG. 11B) that is simultaneously transmitting the view of the real world while outputting the virtual image to the user, to reduce or essentially eliminate distortion of the view of the real world resulting from the lens effects of the second adaptive lens assembly 1008.

When configured as the second adaptive lens assembly 1008 on the user side (FIG. 11A), each of the L1/HWP1 2308 and L2/HWP2 2312 may be configured to diverge light having one of HCP, e.g., LHCP, passing therethrough. Each of the L1/HWP1 2308 and L2/HWP2 2312 may also be configured to converge light having the other HCP, e.g., RHCP, passing therethrough.

As described above with respect to FIG. 11A, some of the light propagating in the x-direction, e.g., by total internal reflection, within the waveguide assembly 1012 may be redirected, or out-coupled, in the z-direction. The light out-coupled from the waveguide assembly 1012 (FIG. 11A) may be incident on the integrated broadband adaptive lens assembly 2400B as a circularly polarized light beam 1720 having LHCP. The light beam 1720 travels, e.g., in a positive z-direction, until the light beam 1720 is transmitted through the L1/HWP 2308 and converted into a light beam 1724 having RHCP while also being diverged according to the first optical power −P1 of the L1/HWP1 2308.

Subsequently, because the L3/HWP3 2304B is deactivated, the light beam 1724 having RHCP transmitting through the L3/HWP3 2304B is converted to light beam 1728B having LCHP while also being diverged or converged according to third optical power −/+P3. Subsequently, the light beam 1728B having LHCP is incident on the L2/HWP2 2312. Because, unlike the light beam 1728A illustrated above with respect to FIG. 24C, the light beam 1728B incident on the L2/HWP2 2312 has LHCP, the L2/HWP2 2312 further diverges the light beam 1728B according to a second optical power −P2 into light beam 1732B having RHCP. Thus, unlike the configuration illustrated with respect to FIG. 24C, the L1/HWP1 2308, the L2/HWP2 2312 and L3/HWP3 2304B in FIG. 24D can have additive lensing effects. Thereafter, upon exiting the adaptive lens assembly 1700B in the deactivated state, the light beam 1732A may be viewed by the eye.

In some embodiments, the first optical power −P1 of the L1/HWP1 2308 and the second optical power −P2 of the L2/HWP2 2312 may both be negative (i.e., diverging) and may have substantially the same or matched magnitudes. In addition, the third optical power −P3 of the L3/HWP3 2304B may be negative. In these embodiments, the net optical power Pnet of the integrated broadband adaptive lens assembly 2400B, may be approximately −(P1+P2+P3). However, embodiments are not so limited, and in some other embodiments, the third optical power +P3 of the L3/HWP3 2304B may be positive. In these embodiments, the net optical power Pnet of the integrated broadband adaptive lens assembly 2400B, may be approximately −(P1+P2)+P3. In addition, the first and second optical powers P1, P2 may have different magnitudes.

While in the illustrated embodiment, the incident light beam 1720 has LHCP, parallel outcome will result when the incident light beam 1720 has RHCP. That is, when the light beam 1720 has RHCP, unlike the illustrated embodiment, the resulting light beam 1732B has LHCP and can be converged by L1/HWP1 2308, L2/HWP2 2312 and L3/HWP3 2304B according to a net optical power Pnet=+ (P1+P2+P3).

The lensing effects of the L1/HWP1 2308, L2/HWP2 2312 and L3/HWP 2304B and the dependence of the lensing effects on the polarization state of incident light beams described above with respect to FIG. 24D serves as but one example, and other configurations are possible. For example, unlike in the illustrated embodiment, L1/HWP1 2308, L2/HWP2 2312 and deactivated L3/HWP3 2304B may each be configured to converge light having LHCP while diverging light having RHCP.

In the above, the integrated broadband adaptive lens assembly 2400B in the deactivated state has been described when configured as the second adaptive lens assembly 1008 on the user side in the display device 1100A described supra with respect to FIG. 11A. As described supra with respect to FIG. 11B, however, activating the second adaptive lens assembly 1008 to display virtual content to the user's eye 210, without any compensating effect, may result in a defocusing or distortion of the view of the real world, which may be undesirable. Thus, it may be desirable to configure the first adaptive lens assembly 1004 on the world side to at least partially compensate or negate the lens effect of the second adaptive lens assembly 1008 when deactivated to display the virtual content.

Referring back to FIG. 24D, when configured as the first adaptive lens assembly 1004 (FIG. 11B) on the world side to negate the lens effect of the second adaptive lens assembly 1008 (FIG. 11B) on the user side, components of the adaptive lens assembly 1700B may be configured similarly as described supra with respect to FIG. 11B. That is, as light transmitted from the world 510 to the eye 210 traverses the first and second adaptive lens assemblies 1004, 1008, each may be configured as described above with respect to the integrated broadband adaptive lens assembly 2400B described with respect to FIG. 24D. In operation, as described above, the polarization of the light transmitted from the world through the first adaptive lens assembly 1004 is converted from a first polarization state to a second polarization state, e.g., from RHCP to LHCP. Subsequently, the polarization of the light transmitted through the second adaptive lens assembly 1008 is converted back from the second polarization state to the first polarization state, e.g., from LHCP to RHCP. Furthermore, as described above with respect to FIG. 11B, the light transmitted from the world through the first adaptive lens assembly 1004 undergoes a first lens effect, e.g., converging effect, according to a first net optical power Pnet1=(P1+P2+P3) having a first sign, e.g., positive sign. Subsequently, the light transmitted through the second adaptive lens assembly 1008 undergoes a second lens effect opposite to the first lens effect, e.g., diverging effect, according to a second net optical power Pnet2=−(P1'+P2'+P3') having a second sign, e.g., negative sign, because the light incident on the second adaptive lens assembly 1008 has an opposite polarization as the light incident on the first adaptive lens assembly 1004. When Pnet1 and Pnet2 have substantially similar magnitudes, the overall lens effect, approximated by P=Pnet1+Pnet2 may be substantially zero. As a result, when the user is viewing virtual content by activating the second lens assembly 1008, as well as viewing real objects in the surrounding world, the view of the world is relatively unaffected by the compensating effect of the first lens assembly 1004.

In various embodiments, when deactivated, each of the first and second adaptive lens assemblies 1004, 1008 may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters.

Figures 25A, 25B:
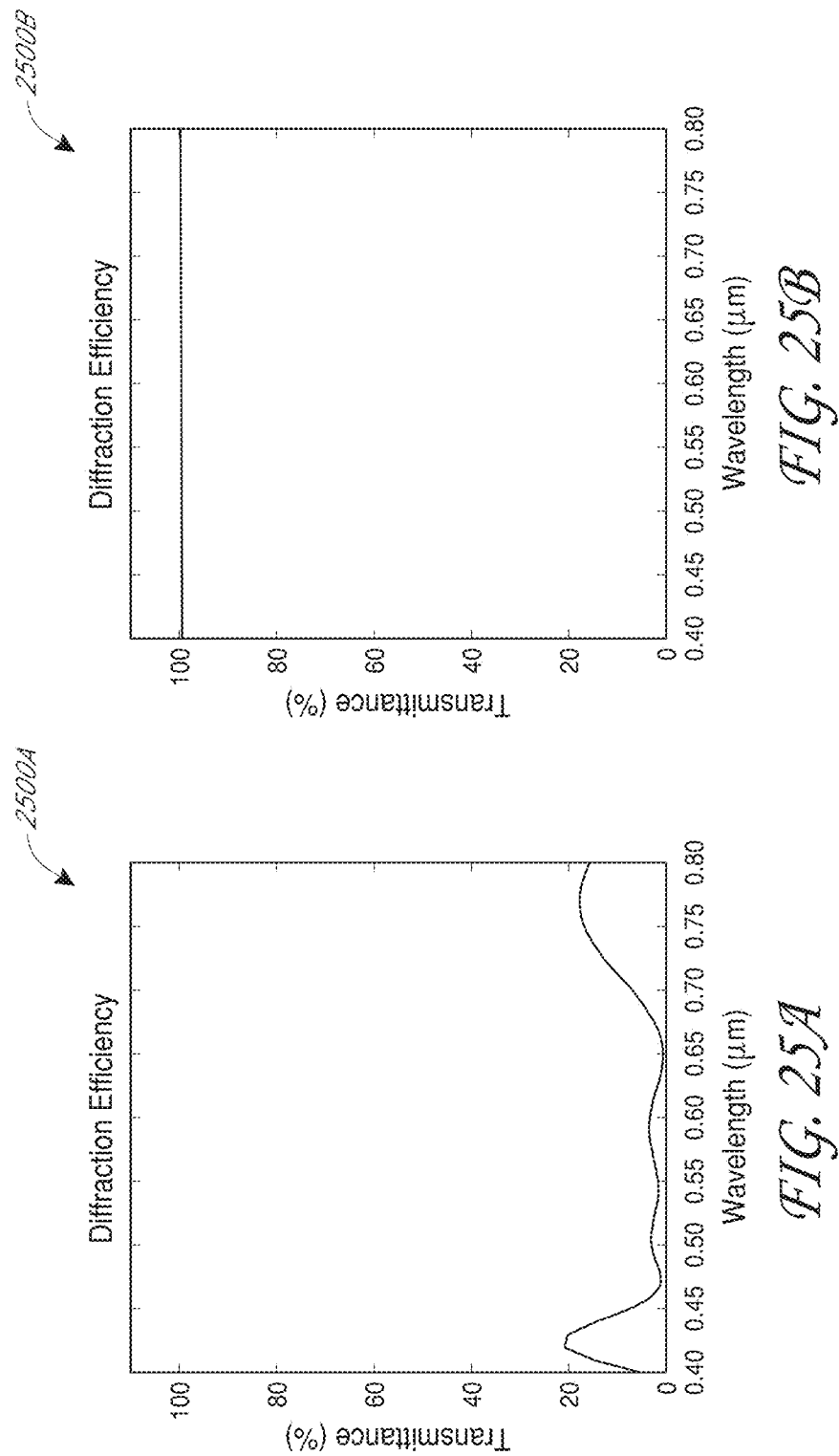
FIG. 25A illustrates simulated diffraction efficiency versus wavelength within in the visible spectrum of the broadband adaptive waveplate lens assembly of FIG. 24A with the switchable broadband waveplate activated.
FIG. 25B illustrates simulated diffraction efficiency versus wavelength within in the visible spectrum of the broadband adaptive waveplate lens assembly of FIG. 24A with the switchable broadband waveplate deactivated.

FIGS. 25A and 25B are graphs 2500A, 2500B illustrating transmission spectra corresponding to the integrated broadband adaptive lens assembly 2400 (FIGS. 24A/24B) in which the L3/HWP3 2304 is deactivated (FIG. 24C) and activated (FIG. 24D), respectively. The simulations correspond to the integrated broadband adaptive lens assembly 2400 in which the L3/HWP3 2304 comprises a switchable LC layer 2304 formed of an unpolymerized LC layer (e.g., the switchable LC layer 2304 in FIG. 23) of 10 μm in thickness and having Δn of 0.2, while each of L1/HWP1 2308 and L2/HWP2 2312 comprises a polymerized LC layer formed of polymerized twisted LC molecules having a twist angle of 60 degrees (e.g., upper and lower polymerized LC (LCP) layers 2302-1, 2303-2 in FIG. 24A). As illustrated in the graph 2500A, when the L3/HWP3 2304A is deactivated (FIG. 24C), the diffraction efficiency is high such that leakage light is low (about 20% maximum), indicating that the incident light efficiently diffracted by the integrated broadband adaptive lens assembly 2400A without substantially leaking through between 400 nm and 800 nm. On the other hand, as illustrated in the graph 2500B, when the L3/HWP3 2304B is activated (FIG. 24D), the diffraction efficiency is very the incident light is mostly transmitted without diffracting (about 100%), indicating that the incident light is largely undiffracted by the integrated broadband adaptive lens assembly 2400A between 400 nm and 800 nm.
Chromatic Aberration Reduction in Broadband Adaptive Lens Assemblies While having high efficiency over a wide range of wavelengths, some broadband adaptive lens assemblies can have focal lengths or optical powers that substantially depend on the wavelength of light, thereby leading to significant chromatic aberration. This is because, for relatively large focal lengths, the lens power is proportional to the corresponding wavelength. That is, dependence of optical power P(λ) for waveplate lenses at different wavelengths can be approximated as $P(\lambda_B)=P(\lambda_G) \lambda_B/\lambda_G$ and $P(\lambda_R)=P(\lambda_G) \lambda_R/\lambda_G$, where B, G, and R correspond to a wavelength in the blue spectrum, a wavelength in the green spectrum and a wavelength in the red spectrum, respectively. Thus, there is a need to reduce chromatic aberration in broadband adaptive lens assemblies. In the following, methods of reducing chromatic aberration are described, according to embodiments.

In the above, e.g., with respect to FIGS. 23A-23D, embodiments of broadband adaptive lens assemblies having two switchable broadband waveplate lenses have been disclosed, which leads to $2^2=4$ optical power states for a light having a circular polarization. By extension, a stack comprising more than two (N) switchable broadband waveplate lenses can be formed, having $2^N$ optical power states. For example, for broadband adaptive lens assemblies having three switchable broadband waveplate lenses (N=3), 8 optical power states can be achieved. TABLE 1 illustrates calculated optical powers of a broadband adaptive assembly comprising three switchable broadband waveplate lenses, where each switchable broadband waveplate lens is similar to the switchable broadband waveplate lens described above, e.g., with respect to FIGS. 22A-22C.

TABLE 1

| COLOR | STATE 1 (1, 1, 1) | STATE 2 (1, 1, -1) | STATE 3 (1, -1, 1) | STATE 4 (1, -1, -1) | STATE 5 (-1, 1, 1) | STATE 6 (-1, 1, -1) | STATE 7 (-1, -1, 1) | STATE 8 (-1, -1, -1) |
|---|---|---|---|---|---|---|---|---|
| LENS 1 STATE (S1) | 1 | 1 | 1 | 1 | -1 | -1 | -1 | -1 |
| LENS 1 STATE (S2) | 1 | 1 | -1 | -1 | 1 | 1 | -1 | -1 |
| LENS 1 STATE (S3) | 1 | -1 | 1 | -1 | 1 | -1 | 1 | -1.00 |
| BLUE | 2.14 | -2.14 | 0.43 | -0.43 | 1.29 | -1.29 | 1.29 | -1.29 |
| GREEN | 2.50 | -2.50 | 0.50 | -0.50 | 1.50 | -1.50 | 1.50 | -1.50 |
| RED | 3.01 | -3.01 | 0.60 | -0.60 | 1.81 | -1.81 | 1.81 | -1.81 |

For a broadband adaptive assembly having three switchable broadband waveplate lenses, the net lens power can be expressed as $P_{net}=((S_1*P_1+P_2)*S_2+P_3)*S_3$, where $P_i$ and $S_i=\pm 1$ (i=1, 2, 3) are the optical powers and power states of the individual switchable broadband waveplate lenses. For example, an activated state can be represented as S=+1 while a deactivated state can be represented as S=−1. Referring to TABLE 1, columns labeled State 1 to State 8 correspond to different lens states for each of the three lenses and rows BLUE, GREEN and RED represent calculated optical powers for at wavelengths of 450 nm, 525 nm and 632 nm, respectively, that are representative of blue, green and red colors of light. In the calculation, it has been assumed that only light having one polarization, e.g., first circular polarization reaches the eye and that the other is either recycled or reflected. For illustrative purposes, the optical powers of the three individual broadband waveplate lenses are calculated to be 0.5 D, 0.5 D, and 1.5 D at the green wavelength (525 nm). Based on TABLE 1, it can be seen that to obtain target net optical powers of 0.5 D, 1.5 D, and 2.5 D, lens states 3, 5 and 1 can be selected. However, it is observed that the net optical powers at blue and red wavelengths (450 nm and 632 nm) can cause significant chromatic aberration, e.g., as large as 0.51 D, for the target net optical power of 2.5 D for the red wavelength.

The inventors have recognized, however, that chromatic aberration can be substantially reduced if, instead of using one state to achieve one target net optical power for the three colors as illustrated in TABLE 1, more than one state is used to achieve a given target net optical power for the different colors. This approach is illustrated in TABLE 2.

TABLE 2

| COLOR | STATE 1 (1, 1, 1) | STATE 2 (1, 1, -1) | STATE 3 (1, -1, 1) | STATE 4 (1, -1, -1) | STATE 5 (-1, 1, 1) | STATE 6 (-1, 1, -1) | STATE 7 (-1, -1, 1) | STATE 8 (-1, -1, -1) |
|---|---|---|---|---|---|---|---|---|
| LENS 1 STATE (S1) | 1 | 1 | 1 | 1 | -1 | -1 | -1 | -1 |
| LENS 1 STATE (S2) | 1 | 1 | -1 | -1 | 1 | 1 | -1 | -1 |
| LENS 1 STATE (S3) | 1 | -1 | 1 | -1 | 1 | -1 | 1 | -1 |
| BLUE | 2.31 | -2.31 | 0.43 | -0.43 | 1.63 | -1.63 | 1.11 | -1.11 |
| GREEN | 2.70 | -2.70 | 0.50 | -0.50 | 1.90 | -1.90 | 1.30 | -1.30 |
| RED | 3.25 | -3.25 | 0.60 | -0.60 | 2.29 | -2.29 | 1.56 | -1.56 |

Referring to TABLE 2, by using more than one state to achieve a given target net optical power for different colors, and slightly different target lens powers, the chromatic aberration can be substantially reduced. Here, the optical powers of the three individual broadband waveplate lenses are 0.4 D, 0.7 D, and 1.6 D at the green wavelength (525 nm). Based on TABLE 2, it can be seen that to obtain target net optical power of 0.5 D, a single lens state 3 can be selected. However, to reduce chromatic aberration, for a target net optical power of 1.5 D, states 5 and 7 can be selected, and for a target net optical power of 2.5 D, states 1 and 5 can be selected. Compared to a chromatic aberration of 0.51 D for the target net optical power of 2.5 D shown in TABLE 1, by using more than one state for different colors, the chromatic aberration for the target net optical power of 2.5 D for the red wavelength can be reduced to 0.2.

Figures 26A, 26B, 26C:
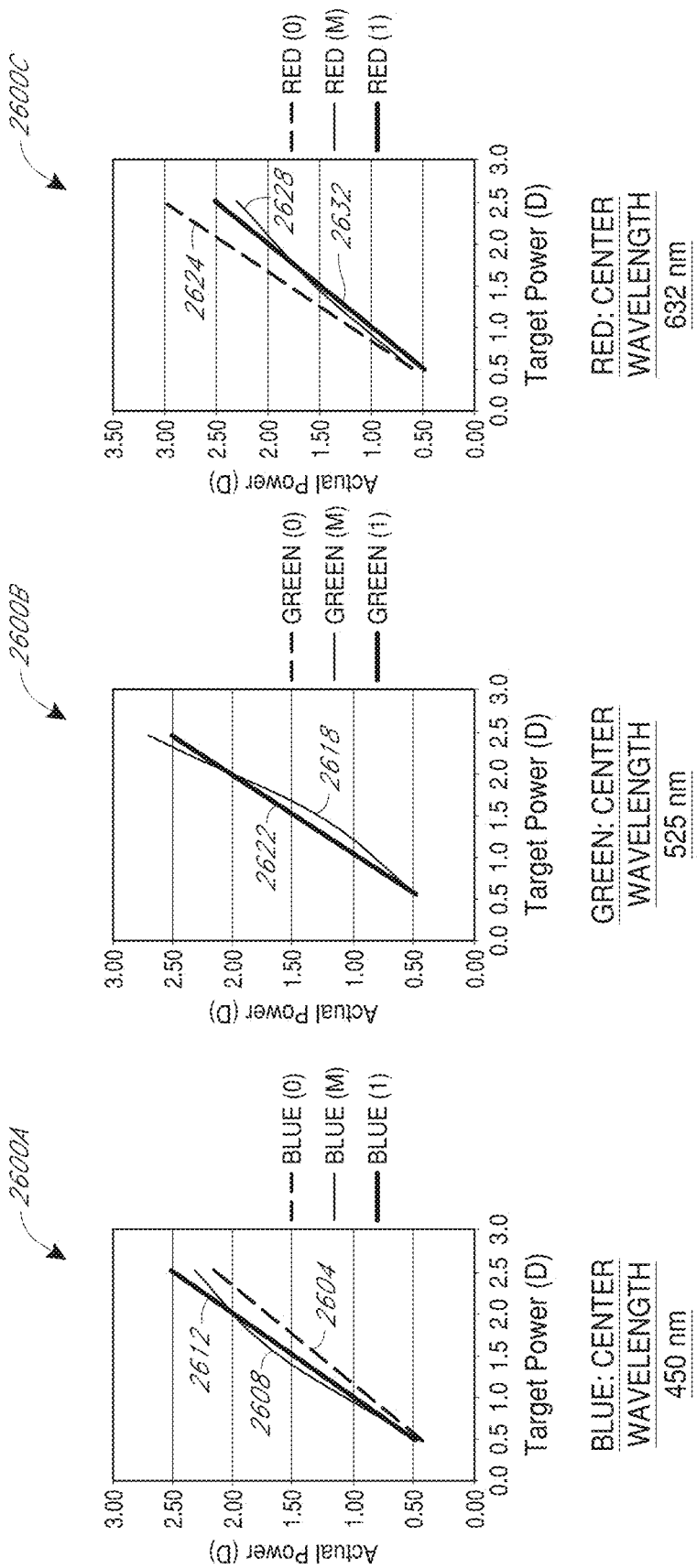
FIG. 26A illustrates simulated actual versus target net optical power of an example broadband adaptive waveplate lens assembly comprising three broadband switchable waveplate lenses, using a single lens state and multiple lens states for a blue wavelength.
FIG. 26B illustrates simulated actual versus target net optical power of an example broadband adaptive waveplate lens assembly comprising three broadband switchable waveplate lenses, using a single lens state and multiple lens states for a green wavelength.
FIG. 26C illustrates simulated actual versus target net optical power of an example broadband adaptive waveplate lens assembly comprising three broadband switchable waveplate lenses, using a single lens state and multiple lens states for a red wavelength.

FIGS. 26A, 26B and 26C are graphs 2600A, 2600B and 2600C illustrating calculated target power net power versus actual net power for the blue, green and red wavelengths, respectively, illustrating the improved chromatic aberration performance achieved by using the method of using different lens states to for different color wavelengths for achieving target net optical powers, according to embodiments. In each of the graphs 2600A, 2600B and 2600C, solid black lines 2612, 2622 and 2632 represent target net optical power, dotted lines 2604, 2614 and 2624 represent calculated optical power when the method of using a single lens state to obtain a given optical power as described above with respect to TABLE 1 is used and solid gray lines 2608, 2618 and 2628 represent calculated optical power when the method of using multiple lens states to obtain a given optical power as described above with respect to TABLE 2 is used. As observed, the actual powers are closer to the target power when multiple lens states to obtain a given optical power are used.

Fabrication of Broadband Waveplates and Waveplate Lenses Using Photoalignment

Figure 27A:
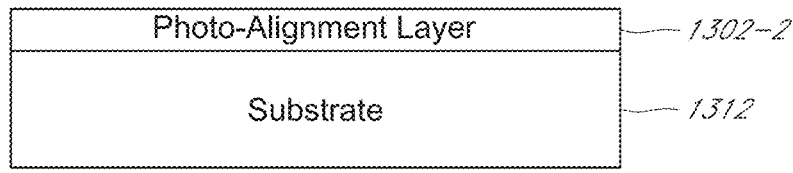
FIG. 27A-27C illustrate an example fabrication method of a broadband waveplate or a broadband waveplate lens.
Figure 27B:
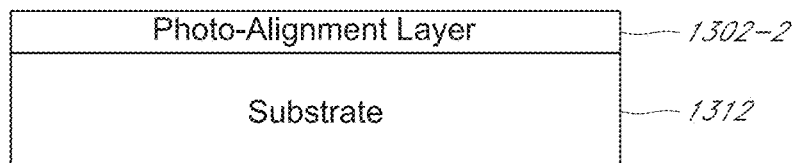
Figure 27C:
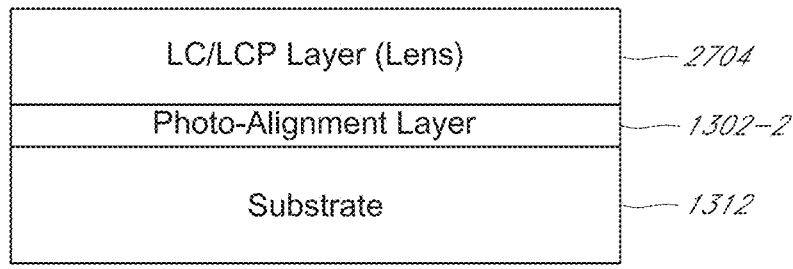

FIGS. 27A-27C illustrate an example fabrication method of a broadband waveplate or a broadband waveplate lens. Referring to an intermediate structure 2700A of FIG. 27A, a transparent substrate 1312 is provided, on which an alignment layer 1302-0 is formed. The transparent substrate 1312 can include, e.g., a silicon dioxide, sapphire or any suitable transparent material. It will be understood that, while not shown, additional structures and layers may be present on the substrate 1312, leading up to the formation of the alignment layer 1302-0 according to various embodiments described herein. By way of example, when forming the switchable waveplate 1300F (FIG. 13F), prior to forming the alignment layer 1302-0, a first one of the transparent electrode layers 1316, 1320 may be present on the substrate 1312 prior to formation of the alignment layer 1302-0.

In some embodiments, the alignment layer 1302-0 can be a photo-alignment layer on which, when LC molecules are deposited, the LC molecules may become oriented along a preferential direction, for example, due to anchoring energy exerted on the liquid crystal molecule by the photo-alignment layer. Examples of photo-alignment layers include polyimide, linear-polarization photopolymerizable polymer (LPP), azo-containing polymers, courmarine-containing polymers and cinnamate-containing polymers, to name a few, as well as other compounds described above with respect to FIGS. 13C, 13F.

The alignment layer 1302-0 may be formed by dissolving precursors, e.g., monomers, in a suitable solvent and coating the substrate 1312 with the solution using a suitable process, e.g., spin coating, slot coating, doctor blade coating, spray coating and jet (inkjet) coating, among other deposition processes. The solvent can thereafter be removed from the coated solution. The alignment layer 1302-0 may also be cured, e.g., UV cured, e.g., with a polarizer, in preparation for the subsequent alignment of the LC molecules thereon.

Referring to an intermediate structure 2700B of FIG. 27B, after coating the alignment layer 1302-0, the alignment layer 1302-0 is optically patterned or recorded. The optical patterning can be performed using a holographic two-beam exposure process (FIG. 28) or an optical replication process using a master lens and a one-beam exposure process (FIGS. 29A, 29B).

Referring to an intermediate structure 2700C of FIG. 27C, after coating the alignment layer 1302-0, a LC layer 2704 is formed thereon. The LC layer 2704 may be formed by depositing on the alignment layer 1302-0 a reactive mesogen mixture (including, e.g., liquid crystal monomers, solvents, photoinitiators, and surfactants) using a suitable process, including, e.g., spin coating, slot coating, doctor blade coating, spray coating and inkjet coating, among other deposition processes.

When LC layer 2704 is integrated as part of a passive waveplate lens or a switchable waveplate, the LC layer 2704 may be cured, e.g., UV cured to photopolymerize the LC layer 2704, such that the LC molecules can become fixedly oriented, as described above.

In contrast, when LC layer 2704 is integrated as part of a switchable waveplate lens or a switchable waveplate, the LC layer 2704 may be further processed without polymerizing the LC layer 2704, such that the LC molecules can reorient themselves in response to a switching signal as described above.

Upon deposition, at least the bottommost LC molecules of the liquid crystal (LC) layer 2704 that are immediately above the alignment layer 1302-0 may be self-organized according to the configuration of the alignment layer 1302-0, depending on various applications described herein. For example, when the LC layer 2704 forms part of a broadband waveplate lens, the alignment layer 1302-0 is configured such that the bottommost LC molecules have local orientations or directors that vary along a radius of the LC layer 2704 that in a radially outward direction from a central region as described, e.g., with respect to any one of FIGS. 16A, 16B, 19A, as described supra. In addition, when the LC layer 2704 forms part of a broadband waveplate, the alignment layer 1302-0 is configured such that the bottommost LC molecules have local orientations or directors that are oriented with their long axes extending generally in a first lateral direction as described, e.g., with respect to FIGS. 13A, 13C. Still referring to FIG. 27C, the LC layer 2704, in some embodiments, as described elsewhere in the application, LC molecules above the bottommost LC molecules in the LC layer 2704 may be configured to be arranged differently from the bottommost LC molecules in the LC layer 2704. For example, topmost LC molecules in the LC layer 2704 may be aligned differently by a second alignment layer formed on the LC layer 2704. In addition, the LC molecules between the topmost LC molecules and the bottommost LC molecules can have a twist, as described with respect to various embodiments, including FIGS. 13C and 20A/20B After depositing the LC layer 2704 and optionally polymerizing, the intermediate structure 2700C may be further processed to form additional structures and/or layers, as described according to various embodiments described herein. By way of example, when forming the switchable waveplate 1300F (FIG. 13F), after forming the LC layer 2704, the intermediate structure 2700C may be further processed to form, e.g., a second alignment layer 1302-0 on the LC layer 2704 and a second one of the transparent electrode layers 1316, 1320. In addition, in some embodiments, additional LC layers may be formed on the LC layer 2704, where bottommost LC molecules of a subsequent LC layer align to topmost LC molecules of a previous LC layer, as described in FIGS. 13F and 24A.

Figure 28:
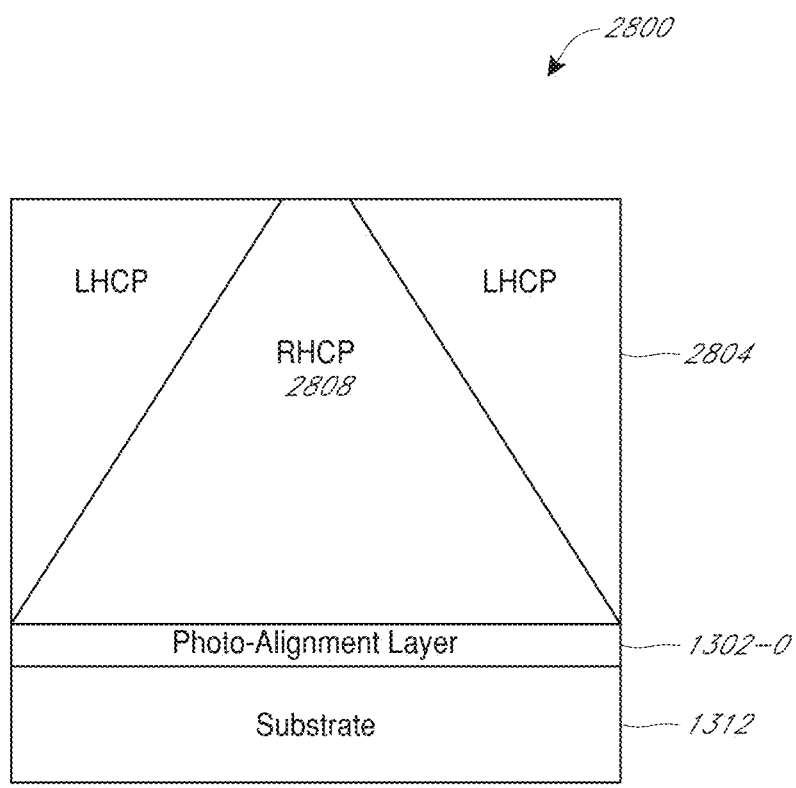
FIG. 28 illustrate an example method of configuring an alignment layer for aligning liquid crystal molecules in broadband waveplates or broadband waveplate lenses using a two-beam exposure.

FIG. 28 illustrates an example method of configuring an alignment layer as described above with respect to FIG. 27C for aligning LC molecules in broadband waveplates or broadband waveplate lenses using a two-beam exposure process, sometimes referred to as polarization holography. While most conventional holography uses an intensity modulation, polarization holography involves a modulation of the polarization state as a result of interference of light with different polarization. Referring to an intermediate structure 2800 of FIG. 28, the illustrated method includes forming an unpolymerized photo-alignment layer 1302-0 on the substrate 1312, as described above with respect to FIG. 27A. Thereafter, a plurality of coherent light beams having different polarizations, e.g., a RHCP light beam 2808 and a LHCP light beam 2804, are directed to the alignment layer 1302-2. In the illustrated embodiment, the RHCP light beam 2808 and the LHCP light beam 2804 are orthogonal circularly polarized light beams. One of the RHCP light beam 2808 and the LHCP light beam 2804, which may be a recording beam, may be converging or diverging while other of the RHCP light beam 2808 and the LHCP light beam 2804, which may be a reference beam, may be collimating. However, embodiments are not so limited. For example, the orthogonally polarized beams can include linear vertically polarized and linear horizontally polarized light beams or linear polarized light beams at ±45 degrees. In some implementations, the two-beam exposure of the alignment layer 1302-0 to a polarization hologram may be performed using a UV laser (e.g., HeCd, 325 nm) with orthogonal circular polarizations. The typical recording dose may be around a few J·cm$^{-2}$ depending on liquid crystal materials and grating parameters (e.g., thickness d). Thereafter, a reactive mesogen mixture (including, e.g., liquid crystal monomers, solvents, photoinitiators, and surfactants) is coated to be aligned according to the surface pattern formed by the two-beam exposure, as described above with respect to FIGS. 27A-27C.

FIGS. 29A-29B illustrate an example method of configuring an alignment layer for aligning liquid crystal molecules in broadband waveplates or broadband waveplate lenses by fabricating a master waveplate or waveplate lens having a master alignment pattern of LC molecules, and using the master waveplate or waveplate lens to replicate the master alignment pattern of LC molecules onto a target alignment layer. Unlike the two-beam exposure method described above with respect to FIG. 28 in which an interference of two orthogonally polarized light beams is employed to directly configure the alignment layer, in the illustrated embodiment, a master waveplate lens and one polarized beam of light is used to create a similar polarization hologram in the near field. Thus, once a master lens having a master alignment pattern of LC molecules is fabricated, it can be used as a template to fabricate multiple waveplates and waveplate lenses with a relatively simpler one beam exposure.

FIG. 29A illustrates a master waveplate or waveplate lens 2904. The master waveplate or waveplate lens 2904 may be fabricated using, e.g., the processes described above with respect to FIGS. 27A-27C and 28, including forming an alignment layer using, e.g., a light interference pattern formed by a two-beam exposure process, and thereafter forming a reactive mesogen (RM) mixture layer (including, e.g., liquid crystal monomers, solvents, photoinitiators, and surfactants) that self-aligns to the alignment layer, followed by blanket UV curing of the RM mixture layer to polymerize the LC molecules in the RM mixture layer. FIG. 29A further illustrates an operational view 2900A of the master waveplate or waveplate lens 2904, which is designed to have limited diffraction efficiency such that only a part of polarized incident light is diffracted while passing a part unaffected. For example, in the illustrated embodiment, the master waveplate or a waveplate lens 2904 is configured to diffract a part (e.g., 30-70%, 40%-60%, 45-55% or any value within these values, e.g., about 50%) of incident light 2908 having a first polarization e.g., RHCP, into diffracted light 2912 having a second polarization, e.g., LHCP, while passing part (e.g., 30-70%, 40%-60%, 45-55% or any value within these values, e.g., about 50%) of the incident light 2908 through the master lens 2904 without diffracting as leakage light 2916, e.g., zero order leakage light, having the same first polarization, e.g., RHCP, as the incident light beam 2908.

FIG. 29B illustrates an example fabrication configuration 2900B of the master lens 2904 fabricated and configured as described above with respect to FIG. 29A and an intermediate structure comprising an alignment layer 1302-0 for aligning LC molecules in broadband waveplates or broadband waveplate lenses. Referring to the fabrication configuration 2900B of FIG. 29B, the illustrated intermediate structure includes an unpolymerized photo-alignment layer 1302-0 on the substrate 1312, as described above with respect to FIG. 27A. The fabrication configuration 2900B includes, disposed over the unpolymerized photo-alignment layer 1302-0 the master lens 2904. An incident light beam 2908 having a first polarization, e.g., a RHCP, is directed to the alignment layer 1302-2. As described above with respect to FIG. 29A, because the master waveplate or waveplate lens is designed to diffract only a part of the incident light, upon passing through the master waveplate or waveplate lens 2904, two light beams having opposite polarizations are incident on the alignment layer 1302-0. In effect, the two light beams incident on the alignment layer 1302-0 serve a similar effect of the two-beam exposure described above with respect to FIGS. 28A, 28B. In the illustrated example, transmitted through the master waveplate or waveplate lens 2904 and incident on the alignment layer 1302-0 are a diffracted light beam 2912 having a second polarization, e.g., LHCP, opposite the first polarization, e.g., RHCP, of the incident light beam 2908, and a leakage light beam 2916 having the same first polarization, e.g., RHCP, as the incident light beam 2908. Thus, in a similar manner as described above with respect to FIG. 28, the diffracted light beam 2912, may be converging or diverging, may serve as a recording beam, while the leakage light beam 2916, may serve as a reference beam. The interference of the diffracted light beam 2912 and the leakage light beam 2915 causes the alignment layer 1302-0, in a similar manner as described above with respect to FIG. 20. Thereafter, a reactive mesogen mixture (including, e.g., liquid crystal monomers, solvents, photoinitiators, and surfactants) may be coated to be aligned according to the surface pattern formed by the two-beam exposure, as described above with respect to FIGS. 27A-27C. Thus, advantageously, once the master lens 2904 is fabricated using a relatively complex two-beam exposure method described above with respect to FIG. 28, subsequent configuration of alignment layers is performed using a relatively simple one-beam exposure as described above with respect to FIG. 29B. Advantageously, under some circumstances, the method illustrated with respect to FIG. 29B can be performed using fully coherent light sources, e.g., lasers, or partially coherent light sources such as UV lamps or light emitting diodes, etc., with less precise optics, less vibration control and looser alignment compared to the two-beam exposure method described above with respect to FIGS. 28A-28B.

Fabrication of Broadband Waveplates and Waveplate Lenses Using Nanoimprint Alignment Layer As described throughout the application, in various embodiments, the LC molecules in an LC layer for broadband waveplates and waveplate lenses according to various embodiments can be aligned using an alignment layer, e.g., a photo alignment layer that can be configured using light. In other embodiments, the LC molecules can be aligned using patterned nanostructures. In the following with respect to FIGS. 30A and 30B, a method of aligning LC molecules using patterned nanostructures is described, followed by an example of patterned nanostructures suitable for serving as a waveplate lens is described with respect to FIG. 30C.

Figure 30C:
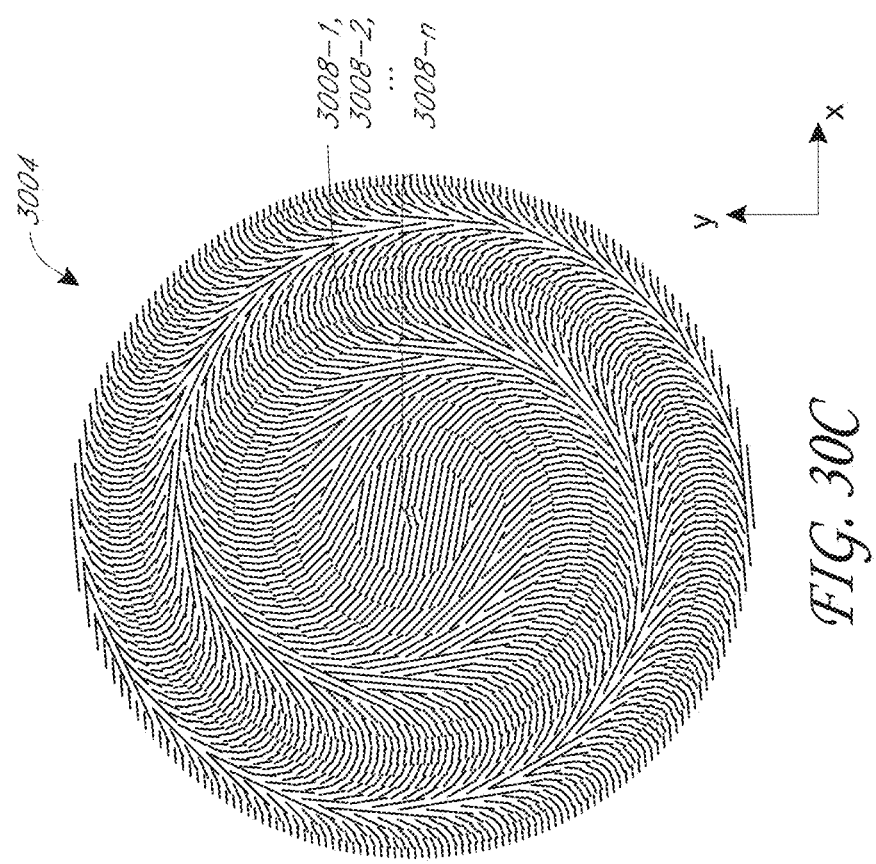
FIG. 30C illustrates an example nanoimprint alignment layer for aligning liquid crystal molecules of a broadband waveplate lens using the example method of FIGS. 30A-30B.
Figure 30A:
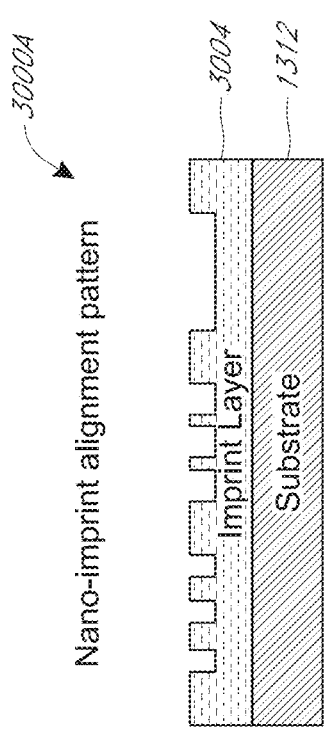
FIGS. 30A-30B illustrate an example method of configuring a nanoimprint alignment layer for aligning liquid crystal molecules in broadband waveplates or broadband waveplate lenses using a master lens and one-beam exposure.
Figure 30B:
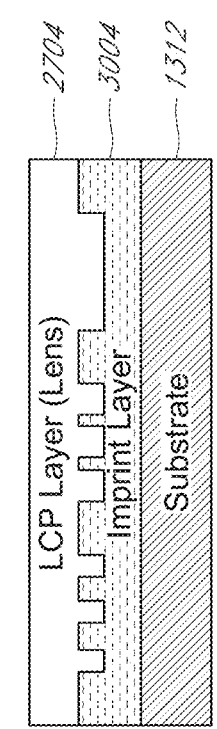

FIGS. 30A and 30B illustrate cross-sectional views of intermediate structures 3000A, 3000B, respectively, at different stages of fabrication using a nanoimprint process, according to some embodiments.

Referring to the intermediate structure 3000A of FIG. 30A, a transparent substrate 1312 is provided, in a similar manner as described above with respect to various embodiments. A nanoimprint template (not shown), or a nanoimprint mold, which has predefined topological patterns configured to form an alignment pattern of LC molecules in the subsequently formed LC layer 2704 (FIG. 30B), e.g., at least the bottommost LC molecules in the LC layer 2704 closest to the substrate 1312, is brought into contact with a blanket base polymer layer (not shown). Subsequently, the template is pressed into the blanket base polymer layer, which can include a thermoplastic polymer under certain temperature, e.g., above the glass transition temperature of the blanket base polymer layer, thereby transferring the pattern of the template into the softened blanket base polymer layer to form an imprinted alignment layer 3004. After being cooled down, the template is separated from the imprinted alignment layer 3004, comprising an alignment pattern having predefined topological patterns configured to form an alignment pattern of LC molecules in the subsequently formed LC layer 2704 (FIG. 30B). In some other approaches, after being pressed into the base polymer layer, the imprinted alignment layer 3004 is hardened by crosslinking under UV light.

The imprinted alignment layer 3004 can include features that are sub-wavelength in dimensions. For example, the imprinted alignment layer 3004 can include features having dimensions (e.g., length, width and/or depth) of the order of a few nanometers, a few hundred nanometers and/or a few microns. As another example, the imprinted alignment layer 3004 can include features having a length greater than or equal to about 20 nm and less than or equal to about 100 nm. As yet another example, the imprinted alignment layer 3004 can include features having a width greater than or equal to about 20 nm and less than or equal to about 100 nm. As yet another example, the imprinted alignment layer 3004 can include features having a depth greater than or equal to about 10 nm and less than or equal to about 100 nm. In various embodiments, the length and/or width of the features can be greater than the depth of the features. However, in some embodiments, the depth can be approximately equal to the length and/or width of the features. The features of each domain of the imprinted alignment layer 3004 can be arranged to form complex geometric patterns within each domain in which the direction and/or the period between consecutive features changes along length scales of the order of a few nanometers, a few hundred nanometers and/or a few microns.

While an example process of nanoimprinting was described for forming the nanoimprinted alignment layer 3004 with respect to FIG. 30A, embodiments are not so limited. In other embodiments, the imprinted alignment layer 3004 can be fabricated using other patterning techniques including lithography and etch. In addition, while the imprinted alignment layer 3004 was described as being formed of a polymeric material, embodiments are not so limited and in various other embodiments, the imprinted alignment layer 3004 can comprise a dielectric material, e.g., silicon or a glass material.

Referring to the intermediate structure 3000B of FIG. 30B, after forming the alignment layer 3004, an unpolymerized LC layer 2704, e.g., a layer of reactive mesogens, is deposited thereon, according to the deposition process described above with respect to FIGS. 27A-27C. Without being bound to any theory, the imprinted alignment layer 3004 serves as an alignment layer that causes the LC molecules of the LC layer 2704 to align according to the pattern of the imprinted alignment layer 3004. For example, the elongation direction of LC molecules within a domain may generally align in a direction parallel to the local elongation direction of the nanostructures in the imprinted alignment layer 3004. Without being bound to any theory, the alignment of the LC molecules to the pattern of the imprinted alignment layer 3004 may be attributed to steric interactions with the liquid crystal molecules, and/or anchoring energy exerted on deposited LC molecules by the imprinted alignment layer 3004.

Still referring to the intermediate structure 3000B of FIG. 30B, the LC layer 2704 may be further processed according to different embodiments, as described above with respect to FIGS. 27A-27C, including polymerization, further aligning LC molecules above the bottommost LC molecules and stacking multiple LC layers.

FIG. 30C illustrates a plan view of a nanoimprinted alignment layer 3004 that is fabricated according to the method described above with respect to FIGS. 30A-30B. The imprinted alignment layer 3004 can serve as an alignment layer to form a layer of LC molecules having various lateral arrangements as described herein including, e.g., the arrangements described above with respect to FIGS. 13A, 13C, 16A, 16B, 19A, among other arrangements.

When LC layer resulting from the imprinted alignment layer 3004 forms part of a waveplate lens, the imprinted alignment layer 3004 according to various embodiments comprises a plurality of zones such as, for example, concentric zones 3008-1, 3008-2, . . . 3008-$n$ in the x-y plane, according to various embodiments. The imprinted nanostructures within each of the zones of the imprinted alignment layer 3004 are oriented along a particular orientation. The orientation of the molecules of the liquid crystal material in adjacent zones can be different. For example, the elongated directions or the local directors of the LC molecules in the various zones zone 3008-1, 3008-2, . . . 3008-$n$ can be successively rotated in a radial direction according to a function that depends on a power of the radius $r^n$ from a central location, where n can vary from about 1 to 3 as described, for example, with respect to FIGS. 16A/16B and FIG. 19.

The imprinted nanostructures and the resulting liquid crystal molecules can have elongation directions that are different in different zones 3008-1, 3008-2, . . . 3008-$n$. For example, the elongation direction of imprinted nanostructures in successive zones can be rotated in a clock-wise direction by an angle of about 18 degrees with respect each other. However, embodiments are not so limited and the relative rotation angle between successive zones can be less than 1 degree, between about 1 and 45 degrees, between about 1 and 18 degrees, or between about 18 and 45 degrees.

Integration of Broadband Adaptive Lens Assemblies Having Broadband Waveplates and/or Waveplate Lenses According to various embodiments described above, e.g., broadband adaptive lens assemblies include integrated waveplates and waveplate lenses. In the following, methods of integrating the waveplates and waveplate lenses are described, according to embodiments. FIGS. 31A-31C illustrate an example method of fabricating a switchable broadband waveplate comprising liquid crystals or a switchable broadband waveplate lens comprising liquid crystals using a gap fill process. According to various embodiments, the method includes providing a lower stack including a first electrode layer on a first substrate and a first alignment layer formed on the first electrode layer, and includes providing an upper stack including a second electrode layer on a second substrate and a second alignment layer formed on the second electrode layer. The first and second stacks are then stacked into a single stack, such that the first and second alignment layers face each other, where spacers are formed between the lower and upper stacks to create a gap therebetween, which gap is subsequently filled with a liquid a LC layer material. Referring to FIG. 31A, the method includes providing a substrate 1312 in a similar manner as described above, e.g., with respect to FIG. 27A, and thereafter forming on the substrate 1312 a first electrode layer 1320, e.g., a transparent electrode layer, in a similar manner as described above, e.g., with respect to FIG. 27A. Thereafter, referring to FIG. 31B, a first alignment layer 1302-0 is formed on the substrate 1312, thereby forming a lower stack 3100A. The alignment layer 1302-2 can be a photo-alignment layer similar to that described above with respect to, e.g., FIGS. 27A-27C, 28 and 29, or an imprinted alignment layer similar to that described above with respect to, e.g., FIGS. 30A-30C.

Referring to FIG. 31C, in a similar manner as forming the lower stack 3100A, an upper stack 3100B is formed, comprising a second substrate 1312 on which a first electrode layer 1320, e.g., a transparent electrode layer, and a second alignment layer 1302-0 is formed in a similar manner as described above with respect to forming the lower stack 3100A, as described above with respect to FIG. 31B.

In some embodiments, the first and second alignment layers 1302-0, which may be photo-alignment layers or imprinted alignment layers, may be configured differently, as described above with respect to various embodiments, such that LC molecules immediately adjacent the first and second alignment layers 1302-0 align differently, e.g., align such that the elongation direction or the director direction of the LC molecules cross each other, e.g., at about 90 degrees.

Still referring to FIG. 31C, the upper and lower stacks 3100B, 3100A are subsequently stacked into a single stack, such that the first and second alignment layers 1302-0 face each other, where a gap 1302 is formed therebetween. The gap 1302 may be formed by spacers 1350 formed between the lower and upper stacks 3100A, 3100B.

The spacers 1350 may be formed of a suitable material, e.g., silica beads having a diameter to produce the gap, whose distance defines the target thickness of the subsequently inserted LC material. In some implementations, the spacers 1350 in the form of silica beads, can be dispersed using a dry process over the surface of one or both of the upper and lower stacks 3100B, 3100A. In other implementations, the spacers 1350 in the form of silica beads can be mixed with adhesives and applied at the edges of the surfaces of one or both of the upper and lower stacks 3100B, 3100A. Thereafter, upper and lower stacks 3100B, 3100A are pressed against each other, until a final gap distance corresponding to the resulting thickness of the LC layer, is obtained. The gap distance can be monitored using a Fabry-Perot interference fringes.

After forming the gap 1302, a LC material is inserted into the gap 1302. The inserted LC material can be a reactive mesogen mixture including, e.g., liquid crystal monomers, solvents, photoinitiators, and surfactants, as described above. The LC material may be inserted in the gap 1302 by capillary force. In some implementations, the insertion is performed under vacuum.

The integration process described above with respect to FIGS. 31A-31C can be applied to any suitable embodiment described herein. For example, the method can be used to form a switchable broadband waveplate similar to that described above with respect to FIG. 13F, including a pair of broadband QWP 1324, 1326 (FIG. 13F) separated by the switchable TN LC layer 1302 (FIG. 13F) inserted into the gap 1302 as described above. In these embodiments, the lower stack 3100A includes a plurality of TN LC layers 1302-1, 1302-2 (FIG. 13F) that are configured to serve as a QWP 1324 (FIG. 13B), and the upper stack 3100B similarly includes a plurality of TN LC layers 1302-1, 1302-2 (FIG. 13F) that are configured to serve as a QWP 1326 (FIG. 13B).

To provide another example, the integration process described above with respect to FIGS. 31A-31C can be applied to form an integrated broadband adaptive lens assembly similar to that described above with respect to FIG. 24A, including a pair of polymerized LC (LCP) layers 2302-1, 2302-2 (FIG. 24A) separated by the switchable LC layer 2304 (FIG. 24A) inserted into the gap 1302 as described above to serve as the L3/HWP3 2304 (FIGS. 23B-24D). In these embodiments, the lower stack 3100A includes the lower polymerized LC (LCP) layer 2302-1 (FIG. 24A) that serves as a L1/HWP2 2308 (FIGS. 24B-24D), and the upper stack 3100B similarly includes the upper polymerized LC (LCP) layer 2302-2 (FIG. 24A) that serves as a L2/HWP2 2312 (FIGS. 24B-24D).

In the following, methods of integrating the waveplates and waveplate lenses are described, according to some other embodiments. In FIGS. 32A-32E, an example method of fabricating a switchable broadband waveplate comprising liquid crystals or a switchable broadband waveplate lens comprising liquid crystals employs a layer transfer process. In the layer transfer process, a LC layer is formed on a donor, a sacrificial or a carrier substrate, which may be flexible, and thereafter be transferred to a permanent substrate, which may be rigid. The LC layer formation on such a carrier substrate may allow for higher manufacturing throughput and/or higher manufacturing yield.

Figure 32A:
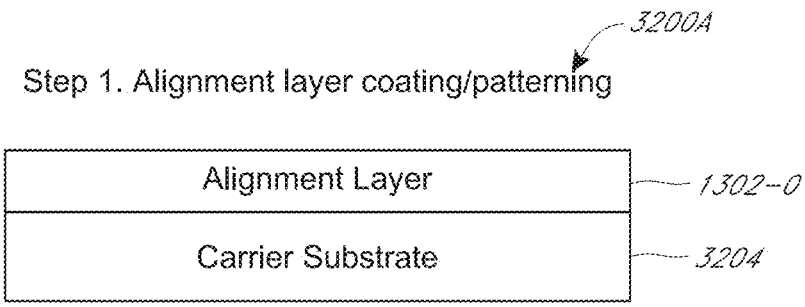
FIGS. 32A-32E illustrate an example method of fabricating a switchable broadband waveplate comprising liquid crystals or a switchable broadband waveplate lens comprising liquid crystals using a layer transfer process.

FIG. 32A illustrates an intermediate structure 3200A comprising a carrier substrate 3204, which may be a suitable substrate having sufficient flexibility while having sufficient thermal stability for subsequent processes including polymerization of a LC layer, on which an alignment layer 1302-0 is formed. The alignment layer 1302-0 can be a photo-alignment layer formed and configured in a similar manner to those described above with respect to, e.g., FIGS. 27A-27C, 28 and 29, or an imprinted alignment layer formed and configured in a manner similar to that described above with respect to, e.g., FIGS. 30A-30C.

Figure 32B:
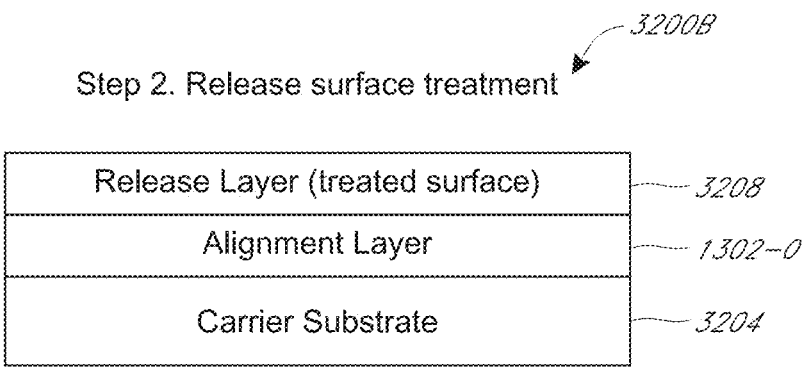
Figure 32C:
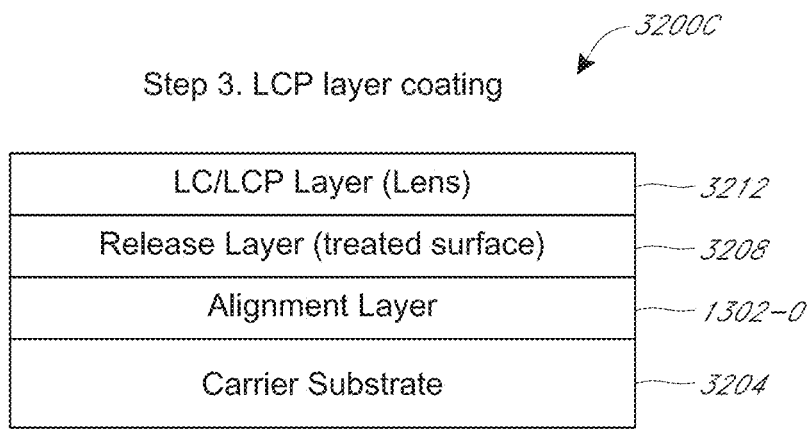

FIG. 32B illustrates an intermediate structure 3200B comprising a release layer 3208 formed on the alignment layer 3208 and FIG. 32C illustrates an intermediate structure 3200C comprising an LC layer 3212 formed on the release layer 3208, thereby temporarily bonding the LC layer 3212 on the alignment layer 3208. The LC layer 3212 can be formed and configured in a similar manner as describe above with respect to FIG. 27C.

In some embodiments, the release layer 3208 comprises a thin surface layer formed by a surface treatment which weakens the adhesion strength between the LC layer 3212 and the alignment layer 1302-0 without substantially affecting the alignment properties of the alignment layer 3208.

In some embodiments, the release layer 3208 is a separate suitable thin film that is coated on the alignment layer 1302-0 which adheres with a higher strength to the layer below compared to the layer above the release layer 3208. In the illustrated example, the release layer 3208 is formed between the alignment layer 1302-0 and a LC layer 3212 (FIG. 32C). Thus, according to some embodiments, release layer 3208 is formed of a suitable material that forms a stronger adhesion interface with the alignment layer compared the LC layer 3212, such that it separates relatively easily from the LC layer 3212 compared to the alignment layer 3202-2, upon application of a mechanical force In some embodiments, the release layer 3208 comprises a separate liquid-like curable adhesive coated on the release layer 3208 that can be cured in place when exposed to UV light for curing the LC layer 3212. Curing converts the adhesive layer into a 3-D polymer network that is resistant to flow prior to separation. In some other embodiments, the release layer 3208 comprises a separate thermoplastic bonding material coated on the release layer 3203 rather than a curable adhesive material. Thermoplastic bonding material comprises thermoplastic polymers that do not crosslink or cure but instead reversibly soften and then re-harden to a glassy state when cooled to room temperature. At room temperature, the thermoplastic bonding material forms a stiff, resilient bond that allows subsequent processes without substantial deformation.

Figure 32D:
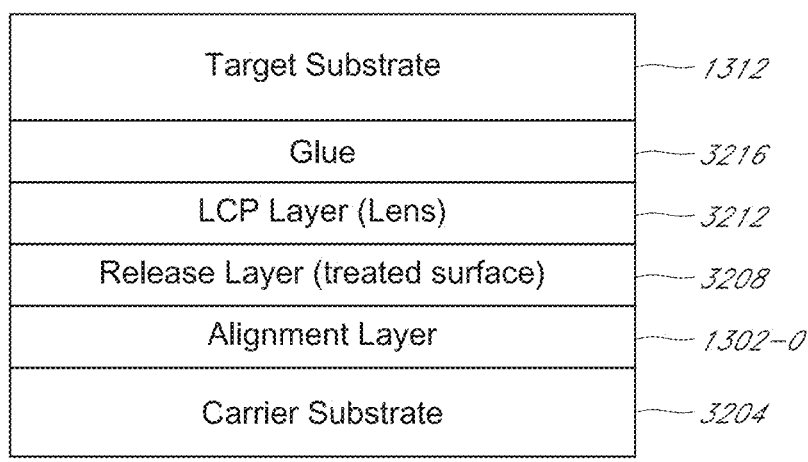

FIG. 32D illustrates an intermediate structure 3200D comprising a target substrate 1312, which may be a permanent substrate, attached on the LC layer 3212 using a glue layer 3216. The substrate 1312 may be any transparent substrate described elsewhere in the specification.

Figure 32E:
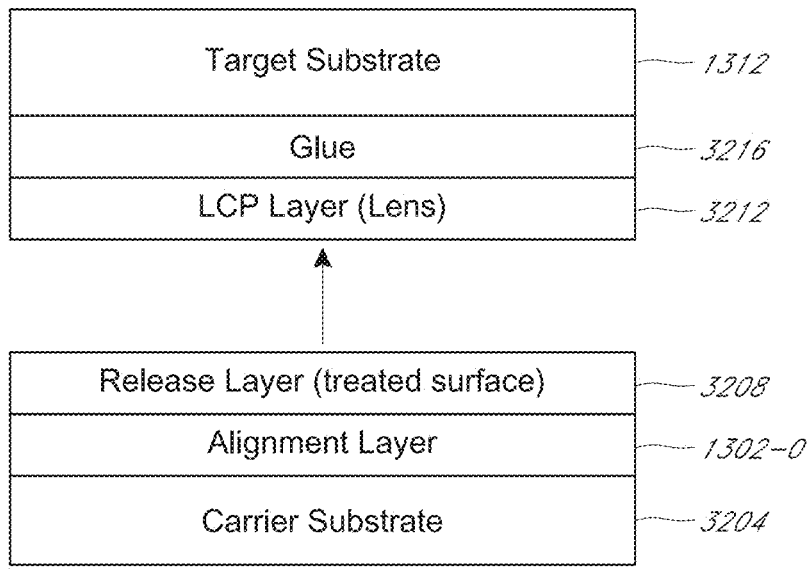

FIG. 32E illustrates an intermediate structure 3200e in which a target stack including the target substrate 1312 attached to the LC layer 3212 by the glue layer 3216 is separated from a carrier stack including the carrier substrate 3204, the alignment layer 1302-0 and the release layer 3208. In some embodiments, the separation is performed by a mechanical debonding, which is sometimes called peel separation. The separation occurs at an interface between the release layer 3208 and the LC layer 3212, e.g., at the surface-treated release layer 3208 or one of different types of separately deposited release layers described above. The separate release layer 3208 or the surface treatment are designed to have sufficient adhesion at their interface that the bonded structure can survive normal in-process stresses but not be so strongly bonded that a strong force, which could break the thin device wafer, is needed to separate between the layers. The separation process can involve initiating a delamination between the release layer 3208 and the LC layer 3212 at an edge interface which propagates across the entire interface between the release layer 3208 and the LC layer 3212 using very low force to cause separation. The use of a thermoplastic bonding material and a low-surface-energy polymeric release layer, which can be a curable or thermoplastic composition, can be suitable for mechanical debonding. However, embodiments are not so limited and in some other embodiments, separation involves slide debonding. These embodiments take advantage of the reversible softening behavior of thermoplastic bonding materials. In this mode, the bonded structure is heated above the softening temperature of the bonding material and an opposing shear force is applied to the device and carrier wafers, causing them to slowly slide past one another until the structure is separated. In yet some other embodiments, separation involves laser debonding. In these embodiments, a laser beam is used to ablate, or decomposes the release layer 3208 into gaseous byproducts and a small amount of carbonaceous residue, when irradiated through the carrier substrate 3204 with a scanning laser.

Still referring to FIG. 32E, the LC layer 2704 on the thus separated target stack can be further processed, may be further processed according to different embodiments, as described above with respect to FIGS. 27A-27C, including polymerization, further aligning LC molecules above the bottommost LC molecules and stacking multiple LC layers.

Formation of Broadband Adaptive Lens Assemblies on Selected Substrate Areas

As described above with respect to various display devices, e.g., the wearable display device 1000 (FIG. 10), broadband adaptive lens assemblies e.g., a pair of broadband adaptive lens assemblies 1004, 1008 can be formed in an optical path 1016 that are interposed by a waveguide assembly 1012 for displaying both virtual and world images. However, in some implementations as a part of a wearable display device, the broadband adaptive lens assemblies may be formed on a portion of a substrate, e.g., on a portion of the waveguide assembly 1012 or a portion of a lens of goggles where they eye 210 is expected to view virtual images. In the following, various embodiments of forming broadband adaptive lens assemblies on selected substrate areas are described.

Figure 33:
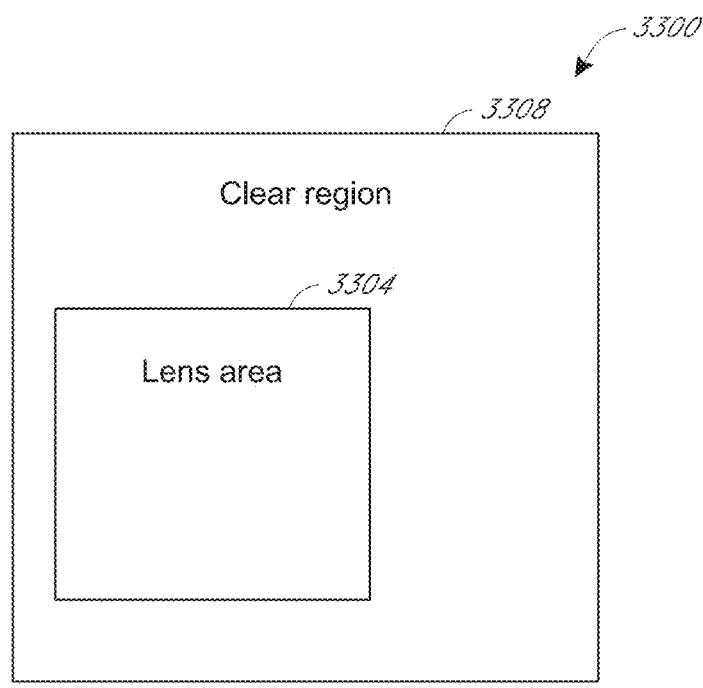
FIG. 33 illustrates an example of a switchable broadband waveplate comprising liquid crystals or a switchable broadband waveplate lens comprising liquid crystals formed on a portion of a substrate.

FIG. 33 illustrates an example of a switchable broadband waveplate comprising liquid crystals or a switchable broadband waveplate lens comprising liquid crystals formed on a portion of a substrate 3300. The substrate 3300 may represent, e.g., a portion of the waveguide assembly 1012 or a portion of a lens of the wearable display device 1000 (FIG. 10) such as goggles or eyeglasses. The substrate 3300 comprises a lens area 3204 on which an optically active switchable broadband waveplate or switchable broadband waveplate lens is to be formed, and a clear region 3308 which is to remain free of the switchable broadband waveplate or the switchable broadband waveplate lens.

Figure 34:
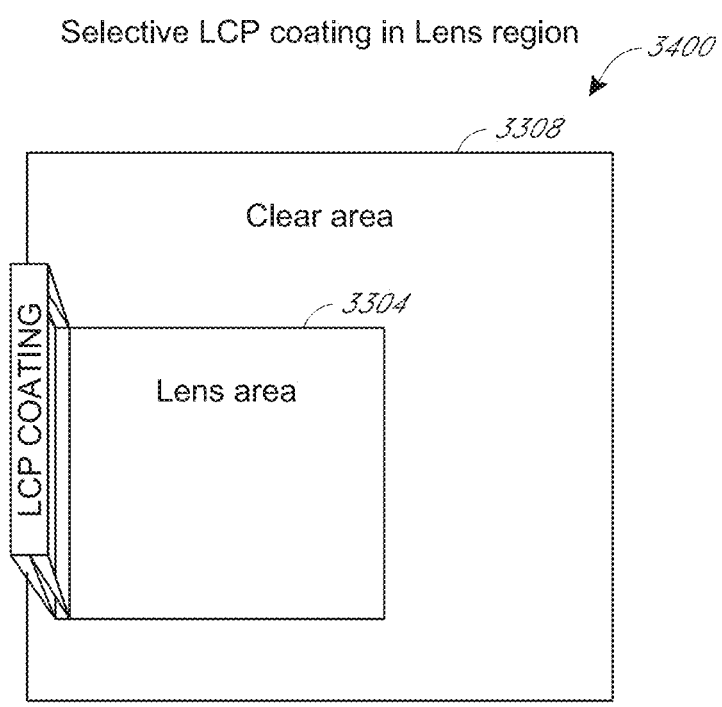
FIG. 34 illustrates an example method of forming a switchable broadband waveplate comprising liquid crystals or a switchable broadband waveplate lens comprising liquid crystals on a portion of a substrate by selective coating.

FIG. 34 illustrates a first example method of forming a switchable broadband waveplate comprising liquid crystals or a switchable broadband waveplate lens comprising liquid crystals on a portion of a substrate 3400 by selectively coating or depositing a LC layer 3404 of the switchable broadband waveplate or the broadband waveplate lens on the lens area 3204 while preventing their formation in the clear area 3308. The LC layer 3404 may be first coated in the form of a reactive mesogen mixture layer (including, e.g., liquid crystal monomers, solvents, photoinitiators, and surfactants) as described above with respect to FIGS. 27A-27C, followed by suitable subsequent processes, e.g., solvent evaporation and optional polymerization (for polymerized LC layers). In some embodiments, the selective coating can be performed using a suitable non-contact or contact process for depositing each layer, such as slot-die coating process, Gravure coating process or jet (ink-jet) coating process.

FIGS. 35A-35C illustrates an example method of forming a switchable broadband waveplate comprising liquid crystals or a switchable broadband waveplate lens comprising liquid crystals on a portion of a substrate by blanket coating a layer of liquid crystals and subtractively removing. Referring to FIG. 35A, a reactive mesogen layer 3504 (which may include, e.g., liquid crystal monomers, solvents, photoinitiators, and surfactants) is initially formed over an entire area of the substrate 3300 (FIG. 33) in a similar manner as described above with respect to FIGS. 27A-27C, followed by suitable subsequent processes, e.g., solvent evaporation. Thereafter, referring to FIG. 35B, the reactive mesogen layer in the lens region 3304 is selectively cured using an optical mask or a reticle to block the UV light in the clear region 3308, such that a polymerized LC layer 3508 is formed in the lens region 3304 while an uncured reactive mesogen layer 3512 remains in the clear area remains uncured (i.e., unpolymerized). Subsequently, referring to FIG. 35C, the uncured reactive mesogen layer 3512 is selectively removed from the clear region 3308 using a suitable solvent, resulting in a selectively coated substrate 3500C having the polymerized 3508 selectively remaining only in the lens region 3304.

Figures 36A, 36B, 36C:
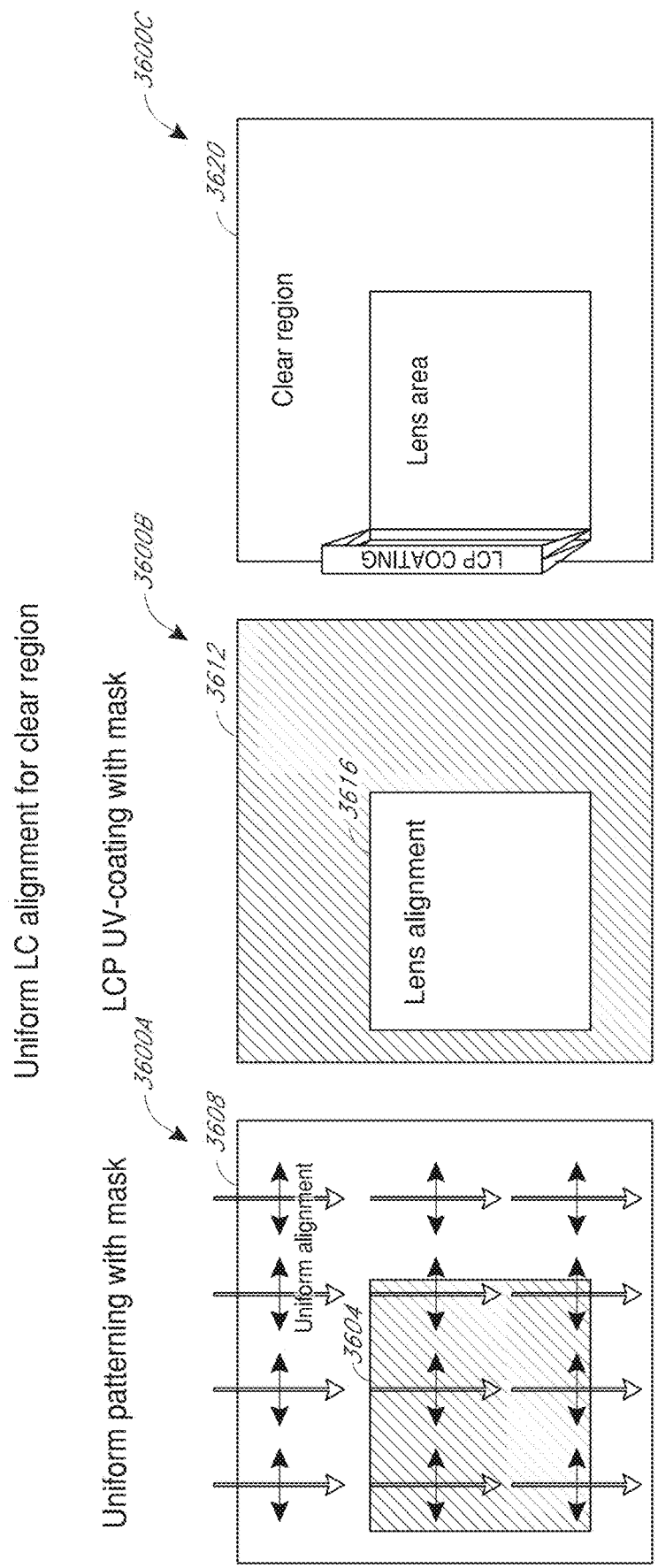
FIGS. 36A-36C illustrate an example method of forming a switchable broadband waveplate comprising liquid crystals or a switchable broadband waveplate lens comprising liquid crystals on a portion of a substrate by using selective optical patterning of an alignment layer.

FIG. 36A-36C illustrates an example method of forming a switchable broadband waveplate comprising liquid crystals or a switchable broadband waveplate lens comprising liquid crystals on a portion of a substrate by using selective optical patterning of an alignment layer. Referring to an intermediate structure 3600A illustrated in FIG. 36A, after blanket-depositing a photo-alignment layer, a first optical mask or a reticle 3604 is used to cover the lens area 3304 while exposing the clear region 3308 to uniform linearly polarized light. Thereafter, referring to an intermediate structure 3600B illustrated in FIG. 36B, using a second optical mask or a reticle 3616 which may be have an inverse mask pattern relative to the first optical mask 3604, the lens area 3304 is exposed to a polarization hologram using, e.g., the two-beam exposure process using orthogonally polarized UV laser beams described above with respect to FIG. 29, while the clear region 3308 is covered. As described above with respect to FIGS. 28 and 29A/29B, an interference of light having orthogonal polarizations causes the alignment layer to be configured to align the LC crystal molecules subsequently formed thereon according to a waveplate pattern or a waveplate lens pattern described with respect to various embodiments described above. Thus, as a result of the arrangements of the first and second optical masks 3604, 3616, the portion of the alignment layer 3616 (FIG. 36B) in the lens area is selectively configured to align LC molecules subsequently formed thereon. In contrast, the portion of the alignment layer 3608 (FIG. 36A) in the clear area is configured differently and lacks a waveplate pattern or a waveplate lens pattern described with respect to various embodiments described above. Thereafter, referring to an intermediate structure 3600C illustrated in FIG. 36C, reactive mesogen layer 3620 (which may include, e.g., liquid crystal monomers, solvents, photoinitiators, and surfactants) is blanket deposited over an entire area of the substrate including the clear region and lens area, in a similar manner as described above with respect to FIGS. 27A-27C, followed by suitable subsequent processes including, e.g., solvent evaporation and optional UV curing. In the resulting intermediate structure 3600C in FIG. 36C, while the entire surface area is covered with LC molecules, the LC molecules over the lens area are aligned according to the configuration of the underlying alignment layer and have systematic orientations to serve as a waveplate or a waveplate lens according to various embodiment s described above, while the LC molecules over the clear region lack systematic orientations to serve as a waveplate or waveplate lens.

FIG. 37A-37B illustrates an example method of forming a switchable broadband waveplate comprising liquid crystals or a switchable broadband waveplate lens comprising liquid crystals on a portion of a substrate by using selective nanoimprinting an alignment layer. Referring to an intermediate structure 3700A illustrated in FIG. 37A, a nanoimprinted alignment layer is formed over the substrate surface, where the nanoimprinted alignment layer has different patterns between the lens area 3304 and the clear region 3308. In particular, the portion of the nanoimprinted alignment layer 3708 (FIG. 37A) in the lens area 3304 is configured to align the LC crystal molecules subsequently formed thereon according to a waveplate pattern or a waveplate lens pattern described with respect to various embodiments described above. In contrast, the portion of the lens alignment layer 3608 (FIG. 37A) in the clear area is configured differently and lacks a waveplate pattern or a waveplate lens pattern described with respect to various embodiments described above. Subsequently, referring to an intermediate structure 3700B illustrated in FIG. 37B, a reactive mesogen layer 3712 (which may include, e.g., liquid crystal monomers, solvents, photoinitiators, and surfactants) may be blanket deposited over both the clear region 3308 and the lens area 3304, in a similar manner as described above with respect to FIGS. 27A-27C, followed by suitable subsequent processes including, e.g., solvent evaporation and optional UV curing. In the resulting intermediate structure 3600C, while the entire surface area is covered with LC molecules, the LC molecules over the lens area 3304 are aligned according to the configuration of the underlying imprinted alignment layer and have systematic orientations to serve as a waveplate or a waveplate lens according to various embodiments described above, while the LC molecules formed over the clear region 3308 lack systematic orientations to serve as a waveplate or waveplate lens.

Additional Examples

In a $1^{st}$ example, a display device comprises a waveguide configured to guide light in a lateral direction parallel to an output surface of the waveguide. The waveguide is further configured to outcouple the guided light through the output surface. The display device additionally comprises a broadband adaptive lens assembly configured to incouple and to diffract therethrough the outcoupled light from the waveguide. The broadband adaptive lens assembly comprises a first waveplate lens comprising a liquid crystal (LC) layer arranged such that the waveplate lens has birefringence ($\Delta n$) that varies in a radially outward direction from a central region of the first waveplate lens and configured to diffract the outcoupled light at a diffraction efficiency greater than 90% within a wavelength range including at least 450 nm to 630 nm. The broadband adaptive lens assembly is configured to be selectively switched between a plurality of states having different optical powers.

In a $2^{nd}$ example, in the display device of the $1^{st}$ example, the $\Delta n$ of the first waveplate lens increases with increasing wavelength ($\lambda$) within the wavelength range.

In a $3^{rd}$ example, in the display device of the $1^{st}$ example or the $2^{nd}$ example, the broadband adaptive lens assembly comprises a plurality of liquid crystal layers, wherein each of the liquid crystal layer comprises liquid crystal molecules that are successively twisted in a layer normal direction.

In a $4^{th}$ example, in the display device of any one of $1^{st}$ to $3^{rd}$ examples, when the outcoupled light has a polarization, the broadband adaptive lens assembly is configured to be selectively switched between at least two lens states. The two lens states include a first lens state configured to converge or diverge the outcoupled light from the waveguide according to a first optical power and to alter a polarization of the outcoupled light, and a second lens state configured to converge or diverge the outcoupled light from the waveguide according to a second optical power without altering the polarization of the outcoupled light.

In a $5^{th}$ example, in the display device of any of the $1^{st}$ to $4^{th}$ examples, the broadband adaptive lens assembly further comprises a second waveplate lens comprising a second liquid crystal layer and a switchable waveplate interposed between the first waveplate lens and the second waveplate lens, wherein the broadband adaptive lens assembly is configured to be selectively switched between the at least two states by electrically activating and deactivating the switchable waveplate.

In $6^{th}$ example, in the display device of any of the $1^{st}$ to $5^{th}$ examples, the switchable waveplate comprises twisted nematic liquid crystals, and wherein electrically activating alters a degree twist of the twisted nematic liquid crystals across a thickness of the switchable waveplate.

In a $7^{th}$ example, in the display device any of the $1^{st}$ to $5^{th}$ examples, when the switchable waveplate is activated, the switchable waveplate serves as a half waveplate configured to invert the handedness of a circularly polarized light passing therethrough, while when the switchable waveplate is deactivated, the switchable waveplate is configured to conserve the handedness of the circularly polarized light passing therethrough.

In an $8^{th}$ example, in the display device of any of the $1^{st}$ to $7^{th}$ examples, each of the first and second waveplate lenses is configured to invert the handedness of the circularly polarized light passing therethrough, and wherein when the switchable waveplate is activated, the first and second waveplate lenses exert optical powers having opposite signs.

In a $9^{th}$ example, in the display device of any of the $1^{st}$ to $7^{th}$ examples, each of the first and second waveplate lenses is configured to invert the handedness of the circularly polarized light passing therethrough, and wherein when the switchable waveplate is deactivated, the first and second waveplate lenses exert optical powers having the same sign.

In a $10^{th}$ example, in the display device any of the $1^{st}$ to $5^{th}$ examples, when the switchable waveplate is deactivated, the broadband adaptive lens assembly has a net optical power having a magnitude that is proportional to a sum of magnitudes of optical powers of the first and second waveplate lenses, while when the switchable waveplate is in an activated state, the adaptive lens assembly has a net optical power having a magnitude that is proportional to a difference between magnitudes of optical powers the first and second waveplate lenses.

In an $11^{th}$ example, in the display device of any of the $1^{st}$ to $10^{th}$ examples, the first and second waveplate lenses have optical powers having about the same magnitude, such that when the switchable waveplate is electrically activated, the net optical power is about zero.

In a $12^{th}$ example, in the display device of any of the $1^{st}$ to $11^{th}$ examples, the first waveplate lens is electrically switchable, wherein the broadband adaptive lens assembly further comprises a second waveplate lens that is electrically switchable and comprises a second liquid crystal (LC) layer arranged such that the second waveplate lens has birefringence ($\Delta n$) that varies in a radially outward direction from a central region of the second waveplate lens and configured to diffract the outcoupled light at a diffraction efficiency greater than 90% within the wavelength range, wherein the broadband adaptive lens assembly is configured to be selectively switched between the at least two states by switching one or both of the first and second waveplate lenses.

In a $13^{th}$ example, in the display device of any of the $1^{st}$ to $12^{th}$ examples, when activated, each of the first and second switchable waveplates serves as a half waveplate configured to invert the handedness of a circularly polarized light passing therethrough, while when deactivated, each of the first and second switchable waveplates is configured to conserve the handedness of the circularly polarized light passing therethrough.

In a $14^{th}$ example, in the display device of any of the $1^{st}$ to $13^{th}$ examples, each of the first and second waveplate lenses is configured to have optical powers having opposite signs when passing therethrough circularly polarized light having opposite polarizations.

In a $15^{th}$ example, in the display device of any of the $1^{st}$ to $14^{th}$ examples, the broadband adaptive lens assembly has a net optical power having a magnitude that is proportional to a sum of magnitudes of optical powers of the first and second waveplate lenses, such that by selectively activating one or both of the first and second waveplate lenses, for the given polarization of the outcoupled light, the broadband adaptive lens assembly is configured to be selectively switched between four states.

In a $16^{th}$ example, a broadband adaptive lens assembly for a display device comprises a first waveplate lens comprising a liquid crystal (LC) layer having LC molecules arranged such that the first waveplate lens has birefringence (Δn) that varies in a radially outward direction from a central region of the first waveplate lens and configured to diffract light at a diffraction efficiency greater than 90% within a wavelength in a range spanning at least 450 nm to 630 nm. The broadband adaptive lens assembly additionally comprises a switchable waveplate configured to be electrically activated and deactivated. The broadband adaptive lens assembly is configured to be selectively switched between at least two lens states. The two lens states include a first lens state configured to exert a first lens effect according to a first optical power and to alter a polarization of light passing through the broadband adaptive lens assembly, and a second lens state configured to exert a second lens effect according to a second optical power and to preserve the polarization of the light passing through the broadband adaptive lens assembly.

In a 17$^{th}$ example, in the broadband adaptive lens assembly of the 16$^{th}$ example, the switchable waveplate is a switchable half waveplate (HWP) configured to reverse the handedness of a circular polarized light when deactivated, while preserving the handedness of the circular polarized light when activated.

In an 18$^{th}$ example, in the broadband adaptive lens assembly of the 16$^{th}$ example or the 17$^{th}$ example, the switchable HWP comprises a twisted nematic liquid crystal (TN LC) switch, wherein the TN LC switch comprises a switchable TN LC layer and is configured to reverse the polarization of a linearly polarized light when electrically deactivated, and to preserve the polarization of the linearly polarized light when electrically activated, and wherein the switchable TN LC layer comprises a plurality of elongated nematic LC molecules having twist angles that vary in a layer normal direction of the switchable TN LC layer.

In a 19$^{th}$ example, in the broadband adaptive lens assembly of any of the 16$^{th}$ to 18$^{th}$ examples, the switchable TN LC switch comprises the switchable TN LC layer formed between an upper alignment layer and a lower alignment layer, wherein the upper alignment layer is configured to align a director of the elongated nematic LC molecules that are immediately adjacent to the upper alignment layer in a first lateral direction, and wherein the lower alignment layer is configured to align a director of the elongated nematic LC molecules that are immediately adjacent to the lower alignment layer in a second lateral direction crossing the first lateral direction.

In a 20$^{th}$ example, in the broadband adaptive lens assembly of any of the 16$^{th}$ to 19$^{th}$ examples, one or both of the upper alignment layer and the lower alignment layer comprise a polymer layer comprising polyimide or polyamide.

In a 21$^{st}$ example, in the broadband adaptive lens assembly of any of the 16$^{th}$ to 19$^{th}$ examples, one or both of the upper alignment layer and the lower alignment layer comprise patterned nanostructures.

In a 22$^{nd}$ example, in the broadband adaptive lens assembly of any of the 16$^{th}$ to 21$^{st}$ examples, the one or both of the upper alignment layer and the lower alignment layer serve as an electrode or electrodes configured to apply an electric field across the switchable TN LC layer.

In a 23$^{rd}$ example, in the broadband adaptive lens assembly of any of the 16$^{th}$ to 18$^{th}$ examples, the TN LC switch comprises a pair of interlaced first and second electrodes on one side of the switchable TN LC layer, wherein the TN LC switch is configured to be switched by applying an electric field between the pair of interlaced first and second electrodes.

In a 24$^{th}$ example, in the broadband adaptive lens assembly of any of the 16$^{th}$ to 18$^{th}$ examples, the switchable half waveplate (HWP) comprises the TN LC switch interposed between a pair of broadband quarter waveplate (QWP) stacks.

In a 25$^{th}$ example, in the broadband adaptive lens assembly of any of the 16$^{th}$ to 24$^{th}$ examples, each of the broadband QWP stacks comprises a plurality of directly stacked polymerized TN LC layers.

In a 26$^{th}$ example, in the broadband adaptive lens assembly of any of the 16$^{th}$ to 18$^{th}$ examples, the switchable HWP comprises the switchable TN LC layer that is directly interposed between a pair of one or more polymerized TN LC layers, wherein the polymerized TN LC layers contacting the switchable TN LC layer serve as alignment layers for aligning the elongated nematic LC molecules of the switchable TN LC layer.

In a 27$^{th}$ example, in the broadband adaptive lens assembly of any of the 16$^{th}$ to 25$^{th}$ examples, each of the directly stacked polymerized TN LC layers has a thickness across which LC molecules that are twisted by a twist angle, wherein adjacent ones of the directly stacked TN LC layers have different twist angles.

In a 28$^{th}$ example, in the broadband adaptive lens assembly of any of the 16$^{th}$ to 27$^{th}$ examples, the broadband adaptive lens assembly further comprises a second waveplate lens comprising a second liquid crystal (LC) layer having LC molecules arranged such that the second waveplate lens has birefringence (Δn) that varies in a radially outward direction from a central region of the second waveplate lens and configured to diffract light at a diffraction efficiency greater than 90% within a wavelength in the range spanning at least 450 nm to 630 nm, wherein the switchable waveplate is interposed between the first waveplate lens and the second waveplate lens.29.

In a 29$^{th}$ example, a broadband adaptive lens assembly for a display device comprises a first waveplate lens comprising a liquid crystal (LC) layer formed on a substrate. The LC layer has LC molecules that are arranged such that the first waveplate lens has birefringence (Δn) that varies in a radially outward direction from a central region of the LC layer and configured to diffract light at a diffraction efficiency greater than 90% within a wavelength range spanning at least 450 nm to 630 nm. Ones of the LC molecules that are the closest to the substrate have generally the same orientation direction at different locations at the same radius from the central region. The broadband adaptive lens assembly is configured to be selectively switched between at least two lens states. A first lens state is configured to exert a first lens effect according to a first optical power and to alter a polarization of light passing through the broadband adaptive lens assembly. A second lens state is configured to exert a second lens effect according to a second optical power and to preserve the polarization of the light passing through the broadband adaptive lens assembly.

In a 30$^{th}$ example, in the broadband adaptive lens assembly of the 29$^{th}$ example, the LC layer is arranged in a plurality of concentric zones, wherein each of the concentric zones has a range of radius within which the ones of the LC molecules that are the closest to the substrate have generally the same orientation direction.

In a 31$^{st}$ example, in the broadband adaptive lens assembly of the 29$^{th}$ example or the 30$^{th}$ example, the ones of the LC molecules that are the closest to the substrate have azimuthal twist angles that vary with radius according to a mathematical function.

In a 32$^{nd}$ example, in the broadband adaptive lens assembly of any of the 29$^{th}$ to 31$^{st}$ examples, the Δn of the LC layer increases with increasing wavelength within the wavelength range.

In a 33$^{rd}$ example, in the broadband adaptive lens assembly of any of the 29$^{th}$ to 32$^{nd}$ examples, ones of the LC molecules that are within the same concentric zone have generally the same twist angle at different depths of the LC layer.

In a 34$^{th}$ example, in the broadband adaptive lens assembly of any of the 29$^{th}$ to 33th examples, the first waveplate lens comprises a plurality of LC layers, wherein each of the LC layers comprises LC molecules that are successively twisted in a layer normal direction.

In a 35$^{th}$ example, in the broadband adaptive lens assembly of any of the 29$^{th}$ to 34$^{th}$ examples, each of the LC layers has a thickness across which the LC molecules are twisted by a twist angle, wherein the LC layers have different twist angles.

In a 36$^{th}$ example, in the broadband adaptive lens assembly of any of the 29$^{th}$ to 34$^{th}$ examples, adjacent ones of the LC layers forming an interface have opposite twist angles.

In a 37$^{th}$ example, in the broadband adaptive lens assembly any of the 29$^{th}$ to 36$^{th}$ examples, the LC molecules of the adjacent ones of the LC layers at about the same depth from the interface have generally the same orientation.

In a 38$^{th}$ example, in the broadband adaptive lens assembly any of the 29$^{th}$ to 37$^{th}$ examples, the first waveplate lens is interposed between a pair of transparent electrodes and configured to be electrically activated and deactivated by application of an electrical signal to the transparent electrodes.

In a 39$^{th}$ example, the broadband adaptive lens assembly of any of the 29$^{th}$ to 38$^{th}$ examples further comprises a first passive waveplate lens having a first optical power (P1) and a second passive waveplate lens having a second optical power (P2), wherein the first waveplate lens is in contact with and interposed between the first and second passive waveplate lenses.

In a 40$^{th}$ example, in the broadband adaptive lens assembly of any of the 29$^{th}$ to 39$^{th}$ examples, the first waveplate lens is configured to have a third optical power (P3) when deactivated and about zero optical power when activated.

In a 41$^{st}$ example, in the broadband adaptive lens assembly of any of the 29$^{th}$ to 40$^{th}$ examples, each of the first and second passive waveplate lenses are half waveplates and the first waveplate lens is configured to be a half waveplate when deactivated.

In a 42$^{nd}$ example, in the broadband adaptive lens assembly of any of the 29$^{th}$ to 39$^{th}$ examples, the first and second passive waveplate lenses and the first waveplate lens are integrated into a single stack.

In a 43$^{rd}$ example. an integrated broadband adaptive lens assembly for a display device comprises a first electrode, a second electrode and a liquid crystal (LC) layer stack interposed between the first electrode and the second electrode. The LC layer stack comprises a switchable liquid crystal (LC) layer comprising unpolymerized LC molecules interposed between first and second polymerized LC layers each comprising polymerized LC molecules. LC molecules in the switchable LC layer that are adjacent to LC molecules in the first polymerized LC layer are generally elongated in a first direction. LC molecules in the switchable LC layer that are adjacent to LC molecules in the second polymerized LC layer are generally elongated in a second direction crossing the first direction. The switchable LC layer comprises LC molecules configured such that under a first voltage condition across the first and second electrodes, a polarization of incident light passing therethrough is preserved, while under a second voltage condition across the first and second electrodes, the polarization of the incident light passing therethrough is altered.

In a 44$^{th}$ example, in the integrated broadband adaptive lens assembly of the 43$^{rd}$ example, the switchable LC layer contacts at least one of the first and second polymerized LC layers.

In a 45$^{th}$ example, in the integrated broadband adaptive lens assembly of any of the 43$^{rd}$ example or the 44$^{th}$ example, the switchable LC layer comprises twisted nematic LC molecules having a net twist angle at about 90 degrees, such that under the second voltage condition, the switchable LC layer converts linearly polarized light having a first polarization direction into linearly polarized light having a second polarization direction perpendicular to the first direction.

In a 46$^{th}$ example, in the integrated broadband adaptive lens assembly of any of the 43$^{rd}$ to 45$^{th}$ examples, each of the first and second polymerized LC layers comprises twisted nematic LC molecules and serves as a quarter wave plate.

In a 47$^{th}$ example, in the integrated broadband adaptive lens assembly of any of the 43$^{rd}$ to 46$^{th}$ examples, the LC layer stack comprises a plurality of polymerized LC layers formed on opposing sides of the switchable LC layer, wherein each of the polymerized LC layers forms an interface with an adjacent one of the polymerized LC layers, and wherein LC molecules adjacent to the interface in the each of the polymerized LC layers are generally elongated in the same direction as LC molecules adjacent to the interface in the adjacent one of the polymerized LC layers.

In a 48$^{th}$ example, in the integrated broadband adaptive lens assembly of any of the 43$^{rd}$ to 47$^{th}$ examples, the LC molecules of each of the switchable LC layer and the first and second polymerized LC layers are arranged such that a birefringence (Δn) of the LC molecules varies in a radially outward direction from a central region.

In a 49$^{th}$ example, in the integrated broadband adaptive lens assembly of any of the 43$^{rd}$ to 48$^{th}$ examples, the Δn increases with increasing wavelength (λ) within a wavelength range including at least 450 nm to 630 nm.

In a 50$^{th}$ example, in the integrated broadband adaptive lens assembly of any of the 43$^{rd}$ to 48$^{th}$ examples, the LC layer stack comprises two switchable LC layers each comprising twisted nematic LC molecules that are successively twisted in a layer normal direction.

In a 51$^{st}$ example, in the integrated broadband adaptive lens assembly of any of the 43$^{rd}$ to 50$^{th}$ examples, the twisted nematic LC molecules of the two switchable LC layers are symmetrically twisted with respect to an interface formed between the two switchable LC layers by a net angle between about 60 degrees and 80 degrees.

In a 52$^{nd}$ example, in the integrated broadband adaptive lens assembly of any of the 43$^{rd}$ to 48$^{th}$ examples, wherein the switchable LC layer comprises twisted nematic LC molecules configured such that under the second voltage condition, the switchable LC layer serves as a half waveplate.

In a 53$^{rd}$ example, in the integrated broadband adaptive lens assembly of any of the 43$^{rd}$ to 48$^{th}$ examples, each of the first and second polymerized LC layers comprises twisted nematic LC molecules and serves as a half wave plate.

In a 54$^{th}$ example, a display device comprises a pair of adaptive lens assemblies in an optical path. Each of the adaptive lens assemblies comprises a corresponding switchable waveplate configured to diffract light at a diffraction efficiency greater than 90% within a wavelength range including at least 450 nm to 630 nm and to switch between first and second states to selectively alter a polarization state of light passing therethrough. The adaptive lens assemblies have optical powers with opposite signs.

In a 55$^{th}$ example, in the display device of the 54$^{th}$ example, each of the adaptive lens assemblies has a respective optical power that is adjustable based upon a state of the switchable waveplate of the adaptive lens assembly.

In a 56$^{th}$ example, the display device of the 54$^{th}$ example or the 55$^{th}$ example further comprises a controller configured such that, when a first optical power of a first one of the pair of adaptive lens assemblies is a first value, a second optical power of a second one of the pair of adaptive lens assemblies is correspondingly adjusted two a second value, such that the net optical power of the pair of adaptive lens assemblies remains at about a constant value.

In a 57$^{th}$ example, in the display device of any of the 54$^{th}$ to 56$^{th}$ examples, the constant value is about 0 m$^{-1}$.

In a 58$^{th}$ example. in the display device of any of the 54$^{th}$ to 57$^{th}$ examples, each of the adaptive lens assemblies comprises first and second waveplate lenses interposed by the corresponding switchable waveplate of the lens assembly, wherein each of the waveplate lenses is configured to alter a polarization state of light passing therethrough.

In a 59$^{th}$ example, in the display device of any of the 54$^{th}$ to 58$^{th}$ examples, the display device further comprises a waveguide assembly interposed between the pair of adaptive lens assemblies, wherein the waveguide assembly comprises a waveguide configured to outcouple light propagating therein into one of the adaptive lens assemblies.

In a 60$^{th}$ example, in the display device of any of the 54$^{th}$ to 59$^{th}$ examples, each of the adaptive lens assemblies comprises a plurality of waveplate lenses and a plurality switchable waveplates, wherein the waveplate lenses and the switchable waveplates are alternatingly stacked.

In a 61$^{st}$ example, in the display device of any of the 54$^{th}$ to 60$^{th}$ examples, different ones of the switchable waveplates and waveplate lenses have different optical powers.

In a 62$^{nd}$ example, an adaptive lens assembly comprises one or more waveplate lenses and one or more switchable waveplates aligned in an optical path. Each of the one or more waveplate lenses is configured to diffract outcoupled light at a diffraction efficiency greater than 90% within a wavelength range including at least 450 nm to 630 nm, to alter a polarization state of light passing therethrough, to provide a first optical power for light having a first polarization, and to provide a second optical power for light having a second polarization. Each of the one or more switchable waveplates is configured to diffract the outcoupled light at a diffraction efficiency greater than 90% within a wavelength range including at least 450 nm to 630 nm and is selectively switchable between a first state configured to pass the light therethrough without altering a polarization state of the light, and a second state configured to alter the polarization state of the light passing therethrough.

In a 63$^{rd}$ example, in the adaptive lens assembly of the 62$^{nd}$ example, one or both of the waveplate lenses and the switchable waveplates comprise liquid crystals.

In a 64$^{th}$ example, in the adaptive lens assembly of the 62$^{nd}$ example or the 63$^{rd}$ example, each of the one or more switchable waveplates in the second state is a half waveplate configured to invert a handedness of circularly polarized light.

In a 65$^{th}$ example, in the adaptive lens assembly of any of the 62$^{nd}$ to 64$^{th}$ examples, each of the switchable waveplates is interposed between a pair of the one or more waveplate lenses.

In a 66$^{th}$ example, in the adaptive lens assembly any of the 62$^{nd}$ to 65$^{th}$ examples, the adaptive lens assembly comprises a plurality of the waveplate lenses and a plurality of the switchable waveplates, wherein the waveplate lenses and the switchable waveplate are alternatingly stacked.

In a 67$^{th}$ example, a wearable augmented reality head-mountable display system comprises a light modulating system configured to output light to form an image, a head mountable frame, one or more waveguides attached to the frame and configured to receive the light from the light modulating system and a pair of adaptive lens assemblies, wherein the one or more waveguides are disposed between the adaptive lens assemblies. Each of the adaptive lens assemblies comprises one or more waveplate lenses configured to diffract outcoupled light at a diffraction efficiency greater than 90% within a wavelength range including at least 450 nm to 630 nm and to provide a first optical power for light having a first polarization, and to provide a second optical power for light having a second polarization. The each of the adaptive lens assemblies additionally comprises one or more switchable waveplates in an optical path, wherein each of the one or more switchable waveplates is configured to diffract the outcoupled light at a diffraction efficiency greater than 90% within a wavelength range including at least 450 nm to 630 nm and to selectively alter a polarization state of light passing therethrough. The adaptive lens assemblies are configured to provide a respective optical power that is adjustable upon application of a respective electrical signal.

In a 68$^{th}$ example, a method of integrating a broadband adaptive lens assembly comprises forming a lower stack and an upper stack. The lower stack comprises a first electrode layer formed on a first substrate, a first alignment layer formed on the first electrode layer, and a first polymerized LC layer on the first alignment layer. The upper stack comprises a second electrode layer formed on a second substrate, a second alignment layer formed on the second electrode, and a second polymerized LC layer on the second alignment layer. The method additionally includes, after forming the lower and upper stacks, stacking the upper stack and the lower stack such that the first and second polymerized LC layers face each other, wherein stacking comprises forming spacers to create a gap between the upper and lower stacks. The method additionally comprises filling the gap with unpolymerized LC molecules to form a switchable liquid crystal (LC) layer. Forming the switchable LC layer comprises self-aligning LC molecules in the switchable LC layer that are adjacent to LC molecules in the first polymerized LC layer to be generally elongated in a first direction, and self-aligning LC molecules in the switchable LC layer that are adjacent to LC molecules in the second polymerized LC layer to be generally elongated in a second direction crossing the first direction.

In a 69$^{th}$ example, in the method of the 68$^{th}$ example, forming the switchable LC layer comprises configuring LC molecules of the switchable LC layer such that under a first voltage condition across the first and second electrode layers, a polarization of incident light passing therethrough is preserved, while under a second voltage condition across the first and second electrodes, the polarization of the incident light passing therethrough is altered.

In a 70th example, in the method of the 68th example or the 69th example, the switchable LC layer contacts at least one of the first and second polymerized LC layers.

In a 71st example, in the method of any of the 68th to 70th examples, self-aligning the LC molecules in the switchable LC layer comprises forming twisted nematic LC molecules having a net twist angle at about 90 degrees, such that under the second voltage condition, the switchable LC layer converts linearly polarized light having a first polarization direction into linearly polarized light having a second polarization direction perpendicular to the first direction.

In a 72nd example, in the method of any of the 68th to 71st examples, each of the first and second polymerized LC layers comprises twisted nematic LC molecules and serves as a quarter wave plate.

In a 73rd example, in the method of any the 68th to 72nd examples, each of forming the lower stack and forming the upper stack comprises forming a plurality of polymerized LC layers. Each of the polymerized LC layers forms an interface with an adjacent one of the polymerized LC layers, wherein LC molecules adjacent to the interface in each of the polymerized LC layers are generally elongated in the same direction as LC molecules adjacent to the interface of the adjacent one of the polymerized LC layers.

In a 74th example, in the method of any of the 68th to 73rd examples, the LC molecules of each of the switchable LC layer and the first and second polymerized LC layers are arranged such that a birefringence ($\Delta n$) of the LC molecules varies in a radially outward direction from a central region in each of the switchable LC layer and the first and second polymerized LC layers.

In a 75th example, in the method of any of the 68th to 74th examples, the $\Delta n$ increases with increasing wavelength ($\lambda$) within a wavelength range including at least 450 nm to 630 nm.

In a 76th example, in the method of any of the 68th to 74th examples, the LC layer stack comprises two switchable LC layers each comprising twisted nematic LC molecules that are successively twisted in a layer normal direction.

In a 77th example, the method of any of the 68th to 76th examples comprises forming two switchable LC layers that are symmetrically twisted with respect to an in interface between the two switchable LC layers by a net angle between about 60 degrees and 80 degrees.

In a 78th example, in the method of any of the 68th to 77th example, the switchable LC layer comprises twisted nematic LC molecules configured such that under the second voltage condition, the switchable LC layer serves as a half waveplate.

In a 79th example, in the method of any of the 74th to 78th examples, each of the first and second polymerized LC layers comprises twisted nematic LC molecules and serves as a half wave plate.

In an 80th example, a method of fabricating a broadband waveplate lens assembly comprises providing a transparent substrate and forming an alignment layer on the transparent substrate. The alignment layer is configured to cause liquid crystal (LC) molecules formed thereon to align according to a waveplate lens pattern. The method additionally includes forming a LC layer on the alignment layer. LC molecules of the LC layer that are immediately adjacent to the alignment layer align according to the waveplate lens pattern in which the LC molecules of the LC layer at a given radius from a central region of the waveplate lens pattern have elongation directions that are generally aligned in the same direction. The LC layer is configured to diffract light at a diffraction efficiency greater than 90% within a wavelength range including at least 450 nm to 630 nm. The broadband adaptive lens assembly is configured to be selectively switched between a plurality of states having different optical powers.

In an 81st example, in the method of the 80th example, forming the LC layer comprises arranging the LC molecules of the switchable LC layer such that a birefringence ($\Delta n$) of the LC layer increases with increasing wavelength ($\lambda$) within the wavelength range including at least 450 nm to 630 nm.

In an 82nd example, the method of the 80th example or the 81st example further comprises forming a second LC layer on the LC layer, wherein each of the LC layer and the second LC layer comprises twisted nematic LC molecules that are successively twisted in a layer normal direction.

In an 83rd example, in the method any of the 80th to 82nd examples, the twisted nematic LC molecules of the LC layer and the second LC layer are symmetrically twisted with respect to an interface formed by the LC layer and the second LC layer by a net angle between about 60 degrees and 80 degrees.

In an 84th example, in the method of any of the 80th to 83rd examples, forming the alignment layer comprises configuring a photo-alignment layer by illuminating the alignment layer with two light beams having orthogonal polarizations.

In an 85th example, in the method of any of the 80th to 84th examples, forming the alignment layer comprises configuring a photo-alignment layer by illuminating the alignment layer with a light beam partially diffracted through a master lens, wherein the master lens comprises LC crystals arranged according to the waveplate lens pattern.

In an 86th example, in the method of any of the 80th to 85th examples, forming the alignment layer comprises forming a nanoimprint alignment layer having nanostructures whose elongation direction has the same dependence on the radius from a central region of the waveplate lens as the elongation directions of the LC molecules of the LC layer.

In an 87th example, in the method of any of the 80th to 86th examples, forming the alignment layer comprises forming a plurality of concentric zones, wherein each of the zones has nanostructures elongated in the same direction.

In an 88th example, in the method of any of the 80th to 87th examples, the transparent substrate is a sacrificial carrier wafer, and the method additionally comprises forming a release layer interposed between the alignment layer and the LC layer. The method additionally comprises attaching a target substrate on the LC layer. The method further comprises transferring the LC layer to the transparent substrate by separating the LC layer from the release layer.

In an 89th example, the method of any of the 80th to 88th examples comprises forming the broadband waveplate lens assembly on a selected portion of the transparent substrate smaller than a major surface area of the transparent substrate.

In a 90th example, in the method any of the 80th to 89th examples, wherein forming the LC layer comprises selectively depositing the LC molecules over the selected portion.

In a 91st example, in the method of any of the 80th 90th examples, forming the LC layer comprises blanket depositing an unpolymerized LC layer over the substrate, selectively exposing the unpolymerized LC layer over the selected portion to form a polymerized LC layer while leaving a portion of the unpolymerized LC layer unpolymerized, and removing the portion of the unpolymerized LC layer.

In a 92nd example, in the method of any of the 80th to 91st examples, forming the alignment layer comprises blanket depositing an alignment layer over the transparent substrate and selectively configuring the LC molecules over the selected area to cause the LC molecules of the LC layer formed thereon to align according to the waveplate pattern, and wherein forming the LC layer comprises blanket depositing an unpolymerized LC layer over the substrate.

In a 93$^{rd}$ example, in the method of any of the 80$^{th}$ to 92$^{nd}$ examples, forming the alignment layer comprises forming patterned nanostructures over the selected area to cause the LC molecules of the LC layer formed thereon to align according to the waveplate pattern, and wherein forming the LC layer comprises blanket depositing an unpolymerized LC layer over the substrate.

In a 94$^{th}$ example, a head mounted display system is configured to project light to an eye of a user to display augmented reality image content in a vision field of the user. The head-mounted display system comprises a frame configured to be supported on a head of the user. The display system additionally comprises an eyepiece disposed on the frame. At least a portion of the eyepiece is transparent and disposed at a location in front of the user's eye when the user wears the head-mounted display such that the transparent portion transmits light from the environment in front of the user to the user's eye to provide a view of the environment in front of the user. The eyepiece is configured to emit light into the user's eye to display augmented reality image content to the user's vision field. At least one switchable lens assembly comprises a diffractive liquid crystal lens assembly comprising a twisted nematic switchable lens. The twisted nematic switchable lens comprises an active layer of twisted nematic liquid crystal, a first layer of polymerized liquid crystal adjacent to the active layer of twisted nematic liquid crystal, a second layer of polymerized liquid crystal adjacent to the active layer of twisted nematic liquid crystal. The active layer of twisted nematic liquid crystal disposed between the first and second layers of polymerized liquid crystal. The nematic switchable lens further comprises first and second electrodes disposed to applying an electric field to the active layer of twisted nematic liquid crystal. The first and second electrodes are on opposite sides of the active layer and the first and second layers of polymerized liquid crystal such that the active layer and the first and second layers of polymerized liquid crystal are disposed between the first and second electrodes. The head mounted display additionally comprises electronics configured to vary the optical power of the switchable lens by applying an electrical signal to the electrodes. The at least one switchable lens assembly is configured to transmit light from the environment in front of the user to the user's eye.

In a 95$^{th}$ example, in the display device of the 94$^{th}$ example, the active layer comprises a diffractive lens.

In a 96$^{th}$ example, in the display device of the 94$^{th}$ or 95$^{th}$ examples, the first and second layers of polymerized liquid crystal comprise diffractive lenses.

In a 97$^{th}$ example, in the display device of any of the 94$^{th}$ to 96$^{th}$ examples, the first and second layers of polymerized liquid crystal are alignment layers for the active liquid crystal layer.

In a 98$^{th}$ example, the display device of any of the 94$^{th}$ to 97$^{th}$ examples further comprises first and second alignment layers disposed adjacent first and second layers of polymerized liquid crystal, respectively. The first and second alignment layers are on respective sides of the first and second layers of polymerized liquid crystal opposite the active layer.

In a 99$^{th}$ example, in the display device of any of the 94$^{th}$ to 98$^{th}$ examples, at least the first electrodes comprise interdigitated electrodes.

In a 100$^{th}$ example, in the display device of any of the 94$^{th}$ to 99$^{th}$ examples, wherein the at least one switcheable lens assembly is configured to transmit light directed into the user's eye to display augmented reality image content to the user's vision field.

In a 101$^{st}$ example, in the display device of any of the 94$^{th}$ to 100$^{th}$ examples, the at least one switchable lens assembly comprises two switchable lens assemblies, where one is disposed to transmit light directed into the user's eye to display augmented reality image content to the user's vision field and both are configured to transmit light from the environment in front of the user to the user's eye.

In a 102$^{nd}$ example, a head mounted display system is configured to project light to an eye of a user to display augmented reality image content in a vision field of the user. The head-mounted display system comprises a frame configured to be supported on a head of the user. The system additionally comprises an eyepiece disposed on the frame. At least a portion of the eyepiece is transparent and disposed at a location in front of the user's eye when the user wears the head-mounted display such that the transparent portion transmits light from the environment in front of the user to the user's eye to provide a view of the environment in front of the user. The eyepiece is configured to emit light into the user's eye to display augmented reality image content to the user's vision field. The system additionally comprises at least one switchable lenses assembly comprising a diffractive liquid crystal lens assembly. The diffractive liquid crystal lens assembly comprises an active layer comprising a twisted nematic liquid crystal diffractive lens, a first and second retarders comprising polymerized liquid crystal on opposite sides of the active layer, and first and second electrodes disposed to applying an electric field to the active layer of twisted nematic liquid crystal, the first and second electrodes on opposite sides of the active layer. The system further comprises electronics configured to vary the optical power of the switchable lens by applying an electrical signal to the electrodes, wherein the at least one switchable lenses is configured to transmit light from the environment in front of the user to the user's eye.

In a 103$^{rd}$ example, in the display device of the 102$^{nd}$ example, the first and second retarders on opposite sides of the active layer of twisted nematic liquid crystal are adjacent to the active layer of twisted nematic liquid crystal.

In a 104$^{th}$ example, in the display device of the 102$^{nd}$ or 103$^{rd}$ examples, polymerized liquid crystal comprising the first and second retarders are alignment layers for the active liquid crystal layer.

In a 105$^{th}$ example, in the display device of any of the 102$^{nd}$ to 104$^{th}$ examples, the first and second retarders are disposed between the first and second electrodes.

In a 106$^{th}$ example, in the display device of any of the 102$^{nd}$ to 105$^{th}$ examples, the first and second retarders each comprise first and second quarter wave retarders comprising polymerized liquid crystal.

In a 107$^{th}$ example, the display device of any of the 102$^{nd}$ to 106$^{th}$ examples further comprises first and second alignment layers disposed adjacent first and second retarders, respectively. The first and second alignment layers are on respective sides of the first and second retarders opposite the active layer.

In a 108$^{th}$ example, in the display device of any of the 102$^{nd}$ to 107$^{th}$ examples, at least the first electrodes comprise interdigitated electrodes.

In a 109th example, in the display device of any of the 102nd to 108th examples, the at least one switchable lens assembly is configured to transmit light directed into the user's eye to display augmented reality image content to the user's vision field.

In a 110th example, in the display device of any of the 102nd to 109th examples, the at least one switchable lens assembly comprises two switchable lens assemblies, where one is disposed to transmit light directed into the user's eye to display augmented reality image content to the user's vision field and both are configured to transmit light from the environment in front of the user to the user's eye.

In a 111th example, a head mounted display system is configured to project light to an eye of a user to display augmented reality image content in a vision field of the user. The head-mounted display system comprises a frame configured to be supported on a head of the user. The system additionally comprises an eyepiece disposed on the frame. At least a portion of the eyepiece is transparent and disposed at a location in front of the user's eye when the user wears the head-mounted display such that the transparent portion transmits light from the environment in front of the user to the user's eye to provide a view of the environment in front of the user. The eyepiece is configured to emit light into the user's eye to display augmented reality image content to the user's vision field. The system additionally includes at least one switchable lens assembly comprising a plurality of switchable lenses. Each of the switchable lenses has at least two states. The switchable lens assembly has different optical power for different states of the plurality of lenses. The switchable lens assembly has different optical power for different wavelengths when the plurality of lenses are set to a particular state. The system further comprises electronics in communication with the switchable lenses to alter the state of the plurality of lenses. The electronics are configured to cause different lenses in the plurality of switchable lenses to be in different states for different wavelengths.

In a 112th example, in the display device of the 111th example, when the plurality of switchable lenses are set in a first combination of states, the lens assembly produces a power for a red wavelength that is different than a power for a green wavelength, and when the plurality of switchable lenses are in a second combination of states, the lens assembly produces a power for a red wavelength that is different than a power for a green wavelength.

In a 113th example, in the display device of the 111th example or the 112th example, when the plurality of switchable lenses is set in the second combination of states, the power for the red wavelength is closer to the power of the green wavelength when the plurality of lenses are set in the first combination of states than the power for the green wavelength when the plurality of lenses is set in the second combination of states.

In a 114th example, in the display device of any of the 111th to 113th examples, the electronics is configured to set the plurality of lenses in the second state for the red wavelength and in the first state for the green wavelengths for a given power target.

In a 115th example, a method of fabricating an eyepiece for augmented reality eyewear configured to direct light into a wearer's eye so as to present images to the wearer comprises providing a substrate. The method additionally comprises forming a first lens region on the substrate, where the first lens region comprises a transparent liquid crystal lens having optical power. The method further comprises providing a second region on the substrate that is transparent that does not have optical power.

In a 116th example, in the method of the 115th example, the first lens region is surrounded by the second transparent region not having lens power.

In a 117th example, in the method of the 115th or 116th examples, the second lens region includes at least 40% the area of the substrate.

In a 118th example, in the method of the 115th or 116th examples, the second lens region includes at least 30% the area of the substrate.

In a 119th example, in the method of 115th or 116th examples, the second lens region includes at least 20% the area of the substrate.

In a 120th example, in the method of the 115th or 116th examples, the second lens region includes at least 10% the area of the substrate.

In a 121st example, the method of any of the 115th to 120th examples comprises selectively depositing liquid crystal on the first lens region and not on the second transparent region.

In a 122nd example, the method of any of the 115th to 121st examples further comprises depositing liquid crystal on the substrate.

In a 123rd example, the method of the 122nd example further comprises selectively polymerizing the liquid crystal in the first lens region and not in the second transparent region.

In a 124th example, the method of the 123rd example further comprises removing unpolymerized liquid crystal from the second transparent region.

In a 125th example, the method of the 124th example further comprises providing a lens pattern on the first lens region and not on the second transparent region.

In a 126th example, the method of the 125th example, further comprising providing a uniform alignment pattern on the second transparent region.

In a 127th example, the method of the 126th example further comprises illuminating the second transparent region and not the first lens region with uniformly linearly polarized light.

In a 128th example, the method of any of the 115th to 120th examples comprises nanoimprinting the first lens region and not the second transparent region with a lens pattern that will provide optical power when liquid crystal is deposited thereon and aligned therewith.

In a 129th example, the method of the 128th example comprises nanoimprinting the second transparent region with a uniform imprint pattern that will not provide optical power when liquid crystal is deposited thereon.

In a 130th example, the method of the 129th example further comprises depositing liquid crystal on the first lens region and the second transparent region.

In a 131st example, the head mounted display system of the 111th example is configured to emit different color light into said user's eye at different times to display the augmented reality image content to the user's vision field.

In a 132nd example, in the head mounted display system of the 131st example, said electronics is configured to cause different lenses in the plurality of switchable lenses to be in different states at different times when said different color light is emitted into said user's eye to display the augmented reality image content to the user's vision field.

In a 133rd example, a head mounted display system is configured to project light to an eye of a user to display augmented reality image content in a vision field of said user. The head-mounted display system comprises a frame configured to be supported on a head of the user. The display system additionally comprises an eyepiece disposed on the frame. At least a portion of said eyepiece is transparent and disposed at a location in front of the user's eye when the user wears said head-mounted display such that said transparent portion transmits light from the environment in front of the user to the user's eye to provide a view of the environment in front of the user. Said eyepiece is configured to emit light into said user's eye to display augmented reality image content to the user's vision field. The display system additionally comprises at least one switchable lens assembly comprising a plurality of switchable lenses, where each of said switchable lenses has at least two states. Variation in the states of said switchable lenses changes the state of the at least one switchable assembly. Said switchable lens assembly has different optical power for different states of said plurality of lenses. Said switchable lens assembly has different optical power for different wavelengths when the plurality of lenses are set to a particular state. The display system further comprises electronics in communication with said switchable lenses to alter the state of said plurality of lenses. Said display device is configured to emit a first color light into said user's eye at a first time and a second color light into said user's eye at a second time to display augmented reality image content to the user's vision field. Said electronics are configured to cause a least one of said lenses to be in different states at first and second times to provide images in said first and second colors.

In a $134^{th}$ example, in the display system of the $133^{rd}$ example, when said plurality of switchable lenses are set in a first combination of states, said lens assembly produces a power for said first color that is different than a power for said second color, and when said plurality of switchable lenses are in a second combination of states, said lens assembly produces a power for said first color that is different than a power for said second color.

In a $135^{th}$ example, in the display system of the $134^{th}$ example, when said plurality of switchable lenses is set in said second combination of states, said power for said first color is closer to the power of said second color when said plurality of lenses are set in said first combination of states than said power for said second color when said plurality of lenses is set in said second combination of states.

In a $136^{th}$ example, in the display system of the $135^{th}$ example, the electronics is configured to set said plurality of lenses in said second state for said first color and in said first state for second wavelengths for a given power target.

In a $137^{th}$ example, in the display system of the $133^{rd}$ example, when said plurality of switchable lenses are set in a first combination of states, said lens assembly produces a power for a red color that is different than a power for a green color, and when said plurality of switchable lenses are in a second combination of states, said lens assembly produces a power for a red color that is different than a power for a green color.

In a $138^{th}$ example, in the display system of the $137^{th}$ example, when said plurality of switchable lenses is set in said second combination of states, said power for said red color is closer to the power of said green color when said plurality of lenses are set in said first combination of states than said power for said green color when said plurality of lenses is set in said second combination of states.

In a $139^{th}$ example, in the display system of the $138^{th}$ example, the electronics is configured to set said plurality of lenses in said second state for said red wavelength and in said first state for green wavelengths for a given power target.

In a $140^{th}$ example, in the display system of the $133^{rd}$ example, said electronics are configured to cause at least one of said lenses to be in different states at said first and second times to provide images in said first and second colors as if originating from the same depth.

In a $141^{st}$ example, in the display system of any of $130^{th}$ to $140^{th}$ examples, the plurality of switchable lenses comprises liquid crystals.

In a $142^{nd}$ example, in the display system of any of $130^{th}$ to $141^{st}$ examples, the plurality of switchable lenses comprises a waveplate lens comprising a liquid crystal (LC) layer.

In a $143^{rd}$ example, in the display system of any of $130^{th}$ to $142^{nd}$ examples, said electronics are configured to cause at least one of said lenses to be in different states at said first and second times to provide images in said first and second colors with reduced difference in focus of said images resulting from chromatic aberration as compared to said at least one of said lenses being in the same states at said first and second times.

It will be appreciated that any one of the above examples may be combined with or used in the context of a wearable augmented reality head-mountable display system and/or a method of making or using the wearable augmented reality head-mountable display system. The head-mountable display may comprise one or more of the following: a light modulating system configured to output light to form an image, a head mountable frame, and/or one or more waveguides attached to the frame and configured to receive the light from the light modulating system.

Additional Considerations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. For example, referring to FIG. 15, it will be appreciated that one or more adaptive lens assemblies 1504-1 to 1504-3 may be disposed between individual ones of the waveguides 1012*a*, 1012*b*, and/or 1012*c*.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display device comprising:
    a waveguide configured to guide light in a lateral direction parallel to an output surface of the waveguide, the waveguide further configured to outcouple the guided light through the output surface; and
    a broadband adaptive lens assembly configured to incouple and to diffract therethrough the outcoupled light from the waveguide, the broadband adaptive lens assembly comprising a first waveplate lens comprising a liquid crystal (LC) layer arranged such that the first waveplate lens has birefringence ($\Delta n$) that varies in a radially outward direction from a central region of the first waveplate lens, and configured to diffract the outcoupled light at a diffraction efficiency greater than 90% within a wavelength range including at least 450 nm to 630 nm,
    wherein a radial arrangement of the $\Delta n$ of the first waveplate lens, resulting from liquid crystal molecules of the LC layer at a given radius from a central axis of the first waveplate lens having substantially the same angle of rotation, is such that the first waveplate lens radially converges light having a first polarization while radially diverging light having a second polarization opposite the first polarization, and
    wherein the broadband adaptive lens assembly is configured to be selectively switched between a plurality of states having different optical powers.

2. The display device of claim 1, wherein the $\Delta n$ of the first waveplate lens increases with increasing wavelength ($\lambda$) within the wavelength range.

3. The display device of claim 1, wherein the broadband adaptive lens assembly comprises a plurality of liquid crystal layers, wherein each of the liquid crystal layers comprises liquid crystal molecules that are successively twisted in a layer normal direction.

4. The display device of claim 1, wherein the broadband adaptive lens assembly is configured to be selectively switched between at least two lens states including:
    a first lens state configured to converge or diverge the outcoupled light having a polarization from the waveguide according to a first optical power and to alter the polarization of the outcoupled light; and
    a second lens state configured to converge or diverge the outcoupled light having the polarization from the waveguide according to a second optical power without altering the polarization of the outcoupled light.

5. The display device of claim 4, wherein the broadband adaptive lens assembly further comprises a second waveplate lens comprising a second liquid crystal layer and a switchable waveplate interposed between the first waveplate lens and the second waveplate lens, wherein the broadband adaptive lens assembly is configured to be selectively switched between the at least two states by electrically activating and deactivating the switchable waveplate.

6. The display device of claim 5, wherein the switchable waveplate comprises twisted nematic liquid crystals, and wherein electrically activating alters a degree twist of the twisted nematic liquid crystals across a thickness of the switchable waveplate.

7. The display device of claim 5, wherein the switchable waveplate is configured to be switched between an activated state, in which the switchable waveplate serves as a half waveplate configured to invert the handedness of a circularly polarized light passing therethrough, and a deactivated state, in which the switchable waveplate is configured to conserve the handedness of the circularly polarized light passing therethrough.

8. The display device of claim 7, wherein each of the first and second waveplate lenses is configured to invert the handedness of the circularly polarized light passing therethrough, and wherein the switchable waveplate is configured to be in the activated state in which the first and second waveplate lenses exert optical powers having opposite signs.

9. The display device of claim 7, wherein each of the first and second waveplate lenses is configured to invert the handedness of the circularly polarized light passing therethrough, and wherein the switchable waveplate is configured to be in the deactivated state in which the first and second waveplate lenses exert optical powers having the same sign.

10. The display device of claim 5, wherein the switchable waveplate is configured to be switched between a deactivated state, in which the broadband adaptive lens assembly has a net optical power having a magnitude that is proportional to a sum of magnitudes of optical powers of the first and second waveplate lenses, and an activated state, in which the adaptive lens assembly has a net optical power having a magnitude that is proportional to a difference between magnitudes of optical powers of the first and second waveplate lenses.

11. The display device of claim 10, wherein the first and second waveplate lenses have optical powers having about the same magnitude, such that in the activated state, the switchable waveplate has the net optical power of about zero.

12. The display device of claim 4, wherein the first waveplate lens is electrically switchable, wherein the broadband adaptive lens assembly further comprises a second waveplate lens that is electrically switchable and comprises a second liquid crystal (LC) layer arranged such that the second waveplate lens has birefringence ($\Delta n$) that varies in a radially outward direction from a central region of the second waveplate lens and configured to diffract the outcoupled light at a diffraction efficiency greater than 90% within the wavelength range, wherein the broadband adaptive lens assembly is configured to be selectively switched between the at least two states by switching one or both of the first and second waveplate lenses.

13. The display device of claim 12, wherein the switchable waveplate is configured to be switched between an activated state, in which each of the first and second switchable waveplates serves as a half waveplate configured to invert the handedness of a circularly polarized light passing therethrough, and a deactivated state, in which each of the first and second switchable waveplates is configured to conserve the handedness of the circularly polarized light passing therethrough.

14. The display device of claim 13, wherein each of the first and second waveplate lenses is configured to have optical powers having opposite signs for circularly polarized light having opposite polarizations passing therethrough.

15. The display device of claim 14, wherein the broadband adaptive lens assembly has a net optical power having a magnitude that is proportional to a sum of magnitudes of optical powers of the first and second waveplate lenses, such that by selectively activating one or both of the first and second waveplate lenses, for the given polarization of the outcoupled light, the broadband adaptive lens assembly is configured to be selectively switched between four states.

16. A display device, comprising:
  a pair of adaptive lens assemblies in an optical path, wherein each of the adaptive lens assemblies comprises:
    a waveplate lens having a radial arrangement of birefringence, resulting from liquid crystal molecules at a given radius from a central axis of the waveplate lens having substantially the same angle of rotation, is such that the waveplate lens radially converges light having a first polarization while radially diverging light having a second polarization opposite the first polarization, and
    a corresponding switchable waveplate configured to diffract light at a diffraction efficiency greater than 90% within a wavelength range including at least 450 nm to 630 nm and to switch between first and second states to selectively alter a polarization state of light passing therethrough,
  wherein the adaptive lens assemblies have optical powers with opposite signs.

* * * * *

UNITED STATES PATENT AND TRADEMARK OFFICE
CERTIFICATE OF CORRECTION

PATENT NO. : 11,231,612 B2
APPLICATION NO. : 16/171290
DATED : January 25, 2022
INVENTOR(S) : Chulwoo Oh Page 1 of 3

It is certified that error appears in the above--identified patent and that said Letters Patent is hereby corrected as shown below:

On the Title Page

Page 2, Column 2 (Other Publications), Line 2, Delete "alighnment" and insert --alignment--.

Page 2, Column 2 (Other Publications), Line 23, Delete "retaration" and insert --retardation--.

Page 2, Column 2 (Other Publications), Line 61, Delete "crystal-polyner compostie:" and insert --crystal-polymer composite:--.

Page 2, Column 2 (Other Publications), Line 62, Delete "andtemperature," and insert --and temperature,--.

Page 3, Column 1 (Other Publications), Line 9, Delete "ARpreserice.pdf." and insert --ARpresence.pdf.--.

Page 3, Column 1 (Other Publications), Line 21, Delete "wavepiate" and insert --waveplate--.

In the Drawings

Sheet 15 of 56, (Reference Numeral 1004) (FIG. 10), Line 2, Delete "lens." and insert --lens--.

Sheet 15 of 56, (Reference Numeral 1008) (FIG. 10), Line 2, Delete "lens." and insert --lens--.

Sheet 20 of 56, (FIG. 13C), Line 5 (Approx.), Delete "birefnngent" and insert --birefringent--.

Sheet 33 of 56, (Reference Numeral 1900) (FIG. 19B), Line 1, Delete "LCDiffractive" and insert --LC Diffractive--.

Sheet 33 of 56, (Reference Numeral 1900) (FIG. 19C), Line 1, Delete "LCDiffractive" and insert --LC Diffractive--.

Signed and Sealed this
Twenty-sixth Day of July, 2022

Katherine Kelly Vidal
*Director of the United States Patent and Trademark Office*

CERTIFICATE OF CORRECTION (continued)
U.S. Pat. No. 11,231,612 B2

In the Specification

Column 2, Line 28, Delete "(☐n)" and insert --(Δn)--.

Column 9, Line 62, Delete "FIG." and insert --FIGS.--.

Column 31, Line 39, Delete "Γ=2πΔnd/λ," and insert --Γ=2πΔnd/λ--.

Column 44, Line 23, Delete "1300F," and insert --13F,--.

Column 48, Line 24, Delete "(FIGS." and insert --(FIG.--.

Column 48, Line 26, Delete "(FIGS." and insert --(FIG.--.

Column 50, Line 28, Delete "LCHP." and insert --LHCP.--.

Column 52, Line 20, Delete "11B." and insert --11B,--.

Column 52, Line 34, Delete "FIGS." and insert --FIG.--.

Column 54, Line 10, Delete "FIGS." and insert --FIG.--.

Column 55, Line 66, Delete "LCHP" and insert --LHCP--.

Column 57, Line 41, Delete "FIGS." and insert --FIG.--.

Column 58, Line 45, Delete "FIGS." and insert --FIG.--.

Column 59, Line 22, Delete "FIG." and insert --FIGS.--.

Column 62, Line 19, Delete "FIGS." and insert --FIG.--.

Column 65, Line 46, Delete "LCHP" and insert --LHCP--.

Column 67, Line 20, Delete "(FIGS." and insert --(FIG.--.

Column 70, Line 25, Delete "courmarine-containing" and insert --coumarin-containing--.

Column 71, Line 26, Delete "20A/20B" and insert --20A/20B.--.

Column 75, Line 32, Delete "FIGS." and insert --FIG.--.

Column 77, Line 60, Delete "force" and insert --force.--.

Column 79, Line 59, Delete "FIG." and insert --FIGS.--.

Column 80, Line 40, Delete "FIG." and insert --FIGS.--.

Column 84, Line 36, Delete "lens.29." and insert --lens.--.

Column 85, Line 11, Delete "33th" and insert --33rd--.

Column 85, Line 53, Delete "example." and insert --example,--.

Column 87, Line 21, Delete "example." and insert --example,--.